US00RE48705E

(19) United States
(12) Reissued Patent
Houghton et al.

(10) Patent Number: US RE48,705 E
(45) Date of Reissued Patent: Aug. 24, 2021

(54) GUSSET PLATE CONNECTION OF BEAM TO COLUMN

(71) Applicant: MITEK HOLDINGS, INC., Wilmington, DE (US)

(72) Inventors: David L. Houghton, Laguna Niguel, CA (US); Jared J Adams, Mission Viejo, CA (US); Jesse Karns, Mission Viejo, CA (US)

(73) Assignee: MITEK HOLDINGS, INC., Chesterfield, MO (US)

(21) Appl. No.: 16/733,818

(22) Filed: Jan. 3, 2020

Related U.S. Patent Documents

Reissue of:
(64) Patent No.: 10,094,103
Issued: Oct. 9, 2018
Appl. No.: 14/729,904
Filed: Jun. 3, 2015

U.S. Applications:
(63) Continuation of application No. 14/233,953, filed as application No. PCT/US2013/072368 on Nov. 27, 2013, now Pat. No. 9,091,065.
(Continued)

(51) Int. Cl.
*E04C 3/06* (2006.01)
*E04C 3/32* (2006.01)
(Continued)

(52) U.S. Cl.
CPC ..... *E04C 3/06* (2013.01); *E04B 1/2403* (2013.01); *E04B 1/40* (2013.01); *E04C 3/32* (2013.01);
(Continued)

(58) Field of Classification Search
CPC ... E04C 3/32; E04C 3/06; E04C 5/162; E04B 1/40; E04B 1/2403; E04B 2001/2418;
(Continued)

(56) References Cited

U.S. PATENT DOCUMENTS 1,883,376 A 10/1932 Hilpert et al.
2,514,607 A 7/1950 McLean
(Continued)

FOREIGN PATENT DOCUMENTS

JP 2003074126 3/2003
JP 2003074126 A 3/2003
(Continued)

OTHER PUBLICATIONS

United Kingdom Office Action for Application No. GB1609741.2, dated May 15, 2020, 4 pages.
(Continued)

*Primary Examiner* — William C Doerrler
(74) *Attorney, Agent, or Firm* — Stinson LLP

(57) ABSTRACT

A joint connection structure of a building framework includes a column assembly including a column and a pair of gusset plates connected to the column on opposite sides of the column and extending laterally outward from the column. A full-length beams assembly includes a full-length beam having upper and lower flanges and an end portion received between the gusset plates. A connecting member is operatively attached by welding to at least one of the flanges of the full-length beam. The connecting member is bolted to at least one of the gusset plates of the column assembly to connect the full-length beam assembly to the column assembly.

35 Claims, 87 Drawing Sheets

Related U.S. Application Data

(60) Provisional application No. 61/798,041, filed on Mar. 15, 2013, provisional application No. 61/732,015, filed on Nov. 30, 2012.

(51) Int. Cl.
*E04C 5/16* (2006.01)
*E04B 1/41* (2006.01)
*E04B 1/24* (2006.01)

(52) U.S. Cl.
CPC ..... *E04C 5/162* (2013.01); *E04B 2001/2415* (2013.01); *E04B 2001/2418* (2013.01); *E04B 2001/2439* (2013.01); *E04B 2001/2445* (2013.01); *E04B 2001/2448* (2013.01); *E04B 2001/2451* (2013.01)

(58) Field of Classification Search
CPC ..... E04B 2001/2448; E04B 2001/2539; E04B 2103/06; E04B 2001/2451; E04B 2001/2415; E04B 2001/2445
See application file for complete search history.

(56) References Cited

U.S. PATENT DOCUMENTS 2,720,291 A * 10/1955 Larkin ..... E04B 1/2403 403/169
2,840,014 A 6/1958 Wadsworth et al.
2,943,716 A 7/1960 Babcock
3,691,712 A 9/1972 Bowling et al.
3,938,297 A 2/1976 Sato et al.
3,952,472 A * 4/1976 Boehmig ..... E04B 1/3511 52/655.1
4,074,947 A 2/1978 Matake et al.
4,211,045 A 7/1980 Koizumi et al.
4,409,765 A 10/1983 Pall
4,441,289 A 4/1984 Ikuo et al.
5,148,642 A 9/1992 Plumier et al.
5,253,465 A 10/1993 Gilb
5,263,296 A 11/1993 Spera
5,402,614 A 4/1995 Jewell
5,577,353 A 11/1996 Simpson
5,660,017 A 8/1997 Houghton
5,689,738 A 11/1997 Uziie et al.
5,806,265 A 9/1998 Sluiter
6,022,165 A 2/2000 Lin
6,073,405 A 6/2000 Kasai et al.
6,138,427 A * 10/2000 Houghton ..... E04B 1/2403 52/236.3
6,158,184 A 12/2000 Timmerman, Sr. et al.
6,237,303 B1 * 5/2001 Allen ..... E04B 1/2403 52/653.1
6,516,582 B2 2/2003 Paul et al.
6,516,583 B1 2/2003 Houghton
6,591,573 B2 * 7/2003 Houghton ..... 52/656.9
6,802,169 B2 10/2004 Simmons
6,837,010 B2 1/2005 Powell et al.
6,993,880 B2 2/2006 Cameron et al.
7,076,926 B2 7/2006 Kasai et al.
7,127,863 B2 10/2006 Simmons
7,225,588 B2 6/2007 Nakamura et al.
7,703,244 B2 4/2010 Suzuki et al.
7,784,226 B2 8/2010 Ichikawa et al.
7,941,985 B2 5/2011 Simmons
8,122,671 B2 2/2012 Karns
8,146,322 B2 * 4/2012 Karns ..... E04B 1/2403 52/653.1
8,205,408 B2 6/2012 Houghton et al.
8,375,652 B2 * 2/2013 Hiriyur ..... E04B 1/2403 403/2
8,468,775 B2 * 6/2013 Vaughn ..... E02D 27/34 403/200
8,505,260 B1 8/2013 Chang et al.
8,925,278 B2 1/2015 Sugihara et al.
9,514,907 B2 12/2016 McManus et al.
1,211,446 A1 1/2017 Horn
9,670,676 B2 6/2017 Sirowatka
2002/0020141 A1 2/2002 Payer
2002/0046514 A1 4/2002 Leung
2002/0124520 A1 9/2002 Bock et al.
2003/0009977 A1 1/2003 Houghton
2003/0203008 A1 10/2003 Gunasekaran
2003/0205008 A1 11/2003 Sridhara
2003/0208985 A1 11/2003 Allen et al.
2004/0244330 A1 * 12/2004 Takeuchi ..... E04B 1/2403 52/831
2005/0204684 A1 9/2005 Houghton
2005/0264684 A1 9/2005 Houghton
2006/0101733 A1 5/2006 Jen et al.
2006/0112652 A1 6/2006 Ichikawa et al.
2007/0209314 A1 9/2007 Vaughn
2007/0245643 A1 10/2007 Ichikawa et al.
2007/0253766 A1 11/2007 Packer et al.
2007/0261356 A1 * 11/2007 Vaughn ..... 52/655.1
2008/0289267 A1 11/2008 Sarkisian
2009/0025308 A1 1/2009 Deans et al.
2009/0165419 A1 * 7/2009 Richard ..... E04B 1/24 52/650.2
2009/0223166 A1 * 9/2009 Ohata ..... E04B 1/2403 52/699
2010/0031587 A1 2/2010 Weeks
2010/0043338 A1 2/2010 Houghton et al.
2010/0043347 A1 2/2010 Houghton et al.
2010/0043348 A1 2/2010 Houghton et al.
2011/0030305 A1 * 2/2011 Karns ..... E04B 1/2403 52/650.1
2011/0047925 A1 3/2011 Gan
2011/0252743 A1 * 10/2011 Yang ..... E04B 1/2403 52/849
2012/0009009 A1 1/2012 Bub
2012/0017523 A1 1/2012 Ozaki et al.
2012/0062648 A1 3/2012 Tanaka et al.
2013/0168626 A1 7/2013 Blinn
2014/0020311 A1 1/2014 Richard et al.
2014/0062648 A1 3/2014 McManus et al.
2014/0083046 A1 3/2014 Yang
2014/0182234 A1 7/2014 Yang
2014/0182236 A1 7/2014 Doupe et al.
2014/0318075 A1 10/2014 Shuhaibar
2014/0325932 A1 11/2014 Tran et al.
2015/0218828 A1 8/2015 Goddard
2015/0275501 A1 10/2015 Houghton
2016/0002910 A1 1/2016 Green
2016/0356033 A1 12/2016 Houghton et al.
2017/0314254 A1 11/2017 Houghton et al.

FOREIGN PATENT DOCUMENTS

JP 2007169983 A 7/2007
JP 2009209477 A 9/2009
WO 2004067869 A1 8/2004
WO 2012112608 A2 8/2012
WO 2014085680 A1 6/2014

OTHER PUBLICATIONS

Shirahama, JP2000273953, Sep. 15, 2016, Espacenet, pp. 1-5.
Non-Final Rejection, U.S. Appl. No. 14/729,904, dated Jun. 22, 2015, 10 pages.
Non-Final Rejection, U.S. Appl. No. 14/729,904, dated Nov. 24, 2015, 11 pages.
Non-Final Rejection, U.S. Appl. No. 14/729,904, dated Nov. 28, 2016, 26 pages.
Non-Final Rejection, U.S. Appl. No. 14/729,904, dated May 11, 2017, 32 pages.
Non-Final Rejection, U.S. Appl. No. 14/729,904, dated Sep. 1, 2017, 25 pages.
Australian Examination Report No. 2 for Application No. 2013352060, dated Sep. 18, 2017, 6 pages.

(56) References Cited

OTHER PUBLICATIONS

Australian Examination Report No. 3 for Application No. 2013352060, dated Jan. 2, 2018, 4 pages.
Canadian Office Action for Application No. 2,850,065, dated Dec. 17, 2015, 3 pages.
European Invitation Pursuant to Article 94(3) and Rule 71(1) EPC for Application No. 13 802 517.6, Nov. 16, 2016, 4 pages.
European Communication Pursuant to Article 94(3) EPC; dated Jun. 13, 2017, 5 pages.
United Kingdom Office Action for Application No. GB1609741.2, dated Nov. 8, 2016, 4 pages.
New Zealand Examination for Application No. 708580, dated Oct. 19, 2016, 4 pages.
New Zealand Further Examination for Application No. 708580, dated May 18, 2017, 2 pages.
New Zealand Further Examination for Application No. 708580, dated Aug. 30, 2017, 3 pages.
New Zealand Further Examination for Application No. 708580, dated Oct. 13, 2017, 2 pages.
Panama Office Action for Application No. 90690-01, dated Feb. 2, 2016, 8 pages with English translation.
Invitation to Pay Additional Fees and, Where Applicable, Protest Fees for Application No. PCT/IB2016/053199, dated Jul. 22, 2016, 7 pages.
International Search Report and Written Opinion for Application No. PCT/IB2016/053199, dated Sep. 12, 2016, 17 pages.
Final Rejection, U.S. Appl. No. 14/729,904, dated Feb. 13, 2018, 27 pages.
First Official Action, Application No. 03173-2015, dated Jun. 5, 2018, 11 pages.
American Institute of Steel Construction, Prequalified Connections for Special and Intermediate Steel Moment Frames for Seismic Applications, ANSI/AISC 358-10, ANSI/AISC 358s1-11, Including Supplement No. 1, 2011, 178 pages, Chicago, Illinois.
American Institute of Steel Construction, Steel Design Guide 4, Extended End-Plate Moment Connections, Seismic and Wind Applications, Second Edition, 166 pages, 2003, United States.
American Institute of Steel Construction, Steel Design Guide Series 16, Flush and Extended Multiple Row, Moment End-Plate Connections, 74 pages, 2002, United States.
Atsushi Sato, et al., Cyclic Behavior and Seismic Design of Bolted Flange Plate Steel Moment Connections, Engineering Journal, Fourth Quarter, 2008, pp. 221-232, United States.
Simpson, Strong Tie, Introduction to the Strong Frame® Special Moment Frame, http://www.strongtie.com/products/strongframe/special_mf/intro.asp, 2014, 3 pages, United States.
International Search Report and Written Opinion for Application No. PCT/US2013/072368, dated Feb. 13, 2014, 13 pages, Europe.
Canadian Office action for Application No. 2,850,065, dated Jan. 22, 2015, 4 pages.
United States Office action for U.S. Appl. No. 14/233,953, dated Sep. 4, 2014, 9 pages.
European Communication Pursuant to Article 94(3) EPC; dated Jun. 25, 2015, 4 pages.
United States Office action for U.S. Appl. No. 14/729,957, dated Nov. 17, 2015, 9 pages.
Office action for Canadian Application No. 2,850,065, dated Dec. 17, 2015, 3 pages.
Office action for Panama Application No. 90690-01, dated Feb. 2, 2016, 8 pages with English translation.
European Examination Report for Application No. 13 802 517.6, dated Feb. 23, 2016, 5 pages.
Final Rejection, U.S. Appl. No. 14/729,995, dated Apr. 1, 2016, 6 pages.
Canadian Office action for Application No. 2,898,340, dated Sep. 21, 2016, 4 pages.
New Zealand First Examination Report for Application No. NZ 708580, dated Oct. 19, 2016, 4 pages.
United Kingdom Search Report for Application No. GB1609741.2, dated Nov. 8, 2016, 4 pages.
European Invitation Pursuant to Article 94(3) and Rule 71(1) EPC for Application No. 13 802 517.6, 4 pages.
Australian Examination Report No. 1 for Application No. 2013352060, dated Jan. 9, 2017, 3 pages.
European Communication Pursuant to Article 94(3) EPC for Application No. 13 802 517.6, dated Jun. 13, 2017, 5 pages.
Further Examination for New Zealand Application No. 708580, dated Aug. 30, 2017, 3 pages.
Examination Report No. 3 for Australian Application No. 2013352060, dated Jan. 2, 2018, 4 pages.
Examination Report No. 2 for Australian Application No. 2013352060, dated Jul. 18, 2017, 6 pages.
Official Action, Mexican Patent Applicaton No. MX/a/2015/6517, dated Feb. 6, 2018, 1 page.
New Zealand Examination Report, NZ IP No. 708580, dated Oct. 13, 2017, 3 pages.
New Zealand Examination Report, NZ IP No. 708580, dated May 18, 2017, 2 pages.

* cited by examiner

GUSSET PLATE CONNECTION OF BEAM TO COLUMN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE OF RELATED APPLICATIONS

This application is a continuation of U.S. application Ser. No. 14/233,953, titled GUSSET PLATE CONNECTION OF BEAM TO COLUMN, which was filed on Jan. 21, 2014, and which is the national application of International Application No. PCT/US2013/072368, filed Nov. 27, 2013, which claims the benefit of priority under 35 U.S.C. § 119 to U.S. Patent Application No. 61/732,105, titled GUSSET PLATE CONNECTION OF BEAM TO COLUMN, which was filed on Nov. 30, 2012, and U.S. Patent Application No. 61/798,041, titled GUSSET PLATE CONNECTION OF BEAM TO COLUMN, which was filed on Mar. 15, 2013 and which are incorporated herein by reference in their entireties for all purposes.

FIELD OF THE INVENTION

The present invention generally relates to a moment resisting, beam-to-column joint connection structure.

BACKGROUND OF THE INVENTION

It has been found in a moment-resisting building having a structural steel framework, that most of the energy of an earthquake, or other extreme loading condition, is absorbed and dissipated, in or near the beam-to-column joints of the building.

In the structural steel construction of moment-resisting buildings, towers, and similar structures, most commonly in the past, the flanges of beams were welded to the face of columns by full-penetration, single bevel, groove welds. Thus, the joint connection was comprised of highly-restrained welds connecting a beam between successive columns. Vertical loads, that is, the weight of the floors and loads superimposed on the floors, were and still are assumed by many to be carried by vertical shear tabs or pairs of vertical, structural angle irons arranged back-to-back, bolted or welded to the web of the beams and bolted or welded to the face of the column.

The greater part of the vertical load placed upon a beam was commonly assumed to be carried by a shear tab bolted or welded to the web of the beams and bolted or welded to the face of the flange of the column at each end of the beam. Through the use of face-to-face gusset plates welded to the column, the greater part of the vertical load is carried by the gusset plates.

Experience has shown that the practice of welding the beam's flanges directly to the column is uncertain and/or unsuitable for resistance to earthquakes, explosions, tornadoes and other disastrous events. Such connection means and welding practice has resulted in sudden, fractured welds, the pulling of divots from the face of the column flange, cracks in the column flange and column web, and various other failures. Such highly-restrained welds do not provide a reliable mechanism for dissipation of earthquake energy, or other large forces, and can lead to brittle fracture of the weld and the column, particularly the flange of the column and the web of the column in the locality of the beam-to-column joint, (known as the "panel zone").

It is desirable to achieve greater strength, ductility and joint rotational capacity in beam-to-column connections in order to make buildings less venerable to disastrous events. Greater connection strength, ductility and joint rotational capacity are particularly desirable in resisting sizeable moments in both the lateral and the vertical plane. That is, the beam-to-column moment-resisting connections in a steel frame building can be subjected to large rotational demands in the vertical plane due to inventory lateral building drift. Engineering analysis, design and full-scale specimen testing lave determined that prior steel frame connection techniques can be substantially improved by strengthening the beam-to-column connection in a way which better resists and withstands the sizeable beam-to-column, joint rotations which are placed upon the beam and the column. That is, the beam-to-column connection must be a strong and ductile, moment-resisting connection.

Reference is made to co-assigned U.S. Pat. Nos. 5,660,017, 6,138,427, 6,516,583, and 8,205,408 (Houghton et al.) for further discussion of prior practice and the improvement of the structural connection between beams and columns through the use of gusset plates. These patents illustrate the improvements that have been manifested commercially in the construction industry by Houghton and others in side plate technology. Initially, side plate construction was introduced to greatly improve the quality of the beam-to-column connection. Further improvements included the provision of side plate technology using full length beams to achieve greater economy and to facilitate more conventional erection techniques.

SUMMARY

In one aspect, a joint connection structure of a building framework generally comprises a column assembly including a column and a pair of gusset plates connected to the column on opposite sides of the column and extending laterally outward from the column. A full-length beam assembly includes a full-length beam having upper and lower flanges and an end portion received between the gusset plates. A connecting member is operatively attached by welding to at least one of said flanges of the full-length beam. The connecting member is bolted to at least one of the gusset plates of the column assembly to connect the full-length beam assembly to the column assembly.

In another aspect, a prefabricated column assembly generally comprises a column. A pair of gusset plates are connected to the column on opposite sides of the column and extend laterally outward from the column. A connecting member is welded to an outer surface of at least one of the gusset plates. Both holes are associated with the gusset plates and connecting member for receiving bolts to connect the prefabricated column assembly to a prefabricated beam assembly generally between the pair of gusset plates during erection of a building framework.

In still another aspect, a prefabricated column assembly generally comprises a column. Gusset plates are connected to the column on opposite sides of the column and extend laterally outward from the column. A connecting member is attached to one of the gusset plates. A first plurality of bolt holes are disposed in the connecting member and a second plurality of bolt holes and disposed in said one gusset plate.

Each of the first bolt holes has a bold receiving axis extending generally along a length of the column and each of the second bolt holes has a bolt receiving axis extending transverse to the length of the column. The bolt holes are configured to connect the prefabricated column assembly to a beam assembly.

In yet another aspect, a prefabricated full-length beam assembly generally comprises a full-length beam including top and bottom flanges. Slotted bold holes are associated with at least one of the top and bottom flanges of the full-length beam for receiving bolts positioned to connect the prefabricated full-length beam assembly to gusset plates of a prefabricated column assembly during erection of a building framework. The slotted bolt holes are slotted generally perpendicular to a longitudinal axis of the full-length beam such that a dimension of each bolt hole extending generally perpendicular to the longitudinal axis of the full-length beam is greater than a dimension of each bolt hole extending parallel to the longitudinal axis of the full-length beam. The prefabricated full-length beam assembly is free of connection to a column prior to erection of the building framework.

In still yet another aspect, a joint connection structure of a building framework generally comprises a column assembly including a column and a pair of gusset plates connected to the column on opposite sides of the column and extending laterally outward from the column. A beam assembly includes a beam having upper and lower flanges and an end portion received between the gusset plates. A first plurality of bolts connects the upper flange of the beam to the column assembly and a second plurality of bolts connects the lower flange of the beam to the column assembly. Each of the first bolts have a bolt receiving axis extending transverse to a length of the beam member and generally along a length of the column and each of the second bolts have a bolt receiving axis extending transverse to the length of the beam and transverse to the length of the column.

In yet still another aspect, a joint connection structure of a building framework generally comprises a column assembly including a column and a gusset plate assembly including a pair of gusset plates connected to the column on opposite sides of the column and extending laterally outward from the column. A full-length beam assembly includes a full-length beam having an end portion. A connecting member is operatively attached by welding to an axially facing end of the full-length beam. The connecting member is bolted to the gusset plate assembly of the column assembly to connect the full-length beam assembly to the column assembly.

In another aspect, a prefabricated column assembly generally comprises a column. A pair of gusset plates extend laterally outward from the column. Bolts attach the gusset plates to the column on opposite sides of the column.

BRIEF DESCRIPTION OF THE DRAWINGS

FIG. 115 is a top view of the column assembly in FIG. 113;

FIG. 116 is a right side view of the column assembly in FIG. 113;

FIG. 117 is a fragmentary perspective of a full-length beam assembly of the beam-to-column joint connection structure of FIG. 109;

FIG. 118 is a front view of the full-length beam assembly in FIG. 117;

FIG. 119 is a top view of the full-length beam assembly in FIG. 117;

FIG. 120 is a section taken in the plane including line 120-120 of FIG. 118;

FIG. 121 is a fragmentary perspective of a beam-to-column joint connection structure of an eleventh embodiment;

FIG. 122 is a front view of the beam-to-column joint connection structure of FIG. 121;

FIG. 123 is a top view of the beam-to-column joint connection structure of FIG. 121;

FIG. 124 is a section taken in the plane including line 124-124 of FIG. 122;

FIG. 125 is a fragmentary perspective of a column assembly of the beam-to-column joint connection structure of FIG. 121;

FIG. 126 is a front view of the column assembly in FIG. 125;

Figure 121:
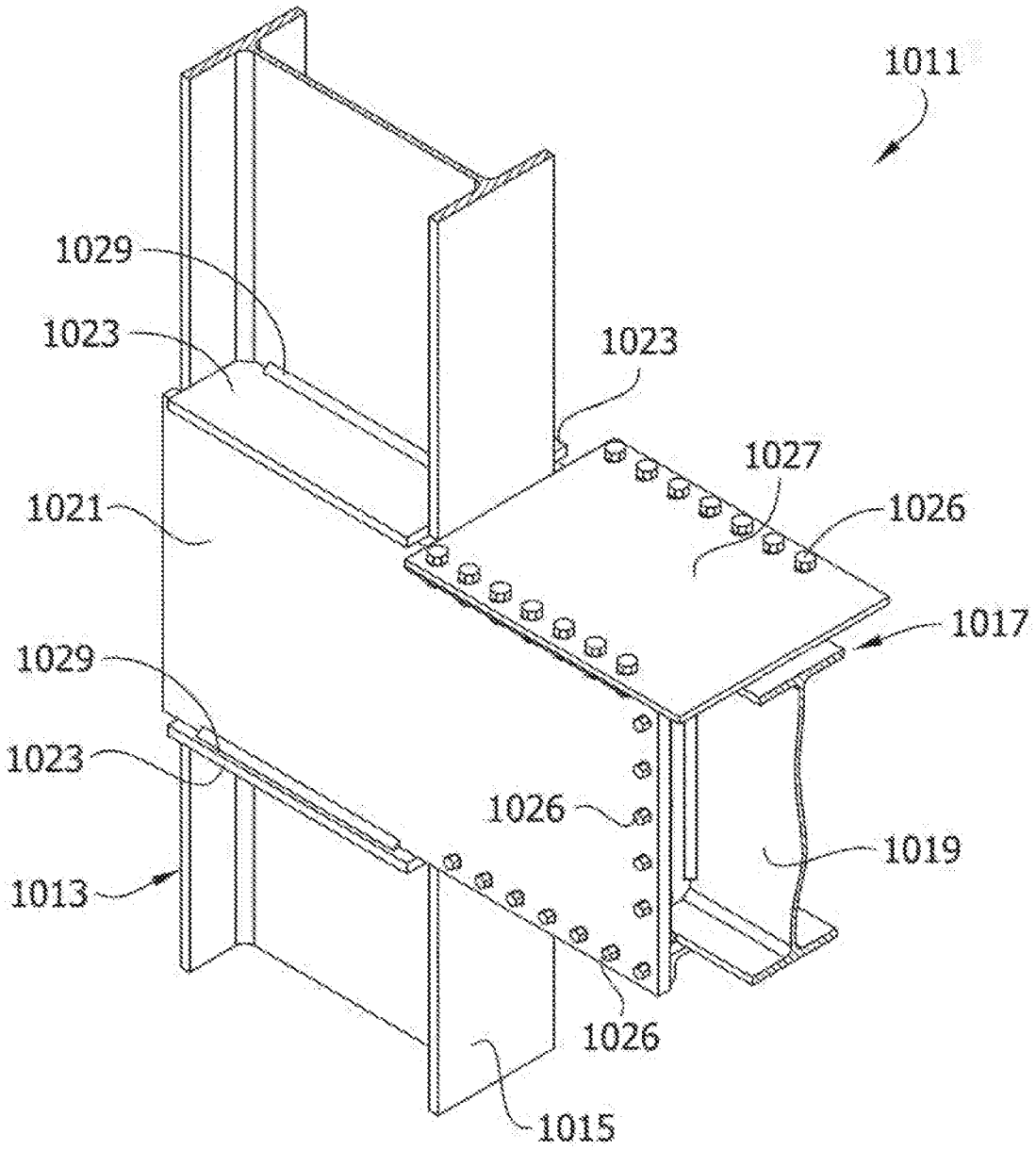
Figure 122:
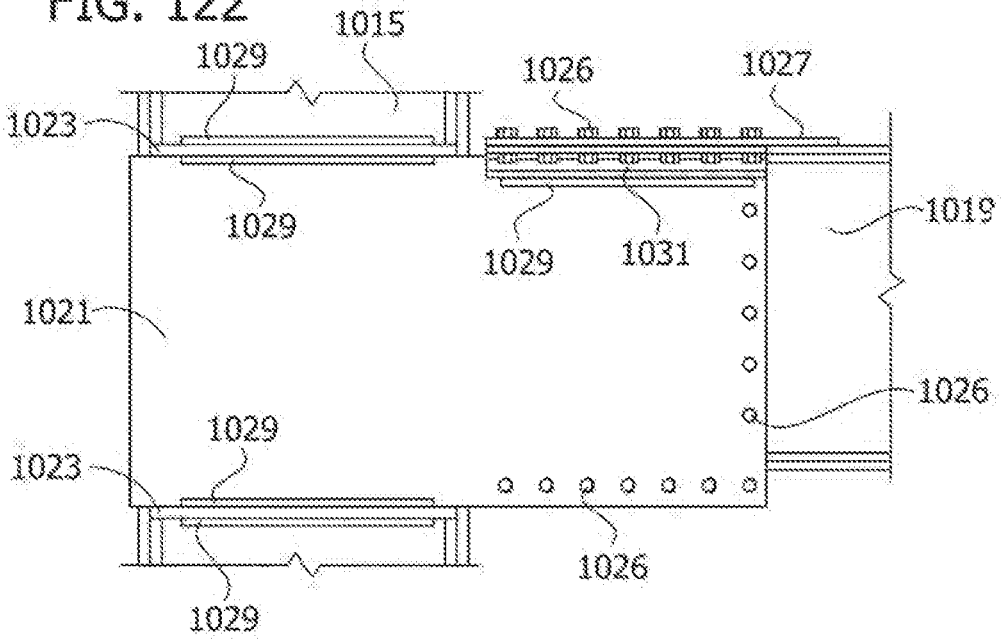
Figure 123:
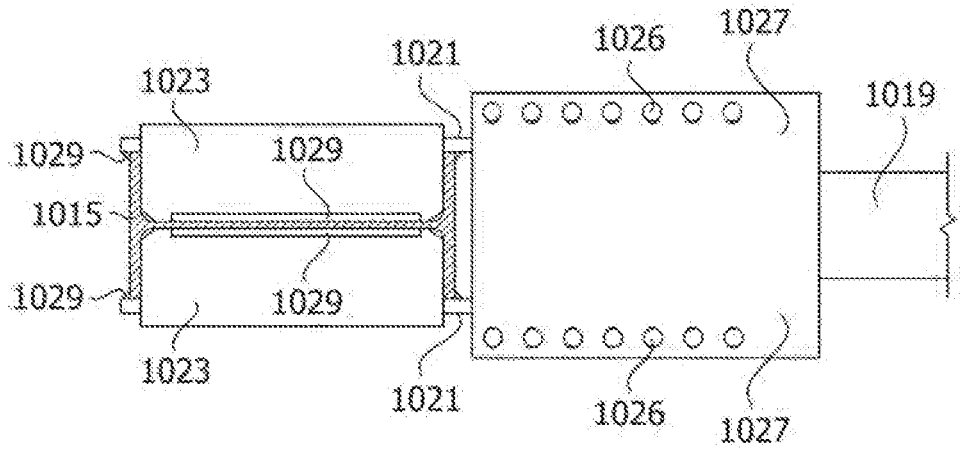
Figure 124:
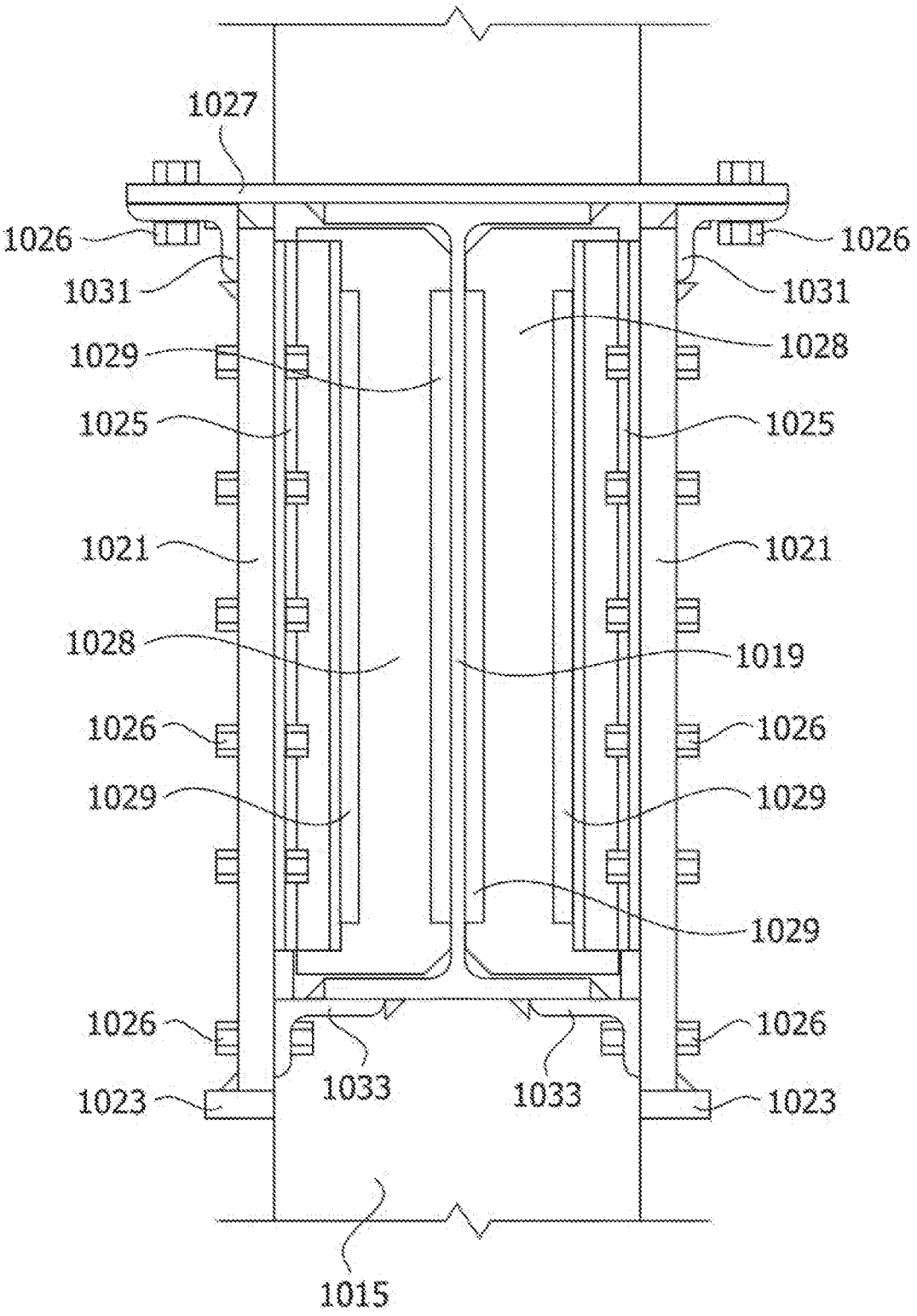
Figure 125:
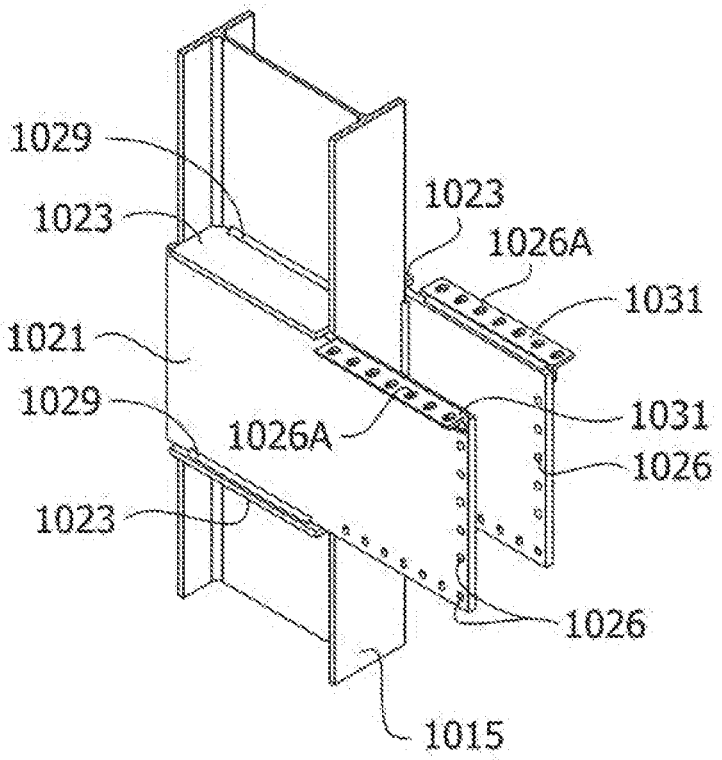
Figure 126:
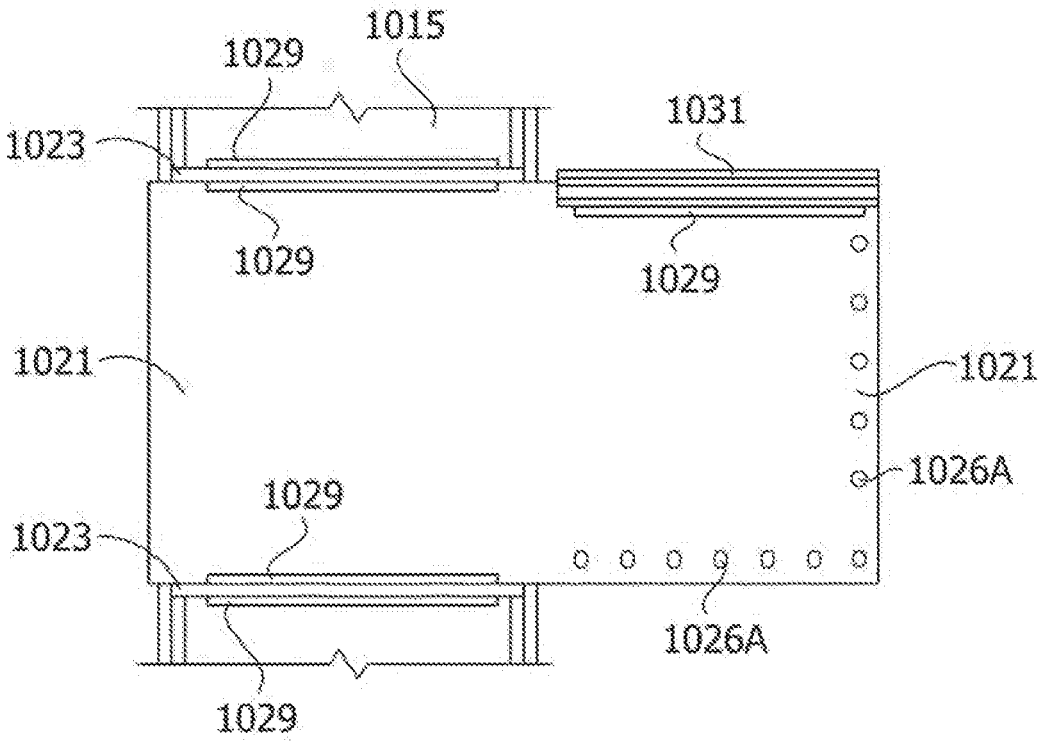
Figure 127:
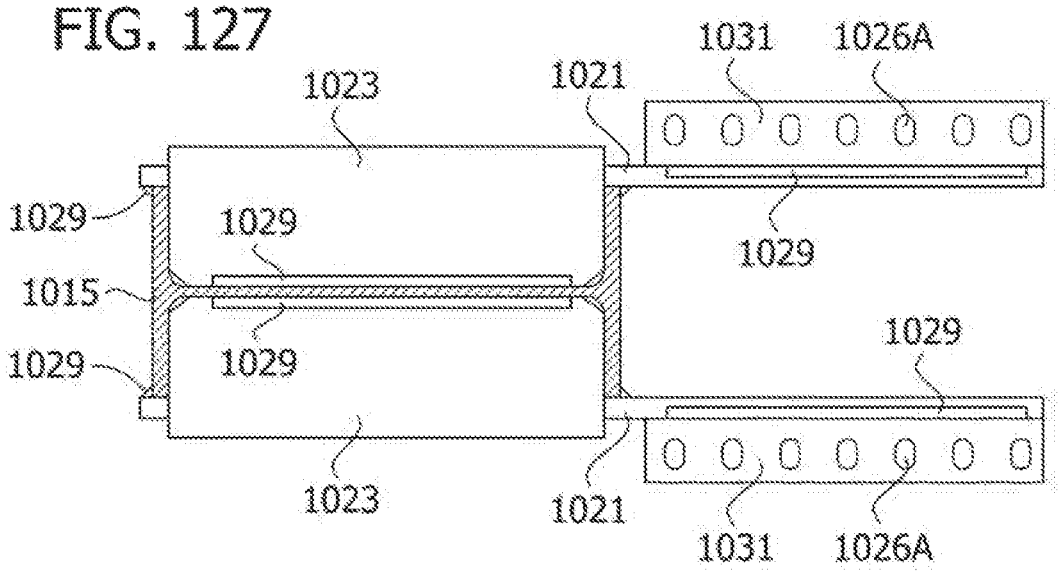
Figure 128:
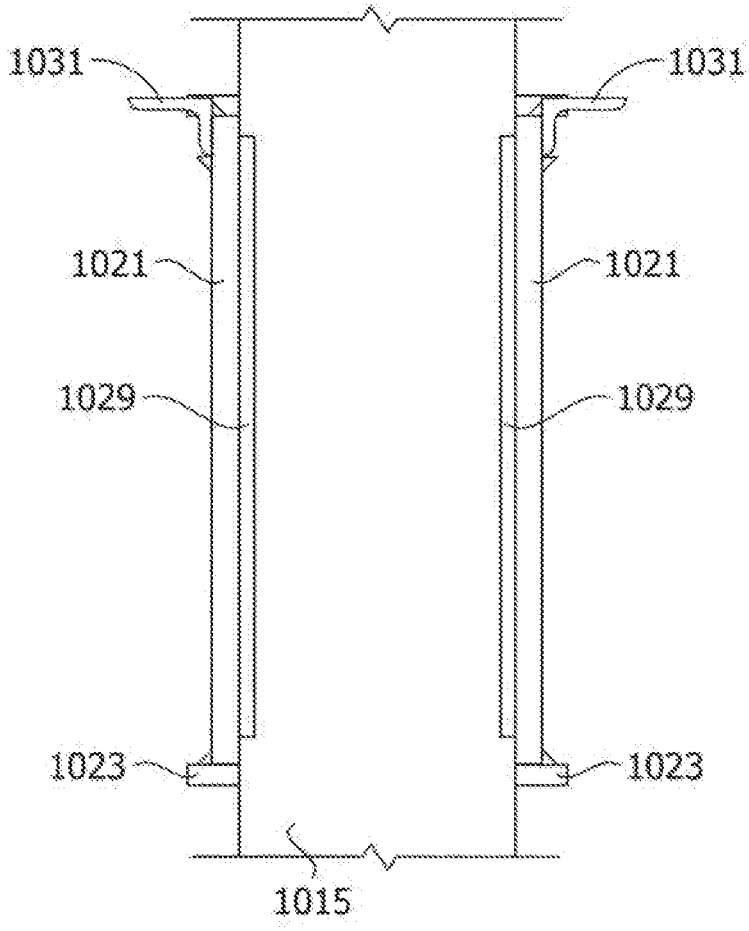
Figure 129:
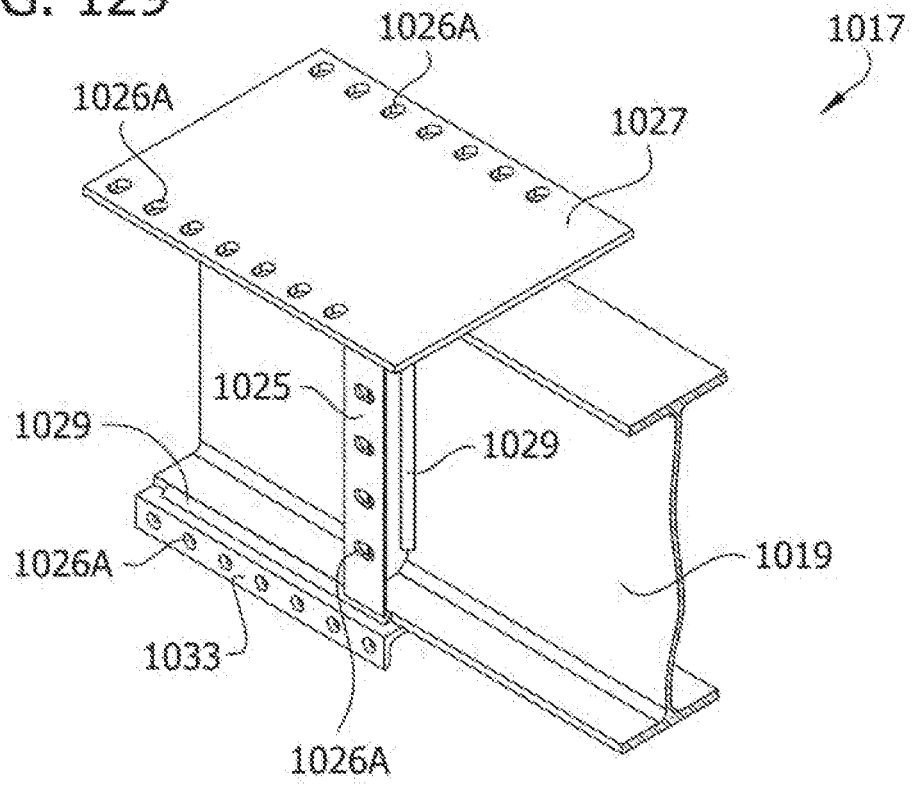
Figure 130:
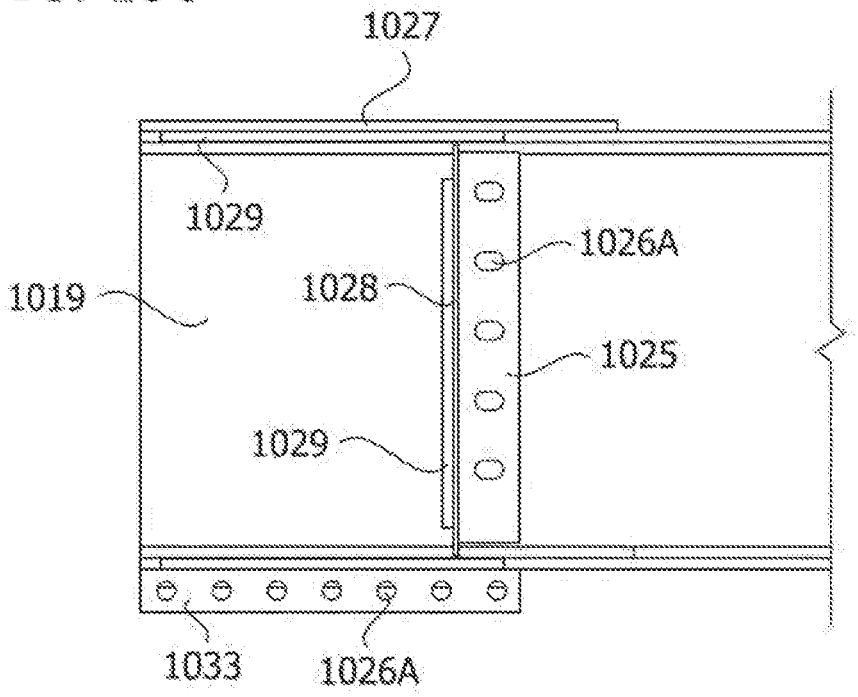
Figure 131:
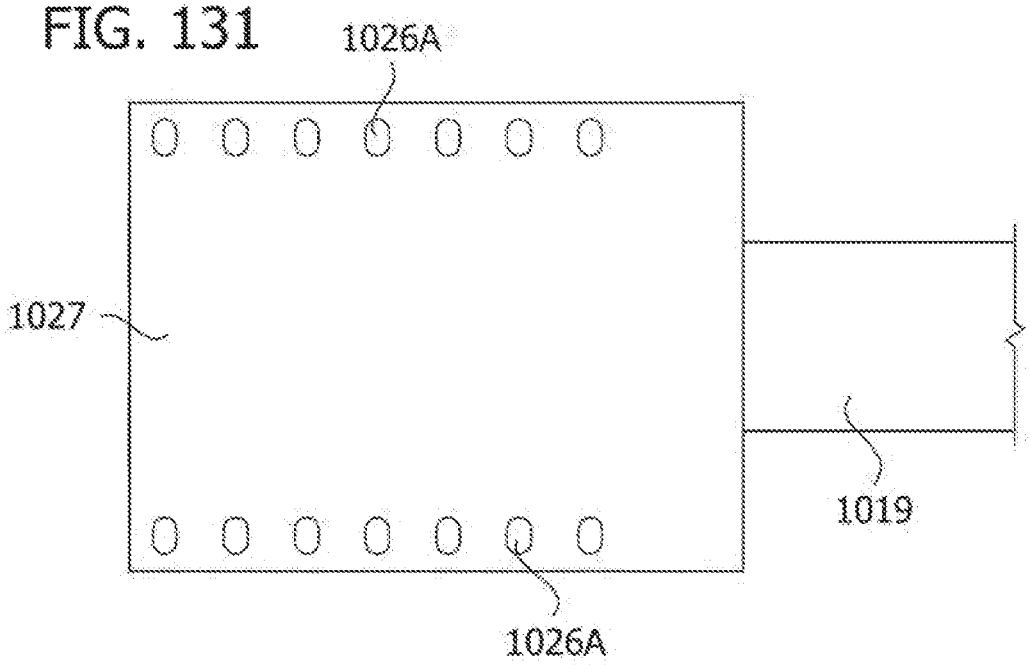
Figure 132:
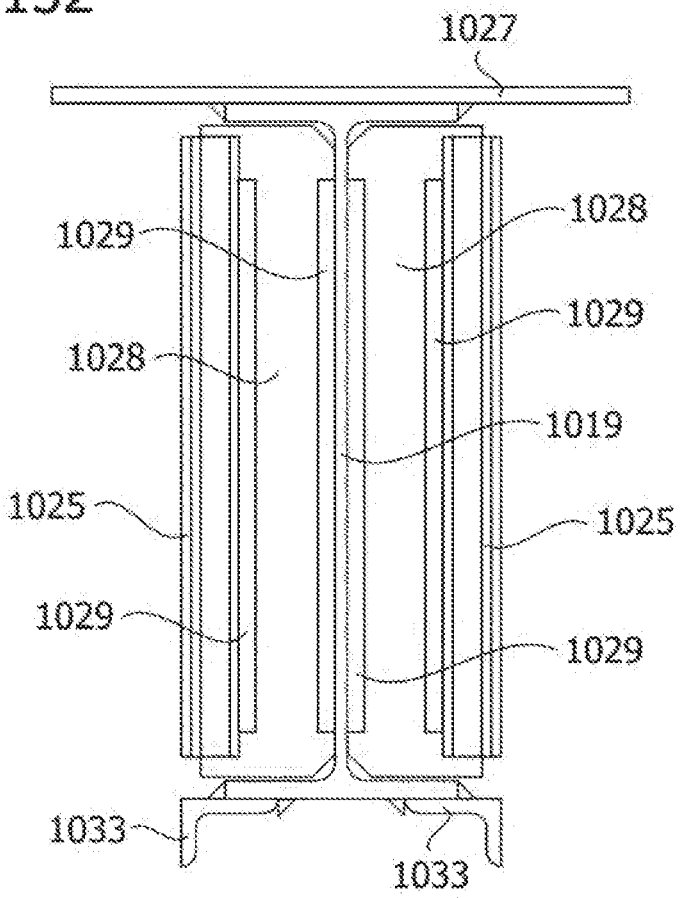
Figure 133:
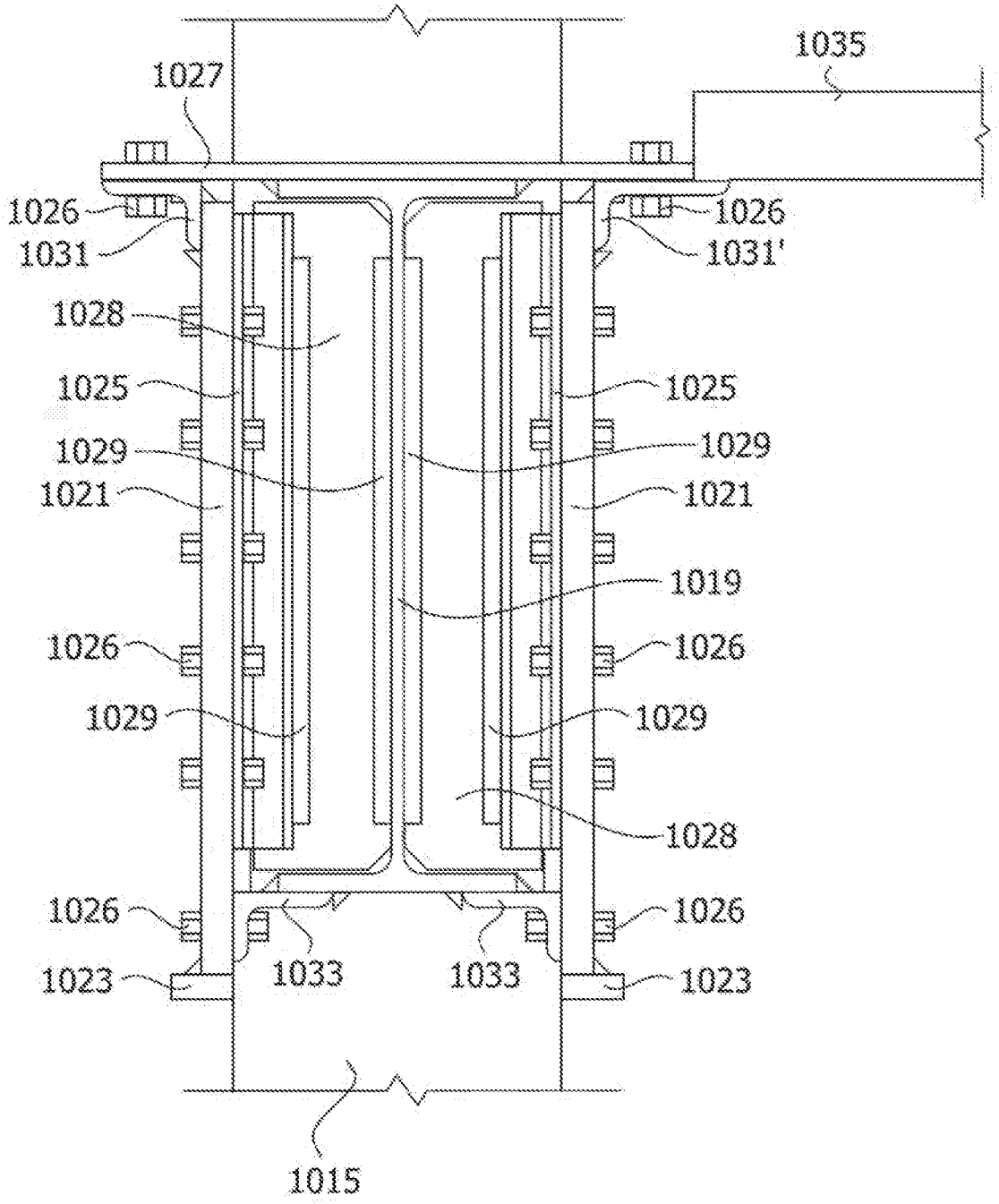
Figure 134:
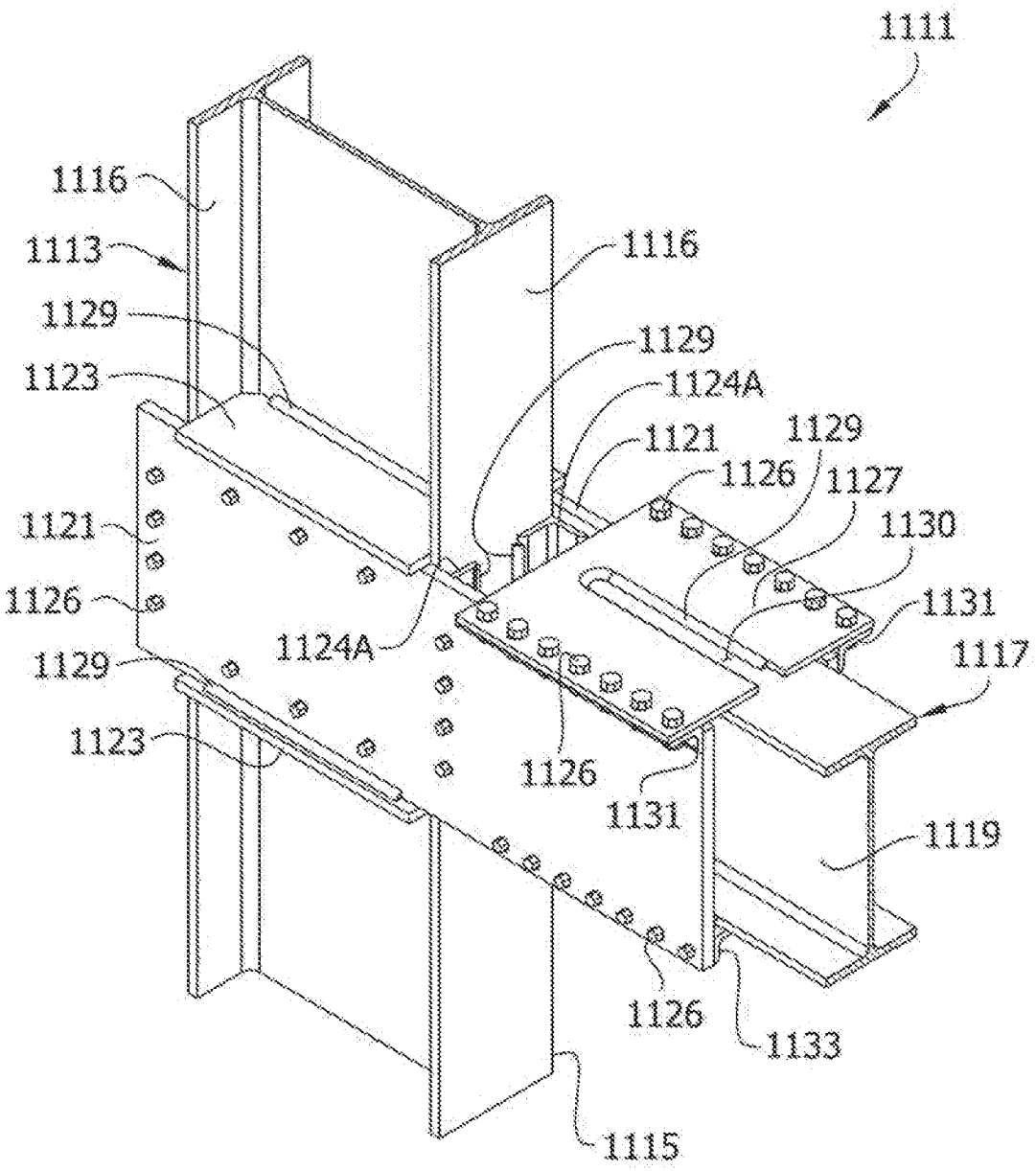
Figure 135:
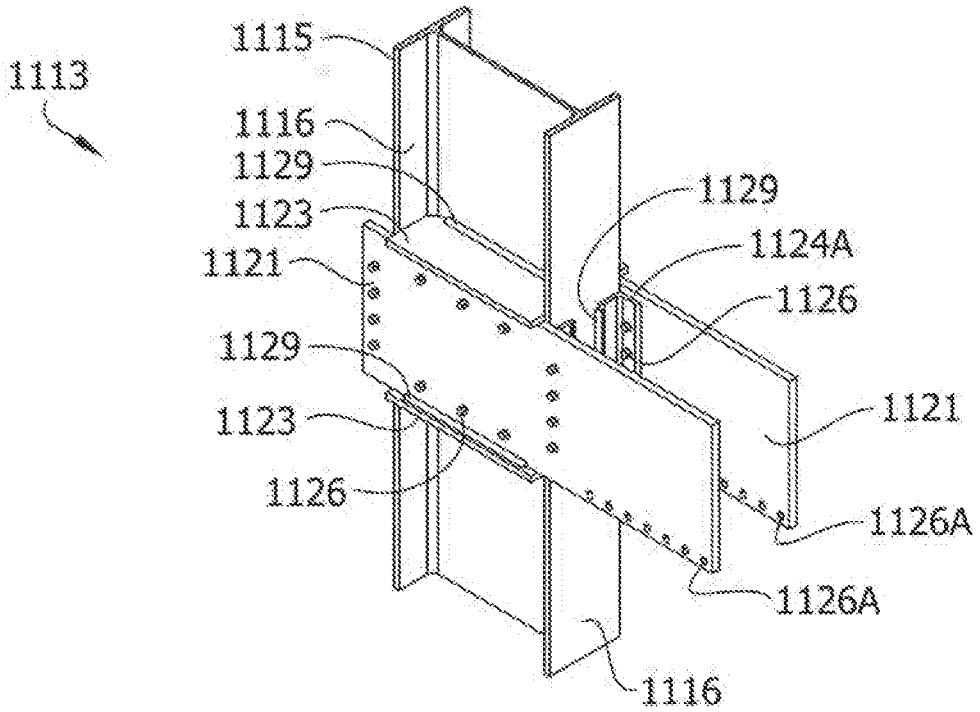
Figure 136:
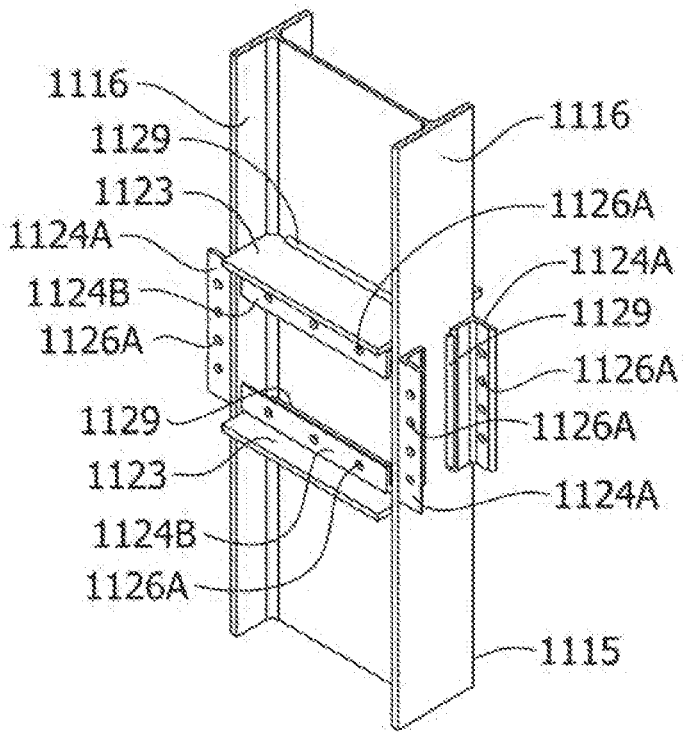
Figure 137:
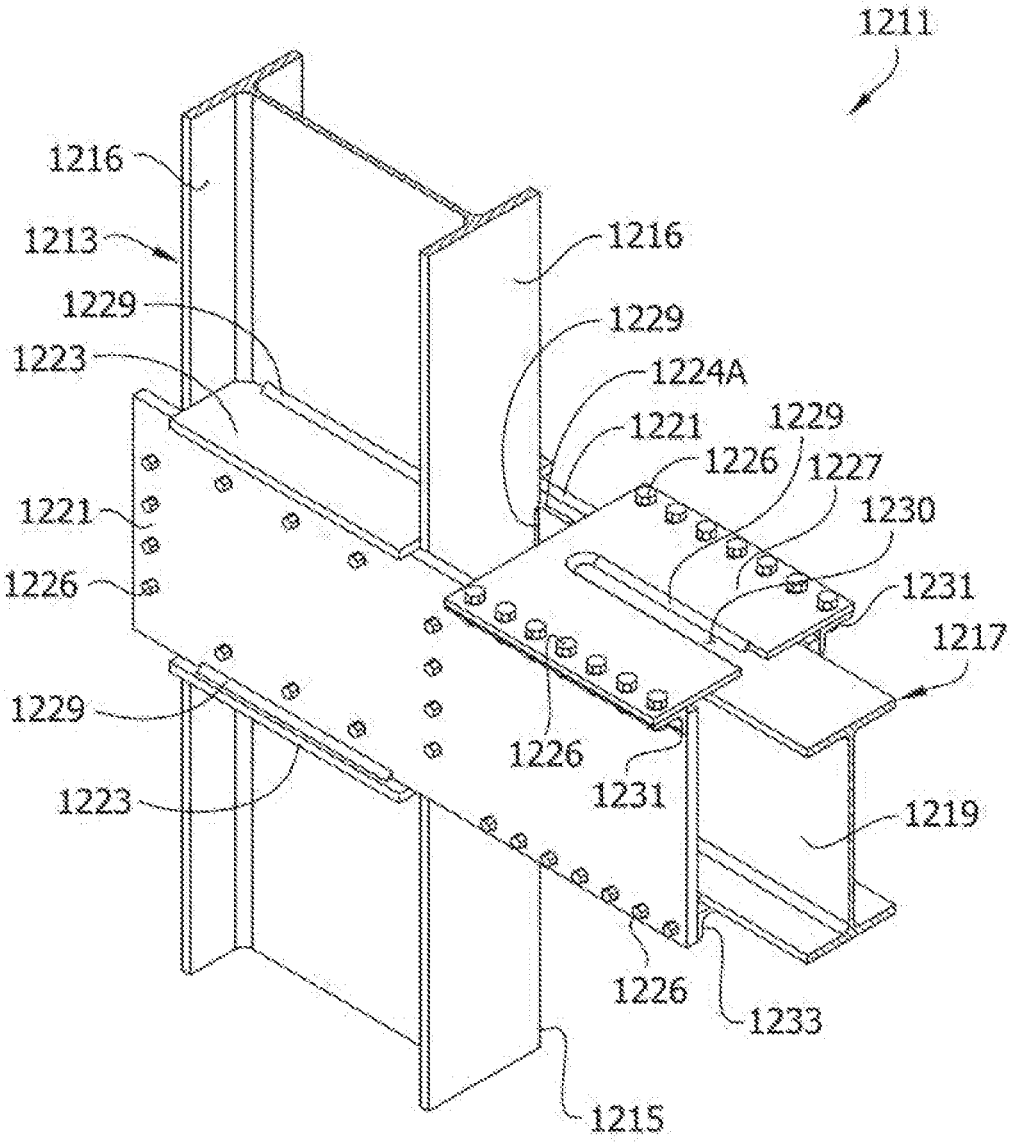
Figure 138:
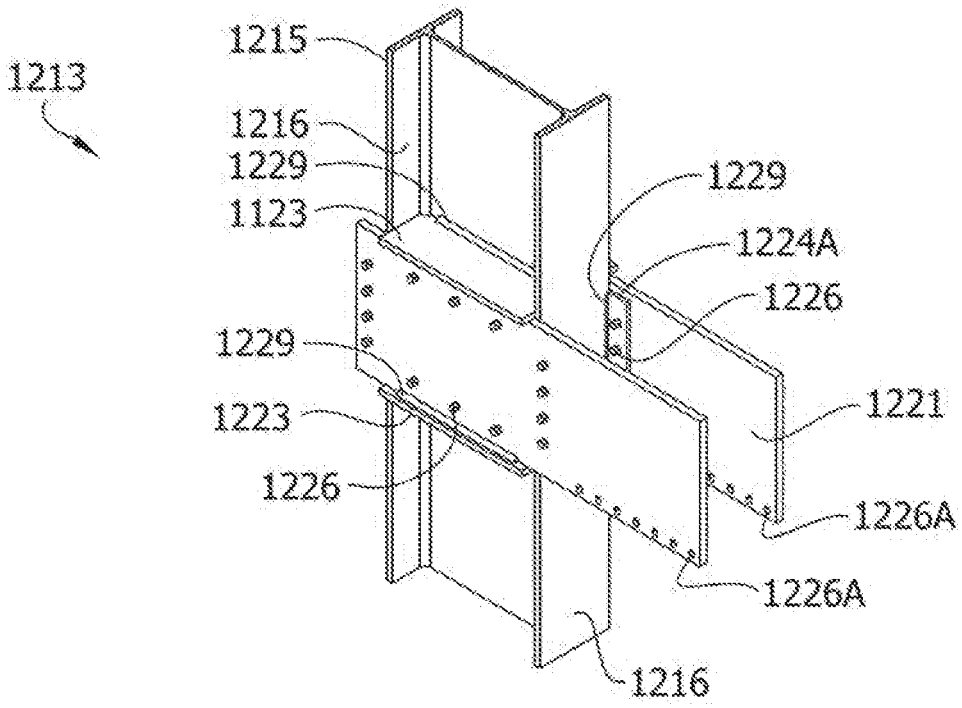
Figure 139:
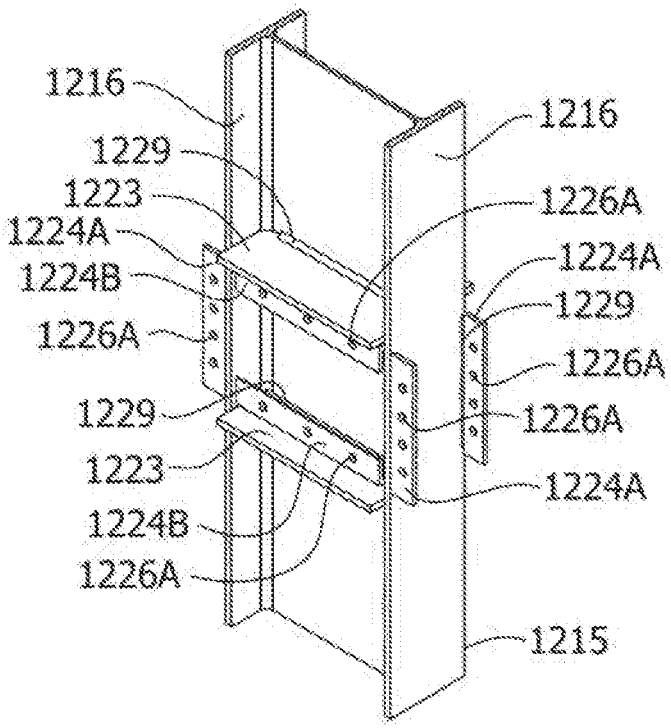

FIG. 127 is a top view of the column assembly in FIG. 125;

FIG. 128 is a right side view of the column assembly in FIG. 125;

FIG. 129 is a fragmentary perspective of a full-length beam assembly of the beam-to-column joint connection structure of FIG. 121;

FIG. 130 is a front view of the full-length beam assembly in FIG. 129;

FIG. 131 is a top view of the full-length beam assembly in FIG. 129;

FIG. 132 is a section taken in the plane including line 132-132 of FIG. 130;

FIG. 133 is the right side view of FIG. 124 but showing a ledger attached to a side plate of the joint connection structure;

FIG. 134 is a fragmentary perspective of a beam-to-column joint connection structure of a twelfth embodiment;

FIG. 135 is a fragmentary perspective of a column assembly of the beam-to-column joint connection structure of FIG. 134;

FIG. 136 is the fragmentary perspective of the column assembly in FIG. 135 with gusset plates of the column assembly removed;

FIG. 137 is a fragmentary perspective of a beam-to-column joint connection structure of a thirteenth embodiment;

FIG. 138 is a fragmentary perspective of a column assembly of the beam-to-column joint connection structure of FIG. 137; and FIG. 139 is the fragmentary perspective of the column assembly in FIG. 138 with gusset plates of the column assembly removed.

Corresponding reference characters indicate corresponding parts throughout the drawings.

DESCRIPTION OF THE PREFERRED EMBODIMENTS

Figure 4:
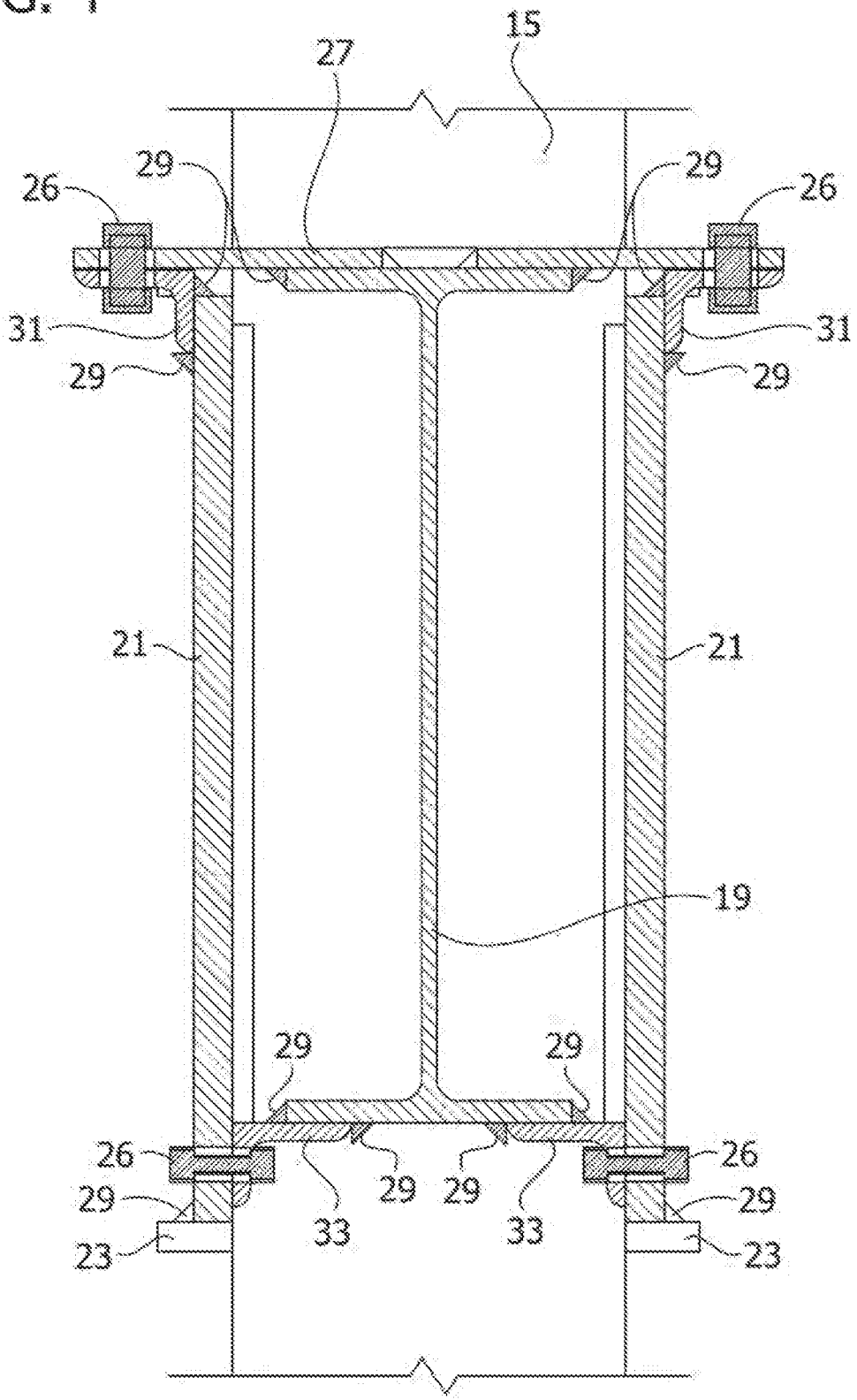
FIG. 4 is a section taken in the plane including line 4-4 of FIG. 2.
Figure 5:
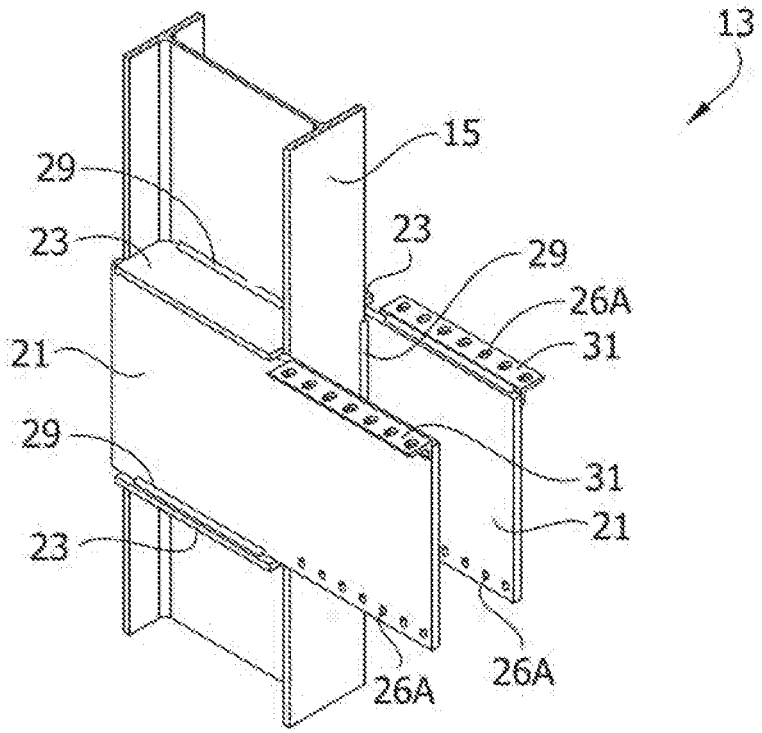
FIG. 5 is a fragmentary perspective of a column assembly of the beam-to-column joint connection structure of FIG. 1.
Figure 16:
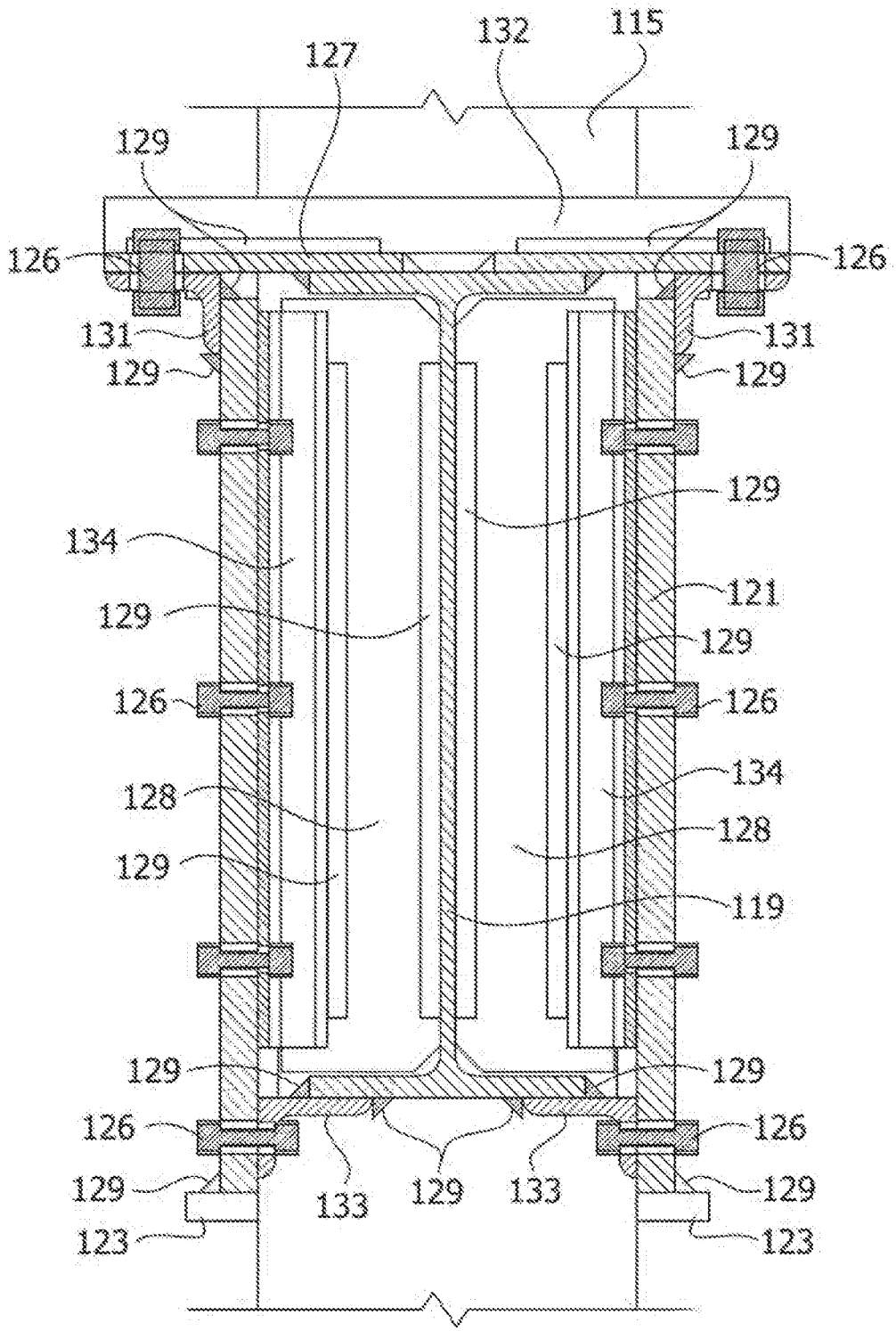
FIG. 16 is a section taken in the plane including line 16-16 in FIG. 14.
Figure 17:
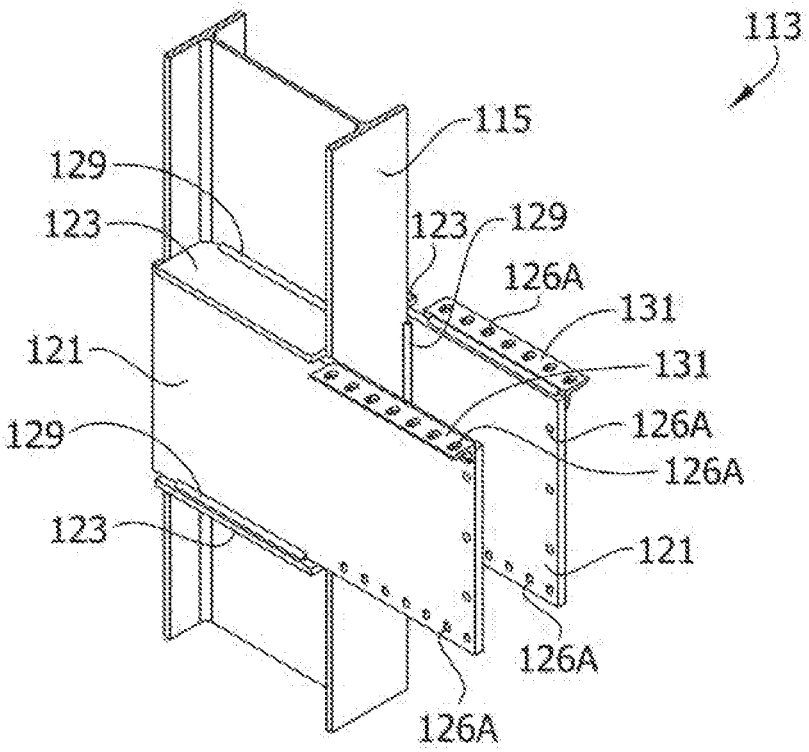
FIG. 17 is a fragmentary perspective of a column assembly of the beam-to-column joint connection structure of FIG. 13.
Figure 18:
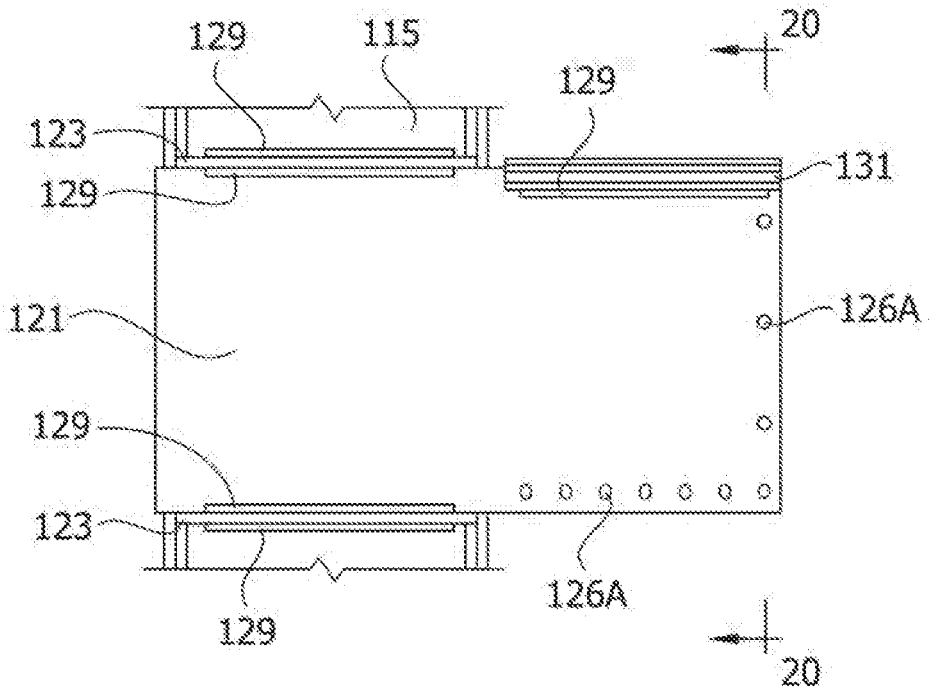
FIG. 18 is a front view of the column assembly in FIG. 17.
Figure 19:
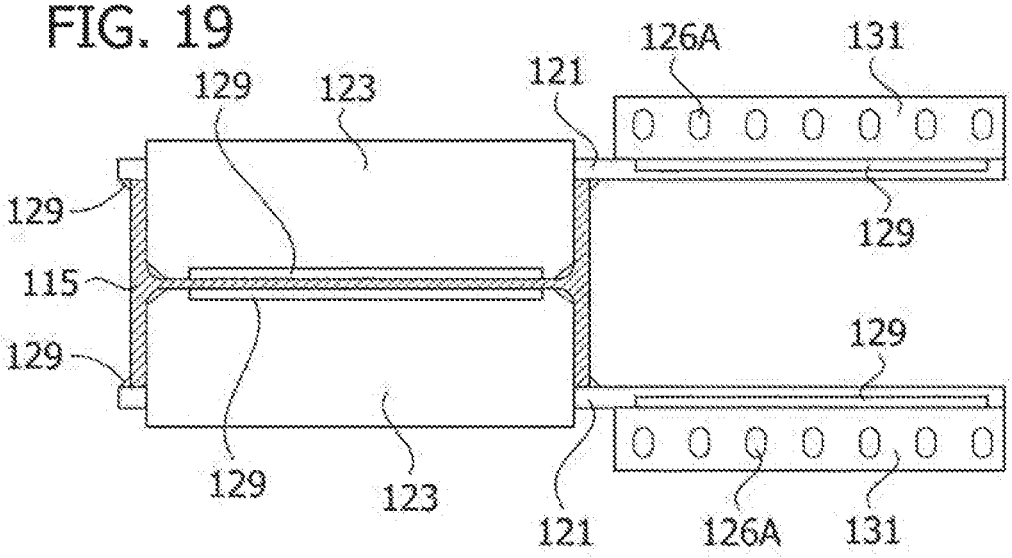
FIG. 19 is a top view of the column assembly in FIG. 17.
Figure 20:
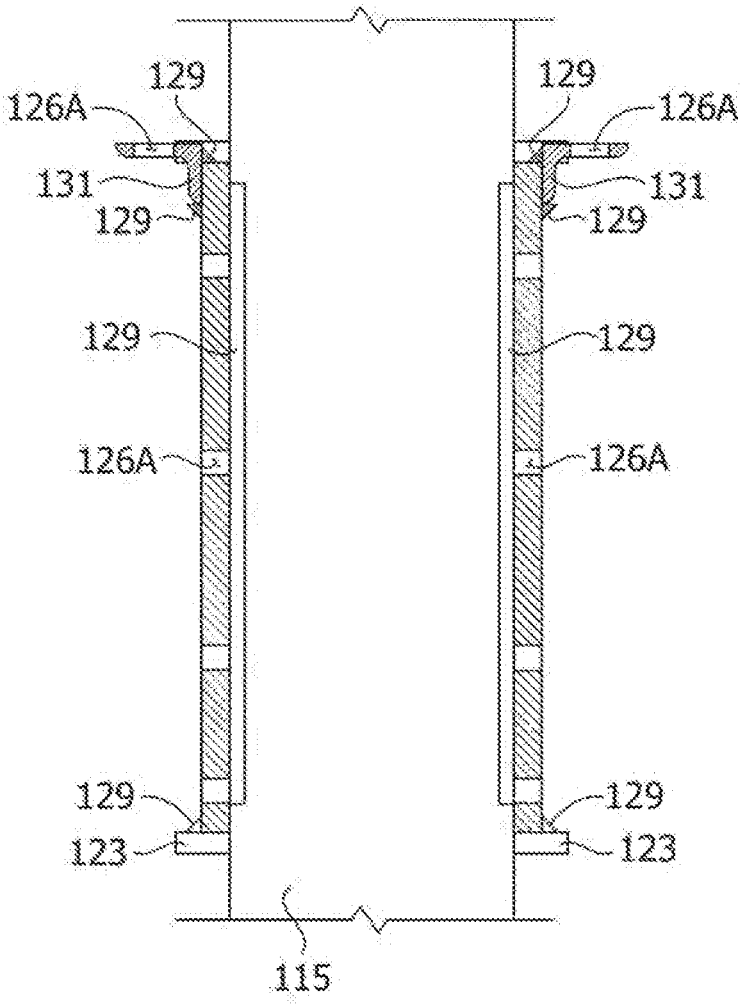
FIG. 20 is a section taken in the plane including line 20-20 in FIG. 18.
Figure 21:
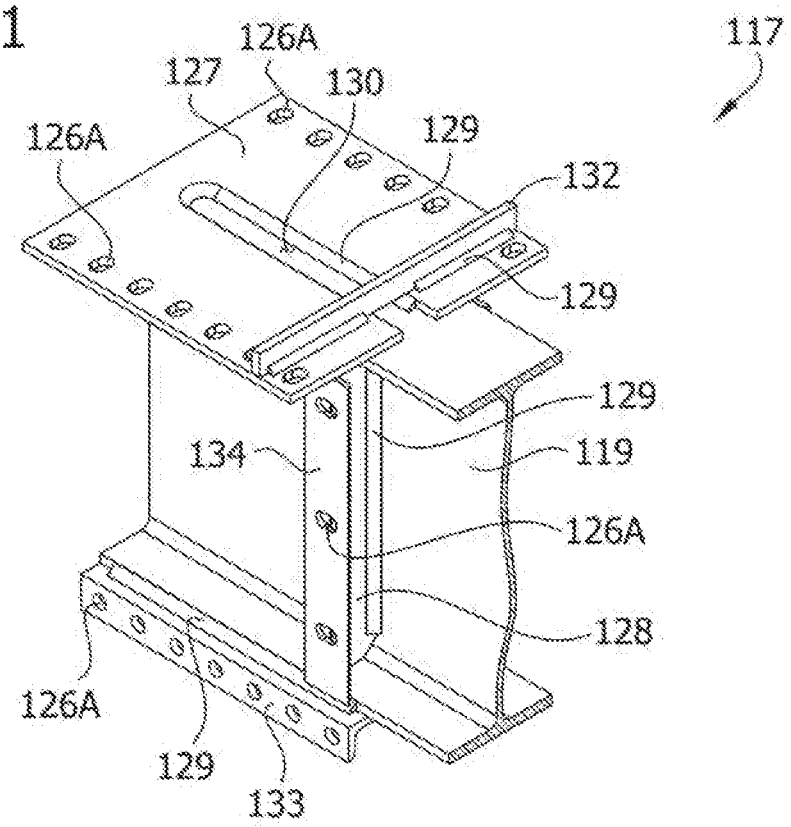
FIG. 21 is a fragmentary perspective of a full-length beam assembly of the beam-to-column joint connection structure of FIG. 13.
Figure 22:
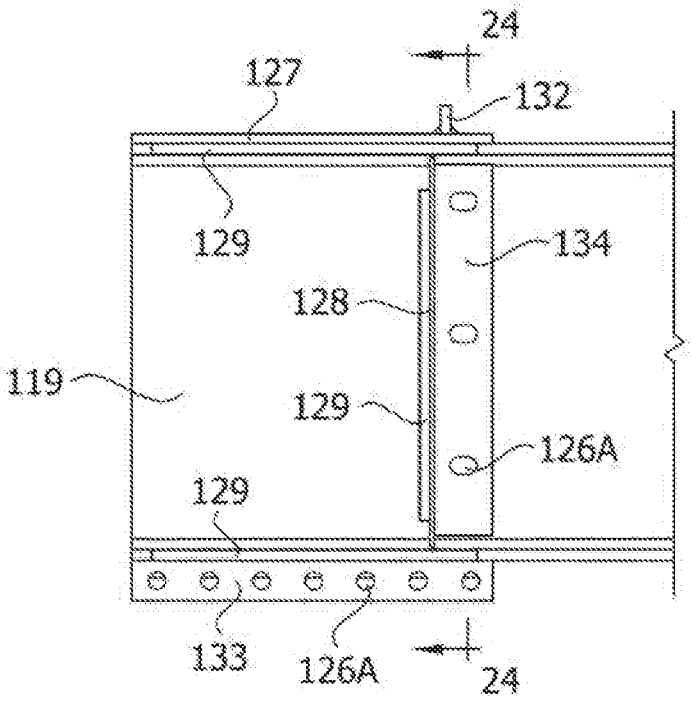
FIG. 22 is a front view of the full-length beam assembly in FIG. 21.
Figure 23:
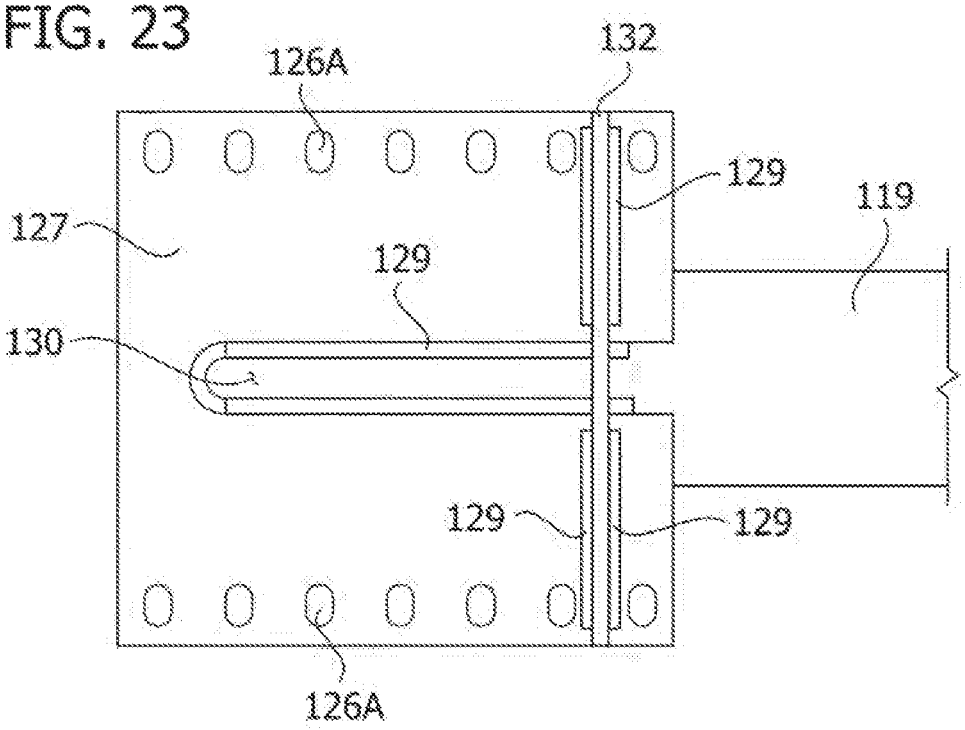
FIG. 23 is a top view of the full length beam assembly in FIG. 21.

Referring to FIGS. 1-12, a beam-to-column moment-resisting joint connection structure of a first embodiment is generally indicated at 11. The joint connection structure may be used in the construction of a building framework F (see FIG. 1A). In the illustrated embodiment, the joint connection structure joins a column assembly 13 including a column 15 to a full-length beam assembly 17 including a full-length beam 19. A full-length beam is a beam that has a length sufficient to extend substantially the full-length between adjacent columns in a structure. Thus, a stub and link beam assembly as shown in FIGS. 5 and 16 of U.S. Pat. No. 6,138,427, herein incorporated by reference, is not a full-length beam. It is understood that the joint connection structure may be a beam-to-column type as shown, or a beam-to-column-to beam type as shown in U.S. Pat. No. 8,146,322, herein incorporated by reference, depending upon the location of the joint connection structure within a building's framework.

Figure 1:
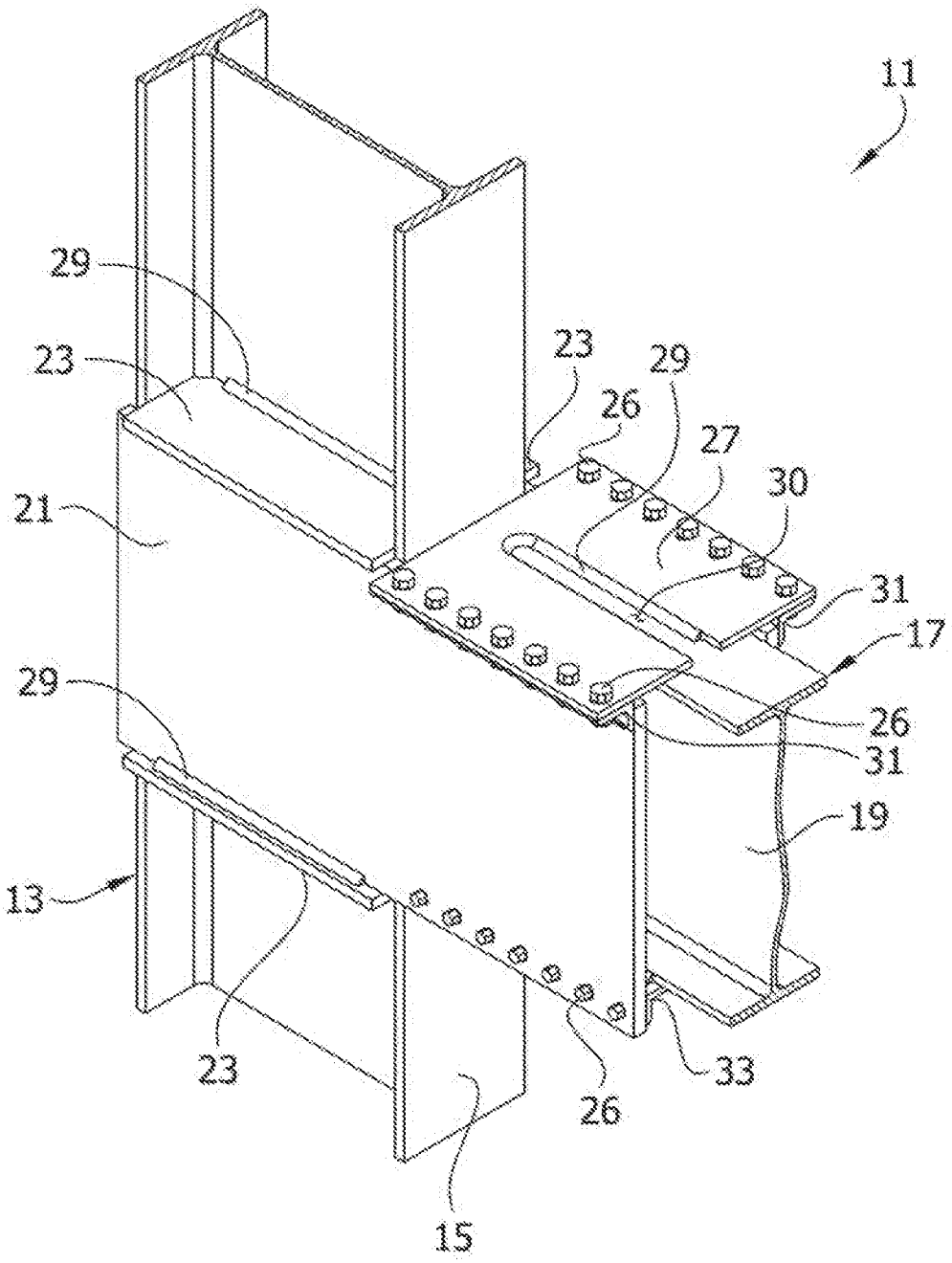
FIG. 1 is a fragmentary perspective of a beam-to-column joint connection structure of a first embodiment.
Figure 1A:
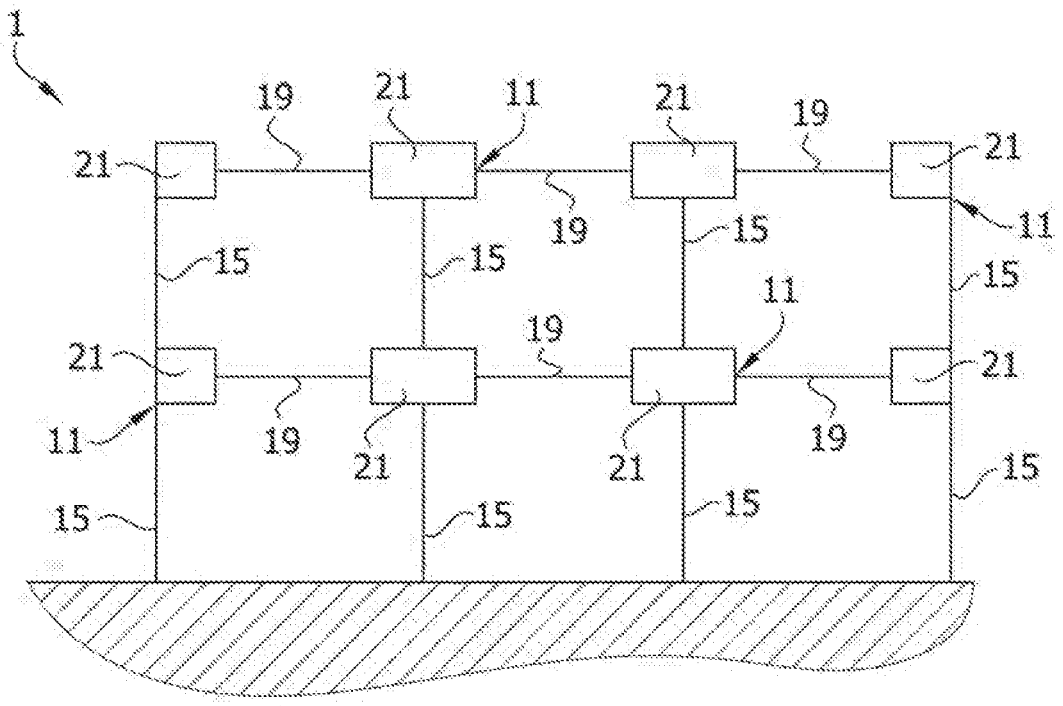
FIG. 1A is a diagrammatic elevation of a building framework.
Figure 2:
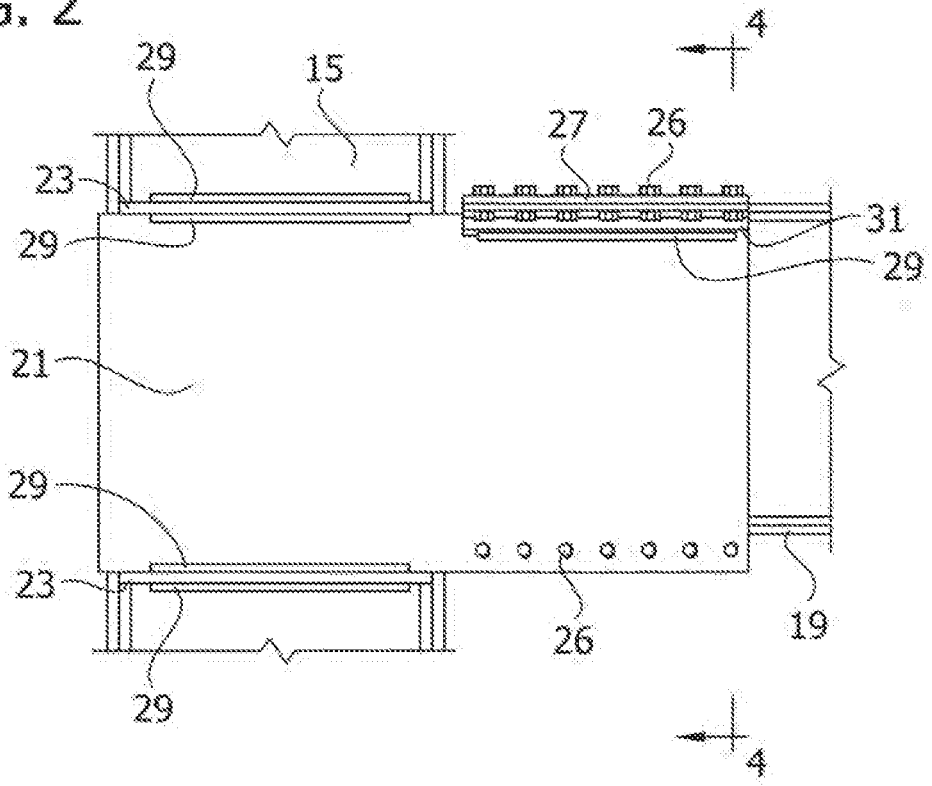
FIG. 2 is a front view of the beam-to-column joint connection structure of FIG. 1.
Figure 3:
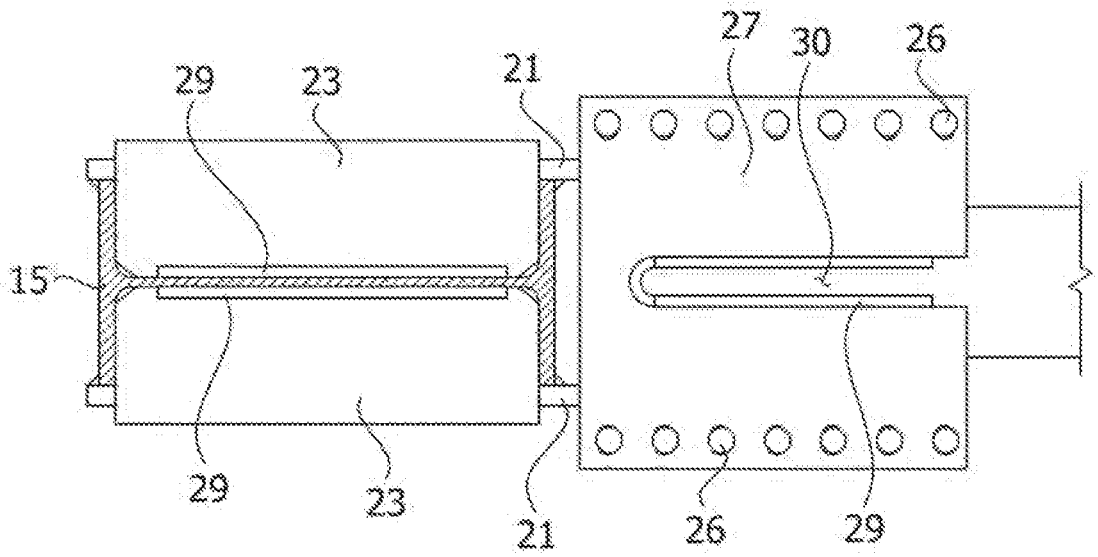
FIG. 3 is a top view of the beam-to-column joint connection structure of FIG. 1.

The beam 19 and column 15 may have any suitable configuration, such as an I-beam, H-beam configuration, or hollow rectangular shape (built up box member or HSS tube section). A spaced apart pair of parallel, vertically and horizontally extending gusset plates 21 sandwich the column 15 and beam 19. Four optional horizontal shear plates 23 (only three are shown in FIG. 1) are arranged in vertically spaced pairs generally aligned at top and bottom edges of the gusset plates 21. A horizontal cover plate 27 is disposed on top of an end of the beam 19. The cover plate 27 is attached in a suitable manner such as by weld 29 to the upper flange of the beam 19. The cover plate 27 may have a width that is greater than a width of the beam 19 and a horizontal spacing of the gusset plates 21. The configuration of the cover plate 27 allows the beam 19 to be lowered between the gusset plates 21 so that one end of the full-length beam assembly 17 is initially supported in bearing between the cover plate 27 and the top edge of the horizontal extension of the gusset plates 21 of the column assembly 13. In other words, the beam 19 is self-shoring. Preferably, the cover plate 27 may rest on a top face of a projecting horizontal leg of upper angle irons 31 which will be explained in greater detail below. The cover plate 27 extends along the length of the beam 19 and terminates generally at the ends of the gusset plates 21. The cover plate 27 has an oblong radiused slot opening 30 extending along the length of the cover plate. It will be understood that the cover plate 27 may have other widths, configurations and slot-type oblong openings. For example, a cover plate (not shown) may extend beyond the ends of the gusset plates 21 and/or have no slot opening 30.

Referring to FIGS. 1-8, each gusset plate 21 has an upper angle iron 31 (broadly, "an upper connecting member") attached to an outer surface of the gusset plate. The upper angle iron 31 comprises an elongate L-shaped member including a vertical first leg attached to the outer surface of the gusset plate 21 at an upper portion of the gusset plate and extending horizontally along the upper portion of the gusset plate. The first leg of each upper angle iron 31 is attached in a suitable manner such as by weld 29 to the outer surface of the respective gusset plate 21. (FIG. 4). A horizontal second leg of the upper angle iron 31 projects from the vertical first leg of the upper angle iron and laterally away from the gusset plate 21 and away from the beam 19. The second leg of each upper angle iron 31 is attached in a suitable manner such as by weld 29 to a top edge of the gusset plate 21. In the illustrated embodiment, the first and second legs of the upper angle irons 31 are disposed at substantially a right angle to each other. A top surface of the horizontal second leg of each upper angle iron 31 is bolded to a bottom surface of the cover plate 27 by horizontally spaced bolts 26 extending through aligned bolt holes 26A in the second leg of the upper angle irons and cover plate. In another embodiment (not shown), the upper angle irons 31 can be configured such that the lateral edges of the second legs project laterally past the lateral edges of the cover plate 27 to provide a ledger support for metal floor-decking spanning perpendicular to beam 19. This reduces construction cost by reducing steel material and welding time, and by speeding the floor construction of the building. Similarly, the horizontal shear plates 23 can extend laterally (perpendicular to the column web) to also serve as metal decking support if there is no perpendicular steel frame member framing into the gusset plates 21. Further the top surfaces of the second legs of the upper angle irons 31 are disposed above the top edges of the gusset plates 21 to allow welds between the top edges of the gusset plates 231 and the interior faces of the vertical first legs of the angle irons 31. The upper angle irons 31 may be otherwise configured and/or arranged within the scope of the present disclosure.

Referring to FIGS. 4 and 9-12, lower angle irons 33 (broadly, "lower connecting members") are attached so a bottom surface of the bottom flange of the full-length beam 19. The lower angle irons 33 may comprise elongate L-shaped members including a horizontal first leg attached to the bottom surface of the bottom flange of the beam 19 at opposite side portions of the beam and extending horizontally along the side portions. The first leg of each lower angle iron 33 is attached in a suitable manner such as by weld 29 to the bottom surface of the bottom flange of the beam 19, and along the bottom flange tips of the beam 19. Each lower angle iron 33 may also include a second leg projecting from the first leg of the lower angle iron and downward, away from the beam 19. In the illustrated embodiment, the first and second legs of each lower angle iron 33 are disposed at substantially a right angle to each other. An outer surface of the vertical second leg of each lower angle iron 33 is bolted to an inner surface of a respective gusset plate 21 by horizontally spaced bolts 26 extending through aligned bolt holes 26A in the second leg of the lower angle iron and the gusset plate 21. In the illustrated embodiment, the lower angle irons 33 are configured such that the horizontal first legs extend laterally past the lateral edges of the bottom flange of the beam 19 so the outer surfaces of the vertical second legs are disposed laterally away from the flange tips of the bottom flange of the beam 19. The lower angle irons 33 may be otherwise configured and/or arranges within the scope of the present invention. although angle irons 33 are illustrated, other forms of connecting members may be used.

The joint connection structure 11 outlined above is a beam-to-column type structure. It will be understood by a person having ordinary skill in the art that abeam-to-column-to-beam type structure will have additional analogous components. Most preferably, each of the components of the joint connection structure 11, as well as the beam 19 and column 15, are made of structural steel. Some of the components of the joint connection structure 11 are united by welding and some by belting. The welding may be initially performed at a fabrication shop. The bolting may be performed at the construction site, which is the preferred option in many regions of the world.

Figure 9:
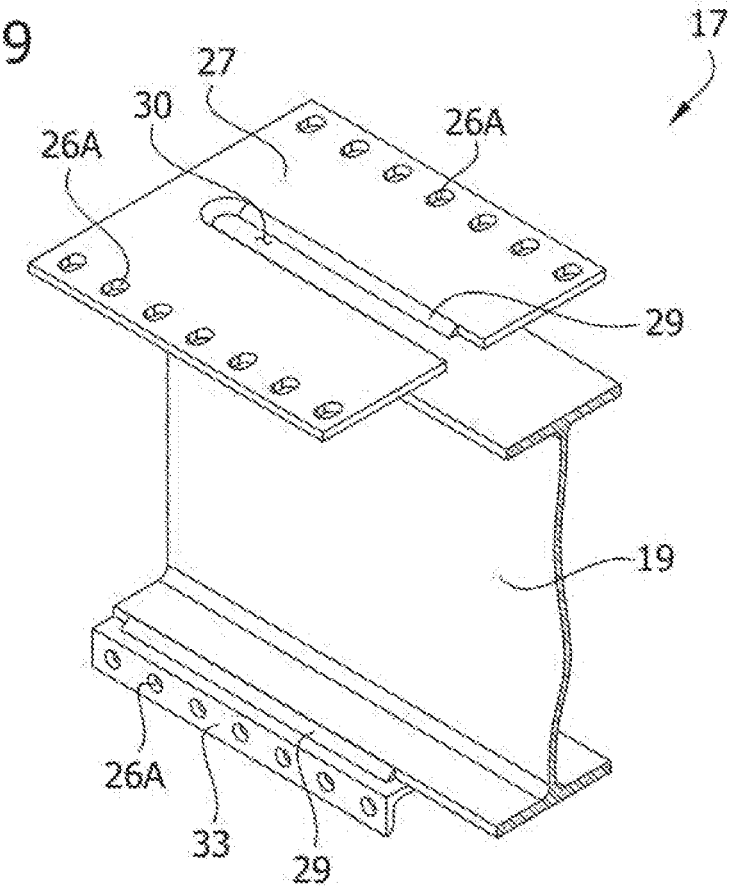
FIG. 9 is a fragmentary perspective of a full-length beam assembly of the beam-to-column joint connection structure of FIG. 1.
Figure 10:
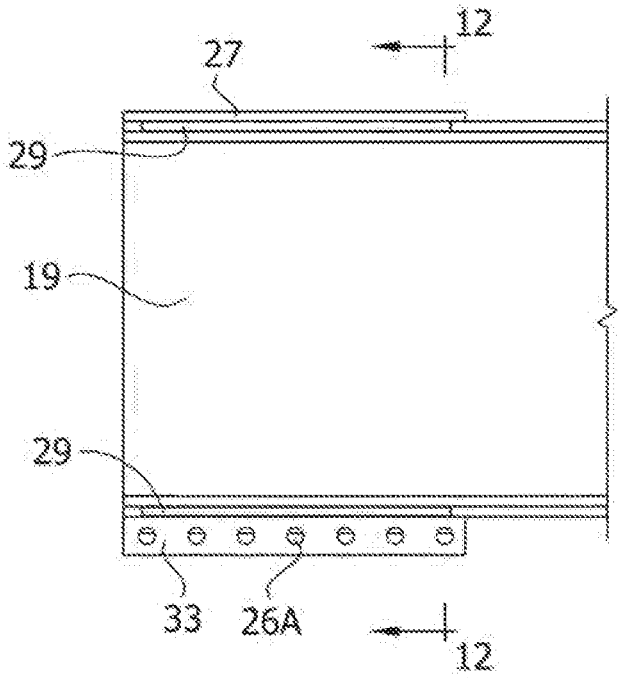
FIG. 10 is a front view of the full-length beam assembly in FIG. 9.

Referring to FIG. 9, the full-length beam assembly 17 may be fabricated at a fabrication shop prior to being transported to the construction site. To fabricate the full-length beam assembly 17, the cover plate 27 is welded at 29 or otherwise attached to the upper flange of the beam. Welding (such as by weld 29) is carried out between the periphery of the slot opening 30 and the top flange of the beam 19, and along the top flange tips of the beam on the underside of the cover plate. The slot opening 30 provides additional flexibility for field installation for cases where there is a skewed orientation of the top beam flange (non-plumb slant) relative to the plumb web of the beam 19, where the erector needs to rotate the beam slightly around its longitudinal axis to resolve a particular beam-to-column erection fit up concern, or where there is a lateral horizontal offset in the beam or column 15 (in the out-of-plane direction, perpendicular to the plane of the moment-resisting frame). The slot opening 30 also reduces out of plane bowing during the welding processes, thus improving performance. The slot opening 30 also allows for smaller sized filler welds connecting the cover plate 27 to the top surface of the upper flange and to the upper flange tips of the beam 19. This permits the cover plate 27 to be connected to the upper flange of the beam 19 using only one pass welds, which reduces construction time and material cost. The lower angle irons 33 are welded at 29 or otherwise attached to the bottom flange of the beam and project laterally outwardly from the beam. Any welds needed to form the full-length beam assembly 17 can be carried out at the shop. In a preferred embodiment, the welds 29 are filler welds. Filler welds to not require ultra-sonic inspection which results in reduced shop fabrication costs. However, the welds could be groove welds or stitch welds. Other welds are also within the scope of the present disclosure. The cover plate 27 and lower angle irons 33 may have other configurations than those illustrated in the current embodiment.

Referring to FIG. 5, the column assembly 13 may also be fabricated at a fabrication shop and later transported to the construction site. To fabricate the column assembly 13, the gusset plates 21 and welded at 29 or otherwise attached to the flanges of the column 15, the optional horizontal shear plates 23 are welded at 29 or otherwise attached to the web of the column and to the top and bottom edges of the gusset plates, and the upper angle irons 31 are welded at 29 or otherwise attached to the gusset plates 21. Thus, at the shop, the column assembly 13 can be constructed exclusively by welds. In a preferred embodiment, the welds 29 are filler welds. Filler welds do not require ultra-sonic inspection which results in reduced shop fabrication costs. However, the welds could be groove welds or stitch welds. Other welds are also within the scope of the present disclosure. The horizontal shear plates 23 can be omitted from the column assembly 13 and the gusset plates 21 may have other configurations than shown.

Figure 6:
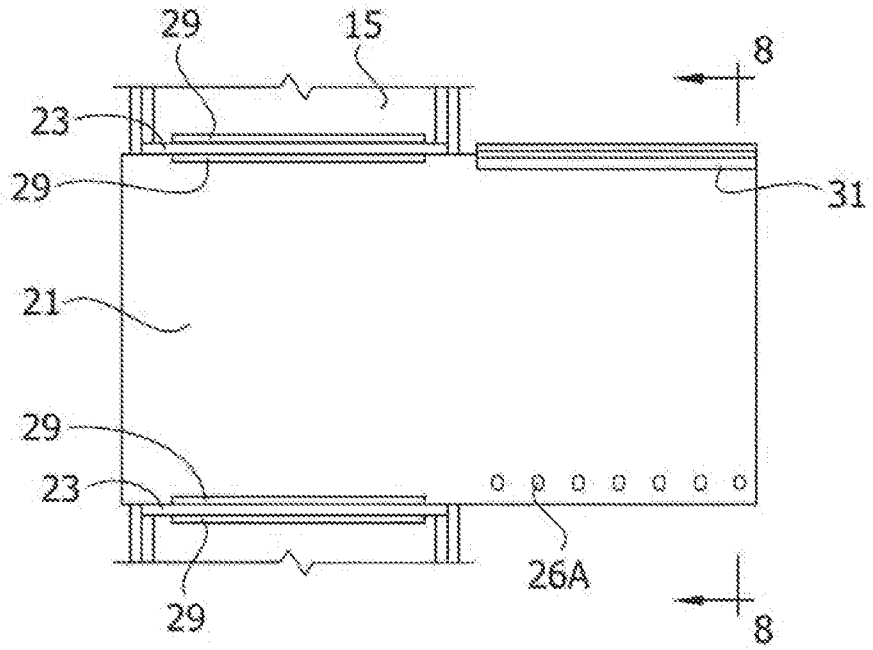
FIG. 6 is a front view of the column assembly in FIG. 5.
Figure 7:
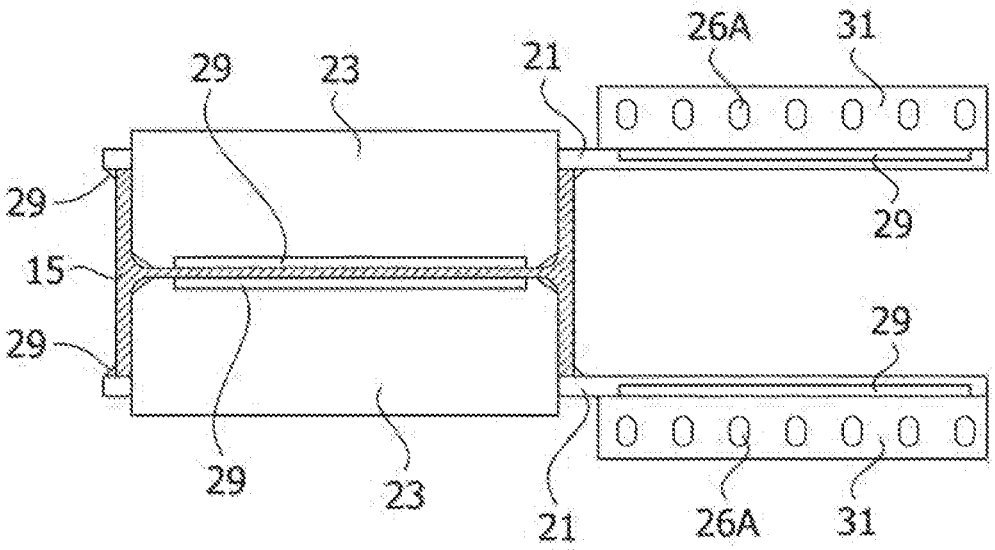
FIG. 7 is a top view of the column assembly in FIG. 5.
Figure 8:
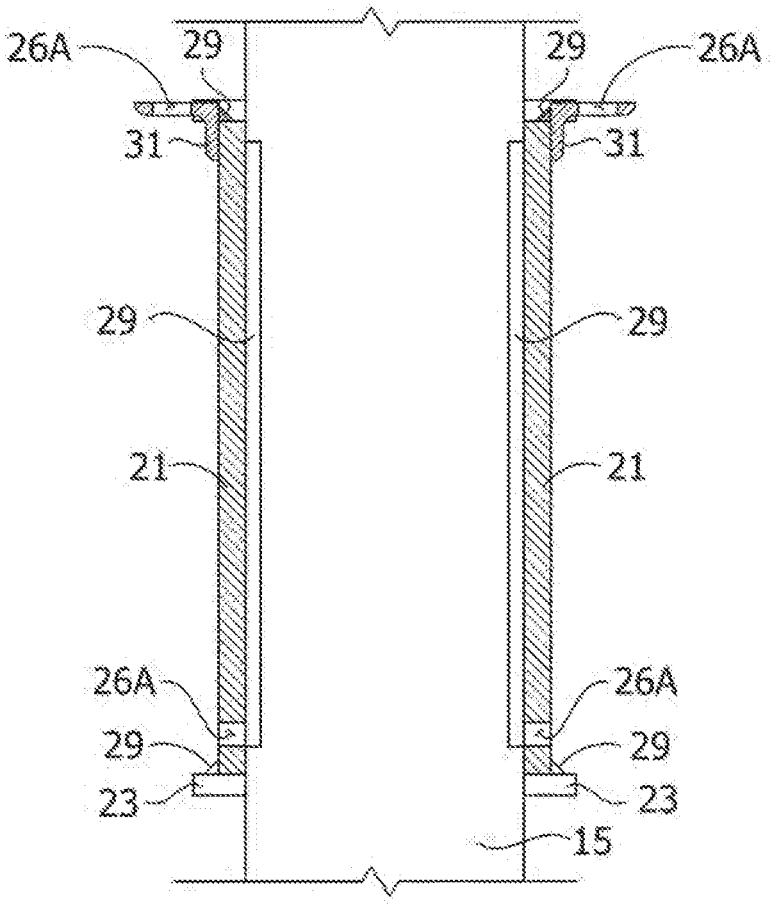
FIG. 8 is a section taken in the plane including line 8-8 of FIG. 6.
Figure 11:
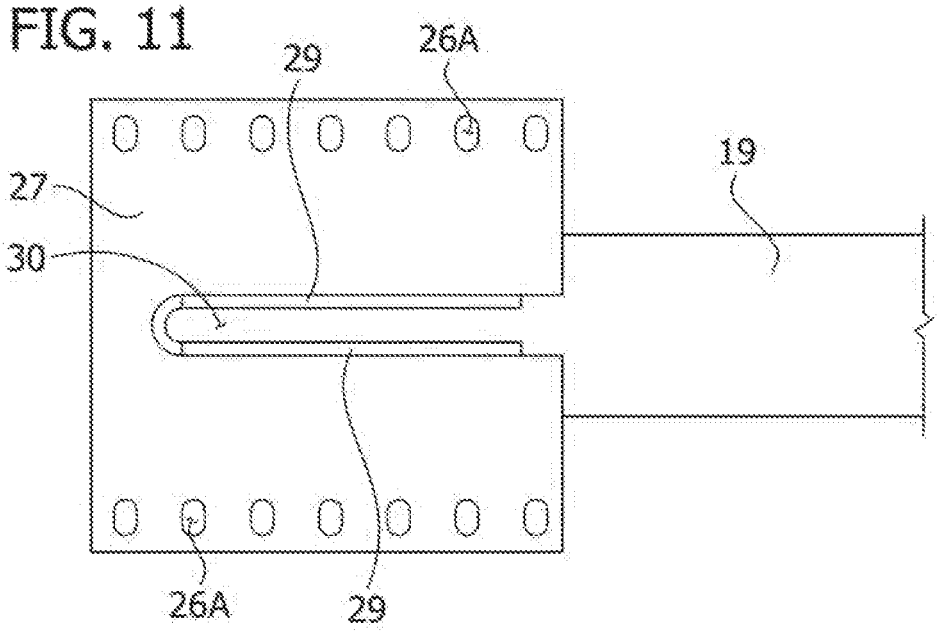
FIG. 11 is a top view of the full-length beam assembly in FIG. 9.
Figure 12:
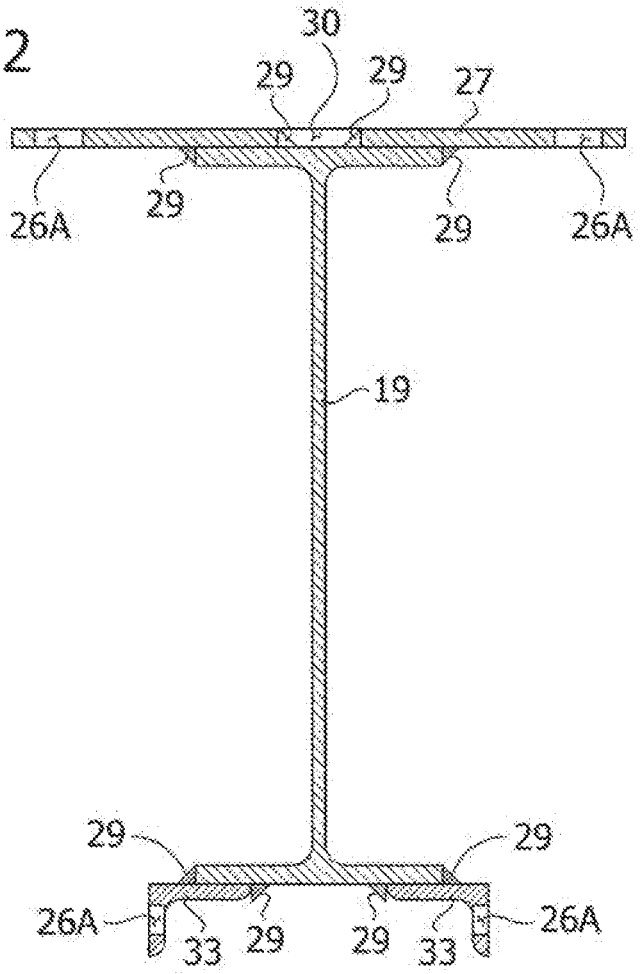
FIG. 12 is a section taken in the plane including line 12-12 in FIG. 10.
Figure 13:
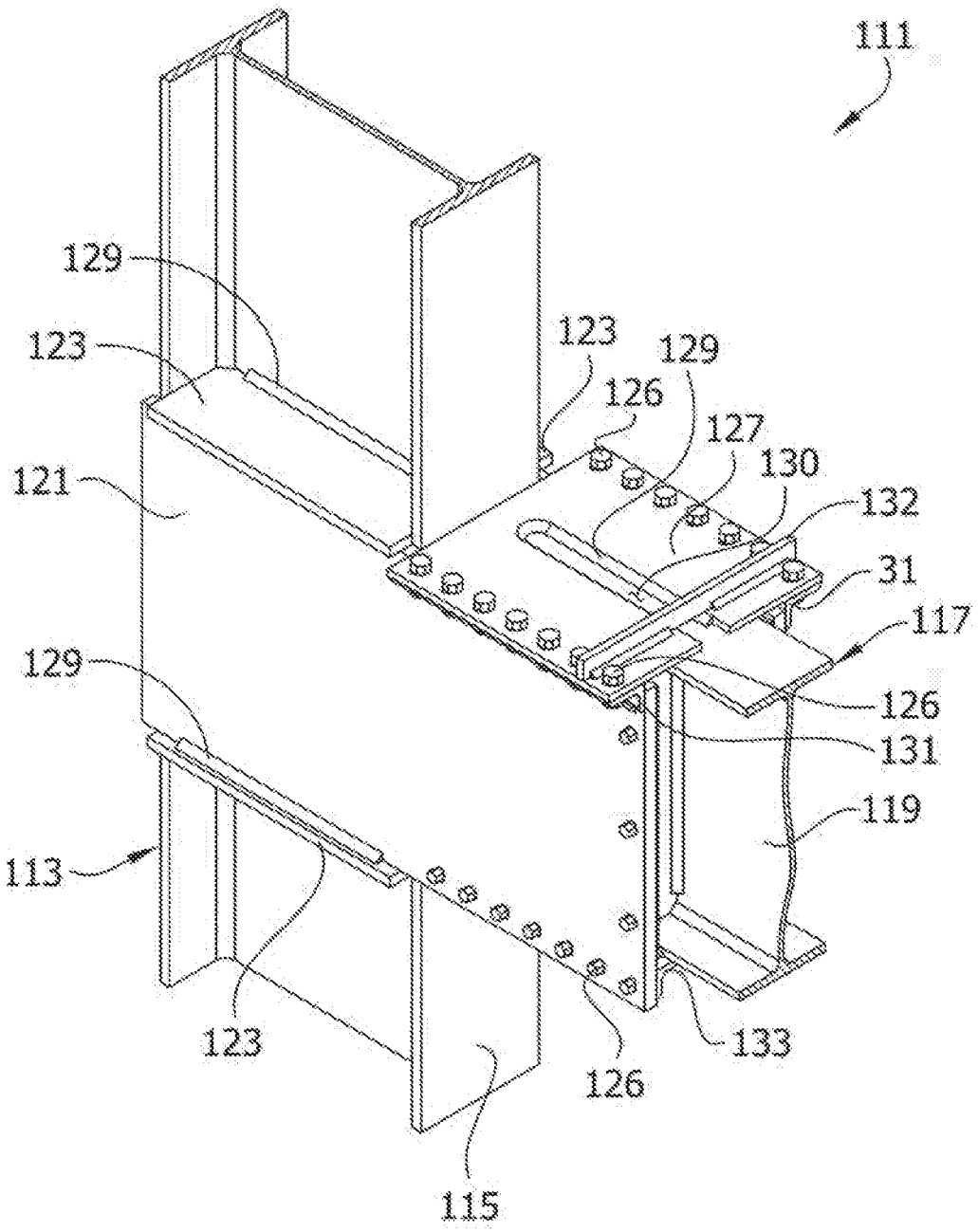
FIG. 13 is a fragmentary perspective of a beam-to-column joint connection structure of a second embodiment.
Figure 14:
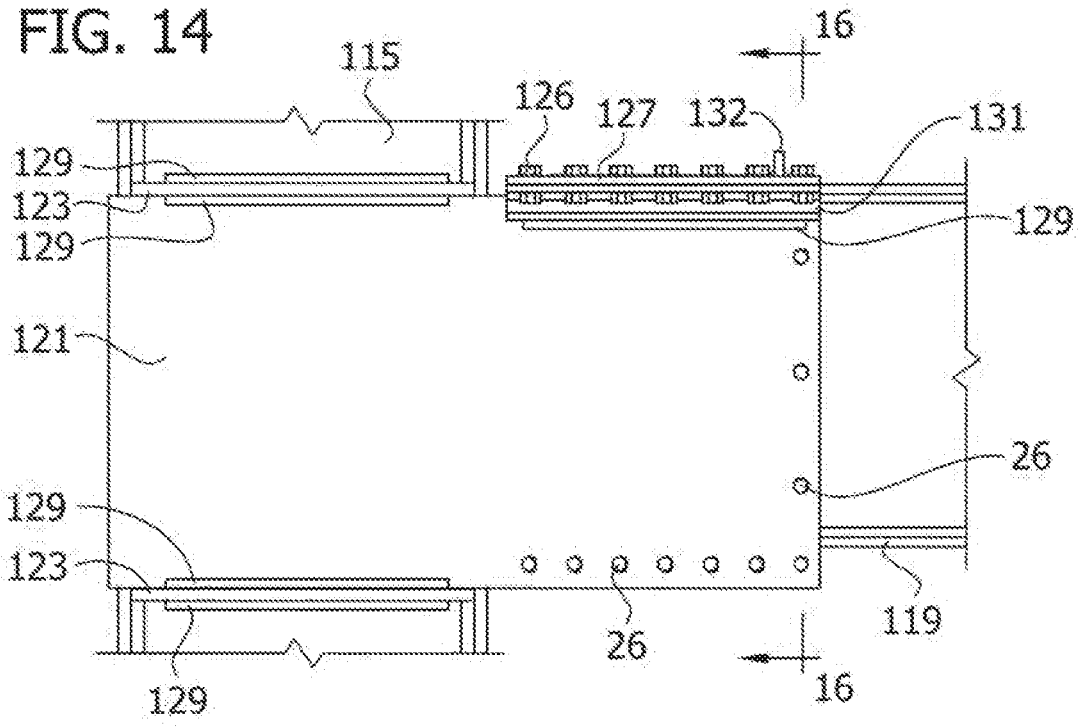
FIG. 14 is a front view of the beam-to-column joint connection structure of FIG. 13.
Figure 15:
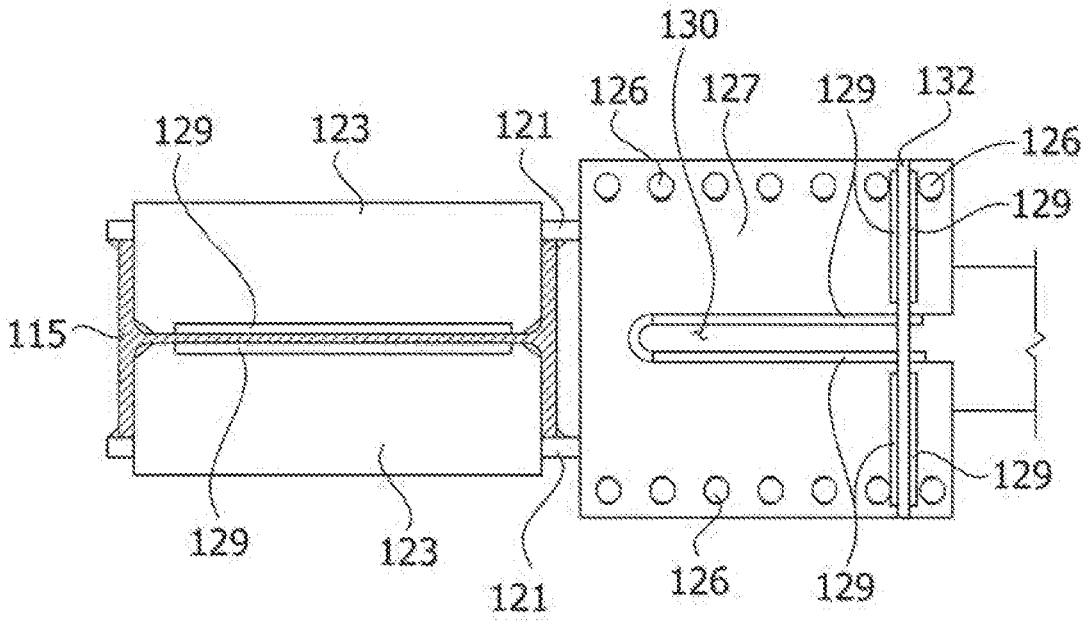
FIG. 15 is a top view of the beam-to-column joint connection structure of FIG. 13.

At the construction site, the column assembly 13 is joined to the full-length beam assembly 17. The column assembly 13 is first erected in a vertical orientation and the end of the full-length beam assembly 17 is positioned horizontally and adjacent to the column assembly, so that each end of the beam is over a respective pair of gusset plates 21. The full-length beam assembly 17 is then lowered between the gusset plates 21 until the bottom surface of the cover plate 27 engages the top surfaces of the horizontal second legs of the upper angle irons 31. This engagement initially locates and supports the full-length beam assembly 17 on the column assembly 13 to facilitate shoring during erection. To fixedly secure the two assemblies 13, 17 bolds 26 are used to attach the upper angle irons 31 to the cover plate 27 and the lower angle irons 33 to the gusset plates 21 through aligned bolt holes 26A in the respective components. Bolt holes 26A in the cover plate 27 are slotted perpendicular to the longitudinal axis of the beam 19 (e.g., elongated as shown in FIG. 11) to facilitate attachment and erection fit up of the cover plate to the upper angle irons 31. In addition to or instead of the slotting of the bolt holes 26A in the cover plate 27, corresponding bolt holes in the horizontal second leg of each upper angle iron 31 can be slotted perpendicular to the longitudinal axis of the beam. Bolt holes 26A near the bottom edge of the horizontal extension of gusset plates 21 may also be slotted in the vertical direction (e.g., elongated as shown in FIG. 6) to facilitate attachment and erection fit up of the lower angle irons 33 to the gusset plate. In addition to or instead of slotting the bolt holes 26A in the gusset plates 21, corresponding bolt holes in the second leg of the lower angle irons 33 can be slotted in the vertical direction. Thus, at the construction site, the beam-to-column moment-resisting joint connection structure 11, which includes a full-length beam assembly 17, is completed exclusively through bolted connections. In the field, the joint connection structure 11 is constructed without the use of welds. The cover plate 27 is designed to transfer most, if not all, of the vertical shear load from the full-length beam 19, thus eliminating the need for the vertical shear plates 23, while also reducing material and construction costs. This full-length beams, all field bolted joint connection structure employing gusset plates was not appreciated in conventional joint connection structures.

The intentional offset positioning of the top horizontal edge of the gusset plates 21 slightly below the top of steel elevation of the beam 19, a result of the top surfaces of the second legs of the upper angle irons 31 being disposed above the top edges of the gusset plates 21, precludes the inadvertent non-plumb positioning of the to p edge of the gusset plates from affecting the desired near flush contact between the cover plate 27 and the top faces of the horizontal leg of the upper angle irons 31 prior to bolting these two components together. This is because the top edges of the gusset plates 21 are vertically spaced below the interface between the angle irons 31 and cover plate 27 providing space for the angle irons 31 to be suitably positioned to account for any inadvertent non-plumb positioning of the gusset plates with respect to the column 15. In particular, the vertical leg of each upper angle iron 31 is positioned plumb to the column's web in the shop and welded in that position to the gusset plates 21 regardless of any possible non-plumb positioning of the top horizontal edges of the gusset plates with respect to the column 15, thus achieving a near flush fit up. The offset of the horizontal legs of the angle irons 31 above the upper edges of the gusset plates 21 also allows the vertical leg of the upper angle irons 31 to be horizontally welded to the gusset plates 21 at two locations, the first being at the toe of the vertical leg of the angle iron, and the second being near the heel of that vertical leg, thus improving significantly the performance of the load transfer between the gusset plates 21 and their respective connecting upper angle irons 31 by providing a force couple that increases strength of the attachment of the angle iron to the gusset plate.

The geometry of the bolted joint connection structure 11 including the widened cover plate 27 inherently maximizes the efficiency of cost and time of field installation because the design geometry can specifically accommodate worse-case scenarios of cumulative permissible variations in cross section for rolled steel column and beam shapes (referred to in the industry as "standard mill practice tolerances"), resulting in less probability of field adjustments needed to accommodate as-build column assemblies and full-length beam assemblies. In particular, the joint connection structure 11 can account for possible vertical separation (or gap) between the underside of the cover plate 27 and the upper angle irons 31, due to a skewed (non-plumb to the web of the beam 19 but within standard mill practice) upper flange orientation of the beam 19. In particular, the clamping action of the upper bolts 26 upon being tensioned during installation automatically closes the gap between the cover plate 27 and the upper angle irons 31, through deformation of the cover plate and the horizontal legs of the upper angle irons. In this way, the need for burdensome shim plates to fill the separation between having surfaces, or other means of remediation in the field, prior to tightening the bolts is eliminated.

The bolted joint connection structure of the present invention also increases construction tolerance for misalignment of components during field steel frame erection because of the slotting of the bolt holes 26A in which some are elongated in a vertical direction and others are slotted in a horizontal direction that is transverse to the longitudinal axis of the beam 19. As a consequence of this construction, the long dimensions of the upper bolts 26 are oriented vertically, and the long dimension of the lower bolts 26 being oriented transverse to a longitudinal direction of the beam 19. The unique direction of slotted bolt holes 26A provides significantly greater shear capacity compared to conventional designs, which significantly reducing misalignment uncertainties during erection. Thus, the need for uncertain reaming of standard bolt holes in the field or the use of oversized bolt holes with slip-critical bolts to accommodate unanticipated field adjustments to the as-build condition is precluded with the bolted joint connection structure 11. Slop-critical bolts are bolts that are typically installed in oversized circular bolt holes that depend on the development of friction forces between clamped faying surfaces to prevent bolt slip through the pre-tensioning of the bolts. Bolts designated as "slip-critical" are typically received through bolt holes having an opening diameter that is about 3/16 in. larger than the diameter of the bolt. Bolts designated as "slip critical" require costly and restrictive surface-clean condition, and the use of special primer coatings over defined clamped faying surfaces, and require an independent special inspection for use, which is costly and time consuming. Slip-critical bolts with circular oversized holes also have a significantly reduced load capacity in shear as compared to standard bolts (i.e., bolts received through bolt holes having an opening diameter that is about 3/16 in. larger than the diameter of the bolt). Thus, a much greater number of slip-critical bolts are required to withstand a given load, as compared to the required number of standard bolts.

Unlike oversized holes requiring the use of slip-critical bolts, the slotted bolt holes 26A are larger than standard bolt holes in only one direction. Also, the slot direction of the bolt holes 26A is perpendicular to the direction of load, that is, does not extend along the longitudinal axis of the beam 19. Instead, the slots of the bolt holes 26A extend perpendicular (broadly, "transverse") to the longitudinal axis of the beam 19 so that when the joint connection structure 11 is loaded, and in particular when the beam is loaded axially along its length or about its major axis in bending, a gap is not formed between the bolts 26 and their respective bolt holes 26A (i.e., no slip of bolt occurs because bolts 26 are already loaded by direct bearing in shear). As used herein "transverse" to the longitudinal axis of the beam 19 means any direction that crosses over the longitudinal axis of the beam and is not parallel to the longitudinal axis of the beam. In some embodiments, the bolt holes 26A have a slotted dimension that is up to about 2.5 times the diameter of the bolt 26. In some embodiments, the bolt holes 26A have a slotted dimension that is from about 3/16 in. up to about 2¾ in. larger than the diameter of the bolt 26. In a preferred embodiment, the bolt holes 26A have a slotted dimension that is about ¾ in. larger than the diameter of the bolt 26.

Slotting the bolt holes 26A along the bottom portion of the gusset plates 21 (or in the vertical leg of each lower angle iron 33) provides a longer vertical dimension for the bolt holes to account for any alignment problems that can arise from the bottom flange of the beam 19 being skewed from an exactly perpendicular orientation with respect to the web of the beam and/or the web of the beam not being plumb. Slotting the bolt holes 26A to the cover plate 27 (or the horizontal leg of each of the upper angle irons 31) provides a longer lateral horizontal dimension for the bolt holes to accommodate transverse alignment problems that can arise from the construction of the beam 19. Thus, the unique orientation of slotted bolt holes 26A in the joint connection structure 11 require alignment accuracy in only one out of three possible translational degrees of freedom (i.e., along the longitudinal axis of the beam 19). this is in contrast to having to resolve alignment accuracy challenges in as many as three degrees of freedom using conventional joint connection structures. Greater tolerance for misalignment during the erection of beam 19 and column 15 is achieved with the use of the unique orientation of the slotted bolt holes. Bolts 26 installed in the unique orientation of the slotted bolt holes 26A of this invention also have comparable shear load and bearing capacity to bolts using standard bolt holes, so significantly fewer bolt holes and bolts are required to withstand a given load than would be required if slip-critical bolts were used. According to current industry design standards, the capacity of a bolt received in the slotted bolt hole elongated in the direction(s) prescribed by the present invention provides an increase in shear load capacity of two or more times that provided by slip-critical bolts with circular oversized holes. As a result, the number of bolts required for the joint connections, the associated labor costs, and the overall erection time in the field are all decreased.

Conventional joint connection structures typically include bolted connections which orient the bolts that connect the beam assembly to the column assembly so that all the bolts extend along the length of the beam assembly or so that all the bolts associated with load transfer from beam flanges extend transverse to the length of the beam assembly. These configurations require alignment accuracy in at least two, and as many as three degrees of freedom. The directions of the degrees of freedom including along the longitudinal axis of the beam, a direction along the longitudinal axis of the column, and a direction transverse to the longitudinal axes of the beam and column). The current disclosure of horizontally slotted bolt holes 26A oriented transverse to the longitudinal axis of the beam 19, and the vertically slotted bolt holes 26A configures the joint connection structure 11 so that alignment accuracy is only required in one degree of freedom (i.e., along the longitudinal axis of the beam 19). Thus, alignment accuracy is required only along one axis of the joint connection structure 11. Accordingly, connecting the full-length beam assembly 17 to the column assembly 13 is significantly easier to accomplish in the field.

The unique geometry and stiffness of the all shop filler-welded and all field-bolted beam-to-column moment-resisting joint connection structure 11 maximizes its performance and the broadness of its design applications, including both extreme wind and moderate-to-severe seismic conditions. In particular, the all field-bolted joint connection structure 11 preserves the physical separation (or gap) between the end of a full-length beam 19 and the flange face of the column 15 made possibly by the use of vertically and horizontally extended parallel gusset plates 21 that sandwich the column and the beam similar to prior designs which feature an all field filler-welded joint connection structure; thus eliminating all of the uncertainty of bending moment load transfer between a rigidly attached steel moment frame beam and column used in the past.

Further, by including the vertically and horizontally extending parallel gusset plates 21 that sandwich both the column 15 and the beam 19, this current all field-bolted joint connection structure 11 preserves the advantage of increased beam-to-column joint stiffness, with a corresponding increase in overall steel moment frame stiffness, which results in smaller beam sizes when the building design in controlled by lateral story drift (not member strength); and hence reduced material costs. When the building design is controlled by member strength (not lateral story drift), this all field-bolted joint connection structure 11 also reduces the beam size and the column size, and hence material quantities and cost, because its connection geometry has no net section reduction in either the beam or the column (i.e., no bolt holes through either the beam or column), thereby maintaining the full strength of the beam and column.

In one aspect of the present disclosure, a full-length beam is connected to gusset plates by bolts so that the full-length beam and gusset plates are substantially free of welded connection. It will be understood that welding the column assembly 13 to the full-length beam assembly 17 is within the scope of that aspect of the disclosure.

Referring to FIGS. 13-24, a beam-to-column moment-resisting joint connection structure of a second embodiment is generally indicated at 111. In the illustrated embodiment, the joint connection joins a column assembly 113 including a column 115 to a full-length beam assembly 117 including a full-length beam 119. The joint connection structure 111 of the second embodiment is substantially identical to the joint connection structure 11 of the first embodiment. Parts of the joint connection structure 111 of the second embodiment corresponding to those of the joint connection structure 11 of the first embodiment will be given the same reference numeral plus "100". This numbering convention is repeated in subsequent embodiments. The joint connection structure 111 further includes a stiffener bar 132 attached to a top surface of cover plate 127 in the joint connection structure 111 and vertical shear plates 128 attached to a web of the beam 119 and bolted to the gusset plates 121 by way of vertical angle irons 134 attached to the vertical shear plates.

The stiffener bar 132 is attached in a suitable manner such as by welds 129 to the top surface of the cover plate 127. In the illustrated embodiment, the stiffener bar 132 is attached to the cover plate 127 between adjacent horizontally spaced bolts 126 received through bolt holes 126A to attach the cover plate to upper angle irons 131. The stiffener bar 132 extends horizontally across the cover plate 127 transverse to a length of the beam 119. Lateral edges of the stiffener bar 132 are flush with longitudinal edges of the cover plate 127. The stiffener bar 132 may be otherwise configured and/or arranged within the scope of the present disclosure. The stiffener bar 132 is optional.

Figure 24:
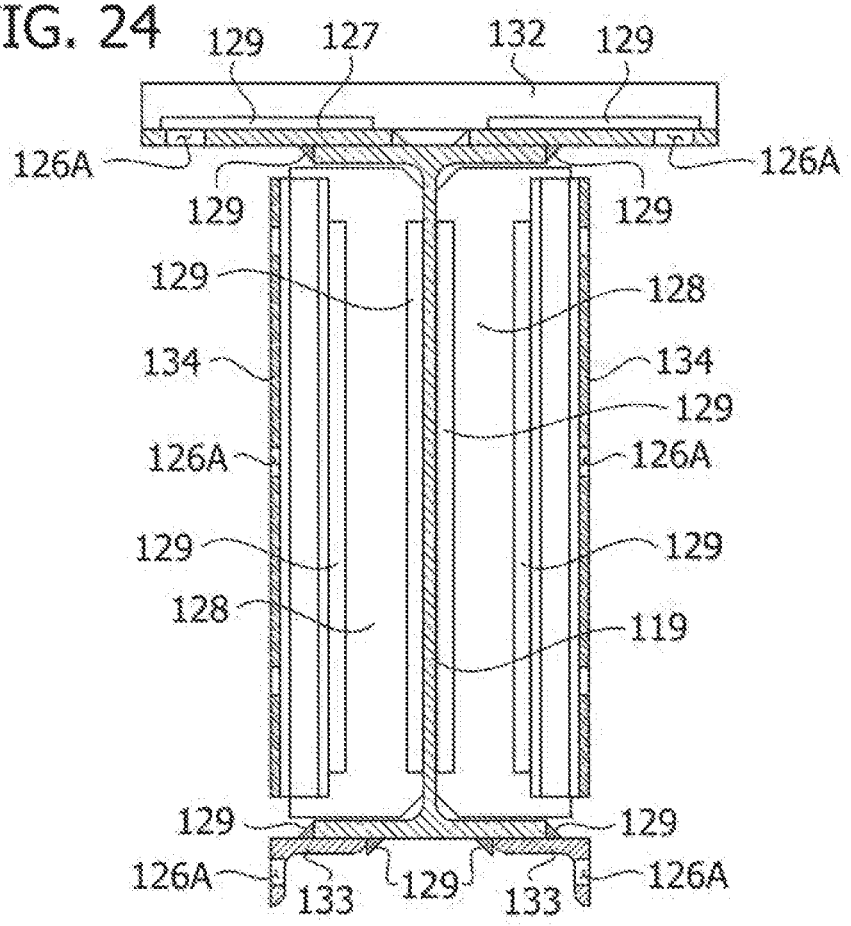
FIG. 24 is a section taken in the plane including line 24-24 of FIG. 22.
Figure 25:
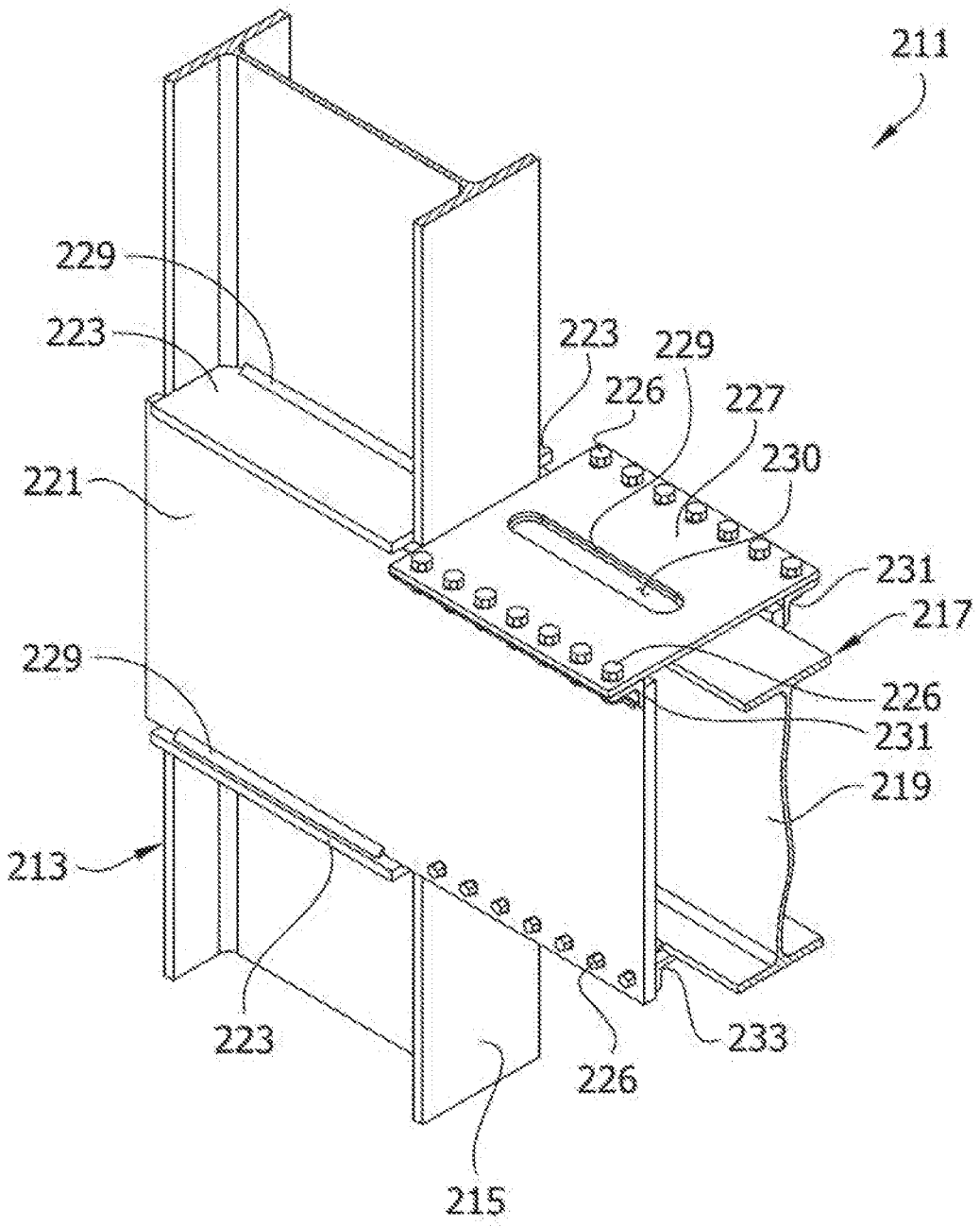
FIG. 25 is a fragmentary perspective of a beam-to-column joint connection structure of a third embodiment.
Figure 26:
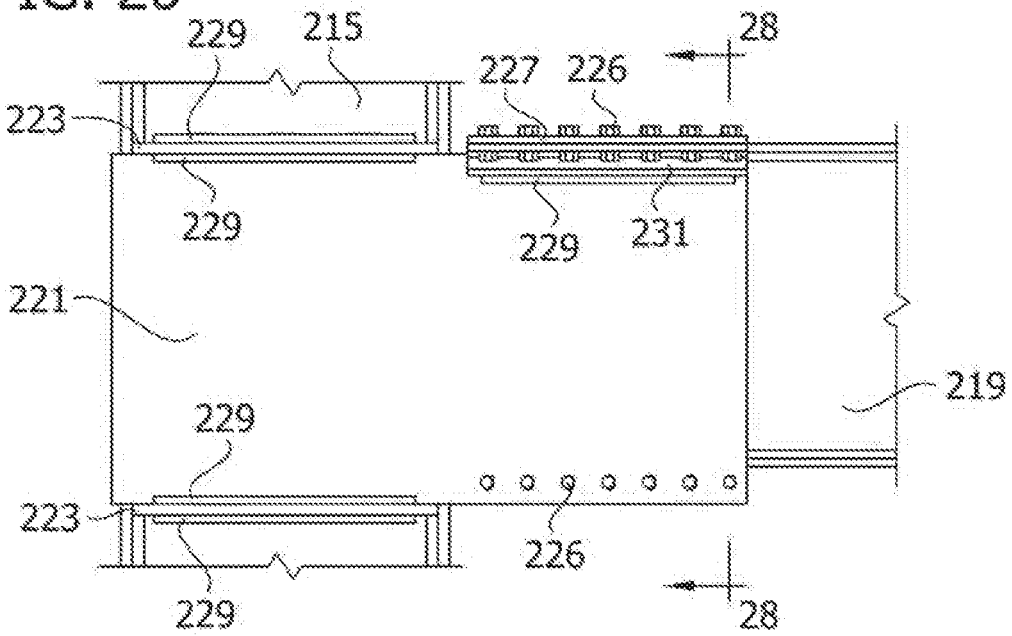
FIG. 26 is a front view of the beam-to-column joint connection structure of FIG. 25.
Figure 27:
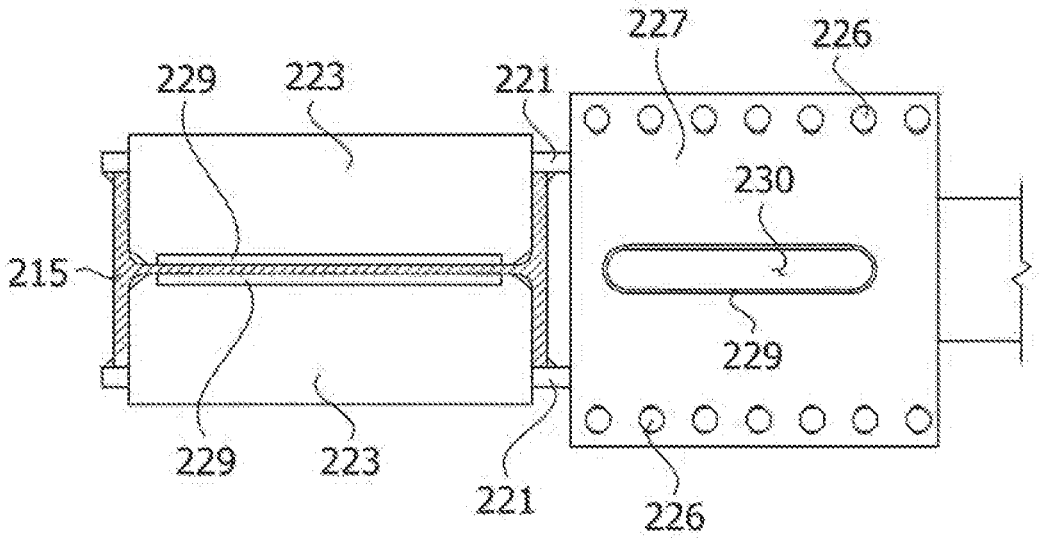
FIG. 27 is a top view of the beam-to-column joint connection structure of FIG. 25.
Figure 28:
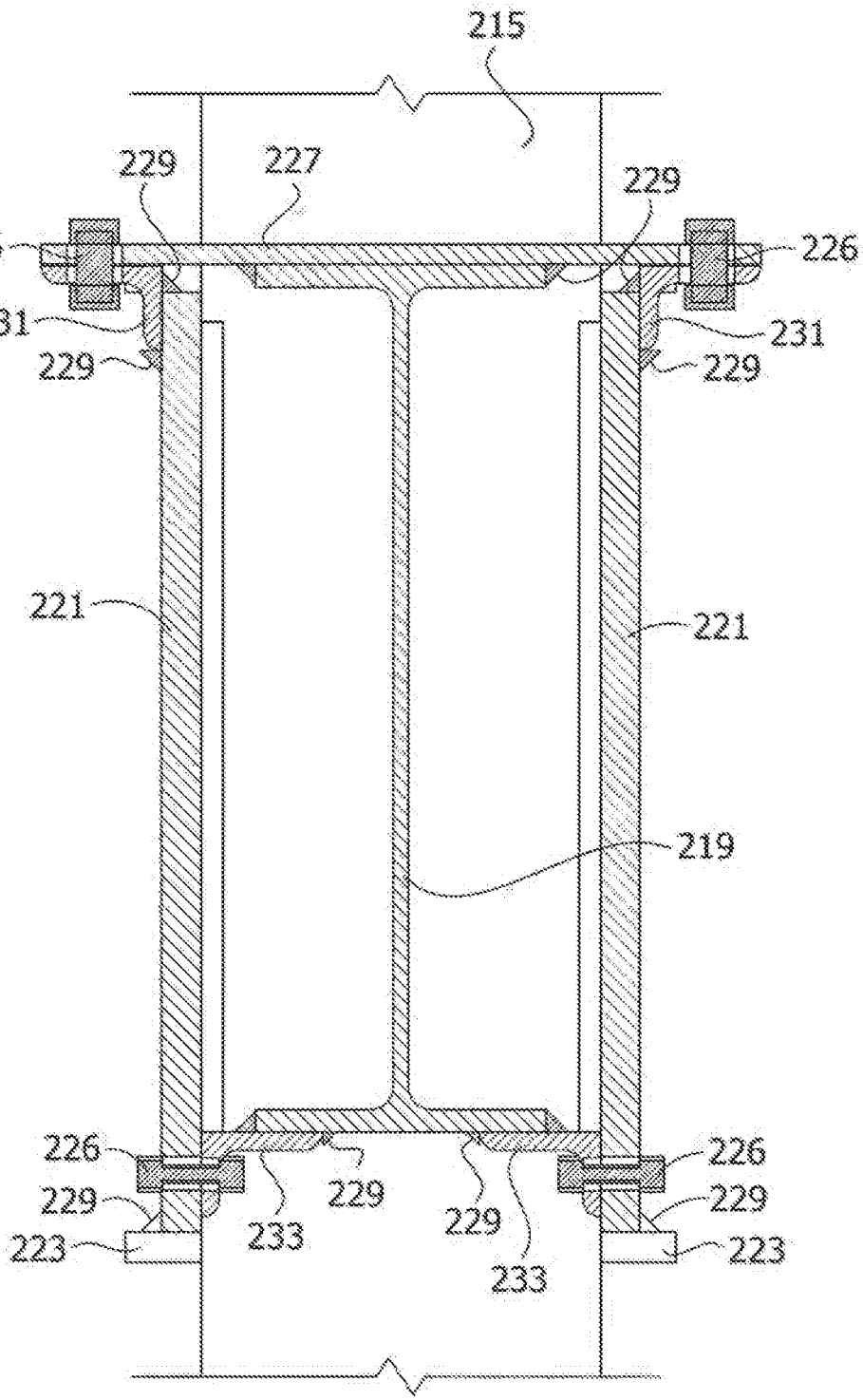
FIG. 28 is a section taken in the plane including line 28-28 of FIG. 26.
Figure 29:
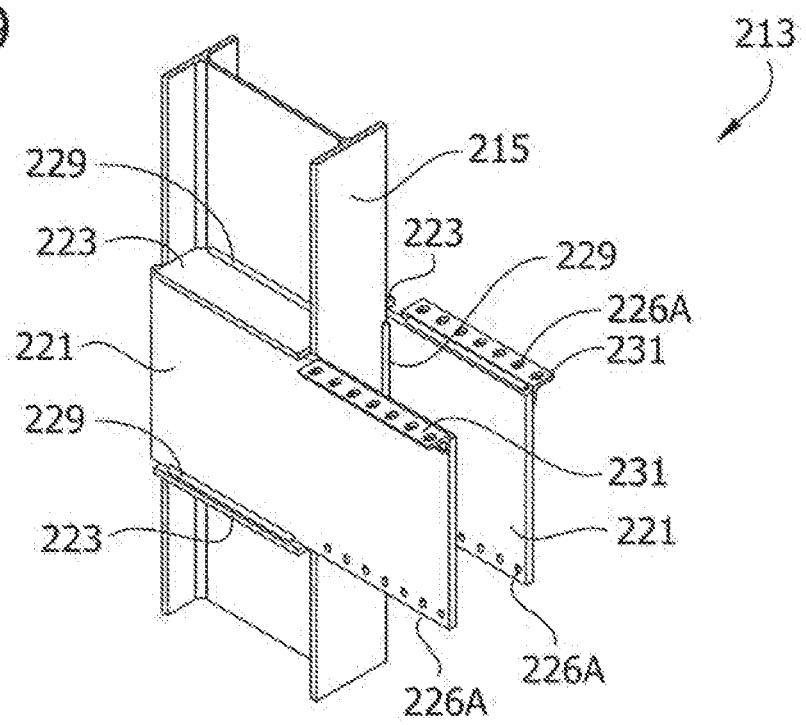
FIG. 29 is a fragmentary perspective of a column assembly of the beam-to-column joint connection structure of FIG. 25.
Figure 30:
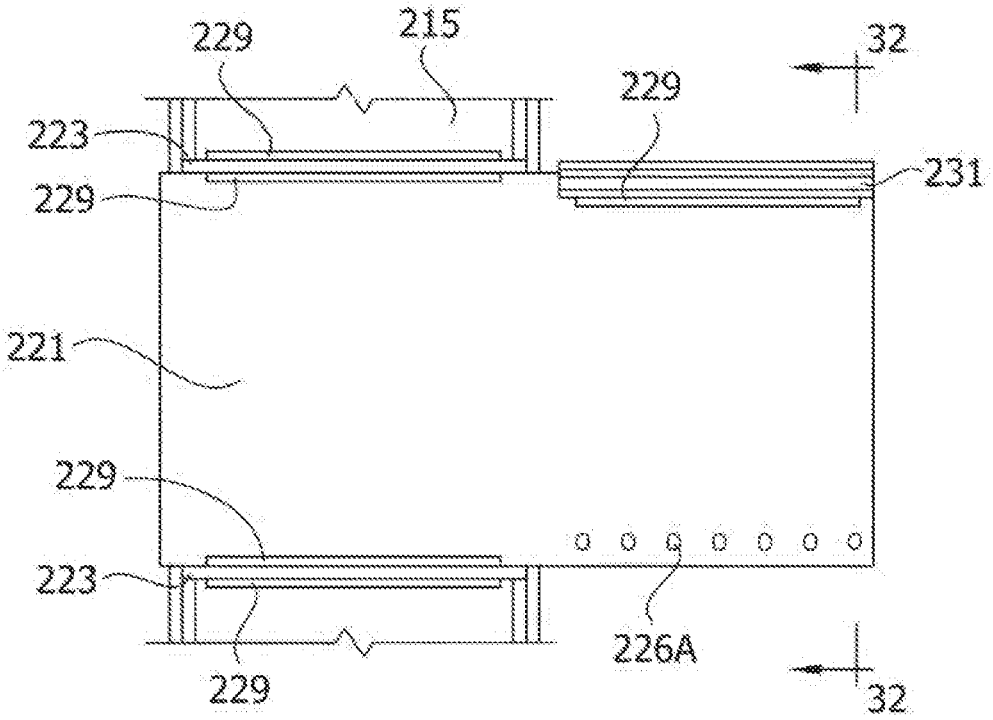
FIG. 30 is a front view of the column assembly in FIG. 29.
Figure 31:
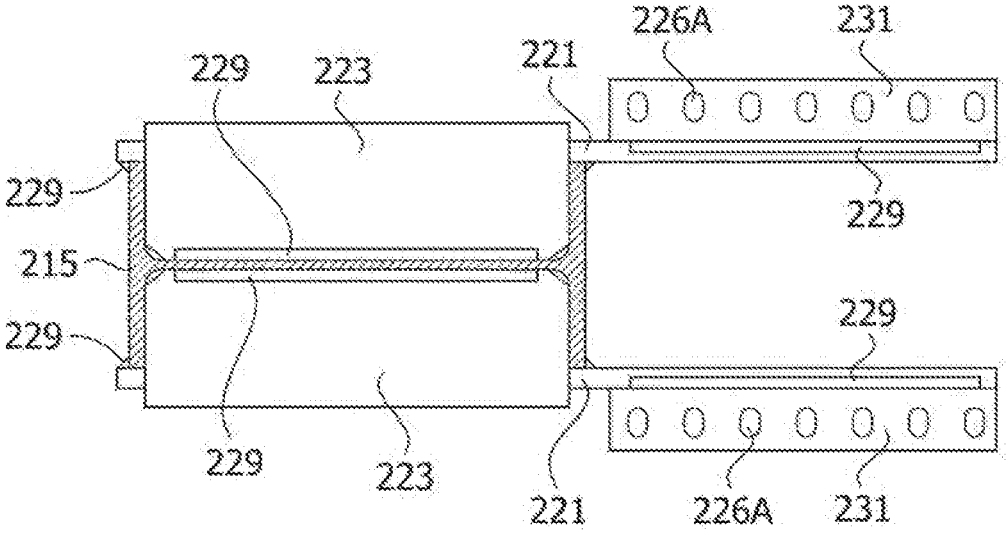
FIG. 31 is a top view of the column assembly in FIG. 29.
Figure 32:
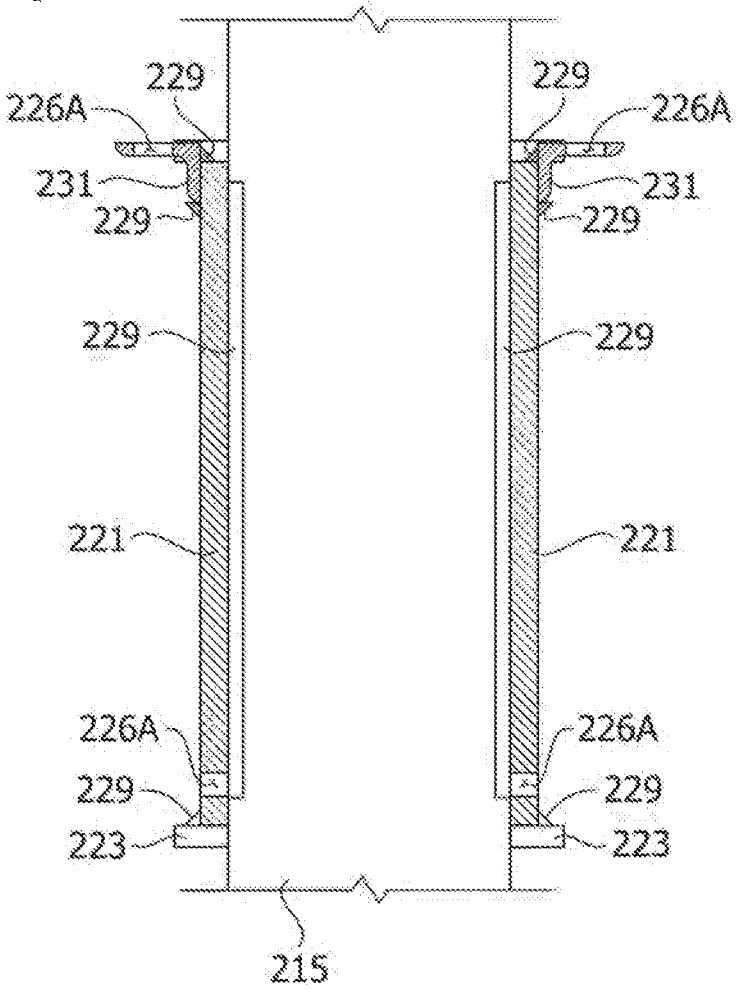
FIG. 32 is a section taken in the plane including line 32-32 in FIG. 30.
Figure 33:
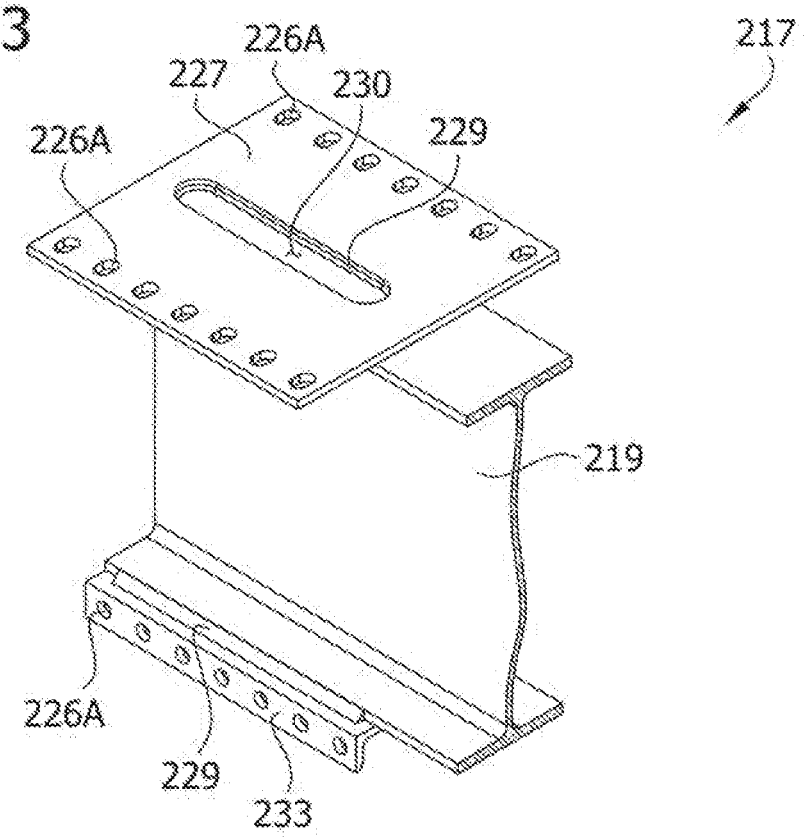
FIG. 33 is a fragmentary perspective of a full-length beam assembly of the beam-to-column joint connection structure of FIG. 25.
Figure 34:
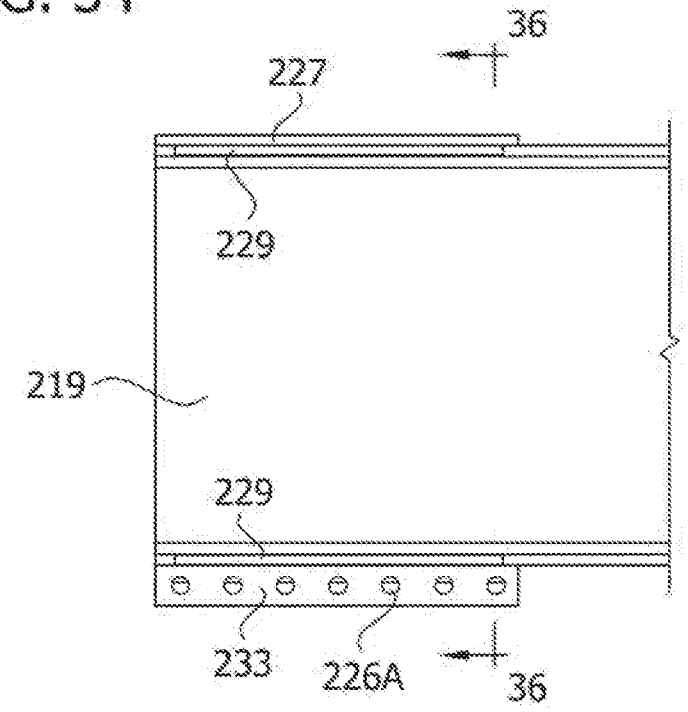
FIG. 34 is a front view of the full-length beam assembly in FIG. 33.
Figure 35:
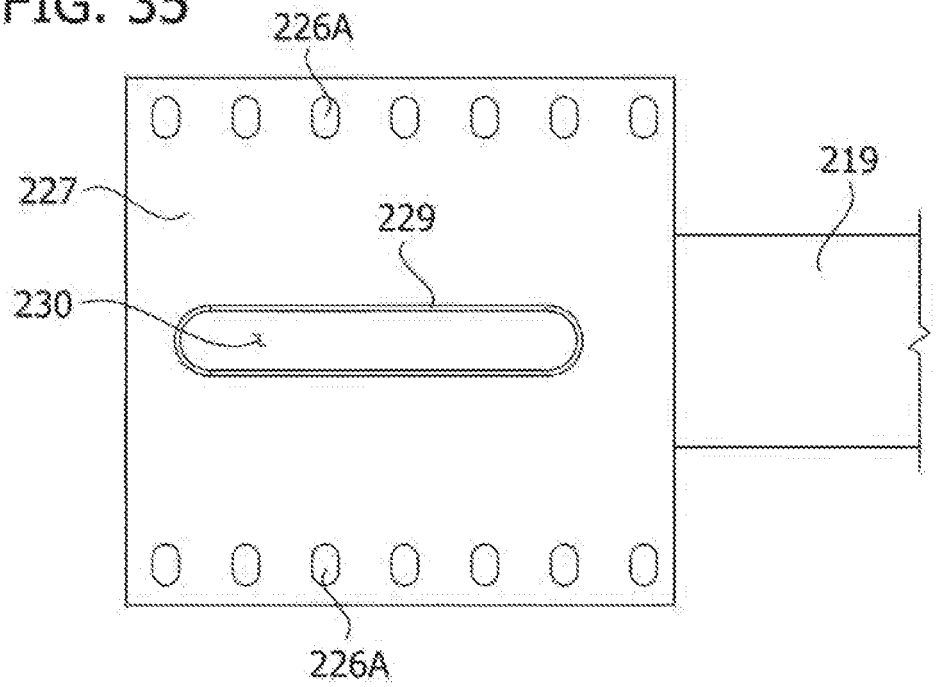
FIG. 35 is a top view of the full-length beam assembly in FIG. 33.
Figure 36:
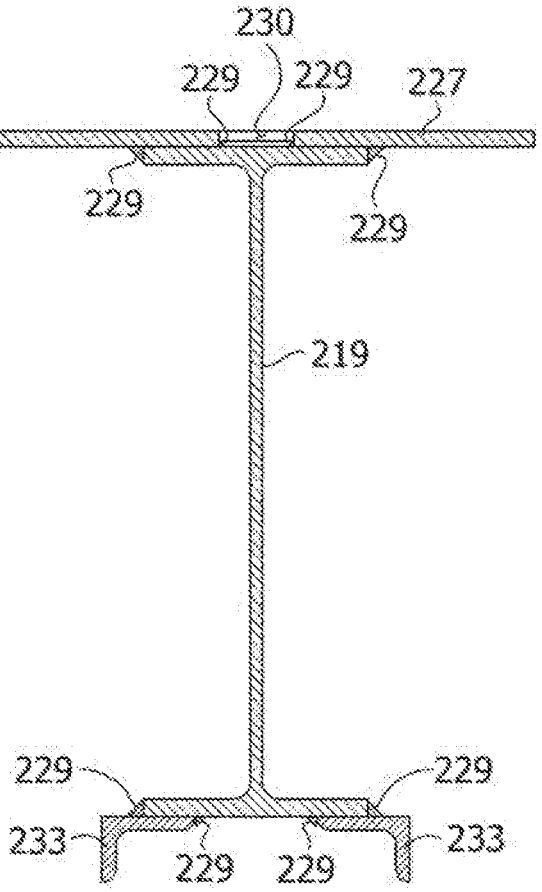
FIG. 36 is a section taken in the p lane including line 36-36 of FIG. 34.
Figure 37:
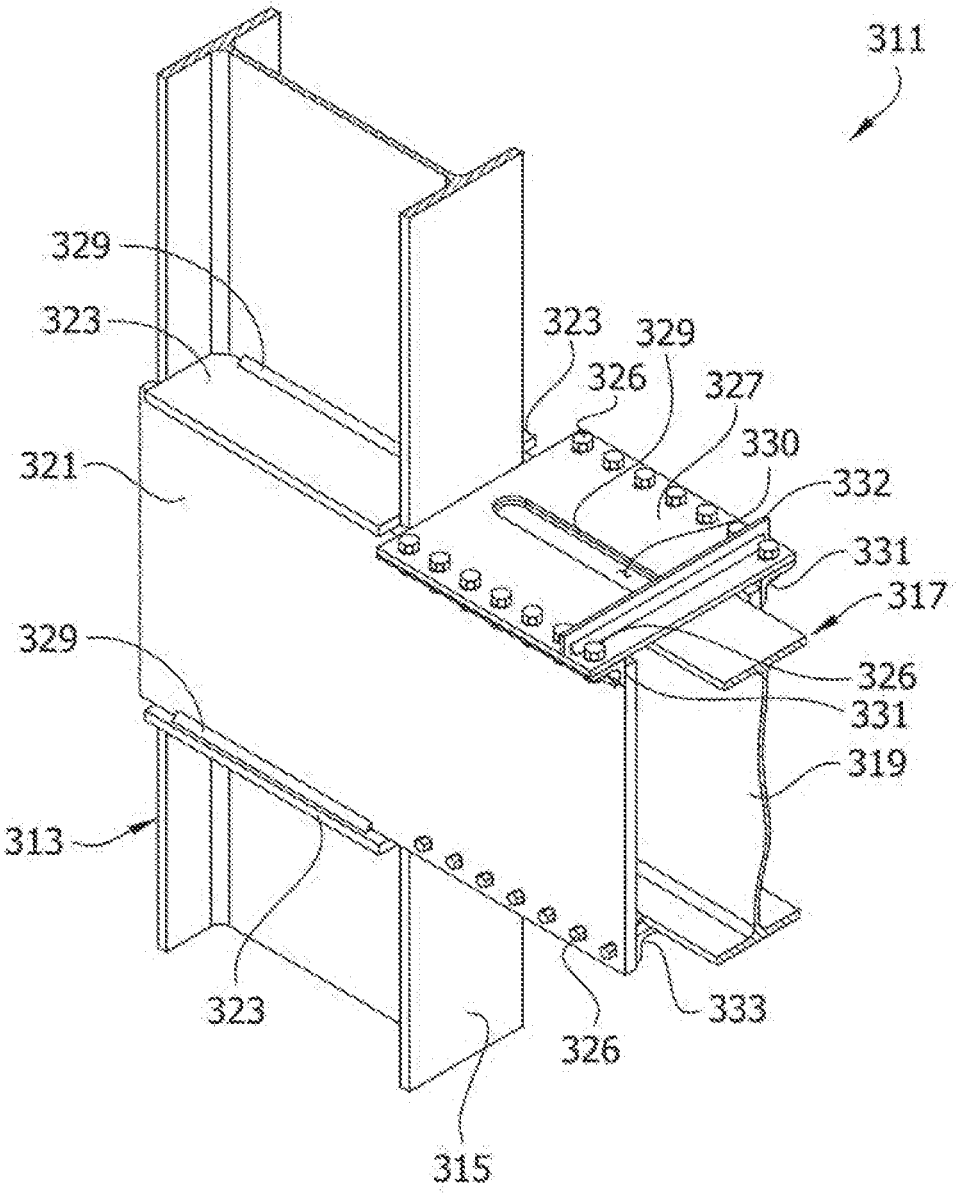
FIG. 37 is a fragmentary perspective of a beam-to-column joint connection structure of a fourth embodiment.
Figure 38:
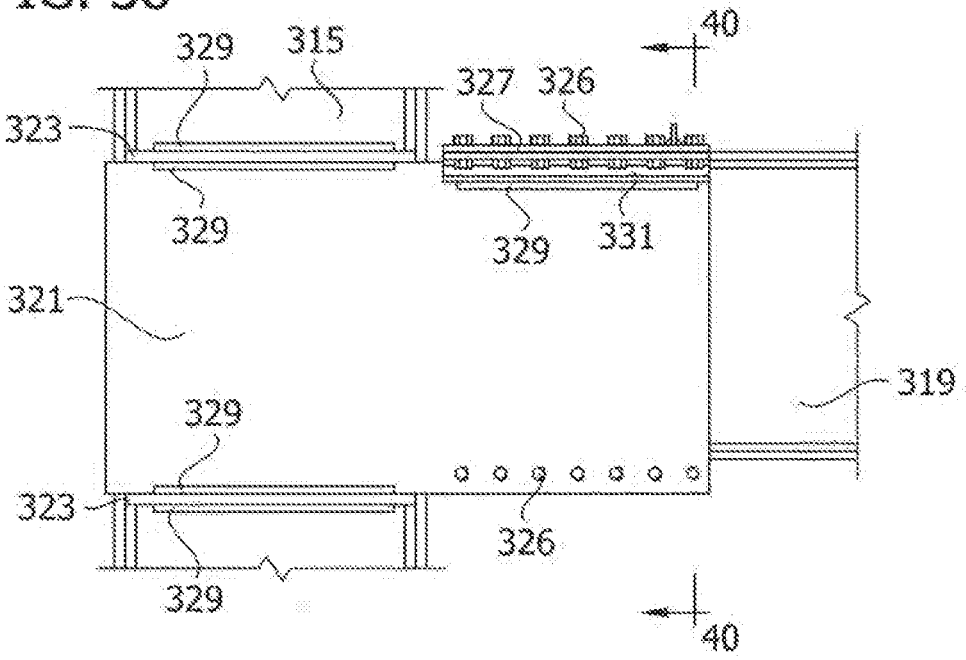
FIG. 38 is a front view of the beam-to-column joint connection structure of FIG. 37.
Figure 39:
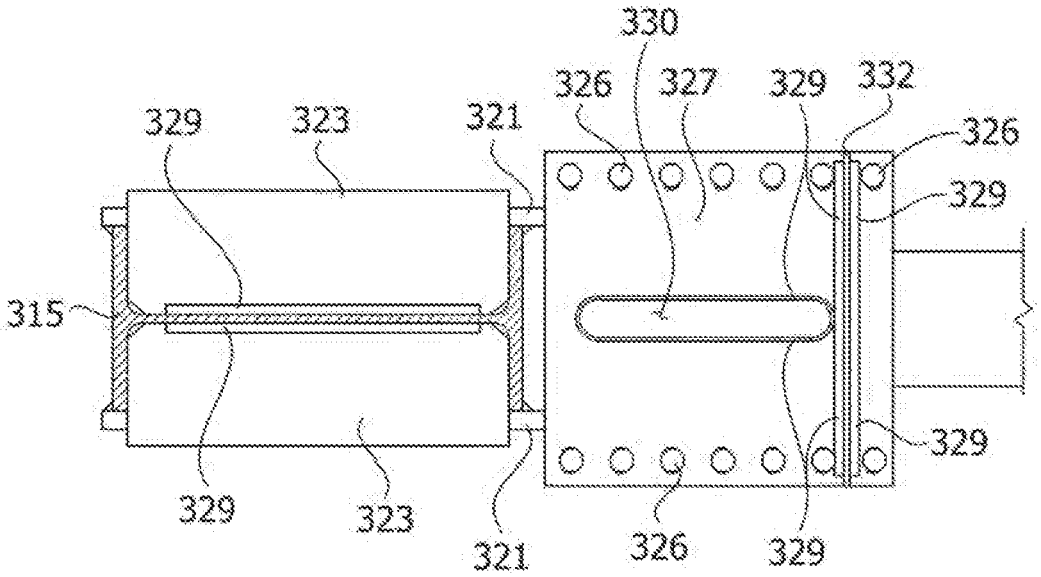
FIG. 39 is a top view of the beam-to-column joint connection structure of FIG. 37.
Figure 40:
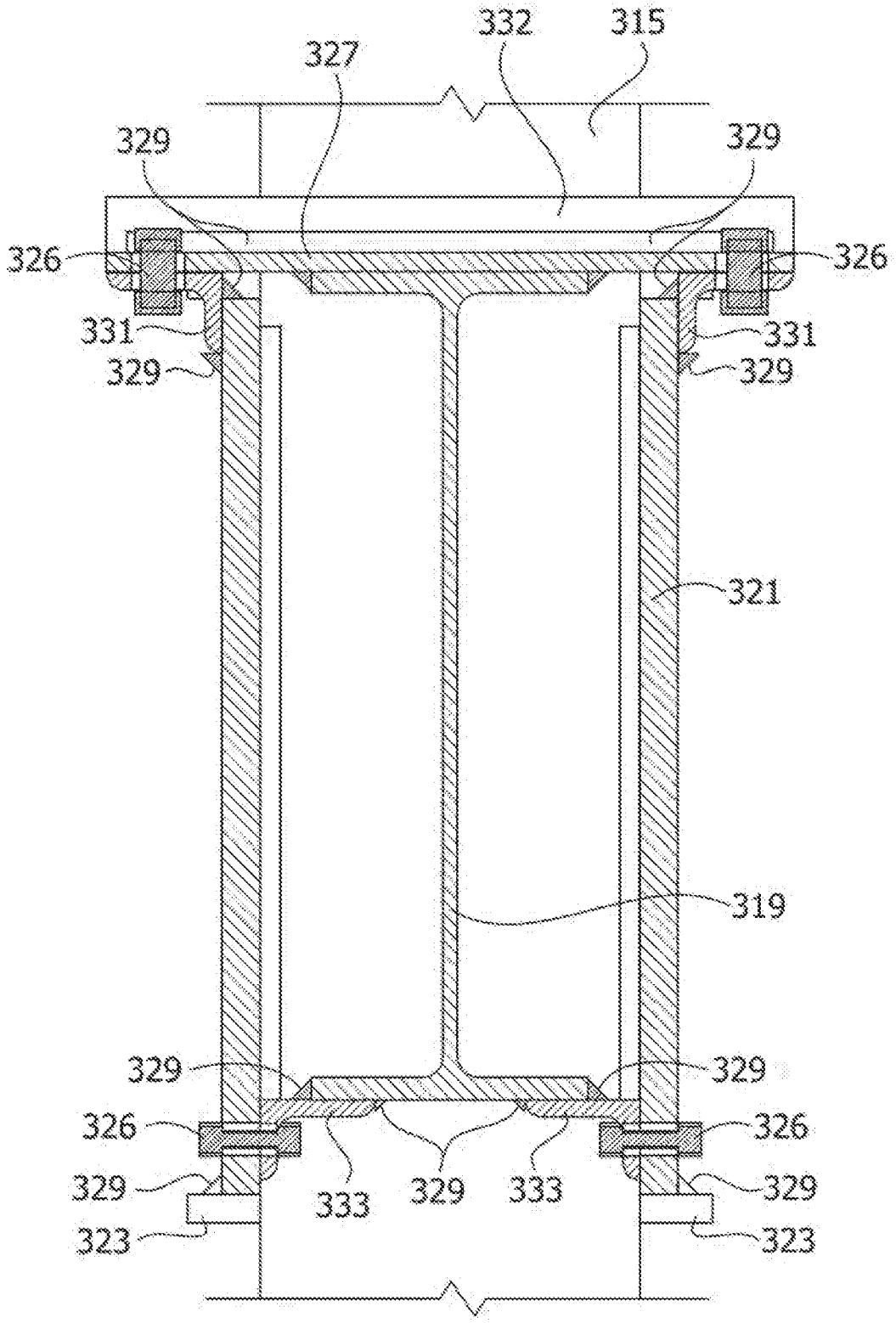
FIG. 40 is a section taken in the plane including line 40-40 of FIG. 38.
Figure 41:
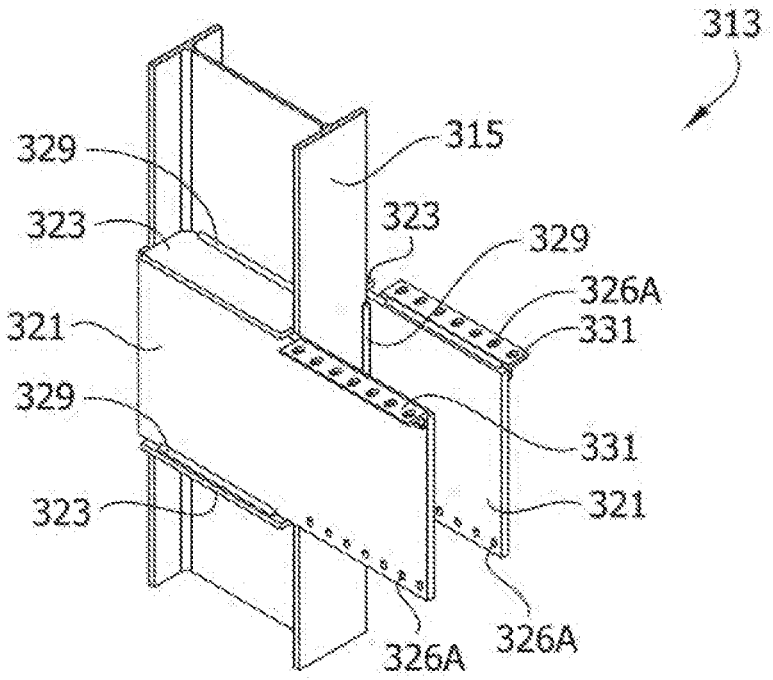
FIG. 41 is a fragmentary perspective of a column assembly of the beam-to-column joint connection structure of FIG. 37.
Figure 42:
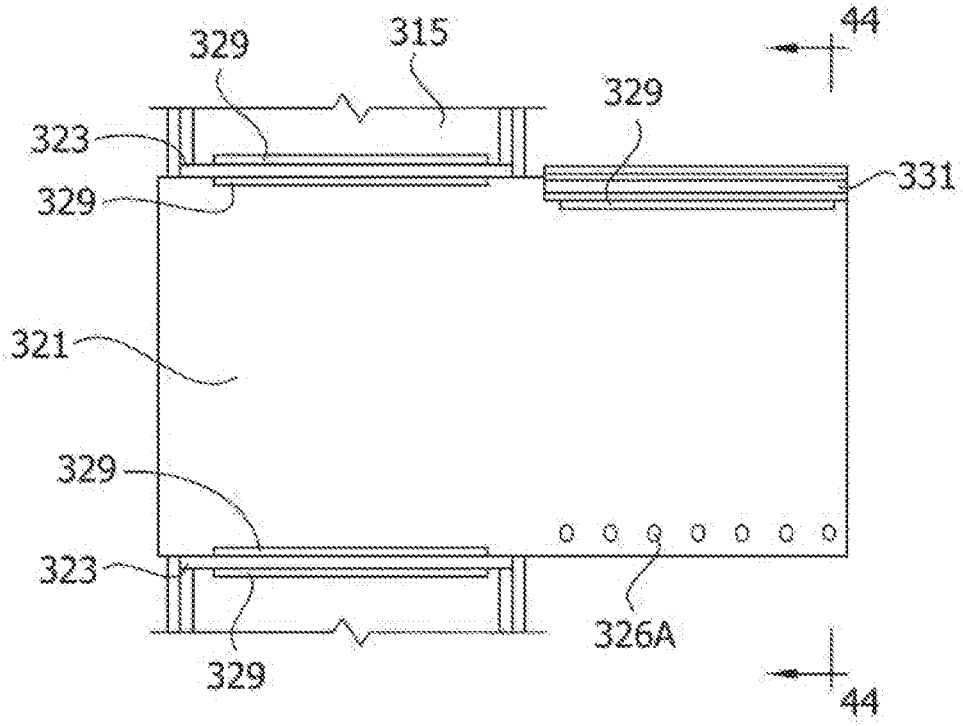
FIG. 42 is a front view of the column assembly in FIG. 41.
Figure 43:
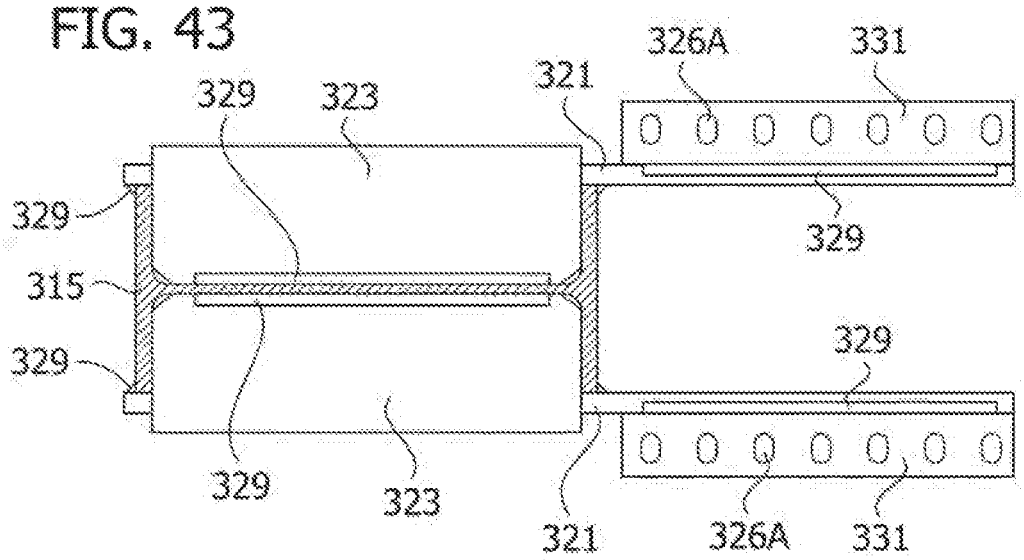
FIG. 43 is a top view of the column assembly in FIG. 41.
Figure 44:
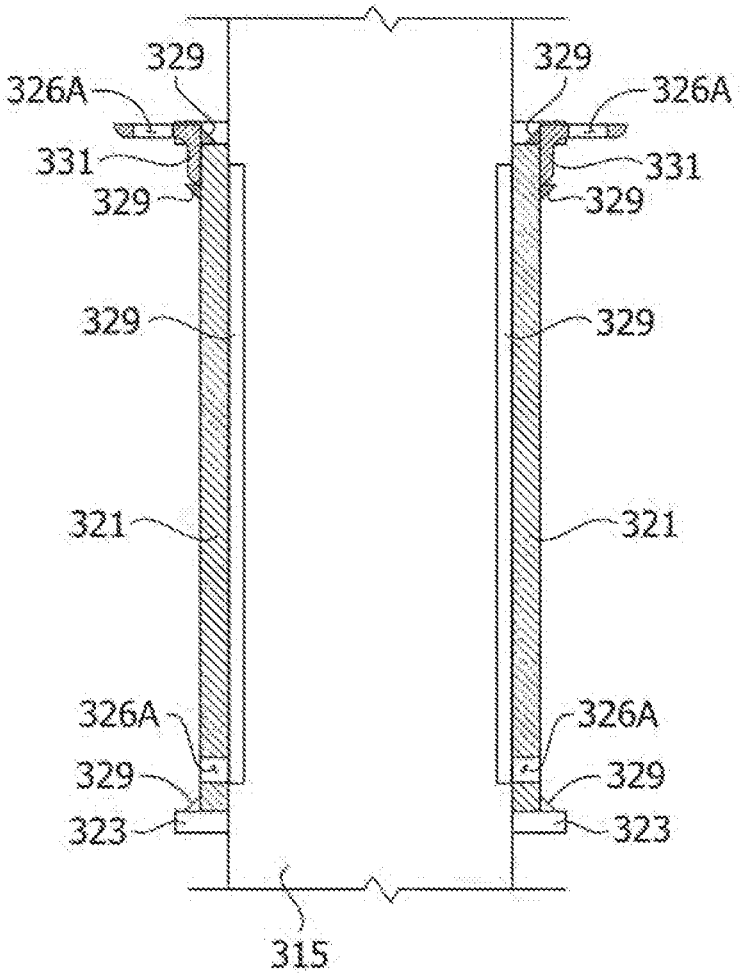
FIG. 44 is a section taken in the plane including line 44-44 of FIG. 42.
Figure 45:
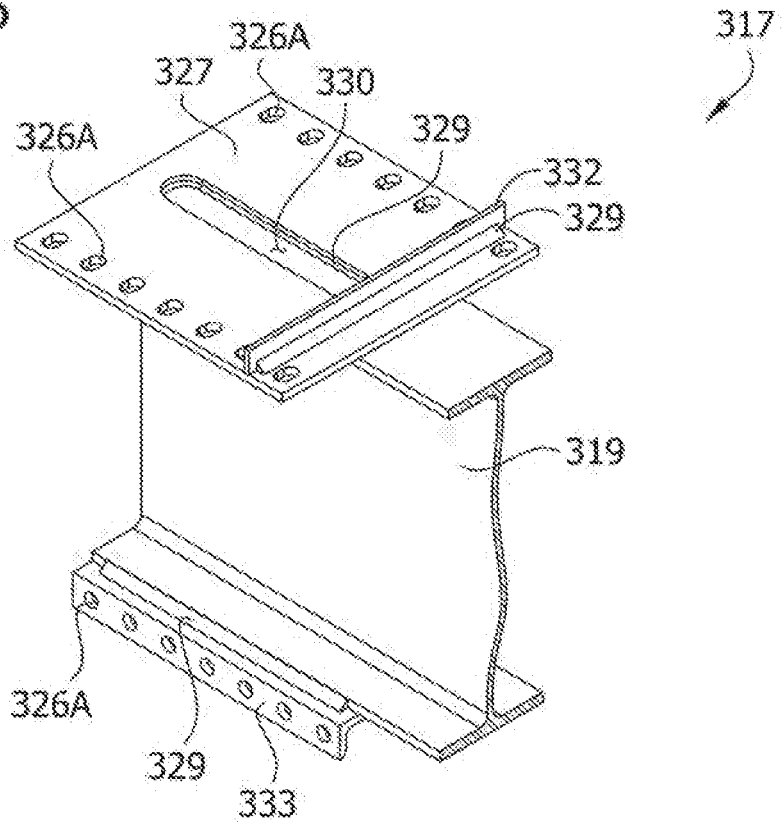
FIG. 45 is a fragmentary perspective of a full-length beam assembly of the beam-to-column joint connection structure of FIG. 37.
Figure 46:
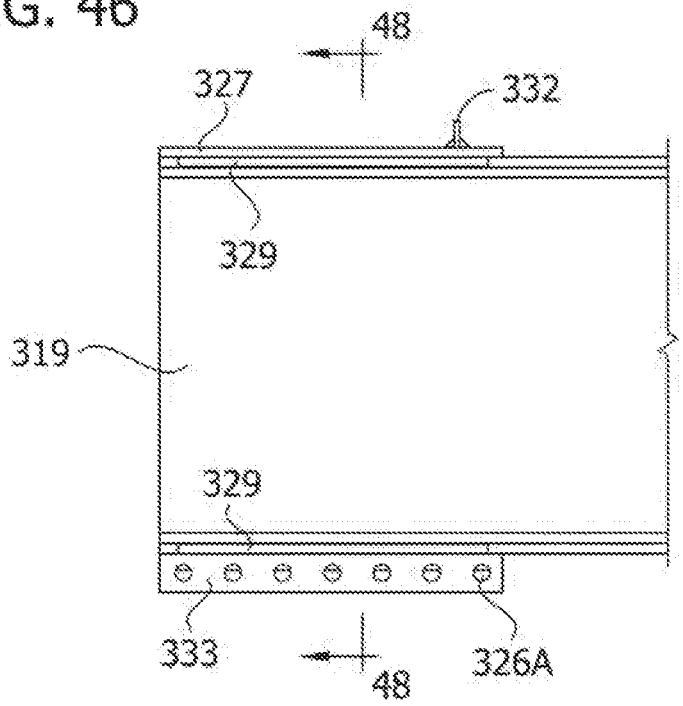
FIG. 46 is a front view of the full-length beam assembly in FIG. 45.
Figure 47:
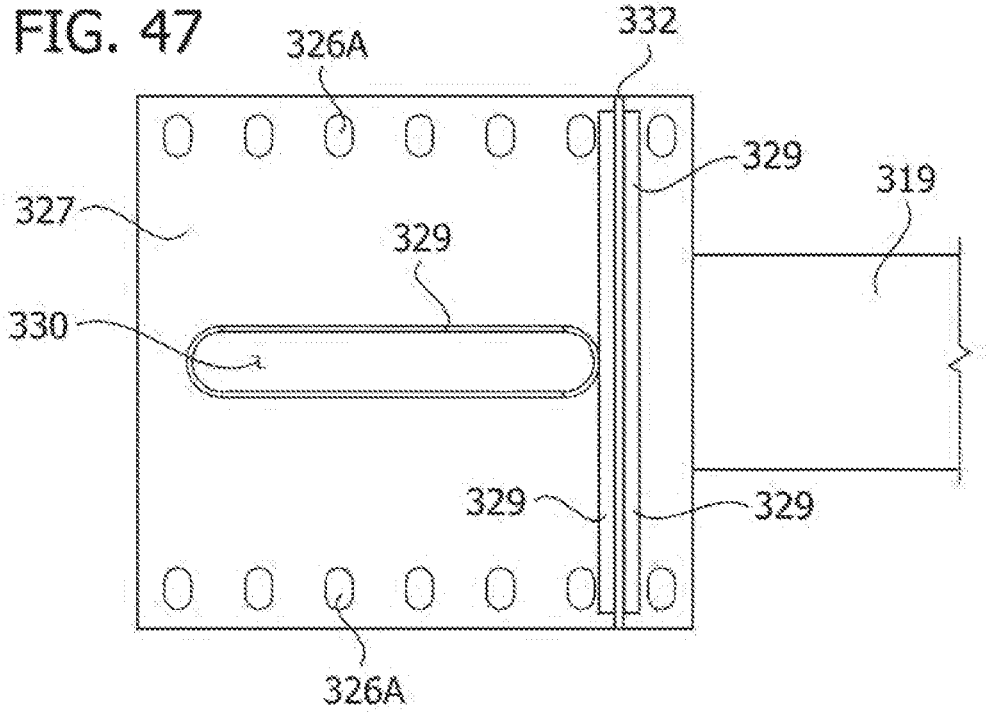
FIG. 47 is a top view of the full-length beam assembly in FIG. 45.
Figure 48:
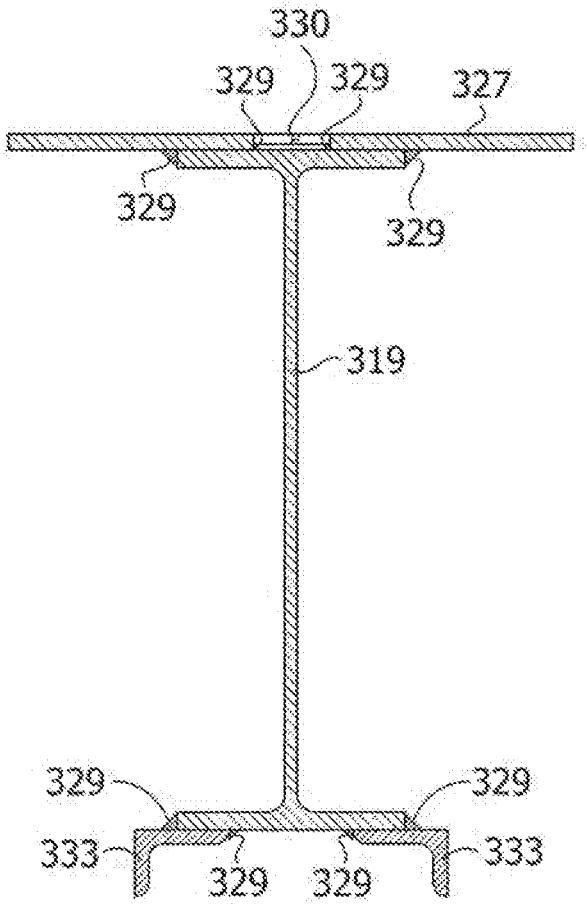
FIG. 48 is a section taken in the plane including line 48-48 of FIG. 46.

The vertical shear plates 128 are welded or otherwise attached to opposite sides of the web of the beam 119 (FIG. 24). Each of the vertical angle irons 134 is attached in a suitable manner such as by welds 129 at the toe and heel of the leg of the angle iron abutting the web of the beam 119. Bolt holes 126A in the other leg of the angle iron 134 receive bolts 126 extending through corresponding bolt holes 126A in the gusset plate 11 to connect the web of the beam 119 to the gusset plate. In the illustrated embodiment, the bolt holes 126A in the angle iron 134 are slotted in a direction parallel to the length of the beam. The vertical shear plates 128 and angle irons 134 are optional.

Referring to FIGS. 25-36, a beam-to-column moment-resisting joint connection structure of a third embodiment is generally indicated at 211. In the illustrated embodiment, the joint connection joins a column assembly 213 including a column 215 to a full-length beam assembly 217 including a full-length beam 219. The joint connection structure 211 of the third embodiment is substantially identical to the joint connection structure 11 of the first embodiment. The only differences between the two embodiments is cover plate 227 has a closed oblong radiused slot opening 230 extending along the length of the cover plate. It will be understood that the cover plate 227 may have other widths, configurations and slot-type oblong openings. For example, multiple smaller slots may be used in place of a single, larger slot (e.g., slot 230). The smaller slots can be punched out of the cover plate rather than cut out.

Referring to FIGS. 37-48, a beam-to-column moment-resisting joint connection structure of a fourth embodiment is generally indicated at 311. In the illustrated embodiment, the joint connection joins a column assembly 313 including a column 315 to a full-length beam assembly 317 including a full-length beam 319. The joint connection structure 311 of the fourth embodiment is substantially identical to the joint connection structure 211 of the third embodiment. The only difference between the two embodiments is the addition of a stiffener bar 332 attached to atop surface of cover plate 327 in the joint connection structure 311.

Referring to FIGS. 49-60, a beam-to-column moment-resisting joint connection structure of a fifth embodiment is generally indicated at 411. The joint connection structure may be used in the construction of a building framework. In the illustrated embodiment, the joint connection joins a column assembly 413 including a column 415 to a full-length beam assembly 417 including a full-length beam 419.

Figure 49:
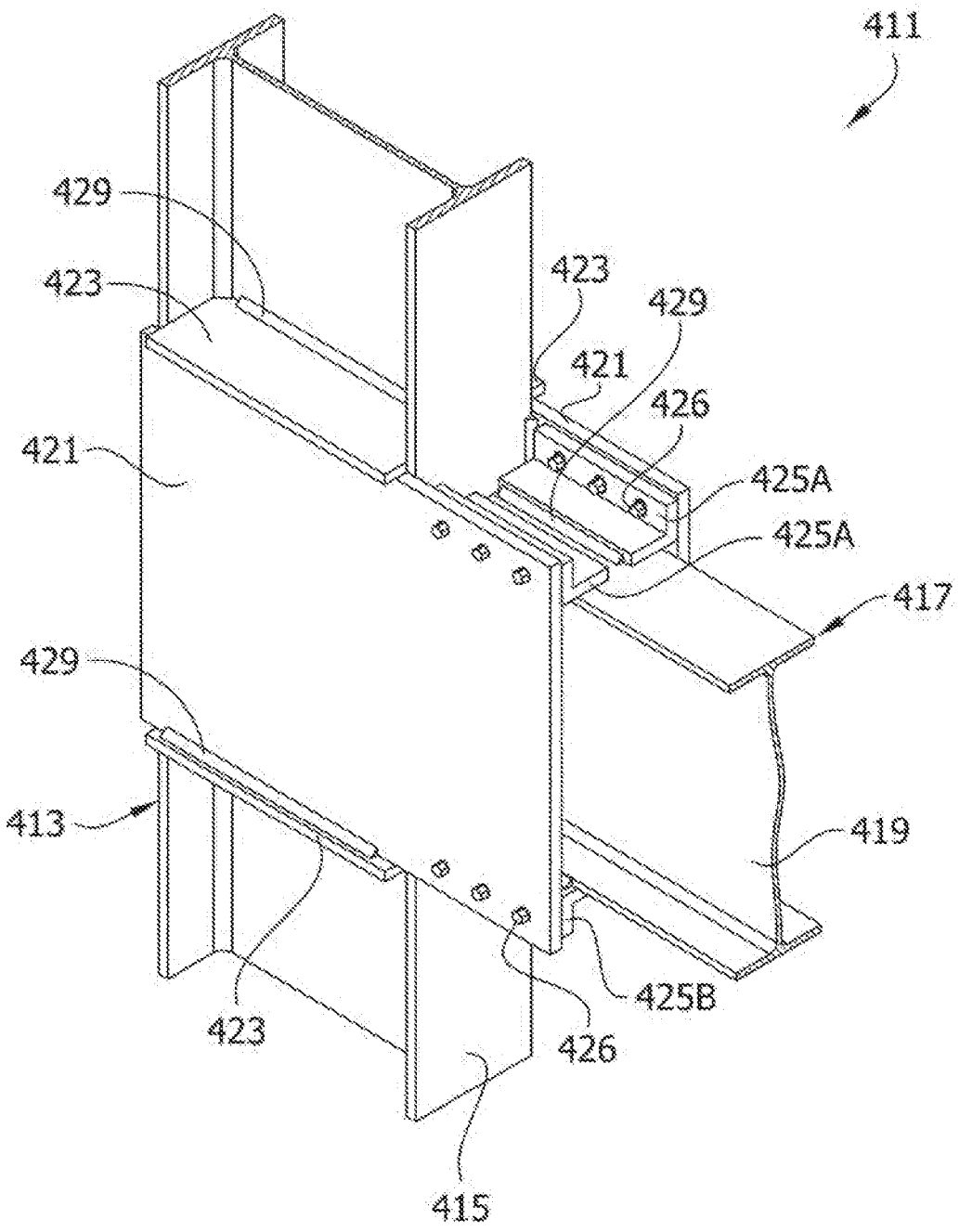
FIG. 49 is a fragmentary perspective of a beam-to-column joint connection structure of a fifth embodiment.
Figure 50:
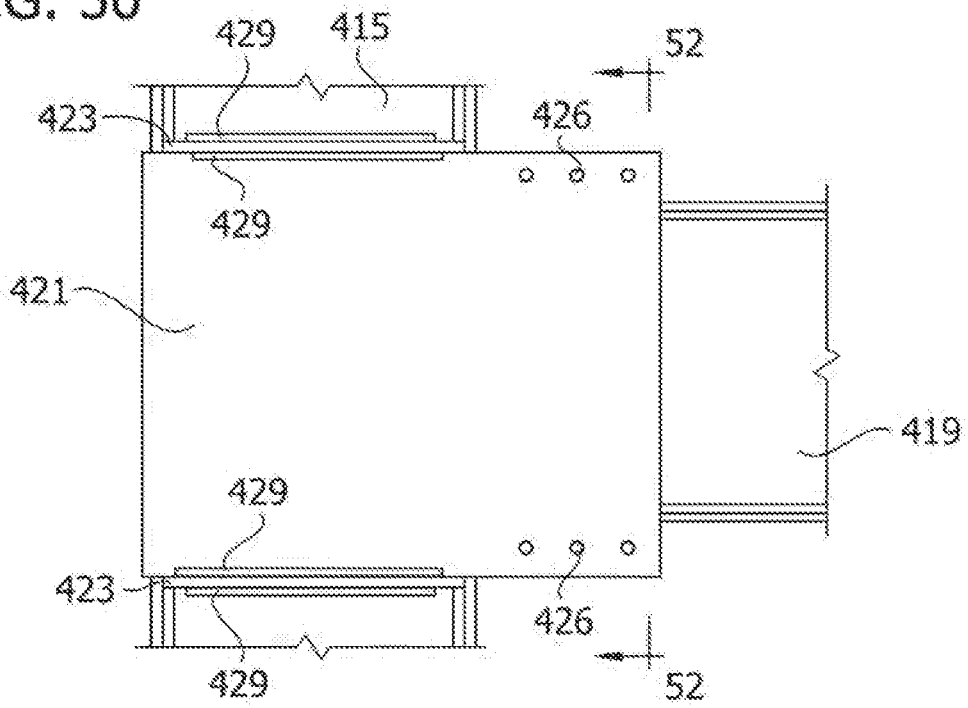
FIG. 50 is a front view of the beam-to-column joint connection structure of FIG. 49.
Figure 51:
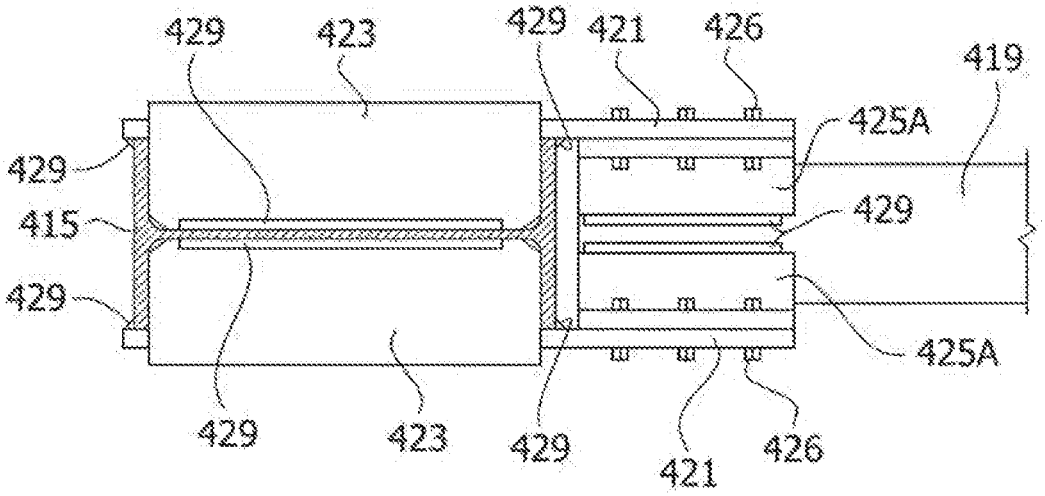
FIG. 51 is a top view of the beam-to-column joint connection structure of FIG. 49.

A spaced apart pair of parallel, vertically and horizontally extending gusset plates 421 sandwich the column 415 and beam 419. Four horizontal shear plates 423 (only three are shown in FIG. 49) are arranged in vertically spaced pairs generally aligned at top and bottom edges of the gusset plates 421. Two angle irons (broadly, "connecting members") 425A are disposed on an upper flange of the beam 419 at an end of the beam. The angle irons 425A are horizontally spaced from one another and extend along a length of the beam 419. The angle irons 425A connect the gusset plates 421 to the upper flange of the beam 419. The angle irons 425A are L-shaped in cross section. Each angle iron 425A may include horizontal first leg attached to the upper flange of the beam 419 and a vertical second leg projecting from the first leg perpendicular to the length of the beam. The first leg is attached in a suitable manner such as by a weld 429 between the toe of the first leg and the top surface of the upper flange of the beam 419 and by a weld 429 on the underside of the first leg to the tips of the upper flange. An outer surface of the second leg of each angle iron 425A are bolted to an inner surface of a respective gusset plate 421 by horizontally spaced bolts 426 extending through aligned bolt holes 426A in the second leg of the angle iron and respective gusset plate. Instead of two angle irons 425A for example, a single channel welded to the top flange could be employed.

Figure 52:
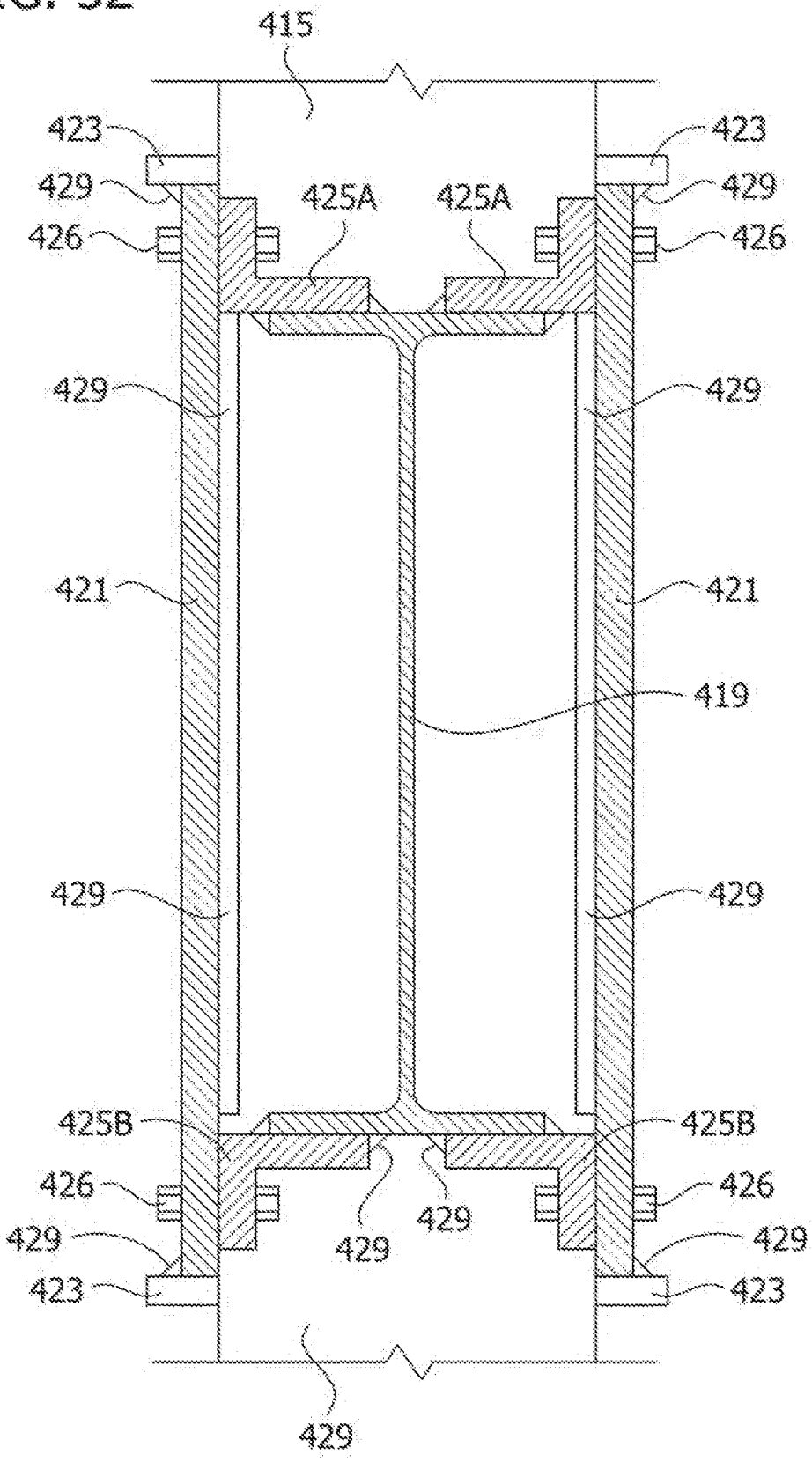
FIG. 52 is a section taken in the plane including line 52-52 of FIG. 50.
Figure 57:
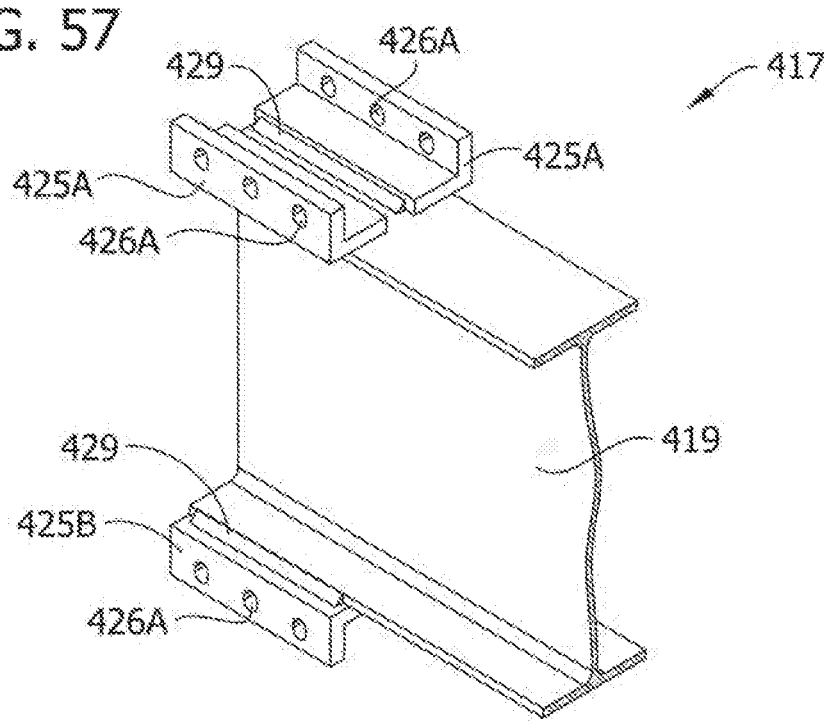
FIG. 57 is a fragmentary perspective of a full-length beam assembly of the beam-to-column joint connection structure of FIG. 49.
Figure 58:
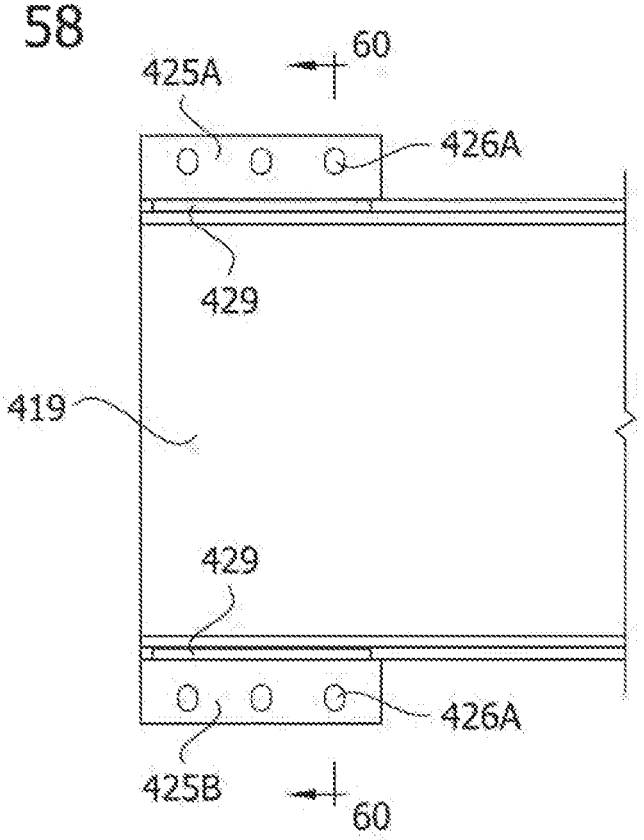
FIG. 58 is a front view of the full-length beam assembly in FIG. 57.
Figure 59:
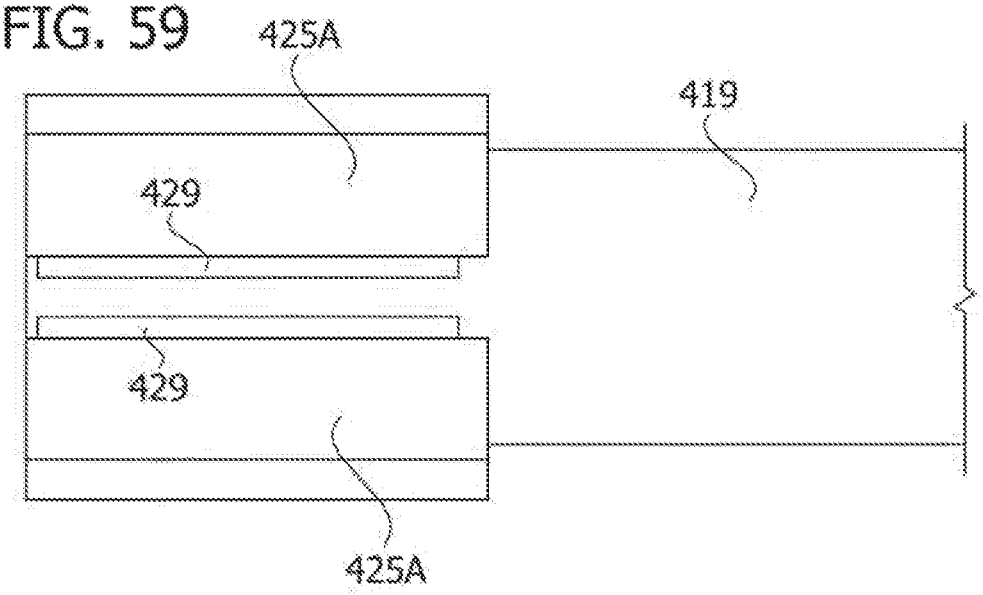
FIG. 59 is a top view of the full-length beam assembly in FIG. 57.
Figure 60:
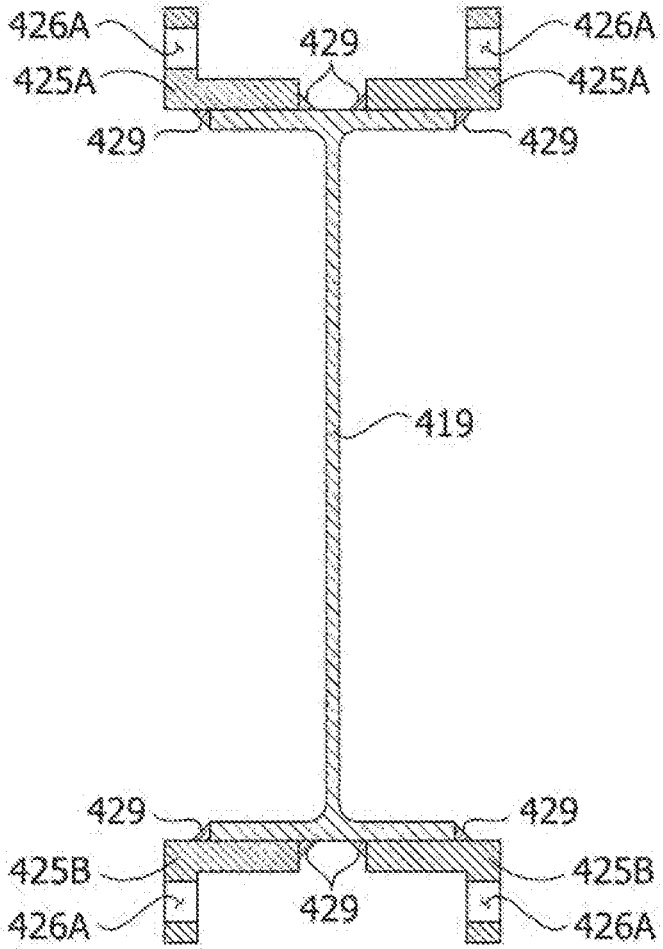
FIG. 60 is a section taken in the plane including line 60-60 of FIG. 58.

Two angle irons (broadly, "connecting members") 425B are disposed on a lower flange of the beam 419 at an end of the beam (see, FIGS. 52 and 57). The angle irons 425B are horizontally spaced from one another and extend along a length of the beam 419. The angle irons 425B connect the gusset plates 421 to the lower flange of the beam 419. The angle irons 425B are L-shaped in cross section. Each angle iron 425B may include a horizontal first leg attached to the lower flange of the beam 419 and a vertical second leg projecting from the first leg perpendicular to the length of the beam. The first leg is attached in a suitable manner to the bottom face of the lower flange of the beam 419 such as by a weld 429 between a toe of the first leg and the bottom surface of the lower flange of the beam 419 and a weld 429 between a top surface of the first leg and a tip of the lower flange. An outer surface of the second leg of each angle iron 425B is bolted to an inner surface of a respective gusset plate 421 by horizontally spaced bolts 426 extending through aligned bolt holes 426A in the second let of the angle iron and respective gusset plate. Instead of two angle irons 425B a single channel welded to the top flange could be employed. Moreover, different combinations of connecting structure could be used. For example, one flange of the beam 419 might use two angle irons, while the other flange of the beam uses a channel.

The bolt holes 426A in the angle irons 425A, 425B may be larger than the bolt holes 426A in the gusset plates 421 to facilitate placement of one or more of the bolts 426 through slightly misaligned holes 426A. In particular, the bolt holes 426A in the gusset plates 421 would be standard size and the bolt holes 426A in the angle irons 425A, 425B would be vertically slotted, and the bolts would be inserted first through the standard sized holes in the gusset plates 421 and then into the slotted bolt holes of the angle irons 425A, 425B. It will be appreciated that similar slotting of one or two mating holes may be used to facilitate bolting the components together in all embodiments may be employed. The bolt connection allows workers in the field to draw the gusset plates 421 into flush engagement with the angle irons 425A, 425B even with the initial gap between the gusset plates and full-length beam assembly 417, without the need of external clamping means.

Referring to FIGS. 57-60, the full-length beam assembly 417 may be fabricated at a fabrication shop prior to being transported to the construction site. To fabricate the full-length beam assembly 417, the angle irons 425A, 425B are welded at 429 or otherwise attached to the upper and lower flanges of the beam 419. Any welds on the beam assembly needed to form the joint connection structure can be made at the shop. The angle irons 425A, 425B may have other configurations than those illustrated in the current embodiment.

Referring to FIGS. 53-56, the column assembly 413 may also be fabricated at a fabrication shop and later transported to the construction site. To fabricate the column assembly 413, the gusset plates 421 are welded at 429 or otherwise attached to the flanges of the column 415, the optional horizontal shear plates 423 are welded at 429 or otherwise attached to the web of the column and to the top and bottom edges of the gusset plates. Any welds on the column assembly 413 needed to form the beam-to-column moment-resisting joint may be carried out at the shop. The horizontal shear plates 423 can be omitted from the column assembly 413. The gusset plates 421 can have other configurations than those illustrated in the current embodiment. For instance, the gusset plates 421 could have a smaller vertical dimension so that the gusset plates are flush with top and bottom edges of the respective angle irons 425A, 425B rather than extending above and below the angle irons as shown in the illustrated embodiment. The angle irons 425A, 425B may have configurations other than those illustrated in the embodiment.

At the construction site, the column assembly 413 is joined to the full-length beam assembly 417. The column assembly 413 is first erected in a vertical orientation and the end of the full-length beam assembly 417 is positioned horizontally and adjacent to the column assembly, over the gusset plates 421. The full-length beam assembly 417 is then lowered between the gusset plates 421 such that the gusset plates are disposed on opposite sides of the beam 419 and angle irons 425A, 425B of the full-length beam assembly 417. To fixedly secure the two assemblies 413, 417, horizontally spaced bolts 426 are used to attach the gusset plates 421 to the angle irons 425A, 425B through aligned bolt holes in the respective components. Thus, at the construction site, the beam-to-column moment-resisting joint connection structure 411 is completed exclusively through bolt connections. So in the field, the beam-to-column joint connection structure 411 is constructed without the use of welds. The joint connection structure 411 can be used if the building frame is dimensionally close to the exterior curtain wall of the building because the angle irons 425A, 425B are on the inside of the gusset plates 421.

Figure 52A:
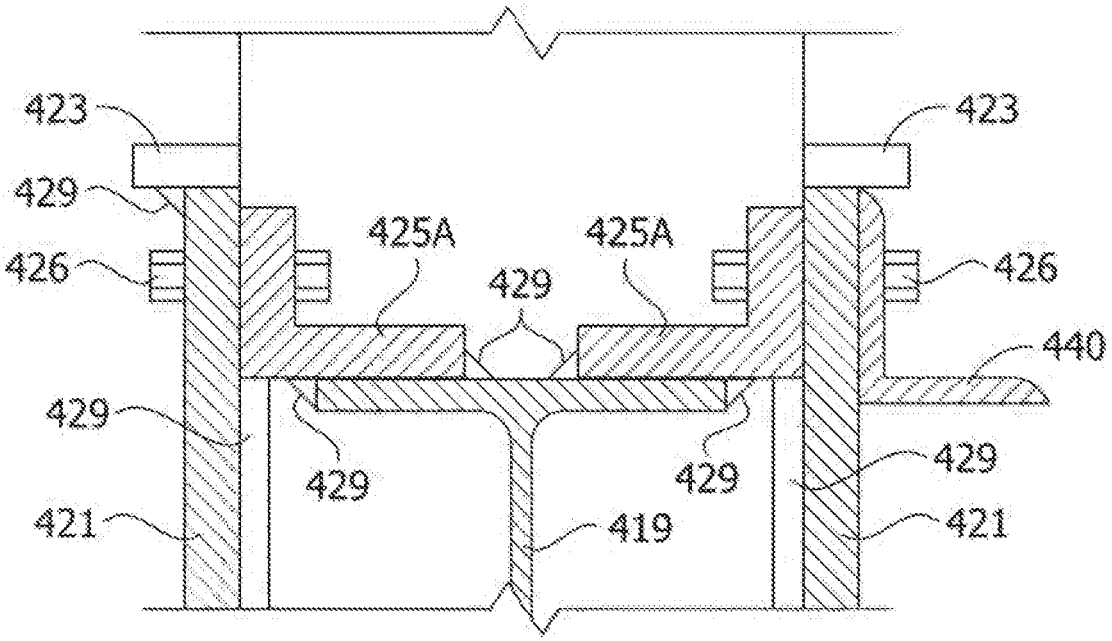
FIG. 52A is an enlarged fragment of FIG. 52 but showing a ledger attached to a side plate of the joint connection structure.
Figure 53:
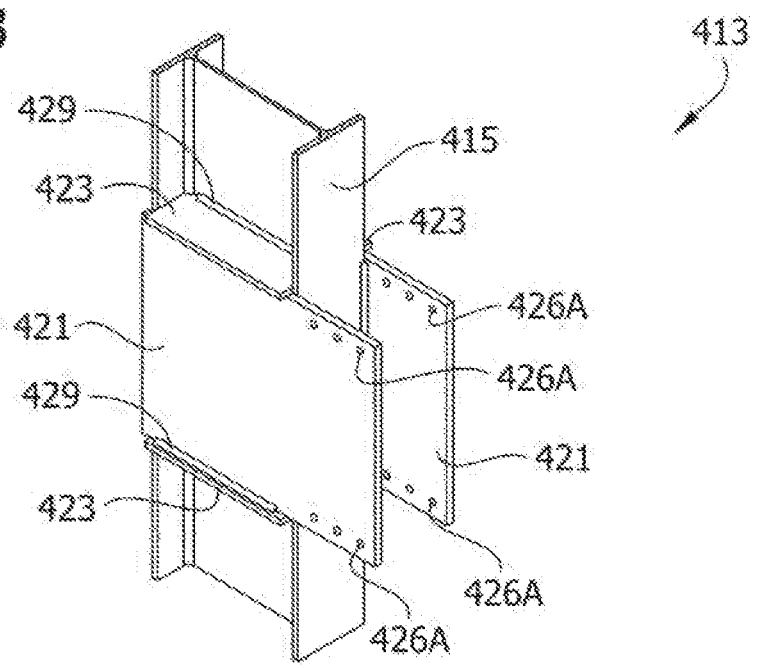
FIG. 53 is a fragmentary perspective of a column assembly of the beam-to-column joint connection structure of FIG. 49.
Figure 54:
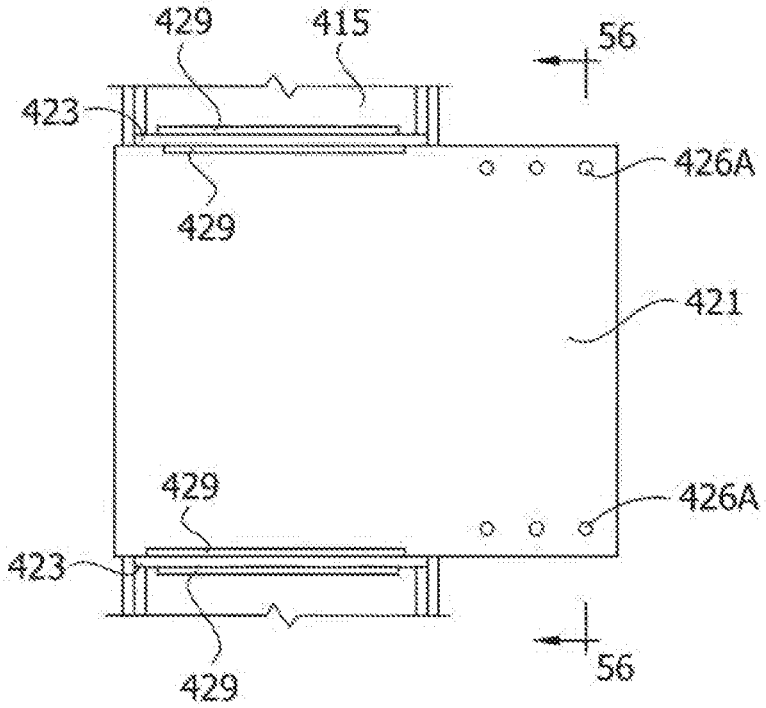
FIG. 54 is a front view of the column assembly in FIG. 53.
Figure 55:
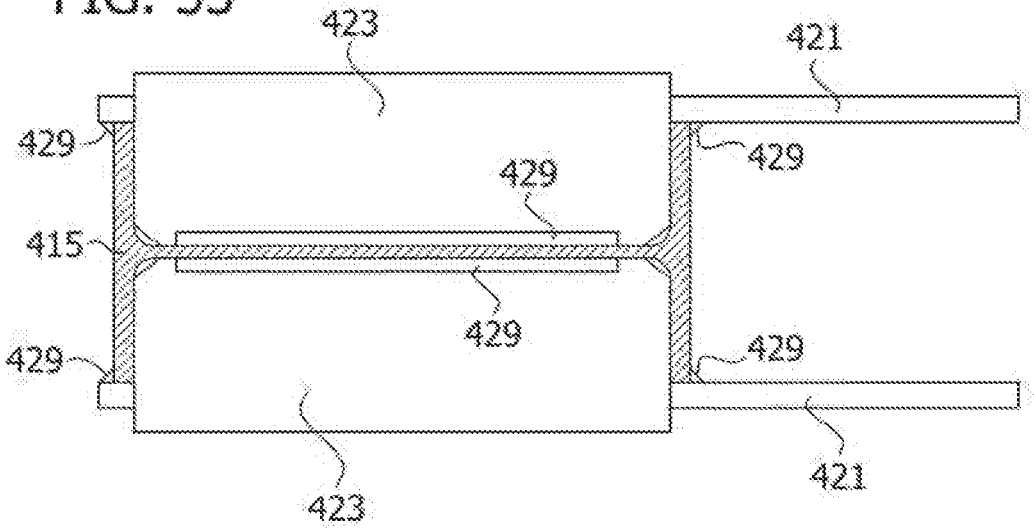
FIG. 55 is a top view of the column assembly in FIG. 53.
Figure 56:
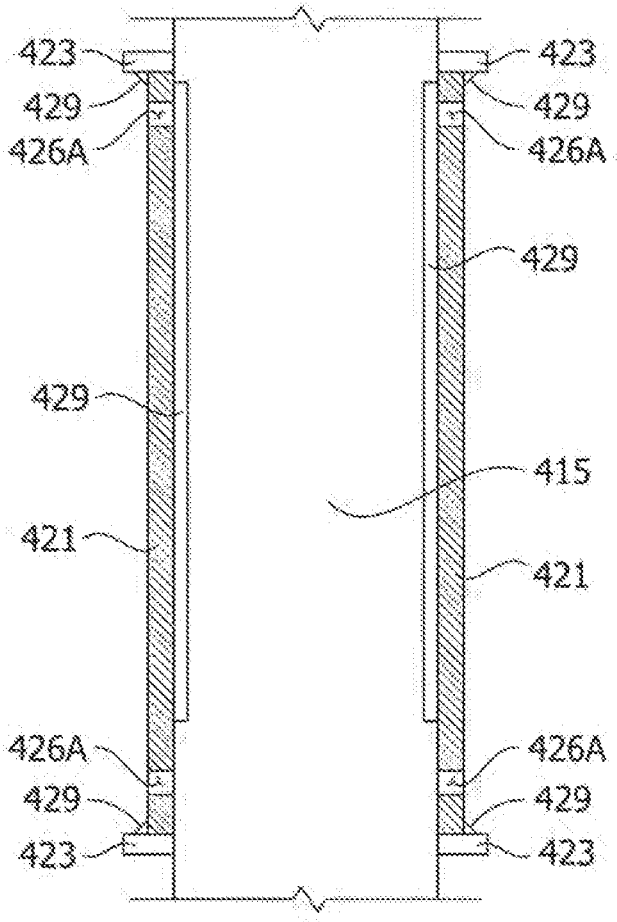
FIG. 56 is a section taken in the plane including line 56-56 of FIG. 54.

The joint connection structure 411 may also be constructed with a ledger angle 440 (FIG. 52A) attached by the same bolts 426 that attach the column and beam assemblies 413, 417, thus saving material. Only one ledger angle 440 is shown in FIG. 52A. Others would be used in a typical construction, such as a ledger angle like the ledger angle 440 shown, but on the opposite side of the top flange of the beam 419. The belt 426 that attaches the ledger angle 440 to the assemblies 413, 417 may also attach angle irons 425A to the gusset plates 421. As understood by persons skilled in the art, the ledger is configured to support floor decking (not shown).

Referring to FIGS. 61-72, a beam-to-column moment-resisting joint connection structure of a sixth embodiment is generally indicated at 511. The joint connection structure may be used in the construction of a building framework. In the illustrated embodiment, the joint connection structure 511 joint a column assembly 513 including a column 515 to a full-length beam assembly 517 including a full-length beam 519.

Figure 61:
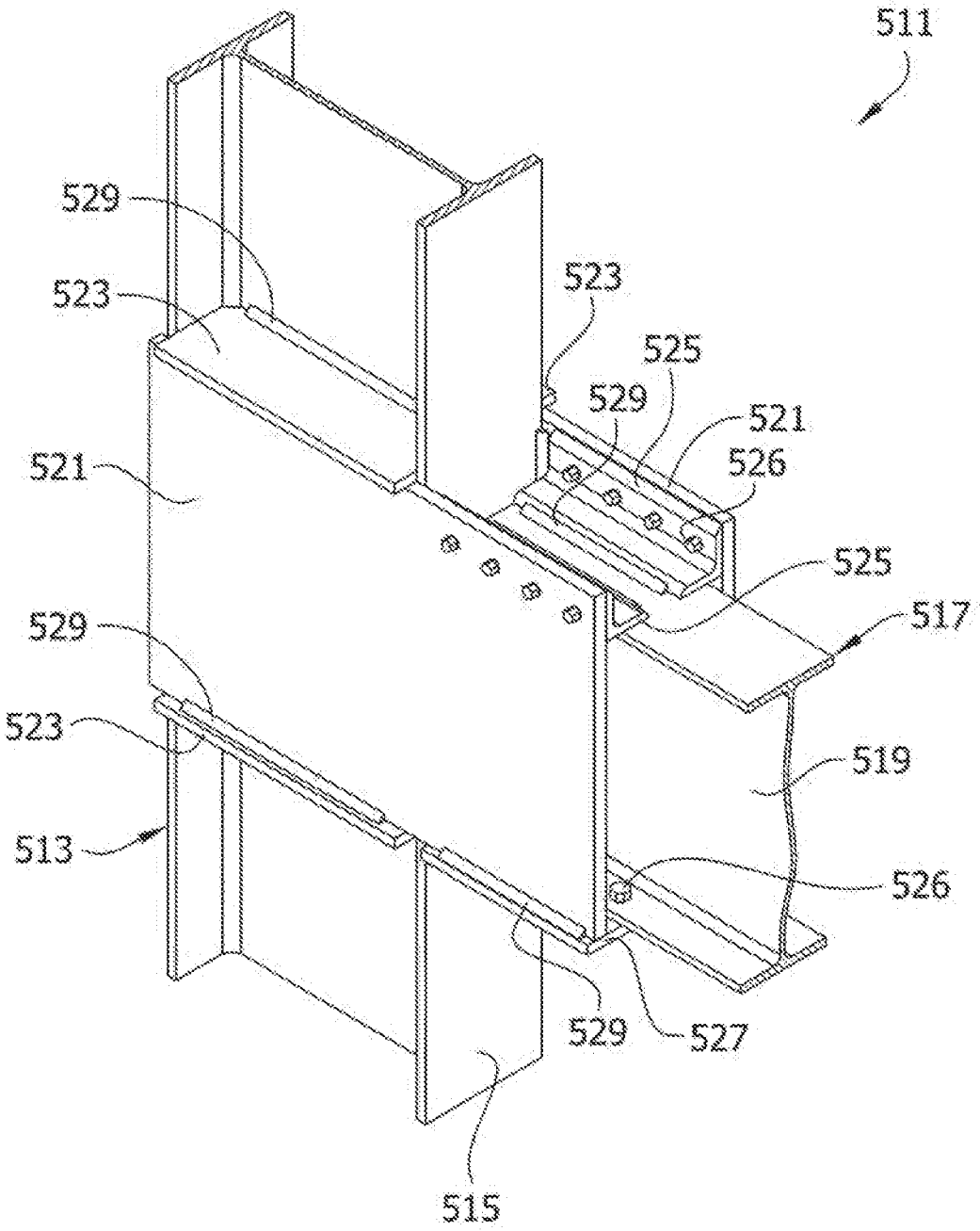
FIG. 61 is a fragmentary perspective of a beam-to-column joint connection structure of a sixth embodiment.
Figure 62:
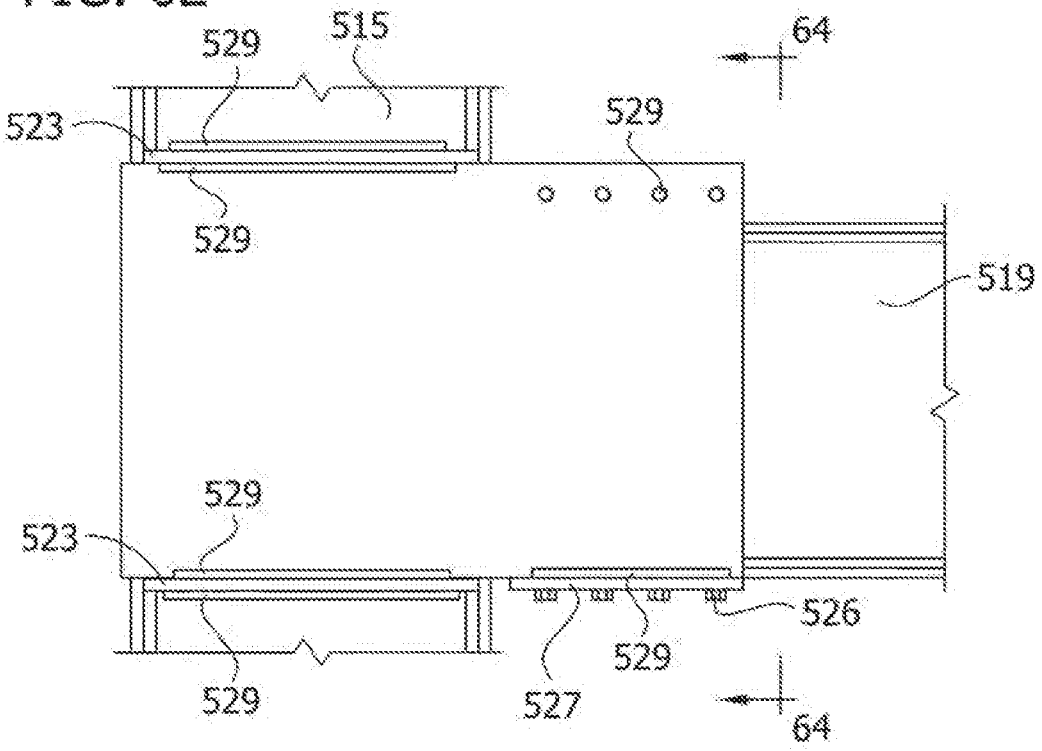
FIG. 62 is a front view of the beam-to-column joint connection structure of FIG. 61.
Figure 63:
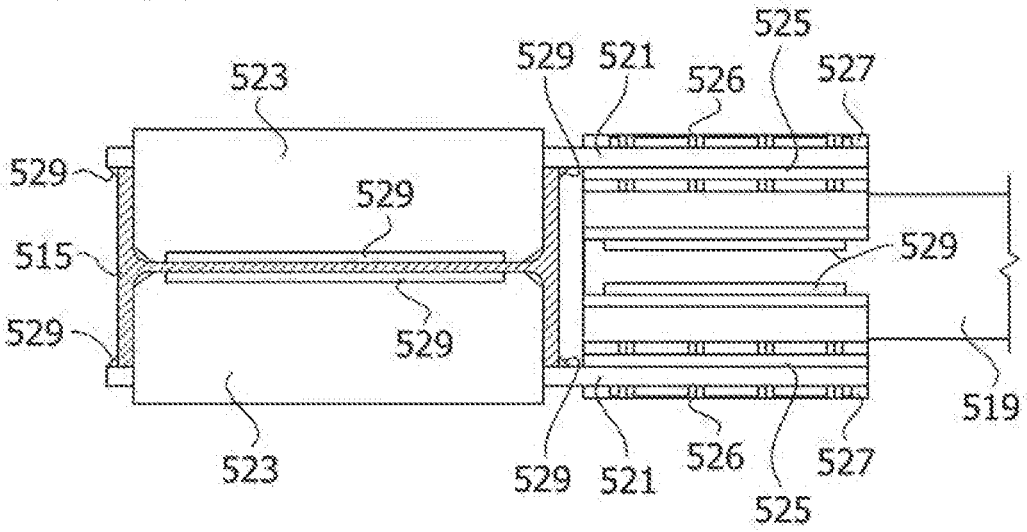
FIG. 63 is a top view of the beam-to-column joint connection structure of FIG. 61.

A spaced apart pair of parallel vertically and horizontally extending gusset plates 521 sandwich the column 515 and end of beams 519. Four optional horizontal shear plates 523 (only three are shown in FIG. 61) are arranged in vertically spaced pairs generally aligned at top and bottom edges of the gusset plates 521. Two angle irons (broadly, "connecting members") 525 are disposed on an upper flange of the beam 519 at an end of the beam. The angle irons 525 are horizontally spaced from one another and extend along a length of the beam 519. The angle irons 525 connect the gusset plates 521 to the upper flange of the beam 519. The angle irons 525 are L-shaped in cross section. Each angle iron 525 may include a horizontal first leg attached to the upper flange of the beams 519 and a vertical second leg projecting upwardly from the first leg transverse to the length of the beam. The angle iron 525 may be attached to the upper flange of the beam 519 in the same way as the angle irons 425A were attached to the upper flange of the beam 419 in the fifth embodiment. An outer surface of the second leg of each angle iron 525 is bolted to an inner surface of the respective gusset plate 521 by horizontally spaced bolts 526 extending through aligned bolt holes 526A in the second leg of the angle iron and respective gusset plate. Instead of two angle irons 525 a single channel welded to the top flange could be employed.

A bottom flange of the beam 519 rests on a cover plate 527 at the end of the beam, which acts as a bearing saddle support for the end of the full-length beam assembly 517. The cover plate 527 is attached in a suitable manner such as by welds 529 to the bottom edge of each gusset plate 521 or near the bottom edges of the gusset plate. The cover plate 527 has a width that is greater than a width of the beam 519 and may be greater than a horizontal spacing of the gusset plates 521. The configuration of the cover plate 527 allows the beam 519 to be lowered between the gusset plates 521 so that the bottom flange of the beam can rest and bear on an upper surface of the cover plate in a self-shoring condition before fixedly securing the beam assembly 517 to column assembly 513. Thus, the beam 519 is fully supported by the column assembly 513 once the end of the beam is placed between the gusset plates 521 onto the top cover plate 527. It will be understood that the cover plate 527 may have other widths within the scope of the present invention. To fixedly secure the beam 519 to the cover plate 527, the bottom flange of the beam is bolted to the upper surface of the cover plate 527 by horizontally spaced bolts 526 extending through aligned bolt holes 526A (see FIG. 67) in the beam bottom flange and cover plate 527. The bolt holes 526A in the cover plate 527 are larger than the bolt holes 526A in the beam flange to facilitate placement of one or more of the bolts 526 through slightly misaligned holes 526A. In particular, the bolt holes 526A in the beam flange would be standard size and the bolt holes 526A in the cover plate 527 would be oversized (e.g., elongated or oversized diameter) and the bolts would be inserted first though the larger holes into the standard sized holes. The bolt holes 526A in the angle irons 525 may also be larger than the bolt holes 526A in the gusset plates 521. As such, the bolt holes 526A in the gusset plates 521 would be standard size and the bolt holes 526A in the angle irons 525 would be oversized. The component having the oversized hole can be switched or both components may have oversized holes. The bolt connection allows workers in the field to draw the gusset plates 521 into flush engagement with the angle irons 525 and beam 519 even with the initial gap between the gusset plates and full-length beam assembly 517. Moreover, the lower flange of the beam 519 is drawn flush against the supporting cover plate 527 by the bolts.

Figure 64:
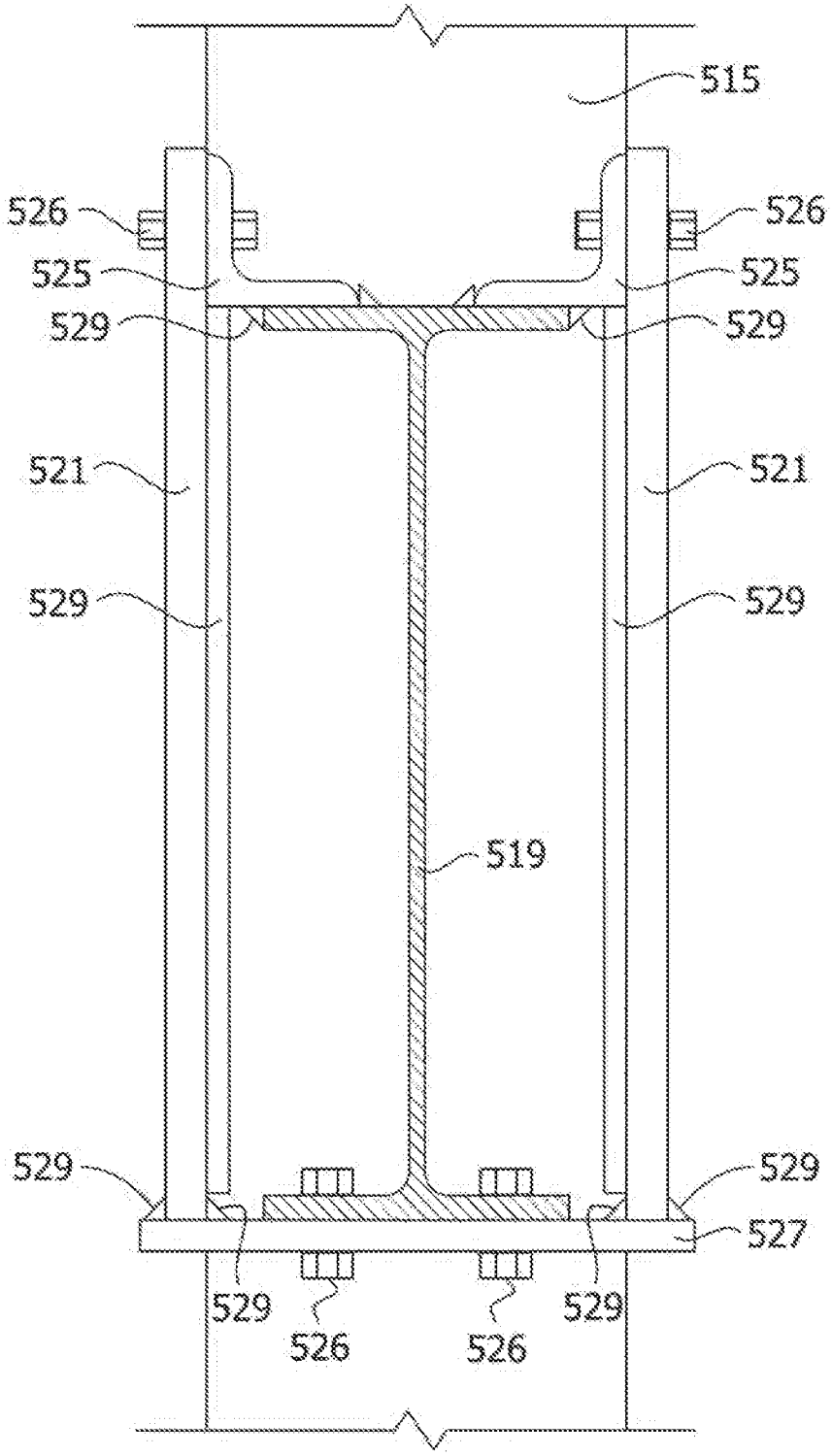
FIG. 64 is a section taken in the plane including line 64-64 of FIG. 62.
Figure 64A:
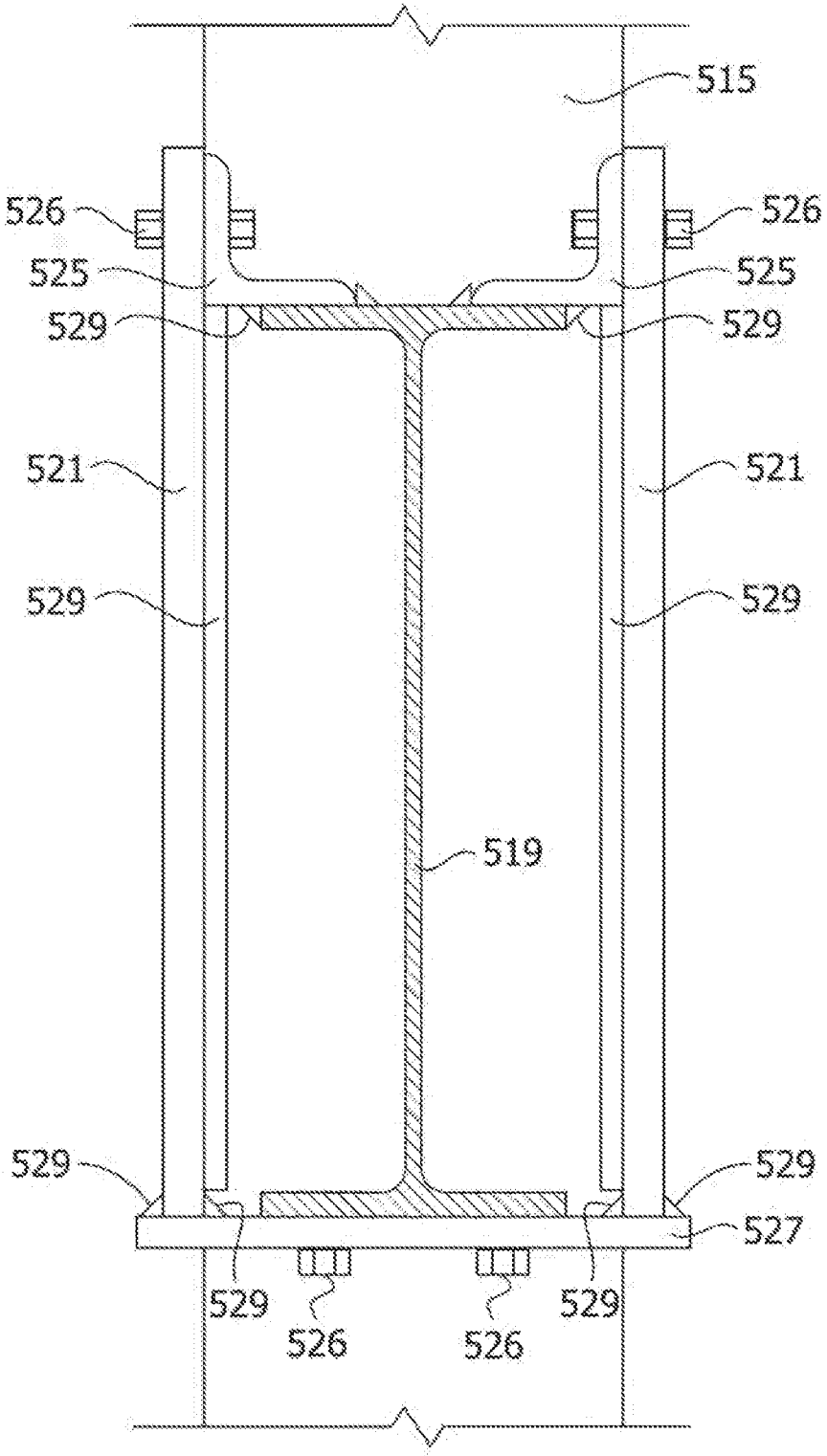
FIG. 64A is the section of FIG. 64 but showing angle irons attached to a top and bottom of an upper flange of a beam of the full-length beam assembly.
Figure 64B:
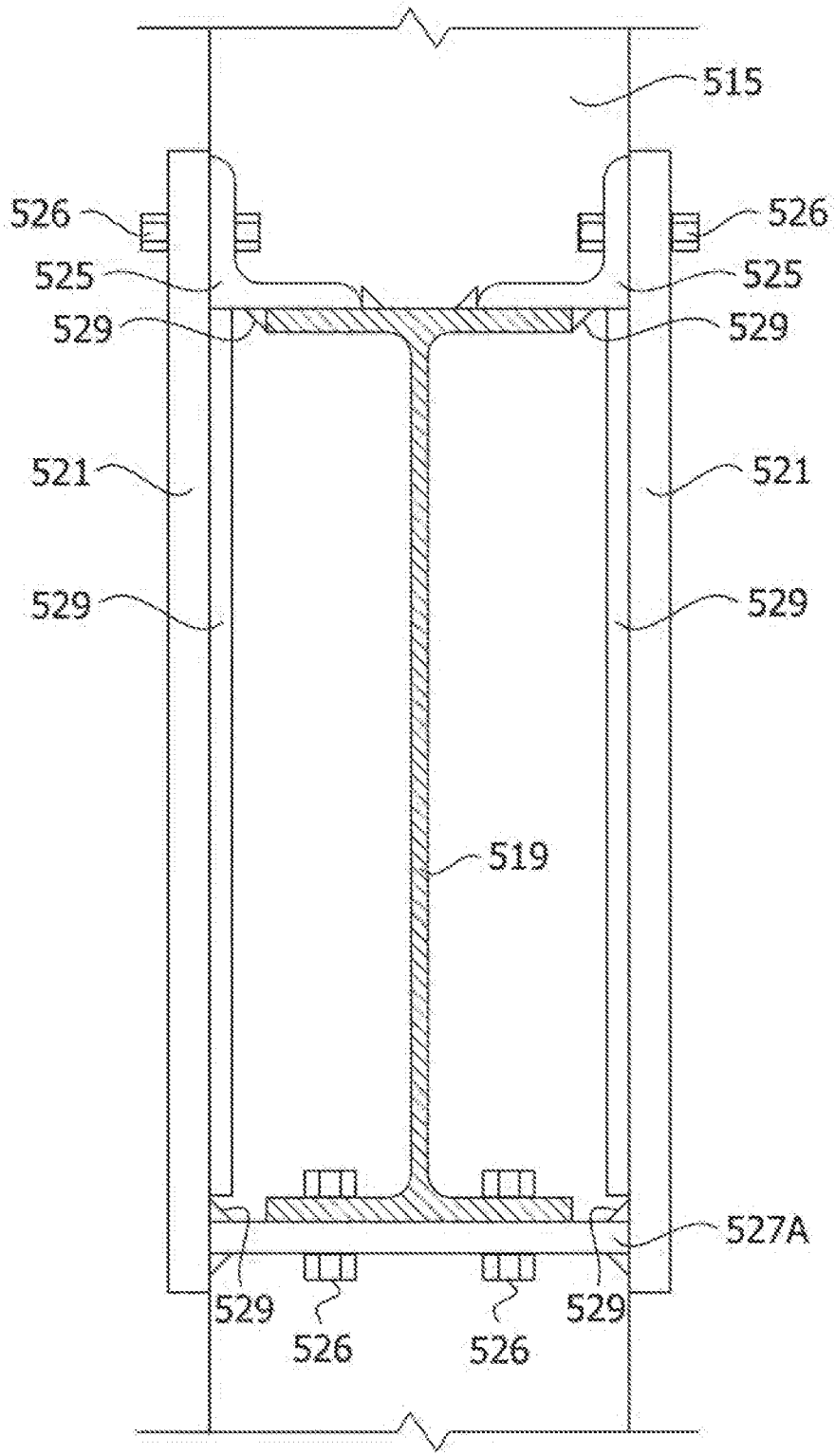
FIG. 64B is the section of FIG. 64 but showing a cover plate disposed between side plates of the joint connection structure.
Figure 64C:
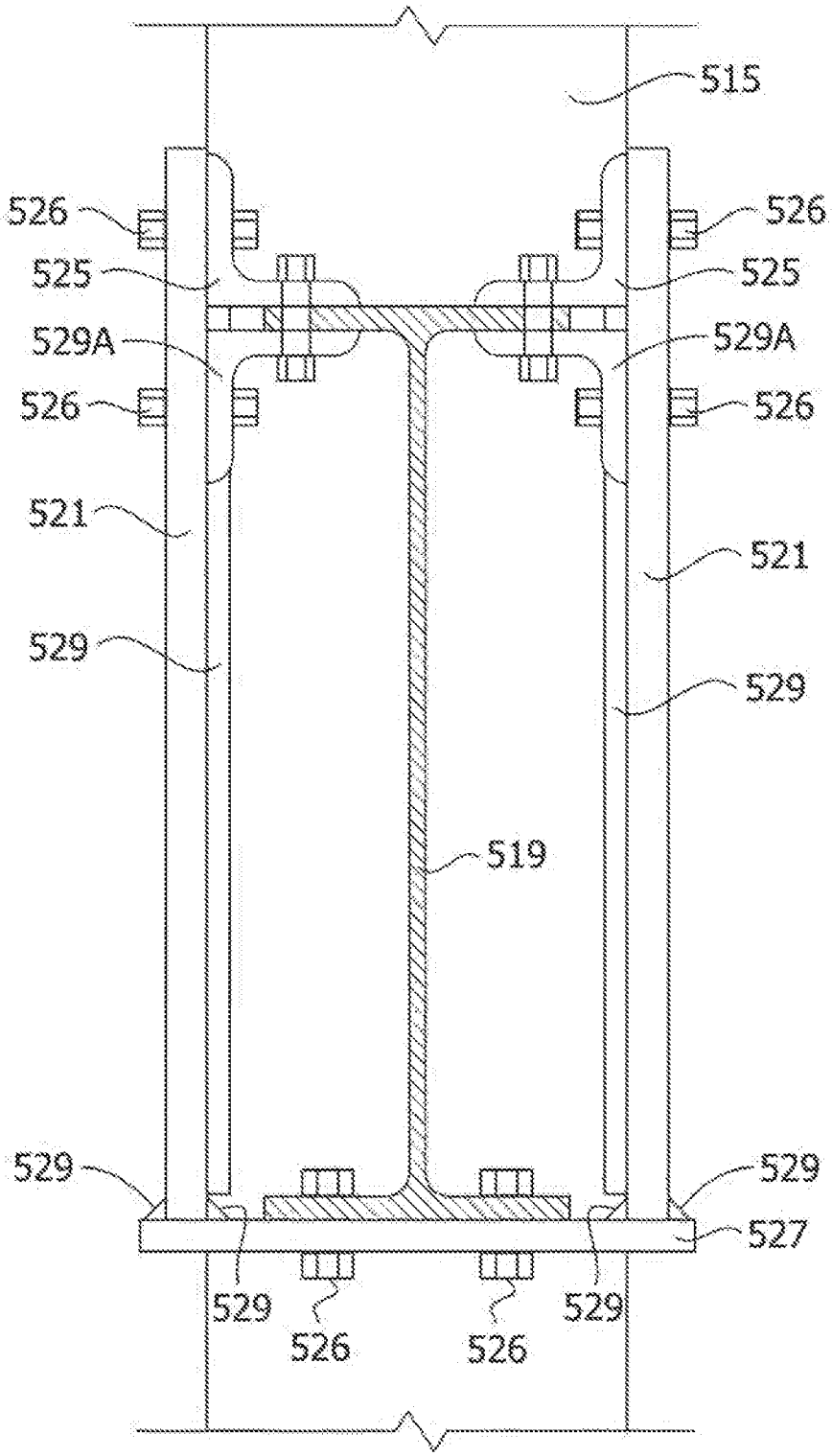
FIG. 64C is the section of FIG. 64 but showing bolts attached to a bottom flange of a beam of the full-length beam assembly.
Figure 65:
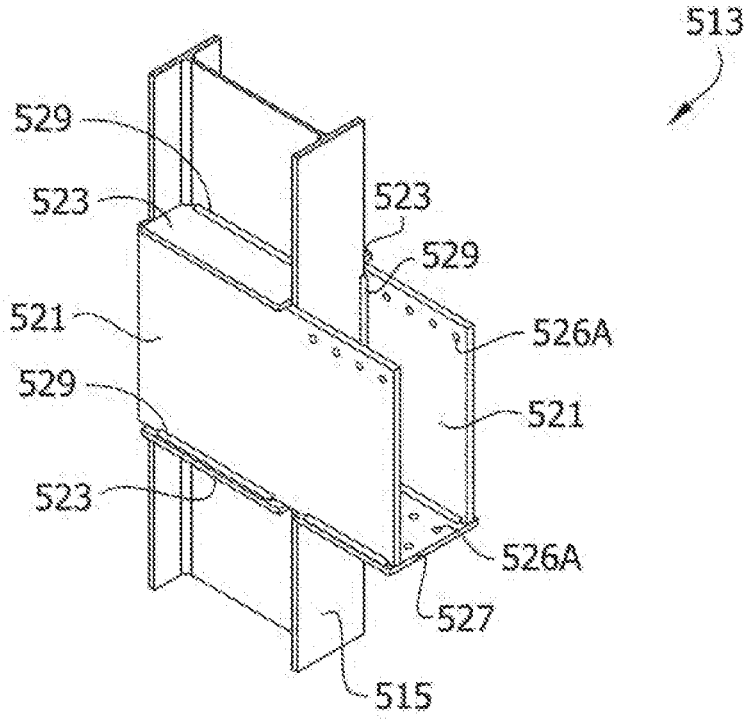
FIG. 65 is a fragmentary perspective of a column assembly of the beam-to-column joint connection structure of FIG. 61.
Figure 66:
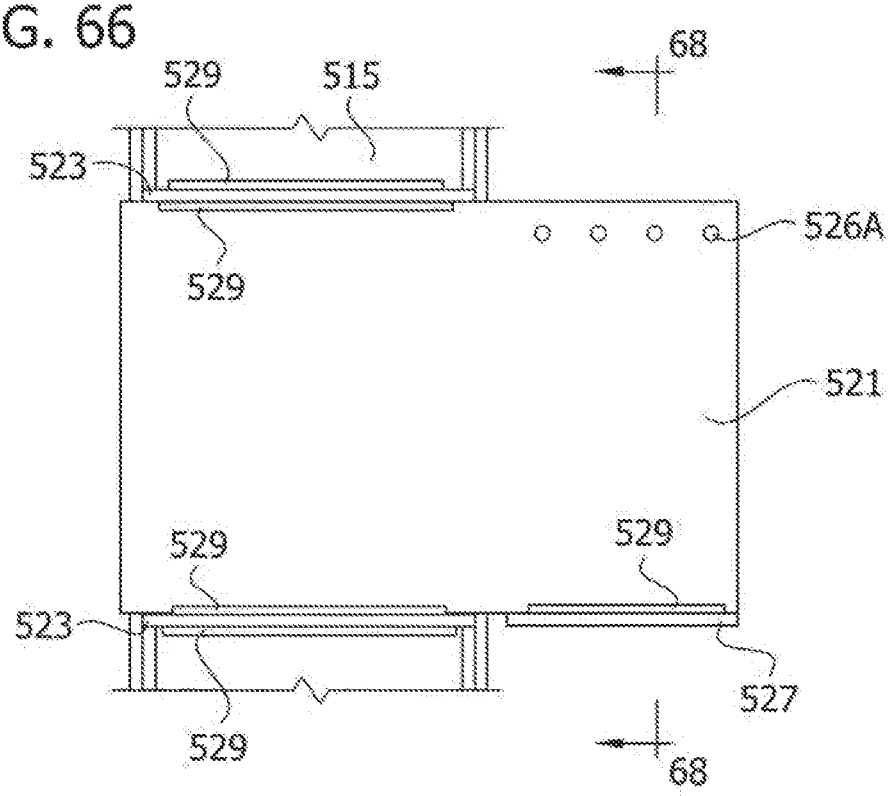
FIG. 66 is a front view of the column assembly in FIG. 65.
Figure 67:
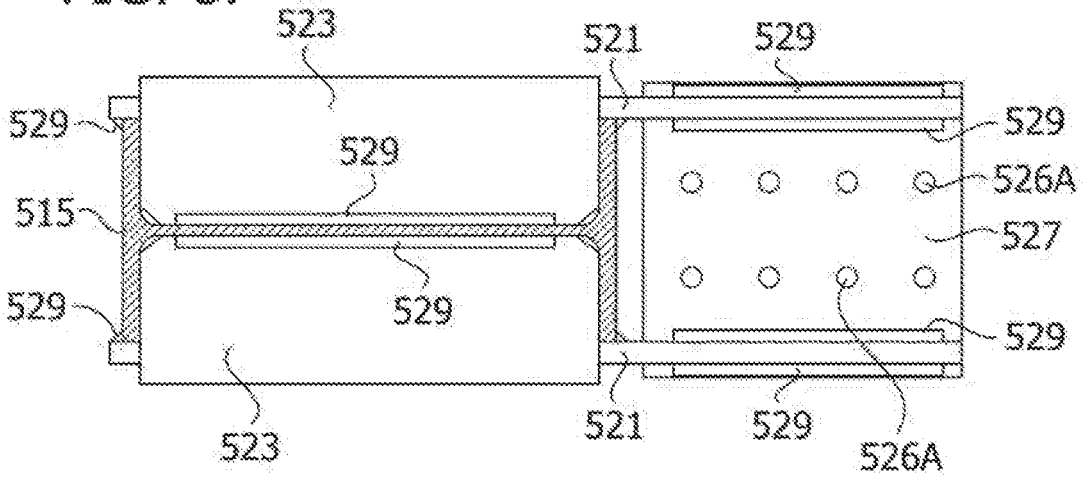
FIG. 67 is a top view of the column assembly in FIG. 65.
Figure 68:
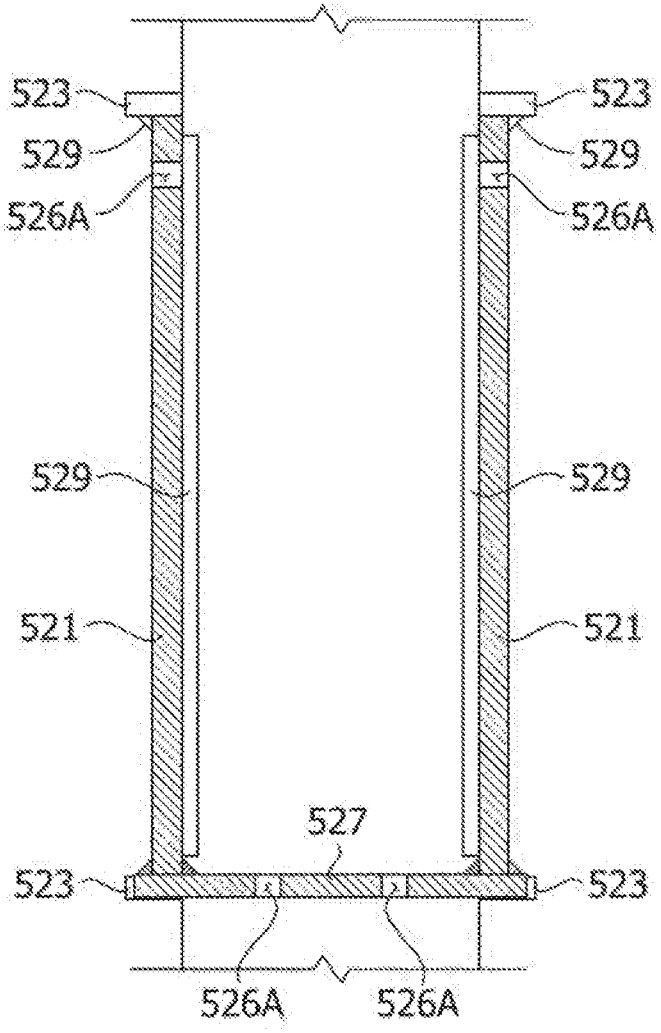
FIG. 68 is a section taken inn the plane including line 68-68 of FIG. 66.
Figure 69:
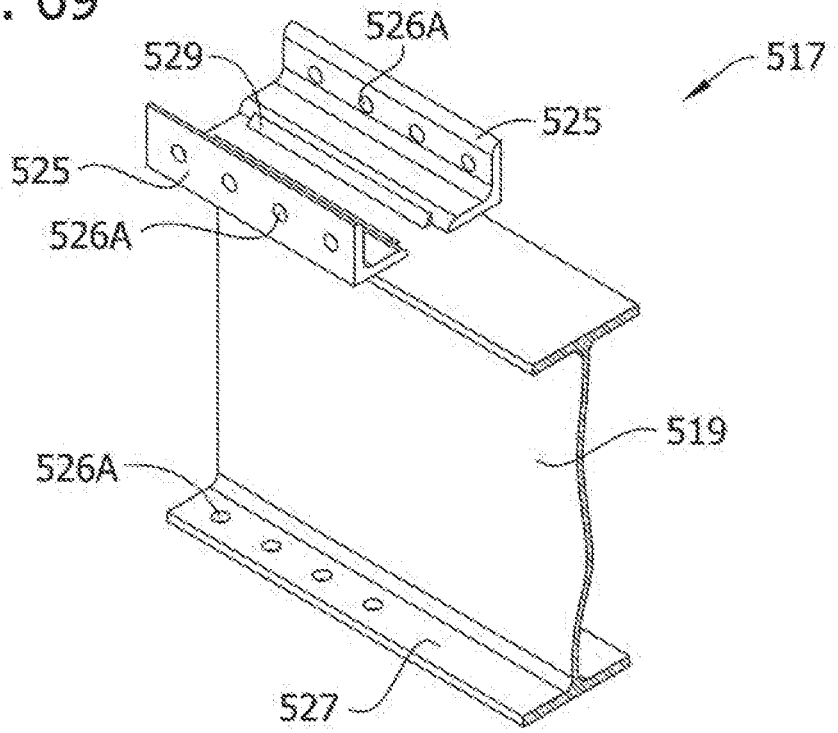
FIG. 69 is a fragmentary perspective of a full-length beam assembly of the beam-to-column joint connection structure of FIG. 61.
Figure 70:
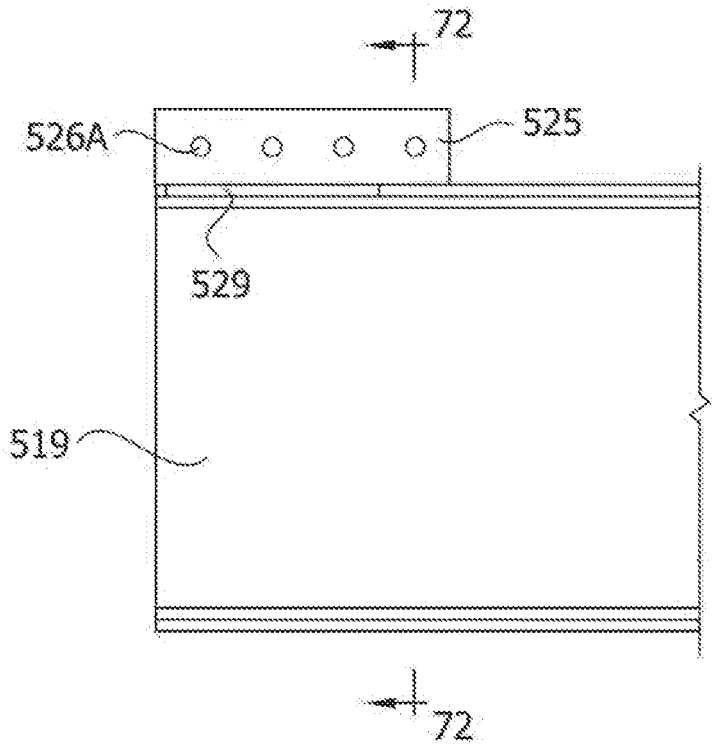
FIG. 70 is a front view of the full-length beam assembly in FIG. 69.
Figure 71:
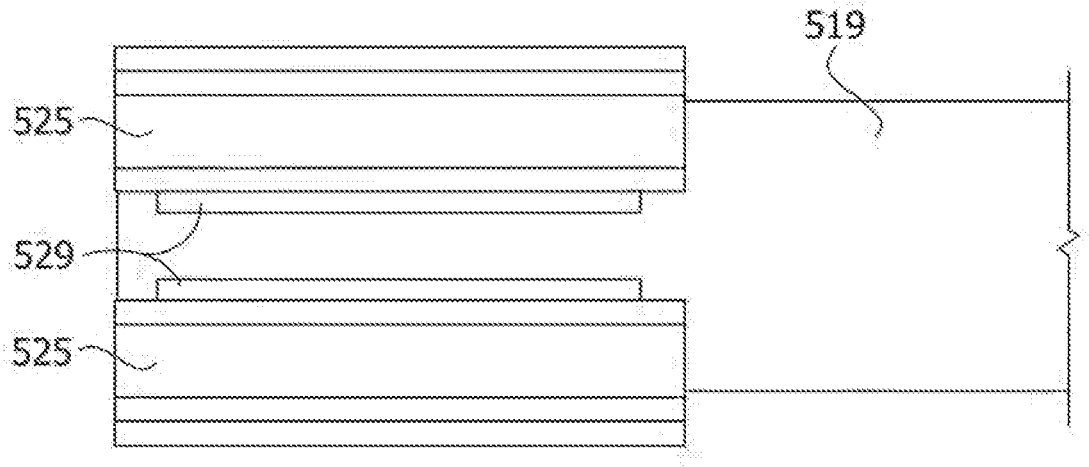
FIG. 71 is a top view of the full-length beam assembly in FIG. 69.
Figure 72:
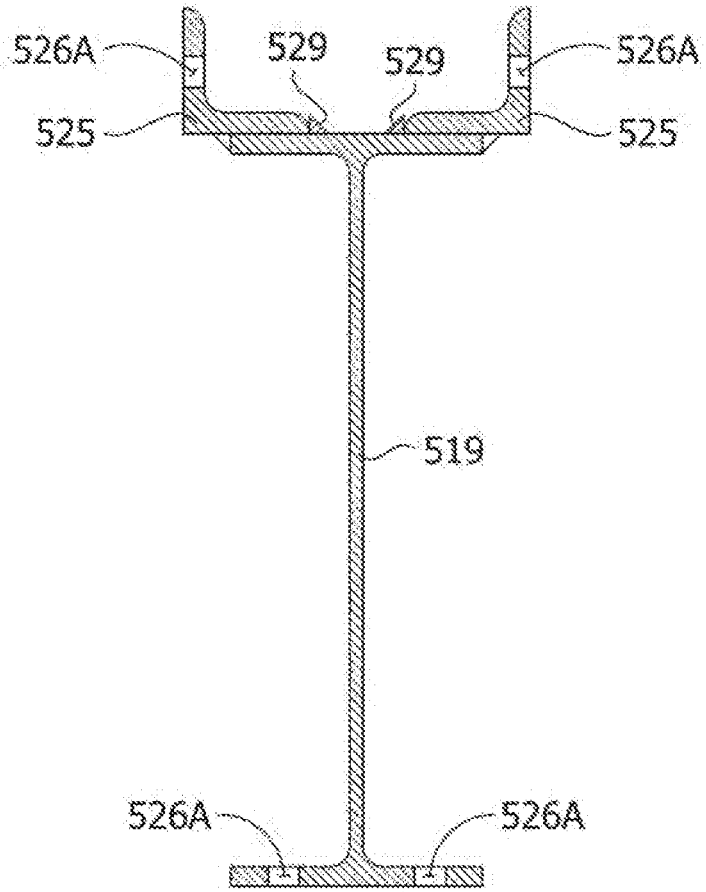
FIG. 72 is a section taken in the plane including line 72-72 of FIG. 70.

FIGS. 64A-64C illustrates some variations for the joint connection structure 511. FIGS. 64A shows the beam 519 having bolts 520 either formed as one piece with or fixedly attached as by welding to the bottom surface of the bottom flange of the beam 519. Te bolts 520 would be received in the holes in the cover plate 527 when the beam end portion is lowered into place between the gusset plates 521. FIG. 64B shows a cover plate 527A received between gusset plates 21 and positioned upward away from a bottom end of the gusset plates. FIG. 64C shows a second lower pair of angle irons 525A located below the upper flange of the beam 519, which are bolted to the top flange of the beam. The horizontal leg of the upper first pair of angle irons 25 is not welded to the top flange of the beam, but rather is also bolted using the bolt that connects the second lower pair of angle irons. In fact, none of the angle irons 525, 525A is welded to the beam. Thus, these bolts that are common to both the first and second pair of angle irons act in double shear to resist bending moments from the beam 519 which doubles the bolt capacity and thereby reduces the number of bolts required. Where feasible, these alternative configurations can be incorporated into the other disclosed embodiments.

Referring to FIGS. 69-72, the full-length beam assembly 517 may be fabricated at a fabrication shop prior to being transported to the construction site. To fabricate the full-length beam assembly 517, the angle irons 525 are welded at 529 or otherwise attached to the upper flange of the beam 519. The bolt holes 526A may also be formed at the shop. Any welding of the beam assembly 517 needed for forming the joint can be done at the shop. Although angle irons 525 are illustrated, other forms of connecting structure may be used, such as a connecting structure having a channel-shaped cross section.

Referring to FIGS. 65-68, the column assembly 513 may also be fabricated at a fabrication shop and later transported to the construction site. To fabricate the column assembly 513, the gusset plates 521 are welded at 529 or otherwise attached to the flanges of the column 515, the horizontal shear plates 523 (if desired) are welded at 529 (FIG. 67) or otherwise attached to the web of the column and to the top and bottom edges of the gusset plates, and the cover plate 527 is welded at 529 or otherwise attached to the bottom edges of the gusset plates. Any welding of the column assembly 511 needed for forming the joint connection structure 513 can be done at the shop. The gusset plates 521 and attached cover plate 527 form a receptacle or saddle support for receiving and supporting the end of the beam assembly 517. The saddle support of the cover plate 527 also provides a permanent spaced to maintain the required separation between the gusset plates 521 during transport to the field, and during erection of the full-length beam assembly to the column assembly. The horizontal shear plates 523 can be omitted from the column assembly 513. The gusset plates 521 and cover plate 527 can have other configurations than those illustrated in the current embodiments.

At the construction site, the column assembly 513 is joined to the full-length beam assembly 517. The column assembly 513 is first erected in a vertical orientation and the end of the full-length beam assembly 517 is positioned adjacent the column assembly, over the gusset plates 521. The full-length beam assembly 517 is then lowered between the gusset plates 521 until the bottom flange of the beam 519 engages the top surface of the cover plate 527. This engagement locates, positions, and supports the end of the full-length beam assembly 517 on the column assembly 513. To fixedly secure the two assemblies 513, 517, bolts 526 are used to attach the angle irons 525 to the gusset plates 521, and the bottom beam flange to the cover plate 527 through aligned bolt holes 526A in the respective components. Thus, at the construction site, the joint connection structure 511 is completed exclusively through bolt connections. So in the field, the beam-to-column moment resisting joint connection structure 511 is constructed without the use of welds.

FIGS. 64A-64C illustrates some variation for the joint connection structure 511. FIG. 64A shows the beam 519 having bolts 520 either formed as one piece with or fixedly attached as by welding to the bottom surface of the bottom flange of the beam 519. The bolts 520 would be received in the holes in the cover plates 527 when the beam end portion is lowered into place between the gusset plates 521. FIG. 64B shows a cover plate 527A received between gusset plates 21 and positioned upward away from a bottom edges of the gusset plates. FIG. 64C shows a second lower pair of angle irons 525A located below the upper flange of the beam 519, which are bolted to the top flange of the beam. The horizontal leg of the upper first pair of angle irons 525 is not welded to the top flange of the beam, but rather is also bolted using, the bolt that connects the second lower pair of angle irons. In fact, none of the angle irons 525, 525A is welded to the beam. Thus, these bolts that are common to both the first and second pair of angle irons act in double shear to resist bending moments from the beam 519 which doubles the bolt capacity and thereby reduces the number of bolts required. Where feasible, these alternative configuration can be incorporated into the other disclosed embodiments.

Referring to FIGS. 73-84, a beam-to-column moment-resisting joint connection structure of a seventh embodiment is generally indicated at 611. In the illustrated embodiment, the joint connection joins a column assembly 613 including a column 615 to a full-length beam assembly 617 including a full-length beam 619.

Figure 73:
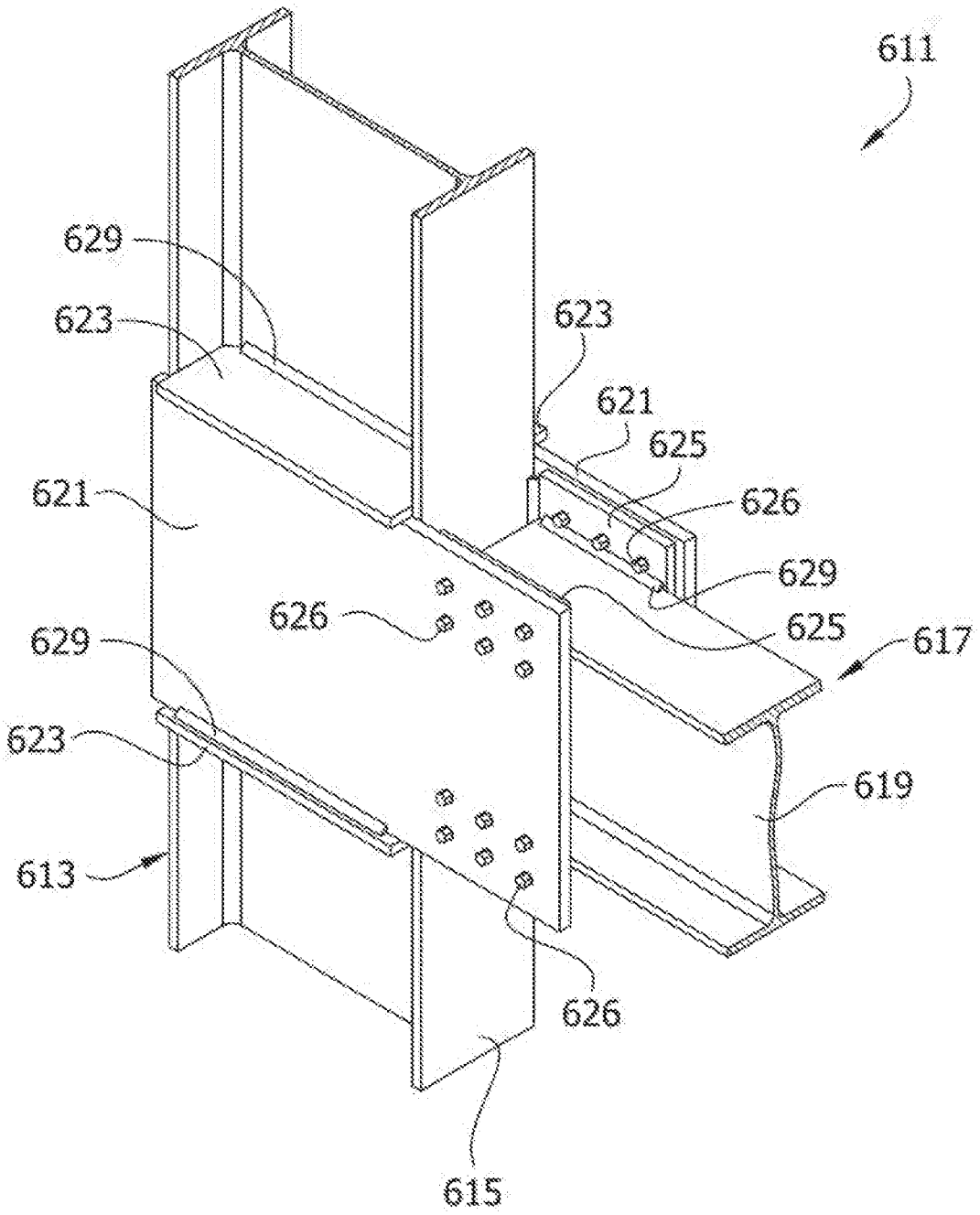
FIG. 73 is a fragmentary perspective of a beam-to-column joint connection structure of a seventh embodiment.
Figure 74:
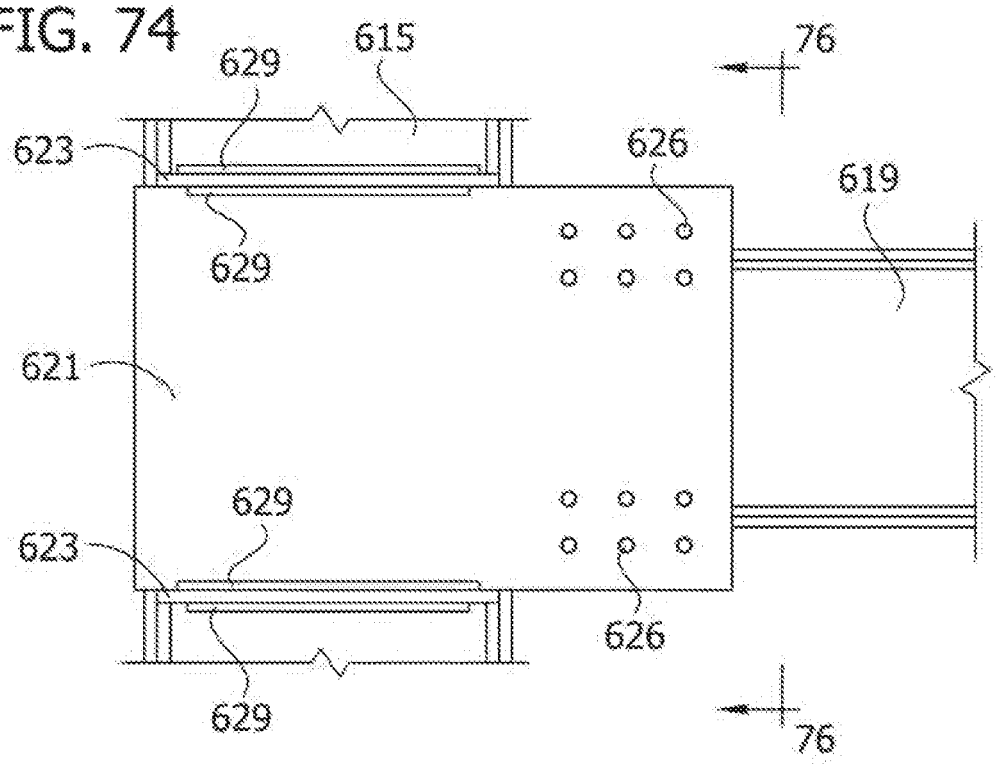
FIG. 74 is a front view of the beam-to-column joint connection structure of FIG. 73.
Figure 75:
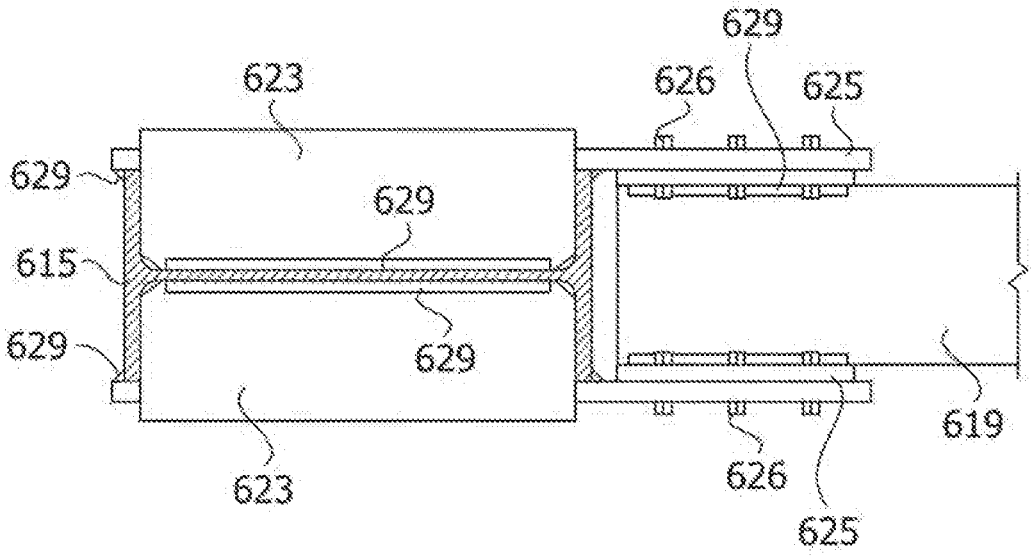
FIG. 75 is a top view of the beam-to-column joint connection structure of FIG. 73.
Figure 76:
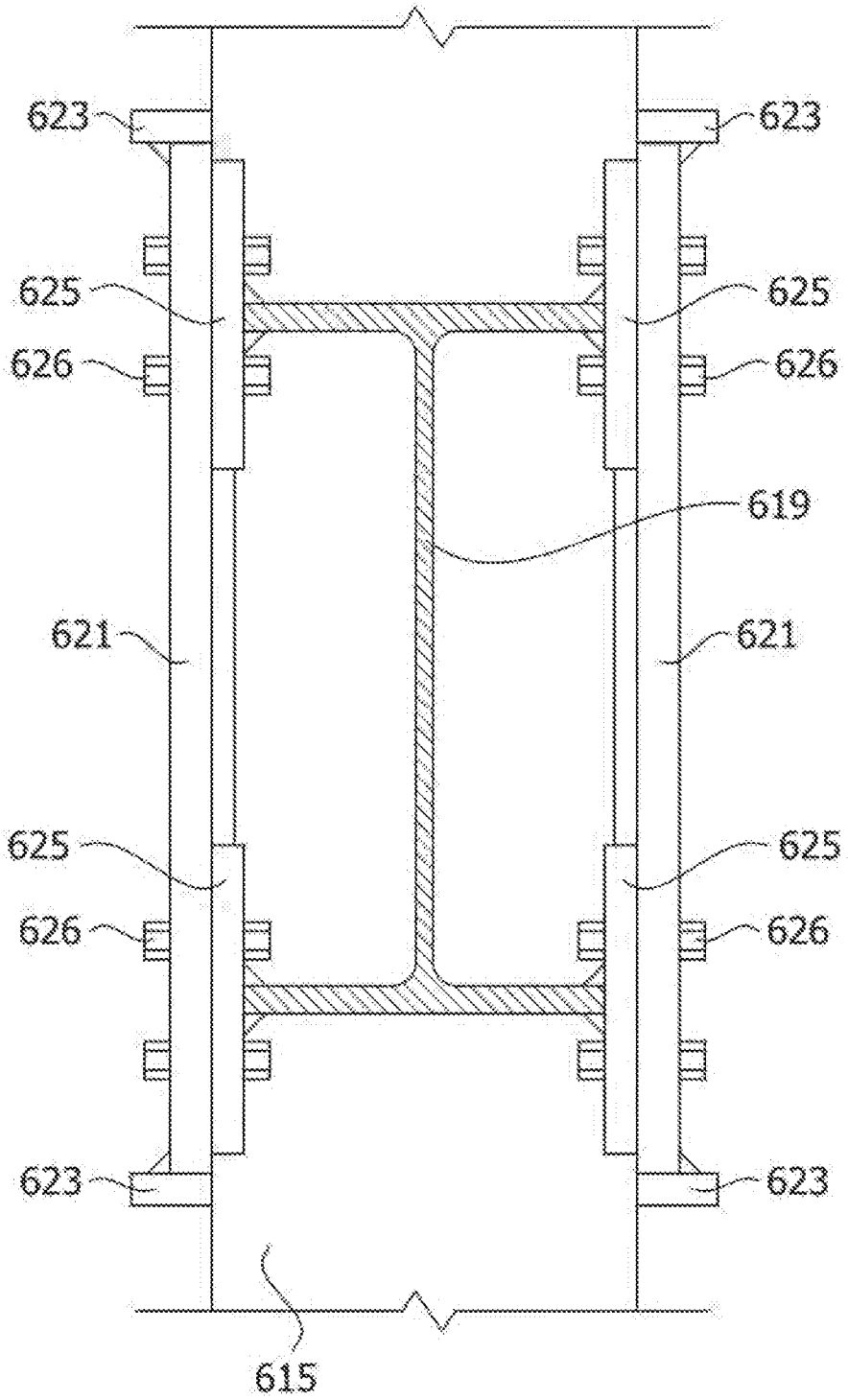
FIG. 76 is a section taken in the plane including line 76-76 of FIG. 74.
Figure 77:
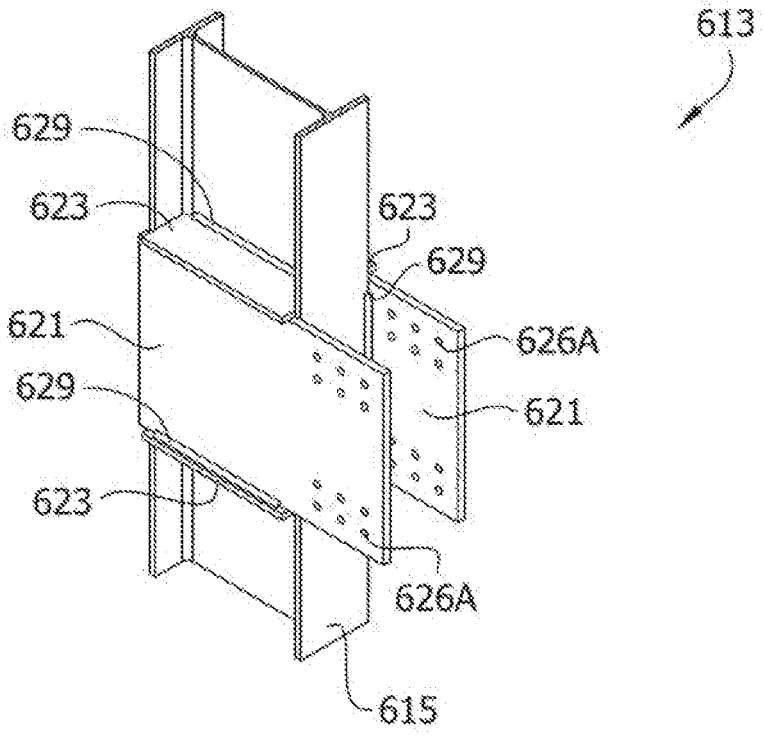
FIG. 77 is a fragmentary perspective of a column assembly of the beam-to-column joint connection structure of FIG. 73.
Figure 78:
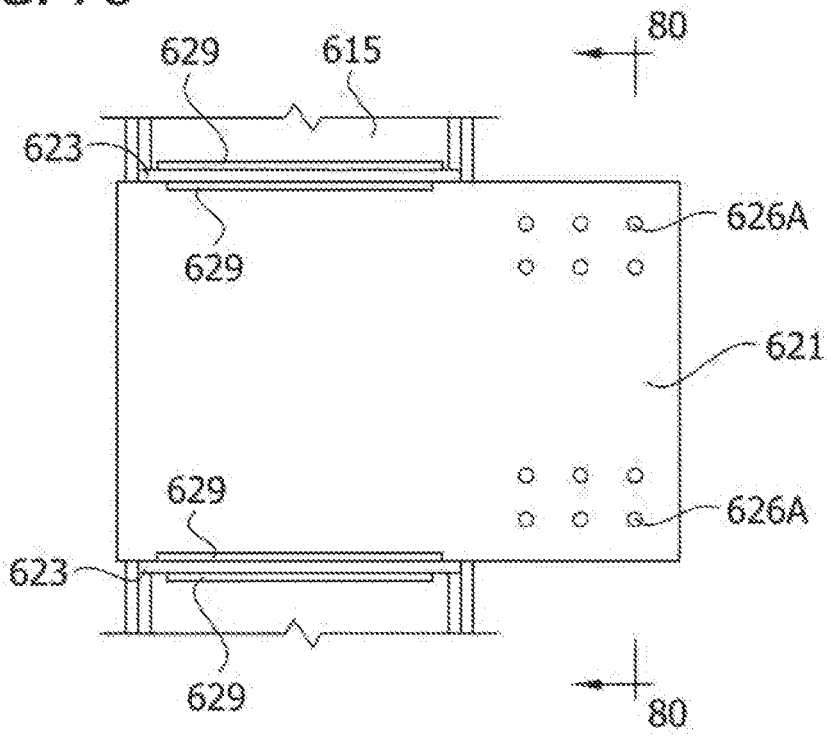
FIG. 78 is a front view of the column assembly in FIG. 77.
Figure 79:
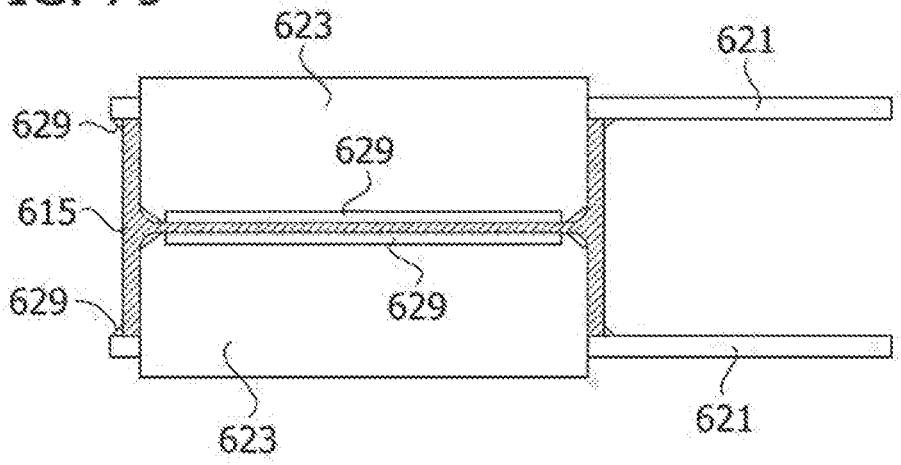
FIG. 79 is a top view of the column assembly in FIG. 77.
Figure 80:
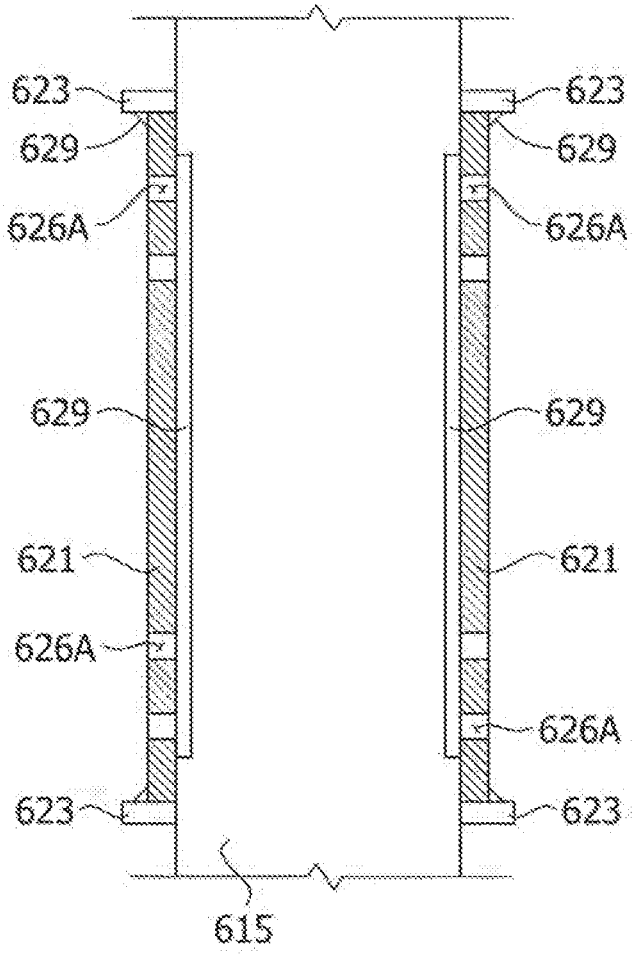
FIG. 80 is a section taken in the plane including line 80-80 of FIG. 78.
Figure 81:
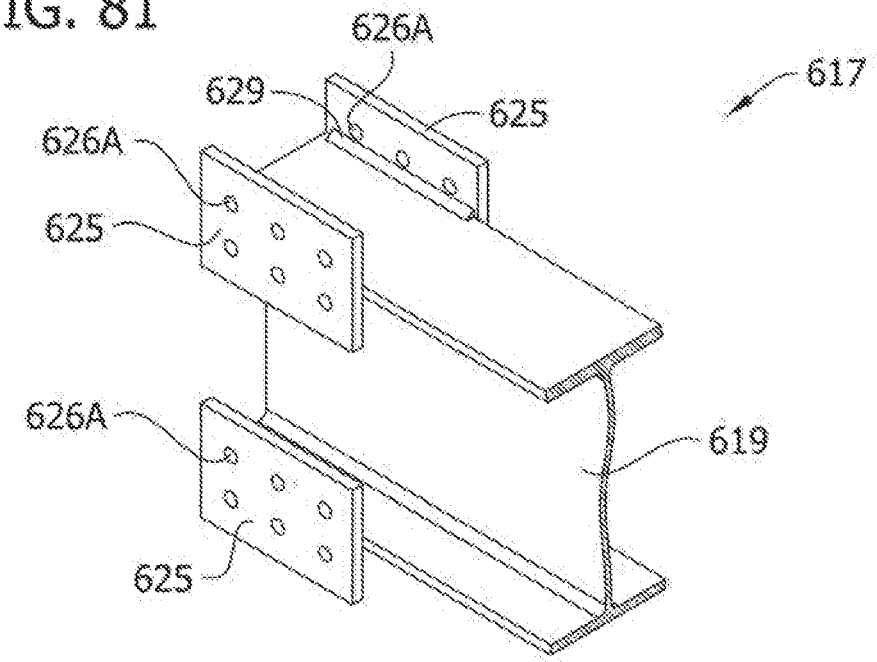
FIG. 81 is a fragmentary perspective of a full-length beam assembly of the beam-to-column joint connection structure of FIG. 73.
Figure 82:
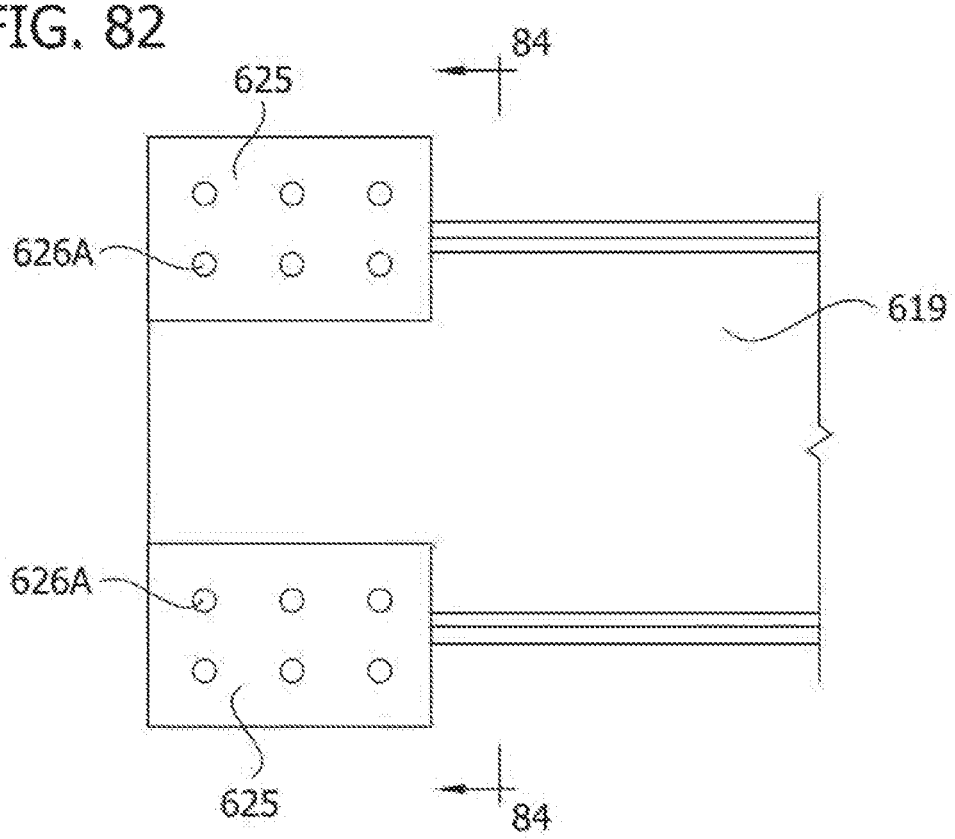
FIG. 82 is a front view of the full-length beam assembly in FIG. 81.
Figure 83:
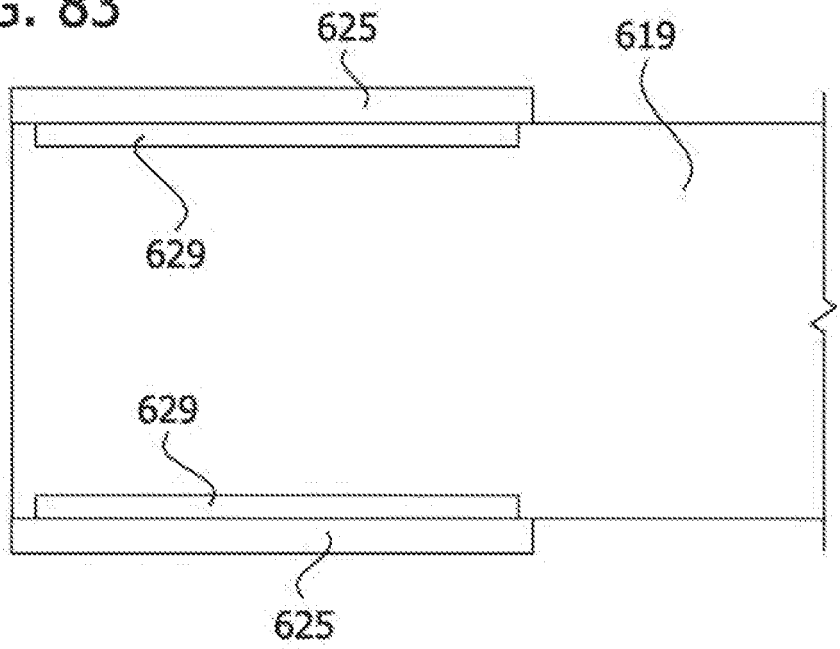
FIG. 83 is a top view of the full-length beam assembly in FIG. 81.
Figure 84:
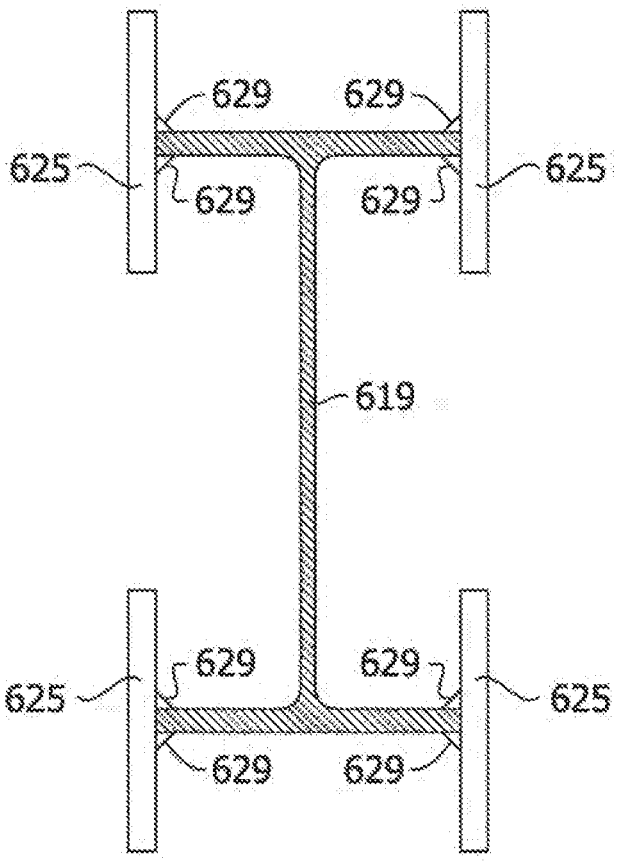
FIG. 84 is a section taken in the plane including line 84-84 of FIG. 82.

A spaced apart pair of parallel, vertically and horizontally extending gusset plates 621 sandwich the column 615 and full-length beam 619. Four optional horizontal shear plates 623 (only three are shown in FIG. 73) are arranged in vertically spaced pairs generally aligned at top and bottom edges of the gusset plates 621 as illustrated in the previous embodiments. Vertical flange plates 625 (broadly, "connecting members") are disposed on each side of the beam 619 and attached to the tips of each flange of the beam 619 as by welding at 629. The gusset plates 621 have holes that receive bolts 626 that pass through holes 626A in the flange plates 625. The flange plates 625 facilitate connection of the beam 619 to the gusset plates 621.

Referring to FIGS. 77-80, the column assembly 613 may be fabricated at a fabrication shop and later transported to the construction site. To fabricate the column assembly 613, the gusset plates 621 are welded at 629 or otherwise attached to the flanges of the column 615 and the horizontal shear plates 623 are welded at 629 or otherwise attached to the web of the column and to the top and bottom edges of the gusset plates. Any welds needed on the column assembly 613 for forming the joint can be made at the shop. The horizontal shear plates 623 can be omitted from the column assembly 613. The gusset plates 621 can have other configurations than those illustrated in the current embodiment.

Referring to FIGS. 81-84, the full-length beam assembly 617 may also be fabricated at a fabrication shop prior to being transported to the construction site. To fabricate the full-length beam assembly 617, inner surfaces of the flange plates 625 are welded at 629 or otherwise attached to the flange tips of the beam 619. Separate welds 629 can connect each flange plate 625 to the top and bottom surfaces of a respective flange of the beam 619. Any welds to the beam assembly 617 needed to form the joint connection structure can be made at the shop. The flange plates 625 and may have other configurations than those illustrated in the current embodiment.

At the construction site, the column assembly 613 is joined to the full-length beam assembly 617. The column assembly 613 is first erected in a vertical orientation and the end of the full-length beam assembly 617 is positioned adjacent the column assembly. The full-length beam assembly 617 is then lowered between the gusset plates 621 such that the gusset plates are disposed on opposite sides of the beam 619 and flange plates 625 of the full-length beam assembly 617. To fixedly secure the two assemblies 613, 617, bolts 626 are used to attach the gusset plates 621 to the flange plates 625 through aligned bolt holes 626A in the respective components. The bolt holes 626A can be slotted as described for prior embodiments of this invention. Thus, as the construction site, the joint connection structure 611 is completed exclusively through bolt connections. So, in the field, the joint connection structure 611 is constructed without the use of welds. The joint connection structure 611 can be used if the building frame is close to the exterior curtain wall of the building because the flange plates 625 are on the inside of the gusset plates 621.

Referring to FIGS. 85-96, a beam-to-column moment-resisting joint connection structure of an eighth embodiment is generally indicated at 711. In the illustrated embodiment, the joint connection joins a column assembly 713 including a column 715 to a full-length beam assembly 717 including a full-length beam 719.

Figure 85:
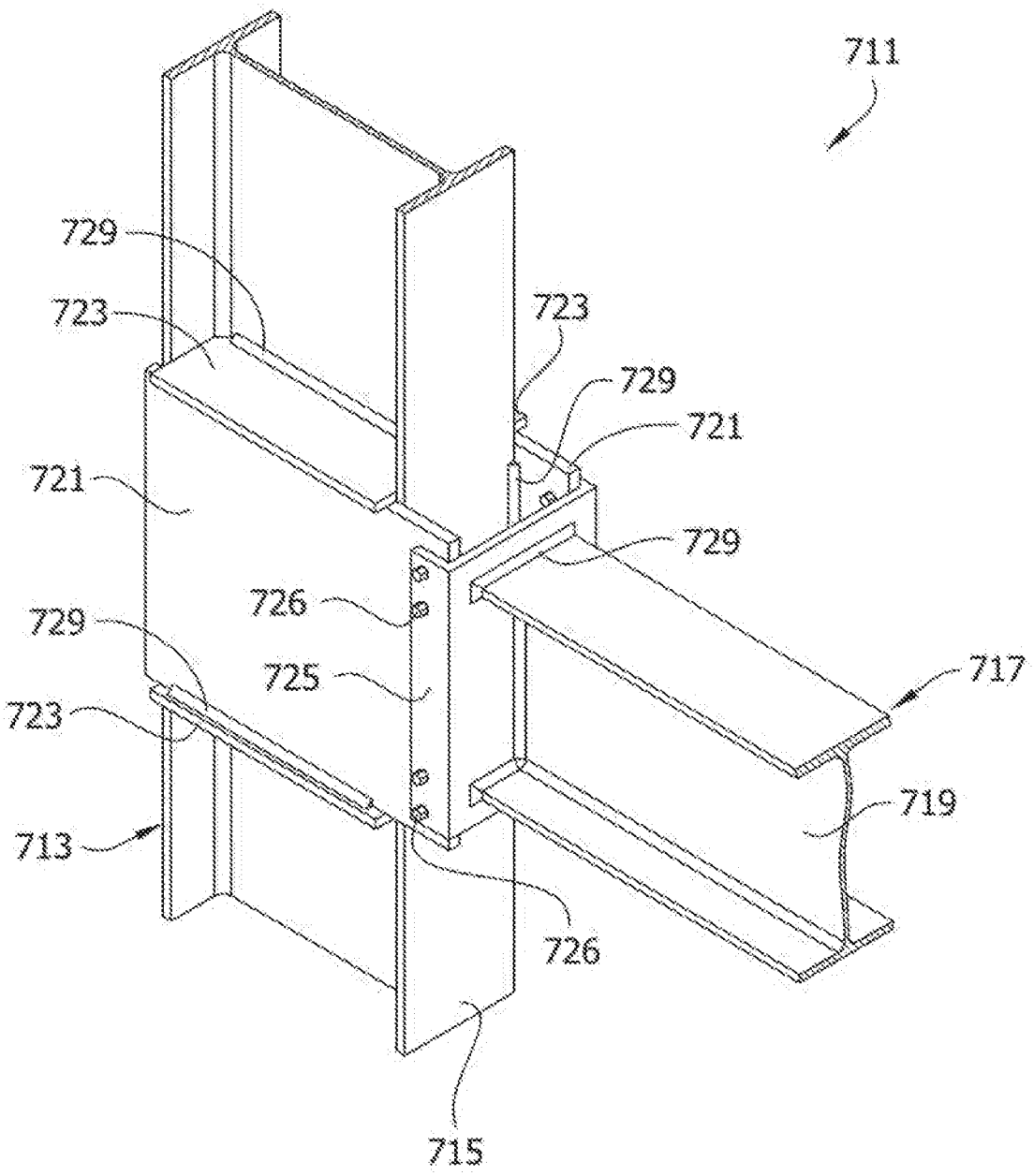
FIG. 85 is a fragmentary perspective of a beam-to-column joint connection structure of an eighth embodiment.
Figure 86:
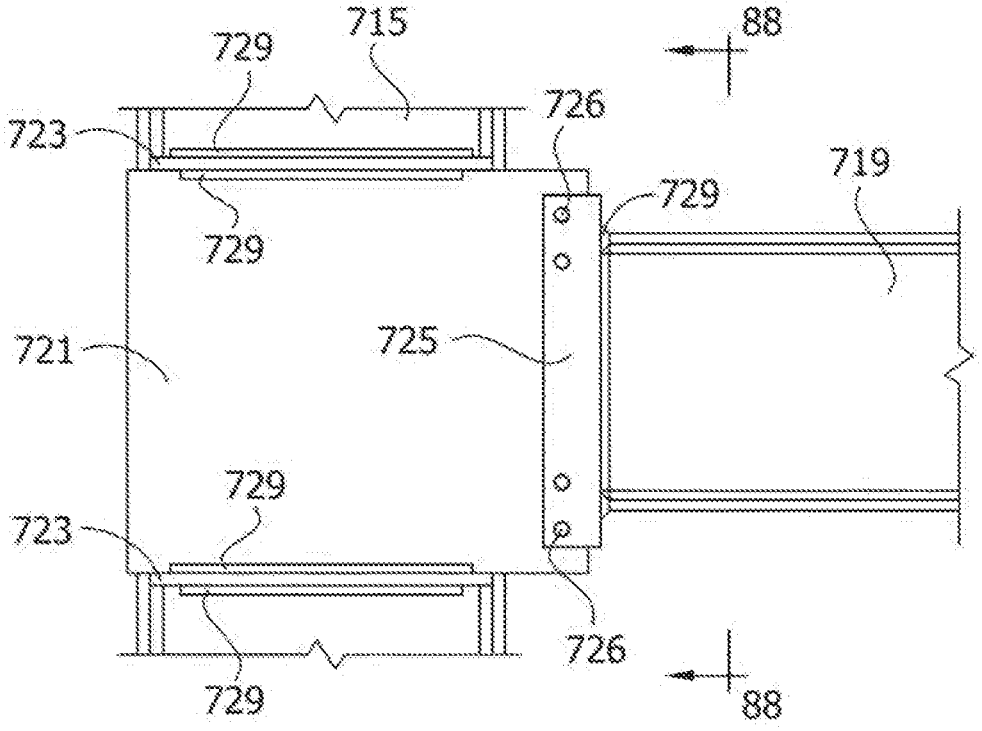
FIG. 86 is a front view of the beam-to-column joint connection structure of FIG. 85.
Figure 87:
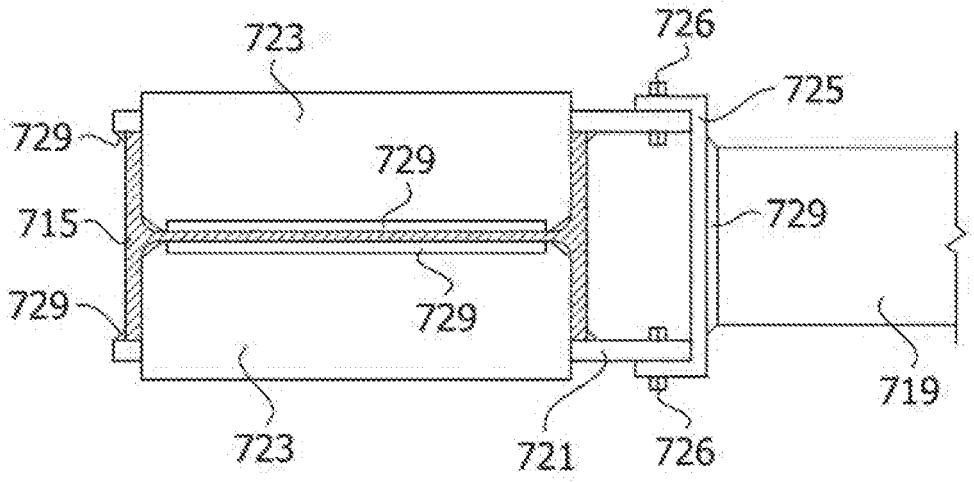
FIG. 87 is a top view of the beam-to-column joint connection structure of FIG. 85.
Figure 88:
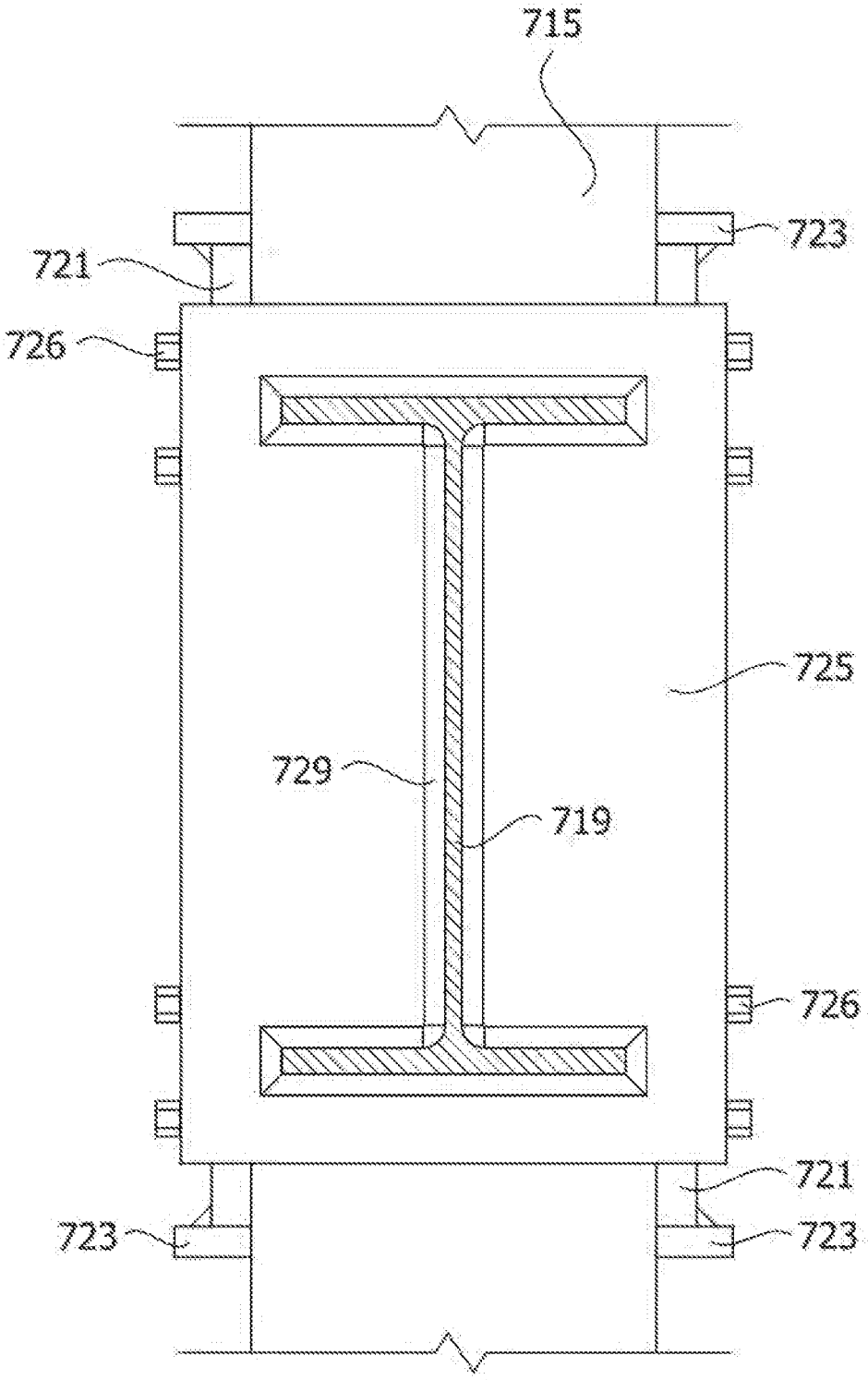
FIG. 88 is a section taken in the plane including line 88-88 of FIG. 86.
Figure 89:
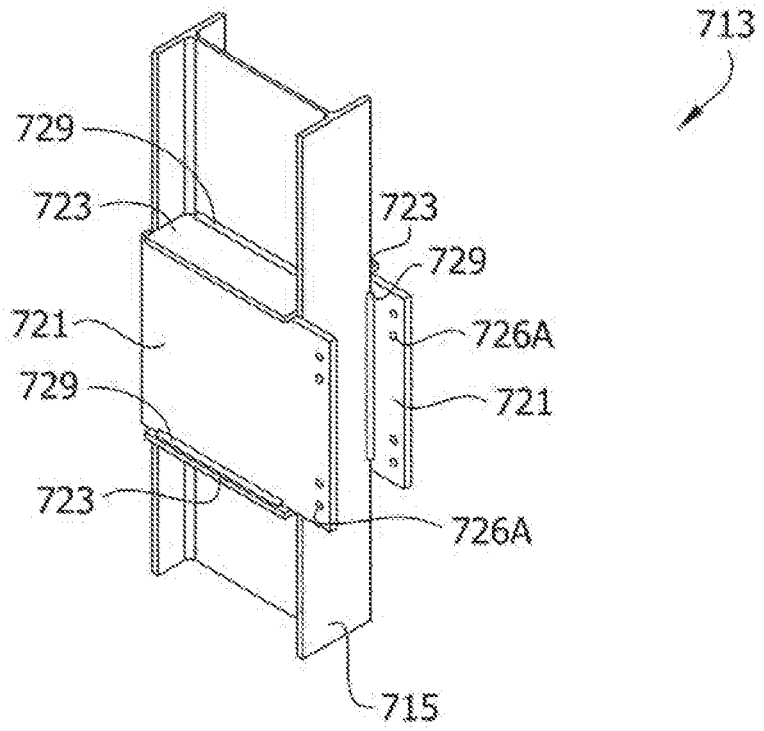
FIG. 89 is a fragmentary perspective of a column assembly of the beam-to-column joint connection structure of FIG. 85.
Figure 90:
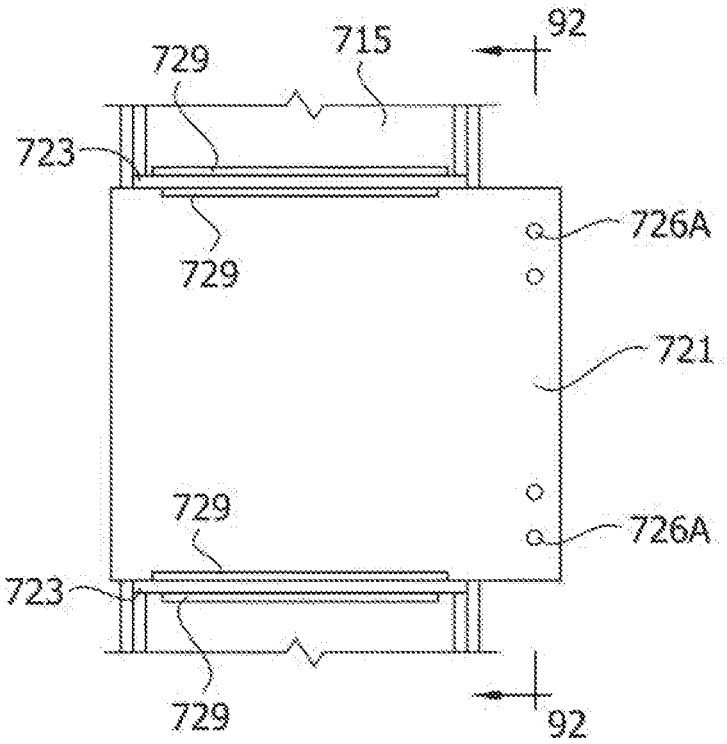
FIG. 90 is a front view of the column assembly in FIG. 89.
Figure 91:
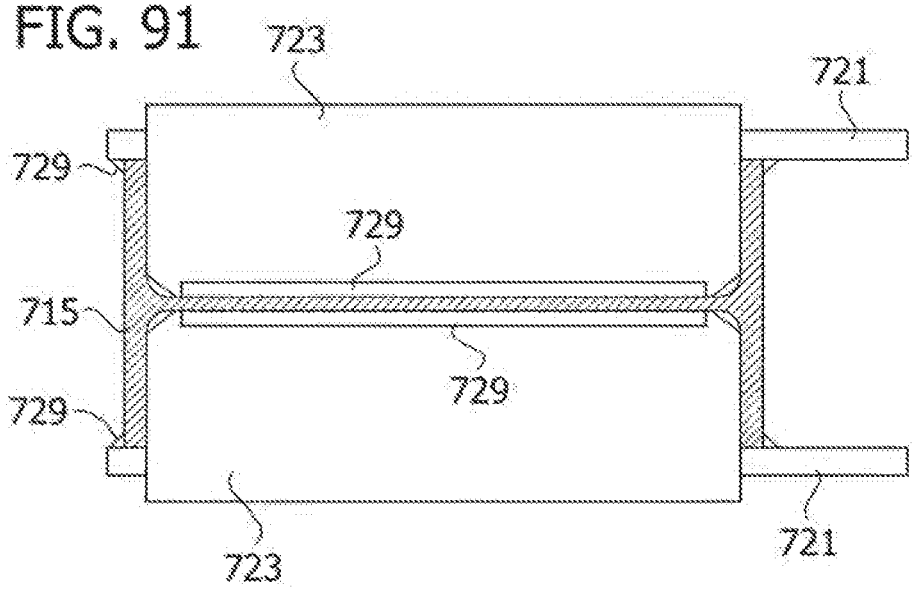
FIG. 91 is a top view of the column assembly in FIG. 89.
Figure 92:
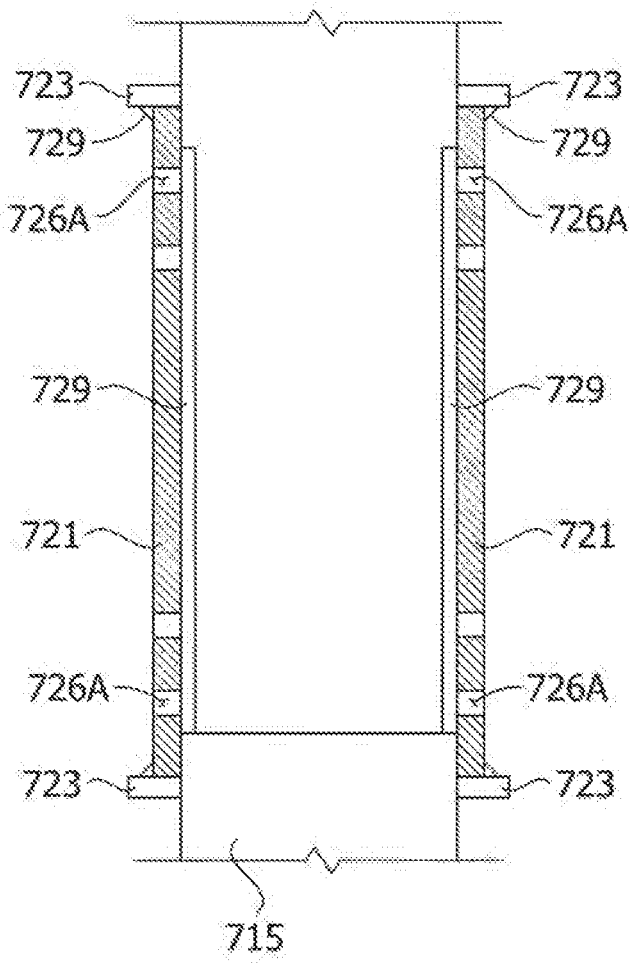
FIG. 92 is a section taken in the plane including line 92-92 of FIG. 90.
Figure 93:
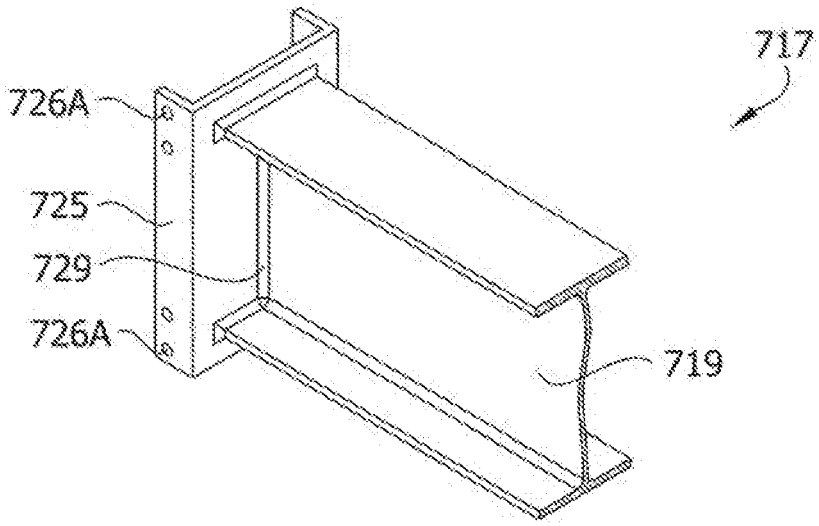
FIG. 93 is a fragmentary perspective of a full-length beam assembly of the beam-to-column joint connection structure of FIG. 85.
Figure 94:
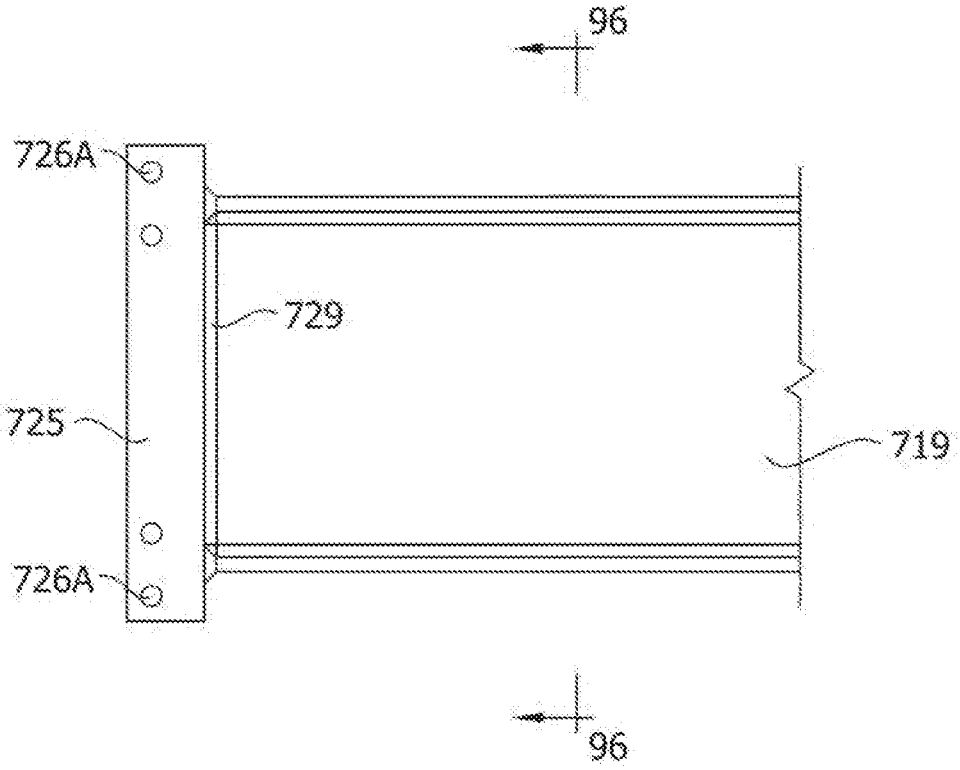
FIG. 94 is a front view of the full-length beam assembly in FIG. 93.
Figure 95:
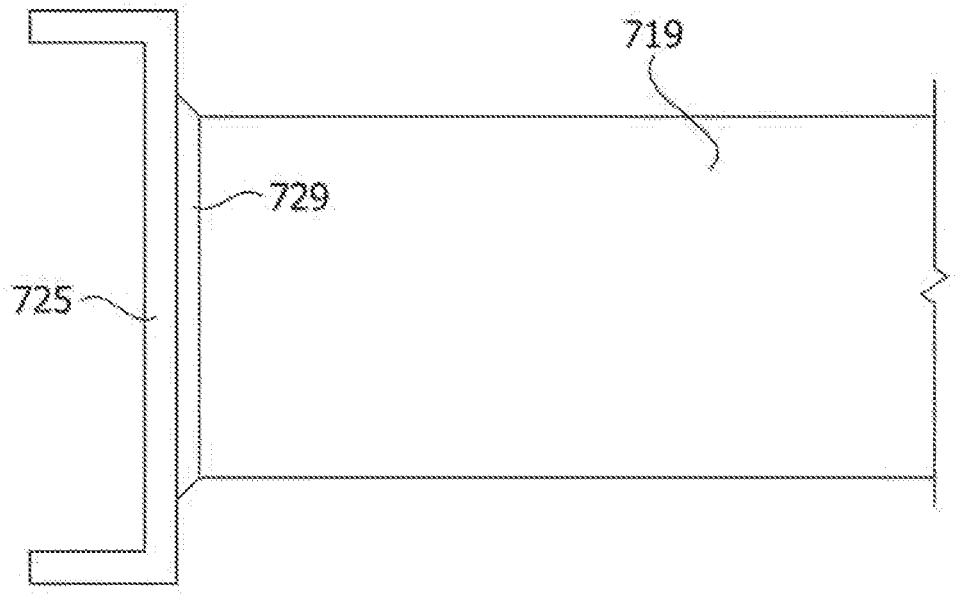
FIG. 95 is a top view of the full-length beam assembly in FIG. 93.
Figure 96:
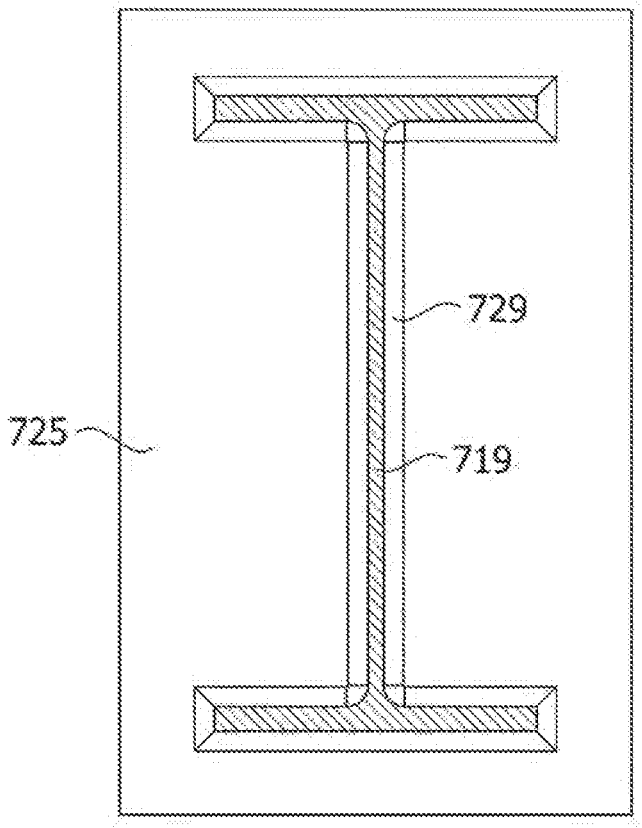
FIG. 96 is a section taken in the plane including line 96-96 of FIG. 94.

A spaced apart pair of parallel, vertically and horizontally extending gusset plates 721 sandwich the column 715. Four optional horizontal shear plates 723 (only three are shown in FIG. 85) are arranged in vertically spaced pairs generally aligned at top and bottom edges of the gusset plates 721 as illustrated in the previous embodiments. A channel-shaped end plate 725 (broadly, "a connecting member") is disposed on an axially facing end of the beam 719. The end plate 725 provides a connection of the full-length beam 719 to the gusset plates 721. The end plate 725 may include a first leg, at least a portion of which engages an outer surface of one of the gusset plates 721 and extends along the vertical dimension of the gusset plate, a connecting section extending transversely from the first leg toward the other gusset plate 721, and a second leg extending from the connecting section, at least a portion of which engages an outer surface of the other gusset plate 721 and extends along the vertical dimension of the other gusset plate. The connecting section of the end plate 725 is attached in a suitable manner such as by welds 729 to the axially facing end of the beam 719. The first and second legs of the end plate 725 are bolted to the outer surface of respective gusset plates 721 by vertically spaced bolts 726 extending through aligned bolt holes 726A in the first and third legs of the end plate 725 and gusset plates 721. The bolts 726 straddle beam flanges to provide access to the bolts from either the top or bottom of the flanges.

Referring to FIGS. 89-92, the column assembly 713 may be fabricated at a fabrication shop and later transported to the construction site. To fabricate the column assembly 713, the gusset plates 721 are welded at 729 or otherwise attached to the flanges of the column 715 and the optional horizontal shear plates 723 are welded at 729 or otherwise attached to the web of the column and to the top and bottom edges of the gusset plates. Any welds on the column assembly 713 needed to form the joint can be carried out at the shop. The horizontal shear plates 723 can be omitted from the column assembly 713. The gusset plates 721 can have other configurations than those illustrated in the current embodiment.

Referring to FIGS. 93-96, the full-length beam assembly 717 may also be fabricated at a fabrication shop prior to being transported to the construction site. To fabricate the full-length beam assembly 717, an outer surface of the connecting section of the end plates 725 is welded at 729 or otherwise attached to the end of the beam 719. In a preferred embodiment, the end plate 725 is groove welded to the beam 719. Any welds on the beam assembly 717 needed to form the joint can be made at the shop. For instance, the welds could be filler welds or stitch welds. The end plate 725 may have other configurations than illustrated in the current embodiment.

At the construction side, the column assembly 713 is joined to the full-length beam assembly 717. The column assembly 713 is first erected in a vertical orientation and the end of the full-length beam assembly 717 is positioned horizontally and adjacent to the column assembly. The full-length beam assembly 717 is then moved toward the gusset plates 721 such that the first and second legs of the end plate 725 sandwich portions of the gusset plates. To fixedly secure the two assemblies 713, 717, bolts 726 are used to attach the gusset plates 721 to the end plate 725 through aligned bolt holes 726A in the respective components. Thus, at the construction site, the beam-to-column moment-resisting joint connection structure 711 is completed exclusively through bolt connections. So in the field, the joint connection structure 711 is constructed without the use of welds. Some or all of the bolt holes 726A can be oversized to reduce alignment constraints in connecting the full length beam assembly 717 to the column assembly 713.

Referring to FIGS. 97-108, a beam-to-column moment-resisting joint connection structure of a ninth embodiment is generally indicated at 811. In the illustrated embodiment, the joint connection joins a column assembly 813 including a column 815 to a full-length beam assembly 817 including a full-length beam 819.

Figure 97:
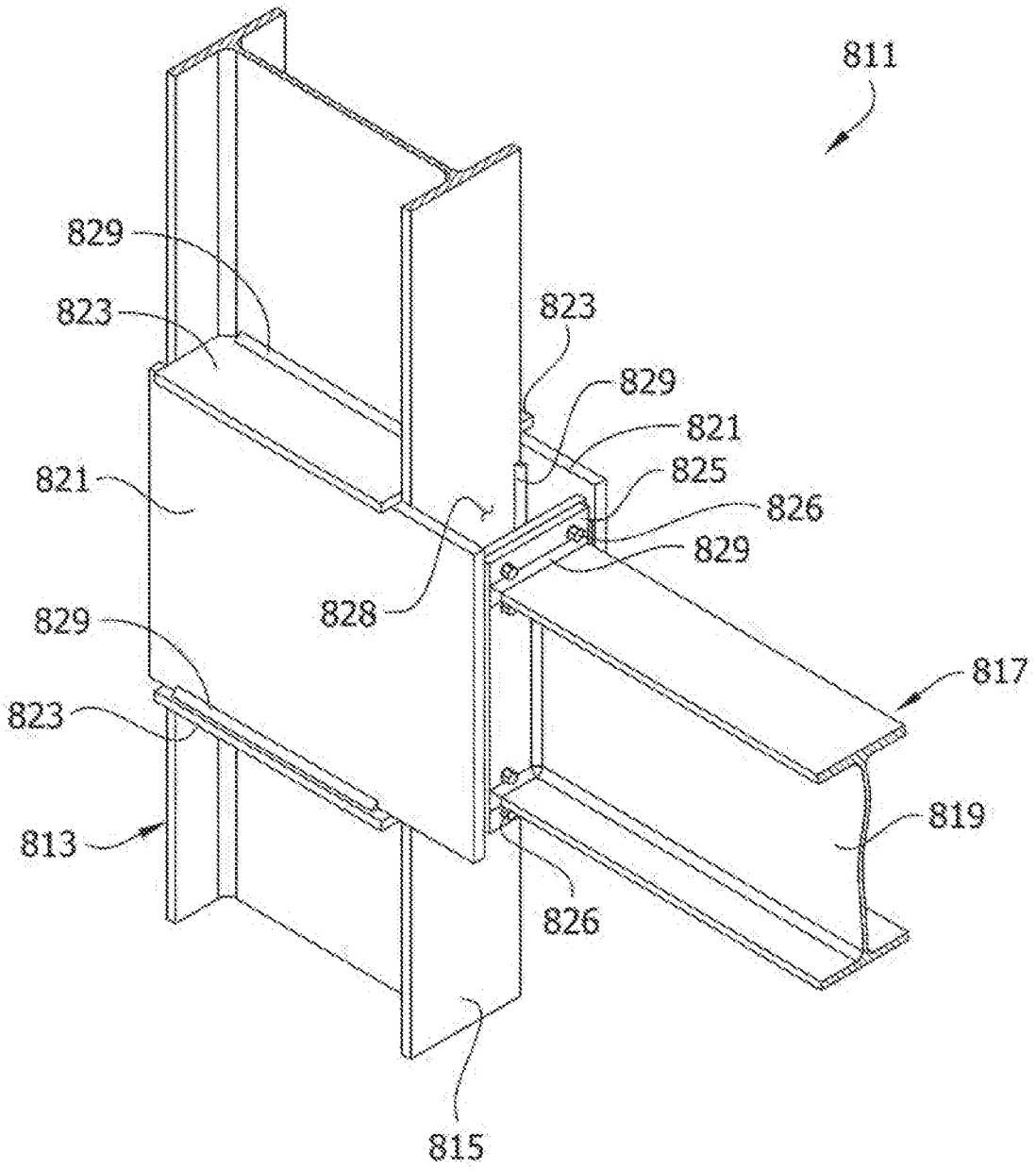
FIG. 97 is a fragmentary perspective of a beam-to-column joint connection structure of a ninth embodiment.
Figure 98:
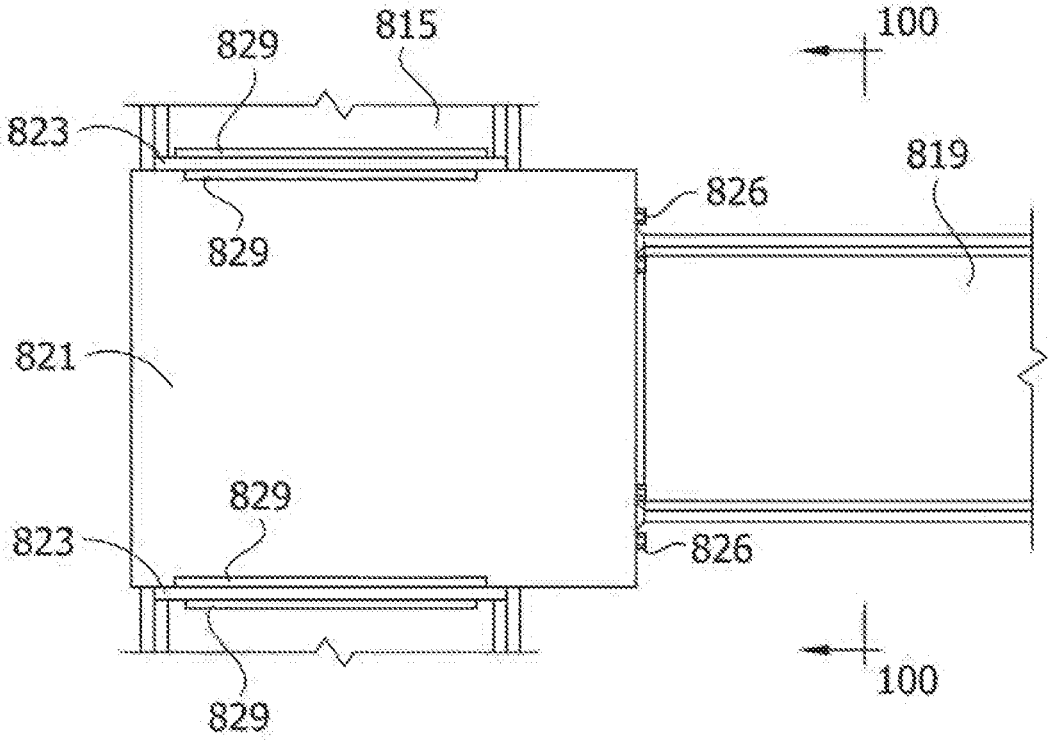
FIG. 98 is a front view of the beam-to-column joint connection structure of FIG. 97.
Figure 99:
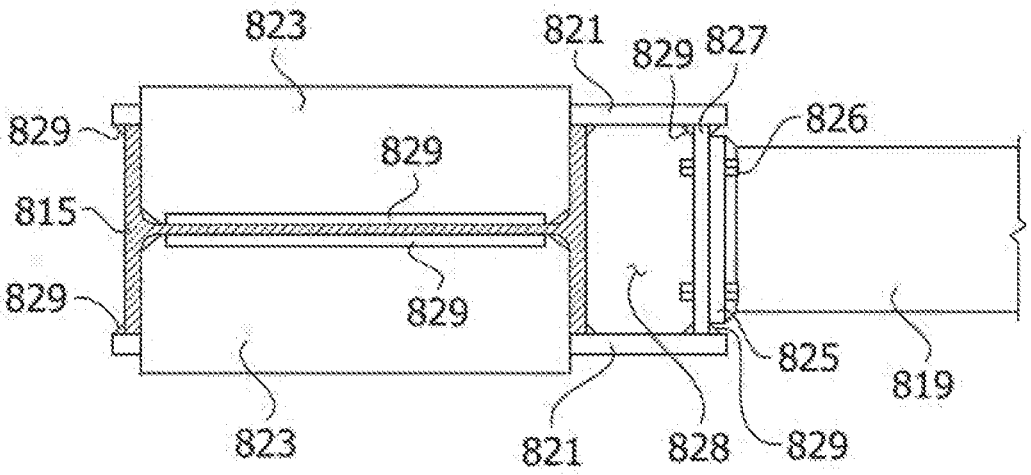
FIG. 99 is a top view of the beam-to-column joint connection structure of FIG. 97.
Figure 100:
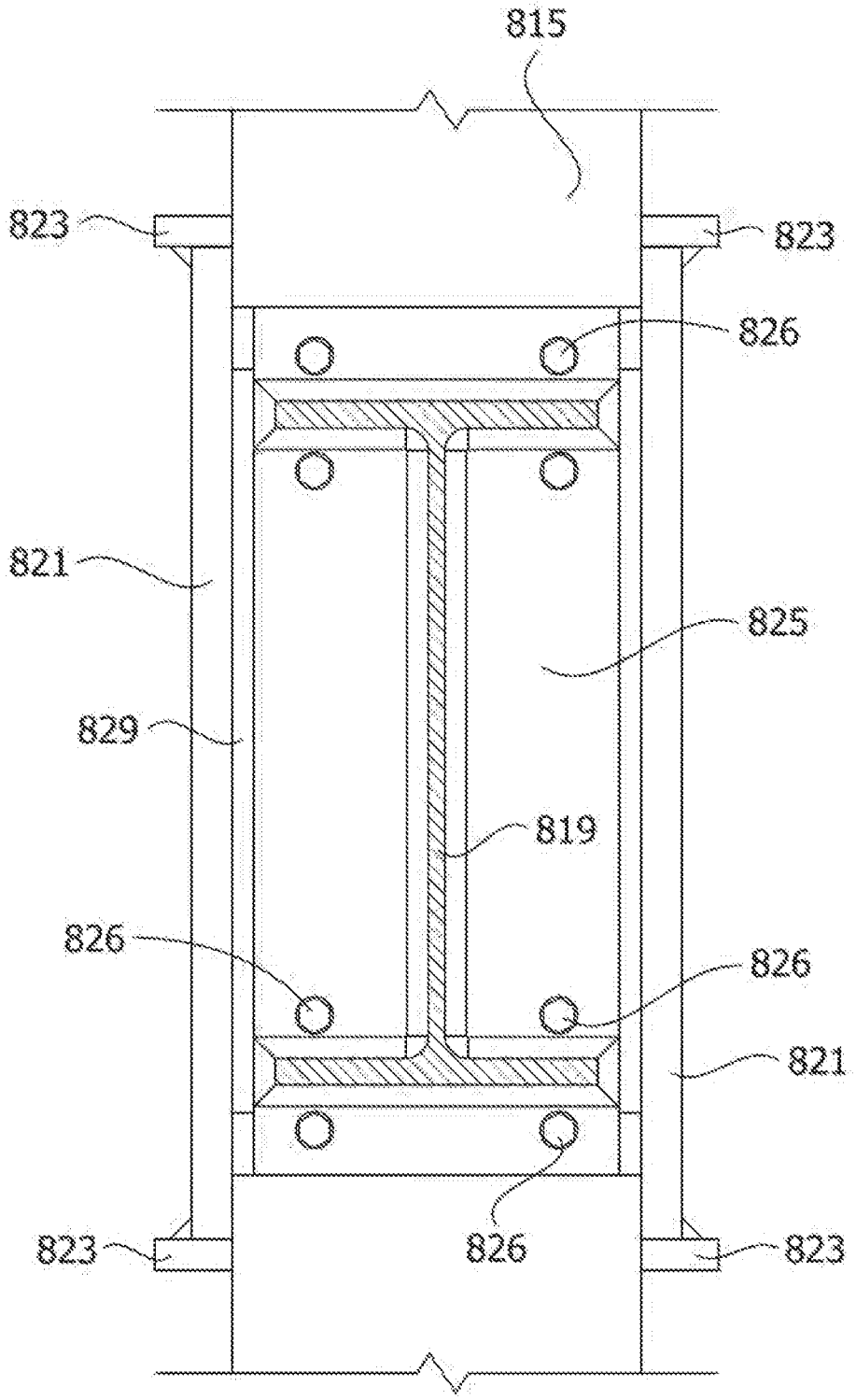
FIG. 100 is a section taken in the plane including line 100-100 of FIG. 98.
Figure 101:
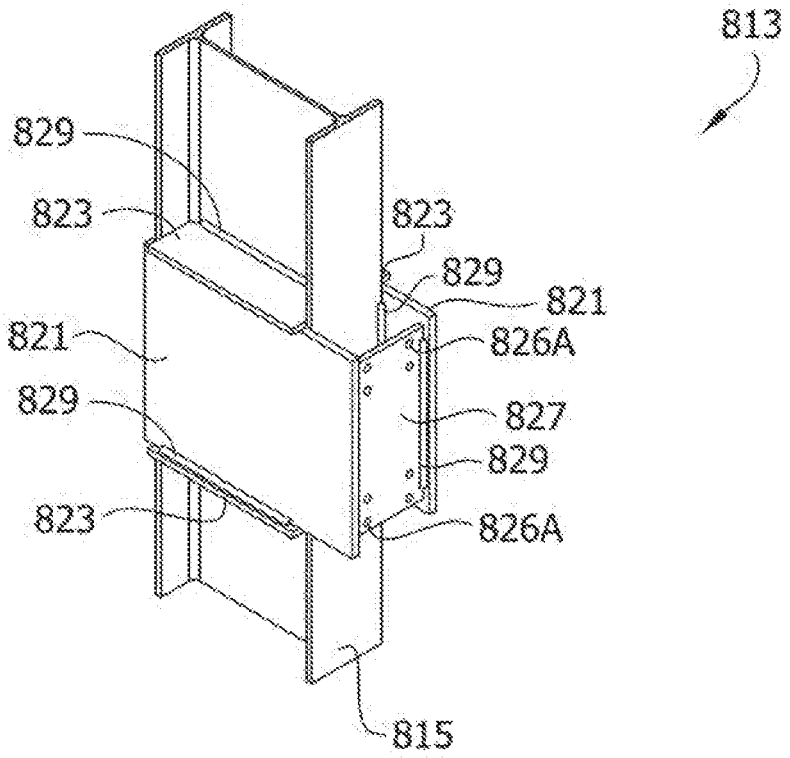
FIG. 101 is a fragmentary perspective of a column assembly of the beam-to-column joint connection structure of FIG. 97.
Figure 102:
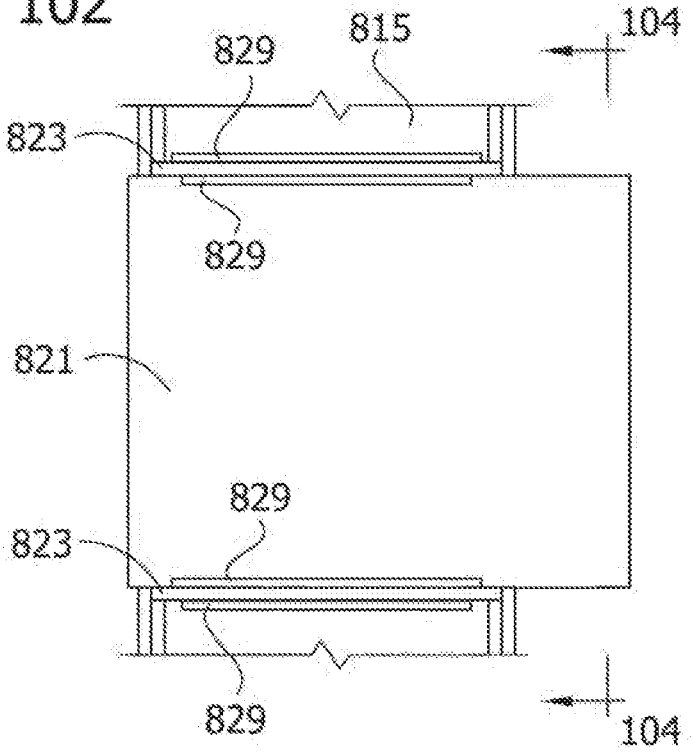
FIG. 102 is a front view of the column assembly in FIG. 101.
Figure 103:
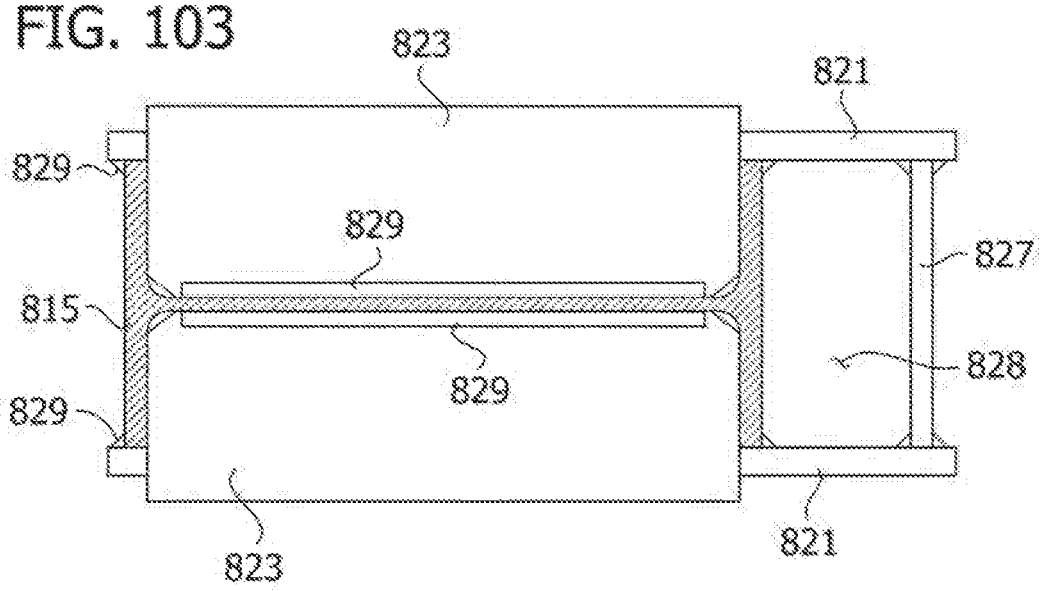
FIG. 103 is a top view of the column assembly in FIG. 101.
Figure 104:
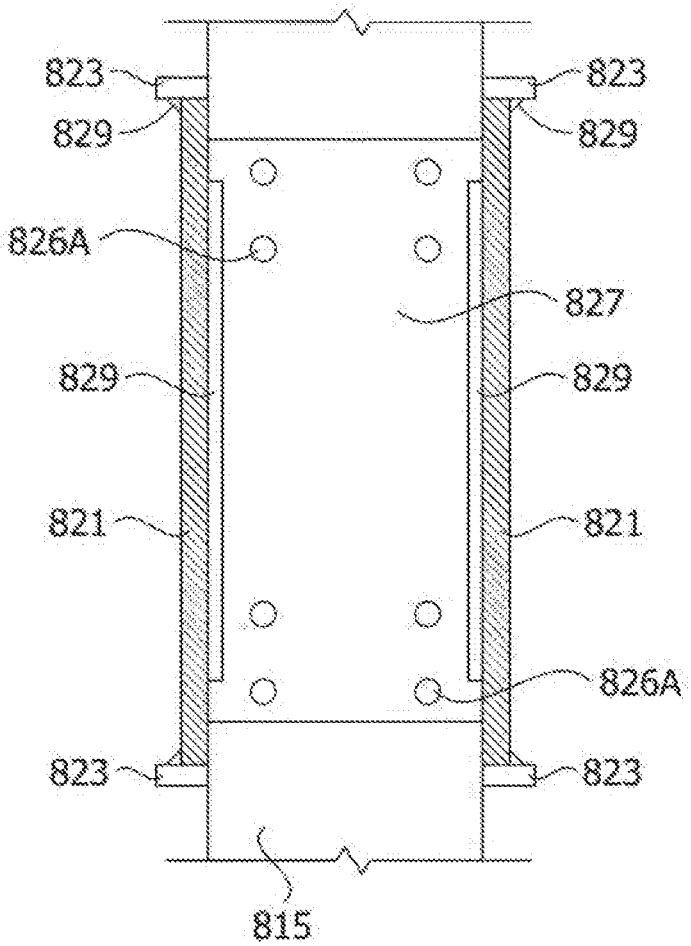
FIG. 104 is a right side view of the column assembly in FIG. 101.
Figure 105:
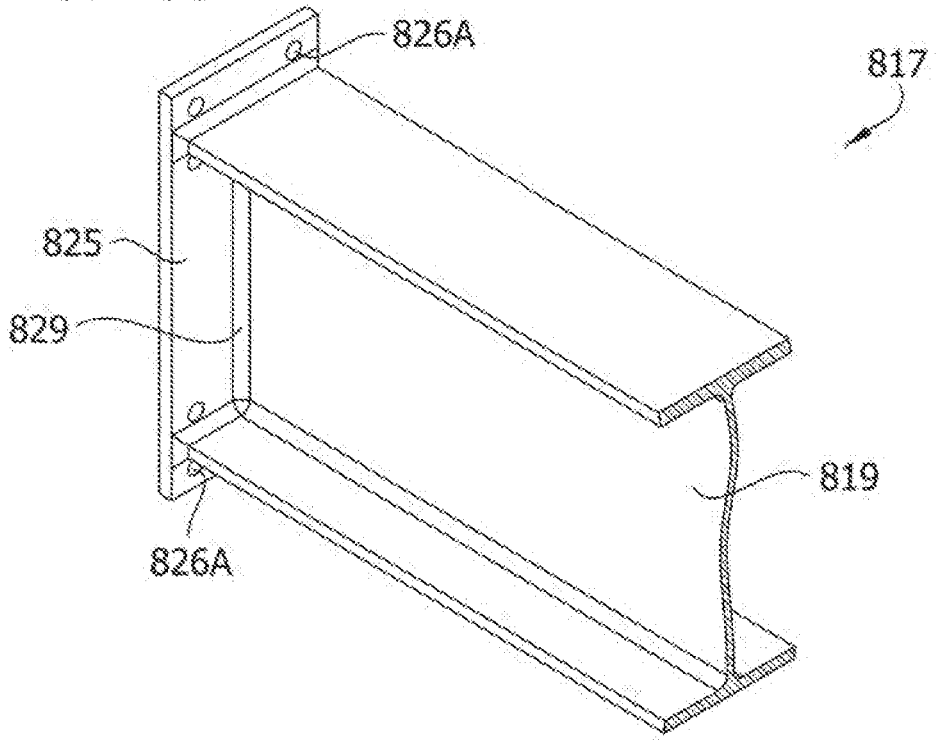
FIG. 105 is a fragmentary perspective of a full-length beam assembly of the beam-to-column joint connection structure of FIG. 97.
Figure 106:
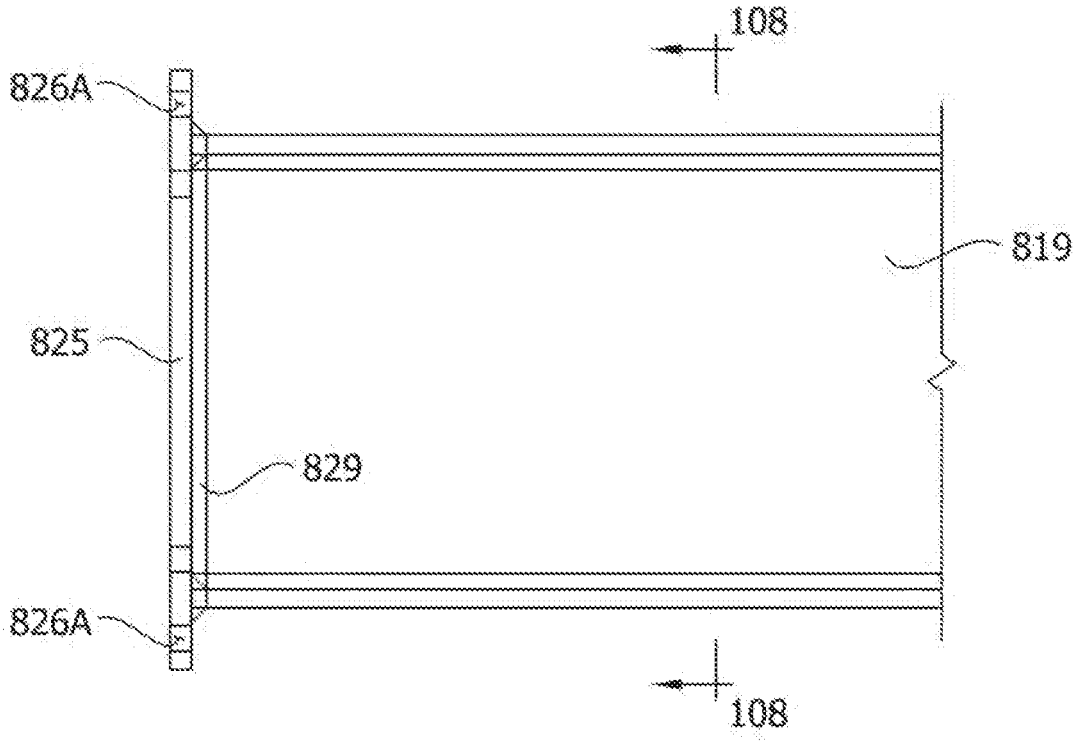
FIG. 106 is a front view of the full-length beam assembly in FIG. 105.
Figure 107:
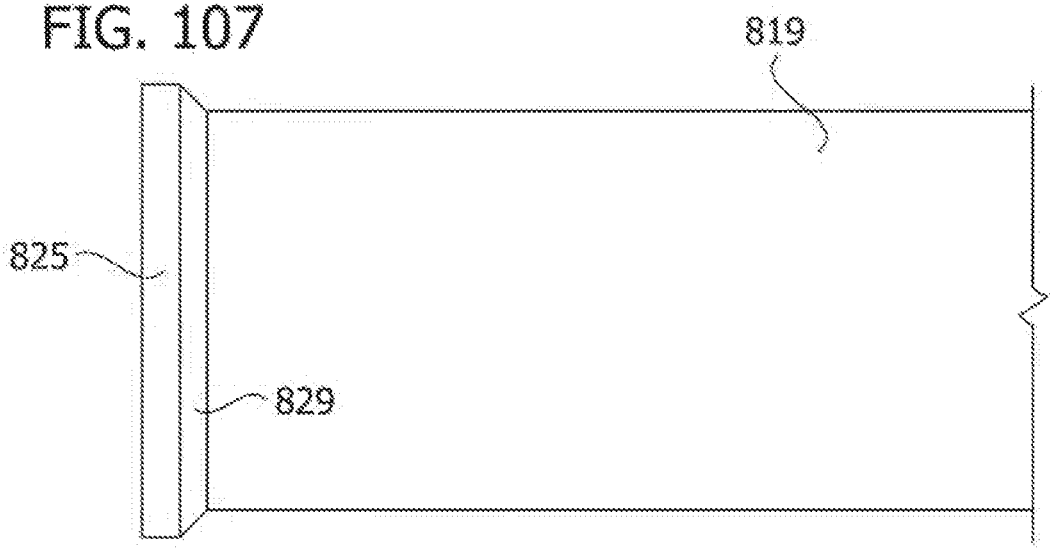
FIG. 107 is a top view of the full-length beam assembly in FIG. 105.
Figure 108:
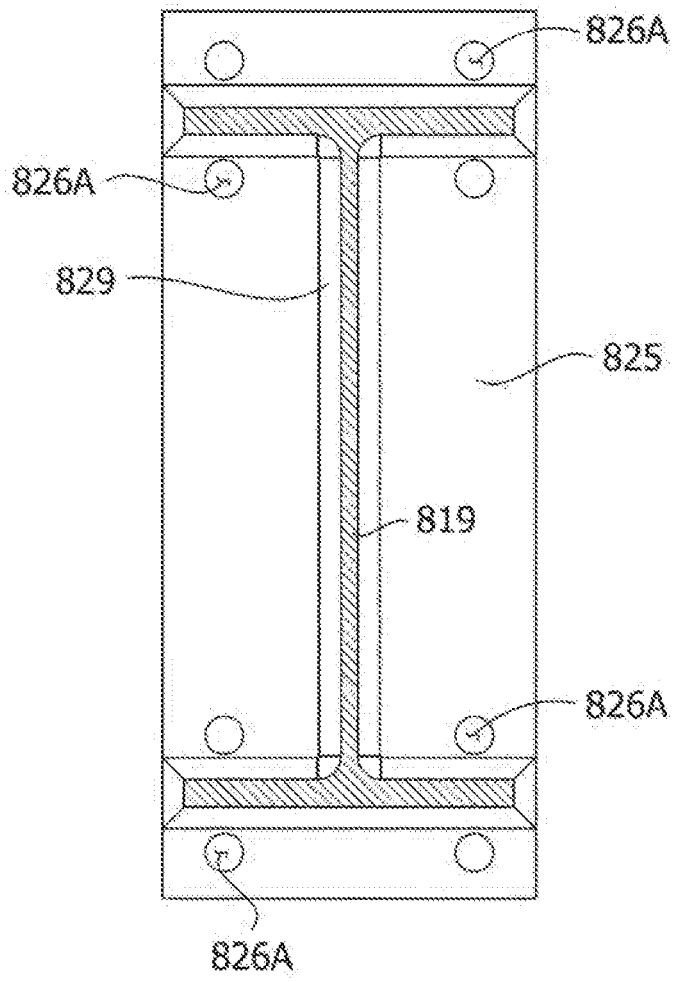
FIG. 108 is a section taken in the plane including line 108-108 of FIG. 106.

A spaced apart pair of parallel, vertically and horizontally extending gusset plates 821 sandwich the column 815 and an end portion of the beam 819. Four optional horizontal shear plates 823 (only three are shown in FIG. 97) are arranged in vertically spaced pairs generally aligned at top and bottom edges of the gusset plates 821 as illustrated in the previous embodiments. A first mounting plate 825 (broadly, "a connecting member") is disposed on an axially facing end of the beam 819. The first mounting plate 825 facilitates connection of the beam 819 to the gusset plates 821 as will be explained in greater detail below. The first mounting plate 825 is attached in a suitable manner such as by welds 829 to the axially facing end of the beam 819. A second mounting plate 827 (broadly, "a connecting member) extends between the gusset plates 821. The second mounting plate 827 is attached in a suitable manner such as be welds 829 to the gusset plates 821. The first mounting plate 825 is bolted to the second plate 827 by bolts 826 extending through aligned bolt holes 826A in the first and second plates. The mounting plate 827 is attached to the gusset plates 821 such that a gap 828 is formed between the mounting plate 827 and an axially facing end of the adjacent column flange.

Referring to FIGS. 101-104, the column assembly 813 may be fabricated at a fabrication shop and later transported to the construction site. To fabricate the column assembly 813, the gusset plates 821 are welded at 829 or otherwise attached to the flanges of the column 815, the optional horizontal shear plates 823 are welded at 829 or otherwise attached to the web of the column and so the top and bottom edges of the gusset plates, and the second mounting plate 827 is welded at 829 or otherwise attached to inner surfaces of the horizontally extended gusset plates. Any welding on the column assembly 813 needed to form the joint connection structure can be carried out at the shop. The horizontal shear plates 823 can be omitted from the column assembly 813. The gusset plates 821 and second mounting plate 827 can have other configurations than those illustrated in the current embodiment.

Referring to FIGS. 105-108, the full-length beam assembly 817 may also be fabricated at a fabrication shop prior to being transported to the construction site. To fabricate the full-length beam assembly 817, an inner surface of the first mounting plate 825 is welded at 829 to otherwise attached to the end of the full-length beam 819. Thus, at the shop, the full-length beam assembly 817 is constructed exclusively by welds. The first mounting plate 825 may have other configurations than illustrated in the current embodiment.

At the construction site, the column assembly 813 is joined to the full-length beam assembly 817. The column assembly 813 is first erected in a vertical orientation and the end of the full-length beam assembly 817 is positioned horizontally and adjacent to the column assembly. The full-length beam assembly 817 is then moved either vertically up or down into position between the gusset plates 821 such that the gusset plates are disposed on opposite sides of the beam 819 and the first and second mounting plates 825, 827 are in opposing relation. To fixedly secure the two assemblies 813, 817, bolts 826 are used to attach the first mounting plate 825 to the second mounting plate 827 through aligned bolt holes 826A, 826A in the respective components. It is possible to oversize the bolt holes 826A to reduce alignment constraints. Thus, at the construction site, the beam-to-column moment-resisting joint connection structure 811 is completed exclusively through bolt connections. So in the field, the joint connection structure 811 can be constructed without the use of welds.

The configuration and position of the adjacent mounting plates 825, 827 and bolts 826 counteract bending moments that can be placed on the full-length beam 819 after the building framework is erected. As previously mentioned, loads on the building framework can cause the beam 819 to flex up and/or down generally about a horizontal axis extending perpendicular to the length of the beam. As the beam 819 flexes up and/or down about the axis, the bolts 826 are placed in tension and/or compression. This flexing may be cyclical. This is a result of the mounting plates 825, 827 and in particular the bolt holes 826A in the plates being arranged to receive the bolts 826 in an orientation where the bolts extend along a length of the beam 819, thereby acting in tension or compression to resist the bending moment applies by the full-length beam. This is different from other joint connection structures, such as the joint connection structures 11, 111, 211, 311, 411, 511, 611, 711 described herein that position the bolts to extend transverse to the length of the beam, thereby acting in shear.

Referring to FIGS. 109-120, a beam-to-column moment-resisting joint connection structure of a tenth embodiment is generally indicated at 911. The joint connection structure may be used in the construction of a building framework. In the illustrated embodiment, the joint connection joins a column assembly 913 including a column 915 to a full-length beam assembly 917 including a full-length beam 919.

Figure 109:
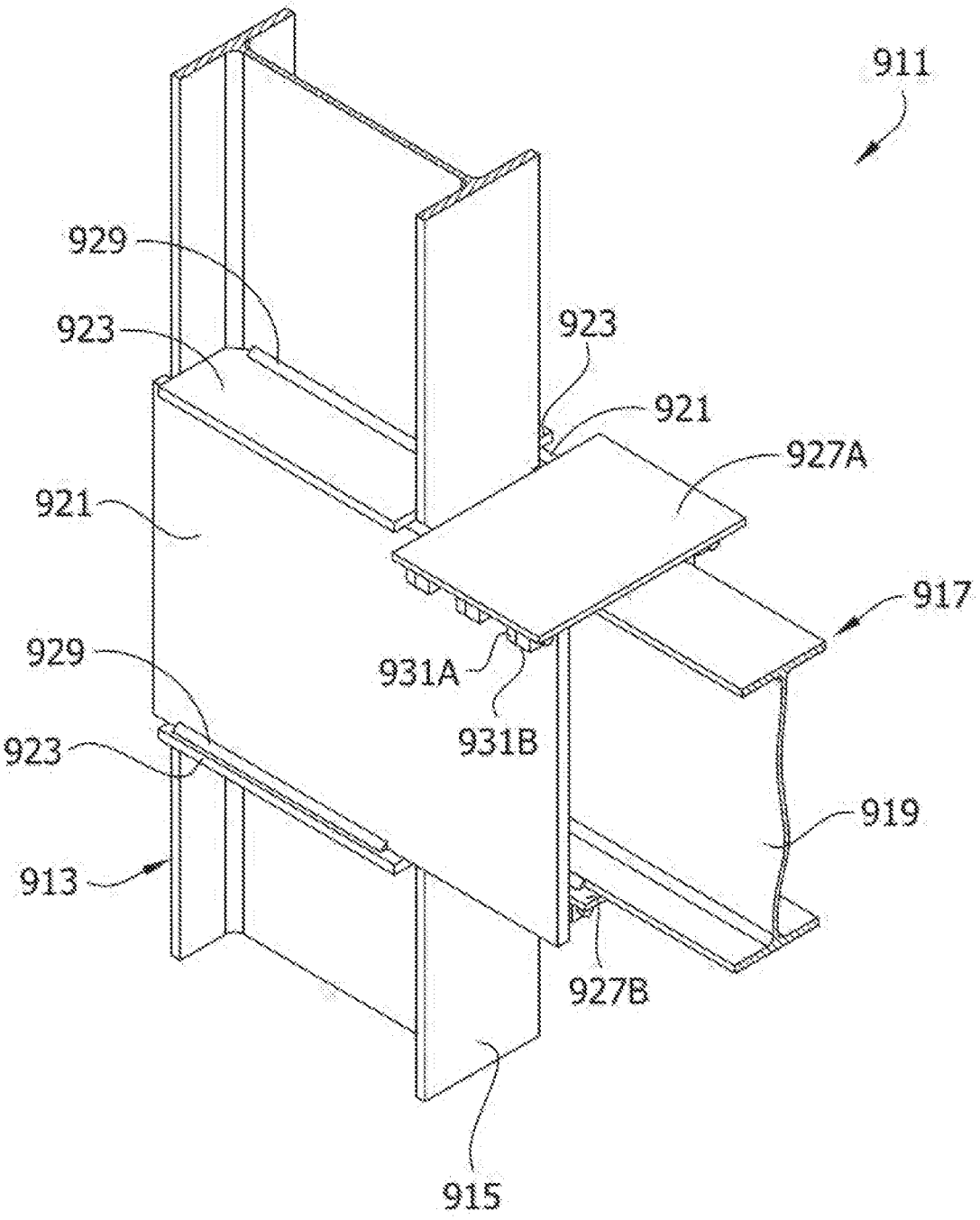
FIG. 109 is a fragmentary perspective of a beam-to-column joint connection structure of an tenth embodiment.
Figure 110:
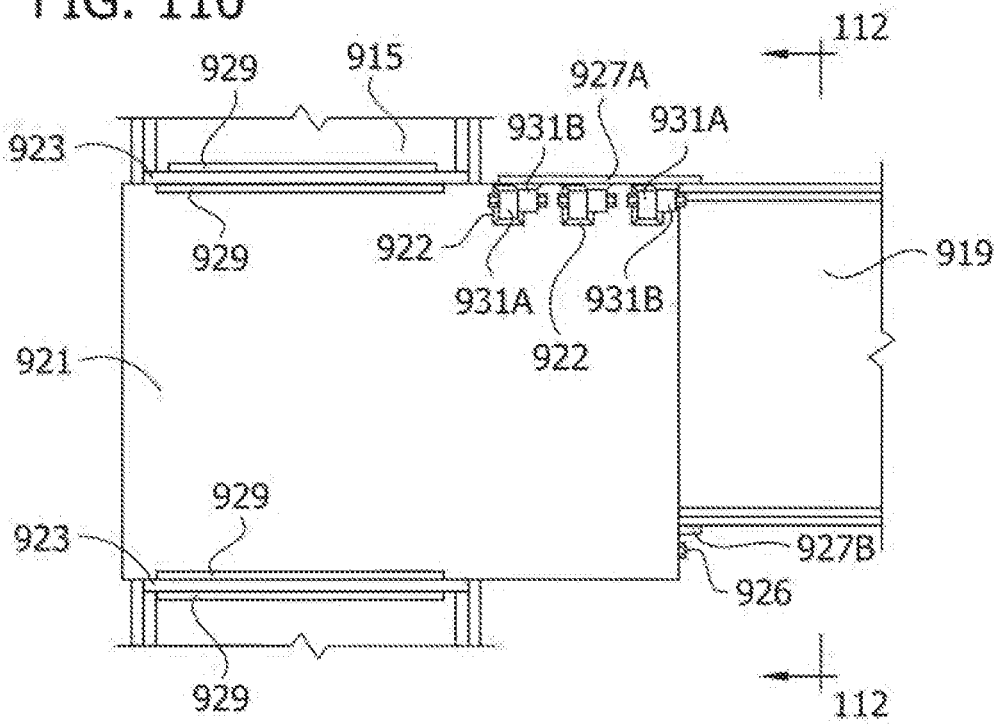
FIG. 110 is a front view of the beam-to-column joint connection structure of FIG. 109.
Figure 111:
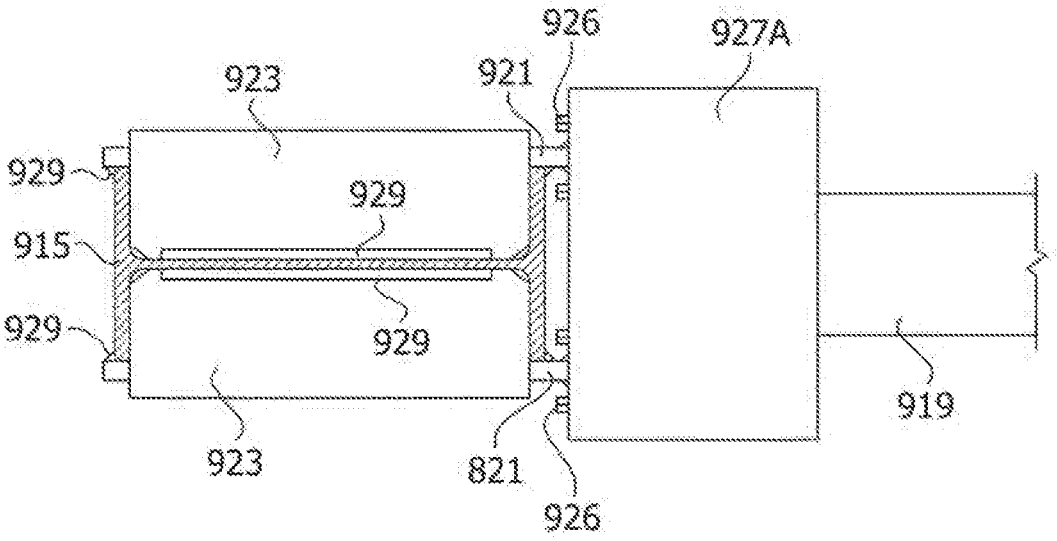
FIG. 111 is a top view of the beam-to-column joint connection structure of FIG. 109.
Figure 112:
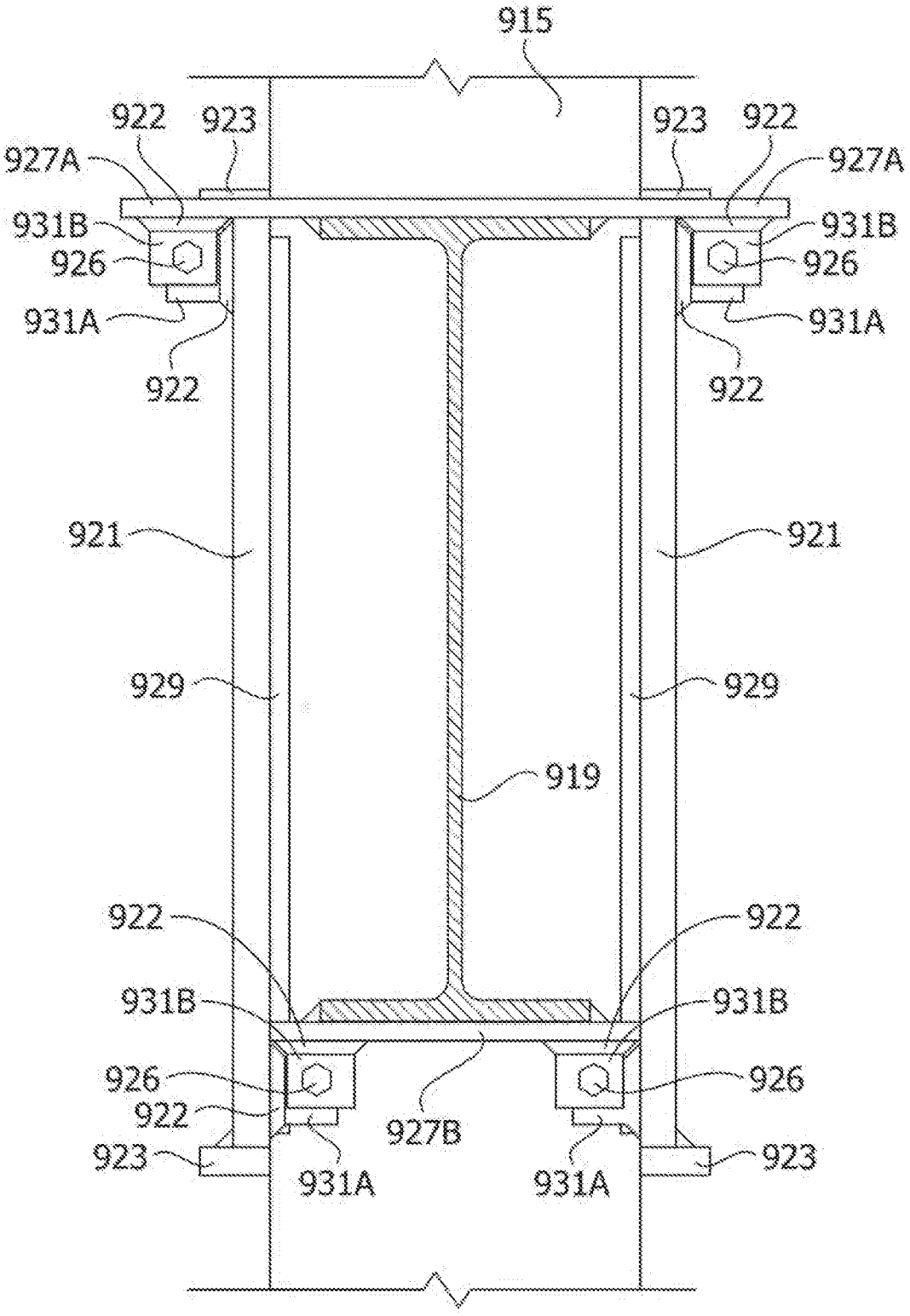
FIG. 112 is a section taken in the plane including line 112-112 of FIG. 110.

A spaced apart pair of parallel, vertically and horizontally extending gusset plates 921 sandwich the column 915 and an end portion of the beam 919. Four optional horizontal shear plates 923 (only three are shown in FIG. 109) are arranged in vertically spaced pairs generally aligned at top and bottom edges of the gusset plates 921. Two horizontal cover plates 927A, 927B are arranged in a vertically spaced pair sandwiching the end portion of the full-length beam 919. Bottom cover plate 927B is optional. Upper cover plate 927A may have a width that is greater than a width of the beam 919 and wider than a horizontal spacing of the gusset plates 921. Lower cover plate 927B may have a width that is less than the horizontal spacing between the gusset plates 921. The configuration of the cover plates 927A, 927B allows the beam 919 to be lowered between the gusset plates 921 so that the upper cover plate 927A rests on the top edge of the gusset plates before fixedly securing the beam assembly 917 to column assembly 913 via the gusset plates 921 as will be explained in greater detail below. It will be understood that the cover plates 927A, 927B may have other widths relative to each other within the scope of the present disclosure.

Referring to FIGS. 109-116, each gusset plate 921 may have a plurality of logs 931A (broadly, "connecting members") attached to an outer surface of the gusset plate generally at a top of the gusset plate and attached to an inner surface of the gusset plate generally at a bottom of the gusset plate. alternatively, both top and bottom lugs may be case as an integral part of separate longitudinal steel strip plates (not shown) that may be individually welded or otherwise attached to the corresponding faces of the gusset plate 921. The lugs 931A comprise cuboidal members welded at 922 to the gusset plates 921, or cast as an integral part of a longitudinal steel strip plate which may be welded or otherwise attached to the gusset plates. The lugs 931A have holes 933A (FIG. 116) for receiving bolts 926 as will be explained in greater detail below. In the illustrated embodiment, a plurality of lugs 931A (three are shown) are welded at 922 to the outer surface of each the gusset plate 921 at the top of the gusset plate, and a plurality of lugs 931A (three) are welded at 922 to the inner surface of each gusset plate at the bottom of the gusset plate. Each set of lugs 931A is horizontally spaced and vertically aligned such that the holes 933A of the lugs 931A in each set are disposed on a common axis extending along a horizontal length of the gusset plates 921.

Referring to FIGS. 109-112 and 117-120, each cover plate 927A, 927B may have a plurality of lugs 931B (broadly, "connecting members") attached to a bottom surface of the cover plate. The lugs 931B may comprise cuboidal members welded at 922 or otherwise attached to the cover plates 927A, 927B. If cover plate 927B is omitted, bottom lugs 931B can be welded or otherwise attached to the bottom face of the beam bottom flange, or may be case as an integral part of a longitudinal steel strip plate that is welded or otherwise attached to the bottom face of the bottom beam flange. The lugs 931B have holes 933B (FIG. 120) for receiving the bolts 926 as will be explained in greater detail below. In the illustrated embodiment, two sets of three lugs 931B are welded at 922 in opposite sides of the bottom surface of each cover plate 927A, 927B. Each set of three lugs 931B is horizontally spaced along a length of the cover plate 927A, 927B and aligned such that the holes 933B of the lugs 931B in each set are disposed on a common axis extending along the length of the respective cover plate 927A, 927B and along a length of the beam 919. The cover plates 927A, 927B are welded at 929 or otherwise attached to respective upper and lower flanges of the beam 919.

Figure 113:
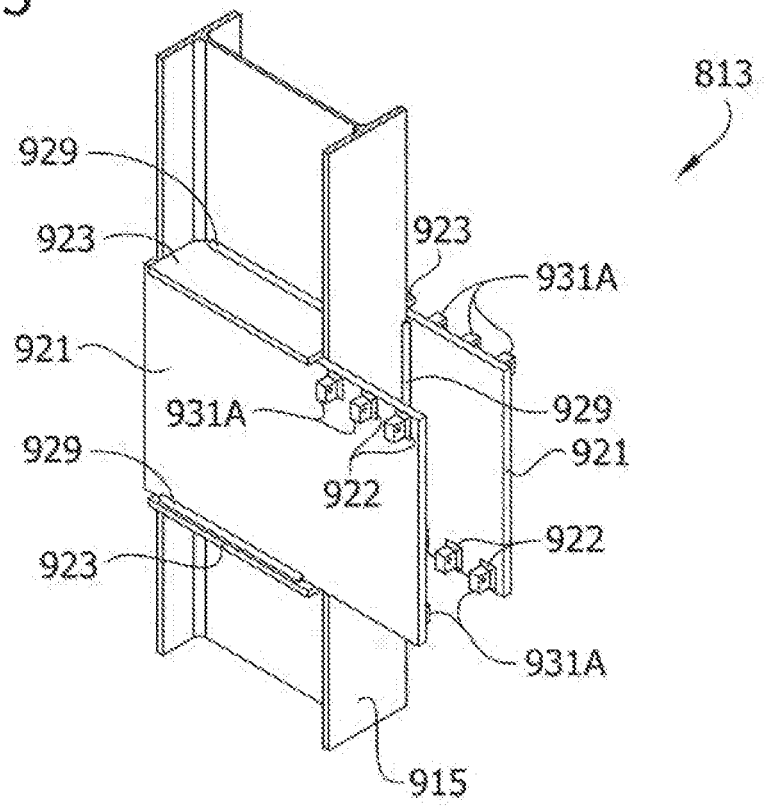
FIG. 113 is a fragmentary perspective of a column assembly of the beam-to-column joint connection structure of FIG. 109.
Figure 114:
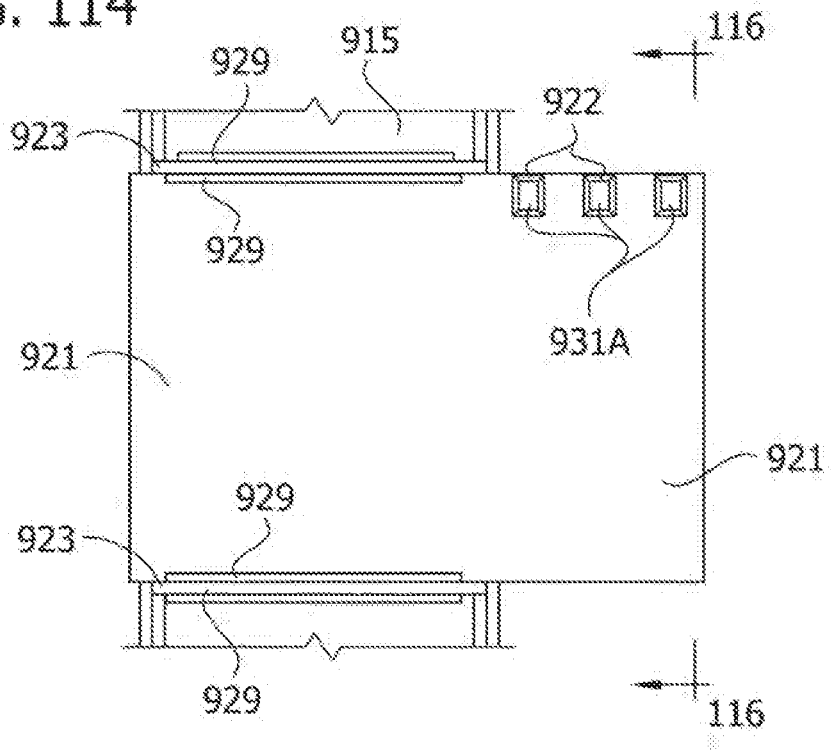
FIG. 114 is a front view of the column assembly in FIG. 113.
Figure 115:
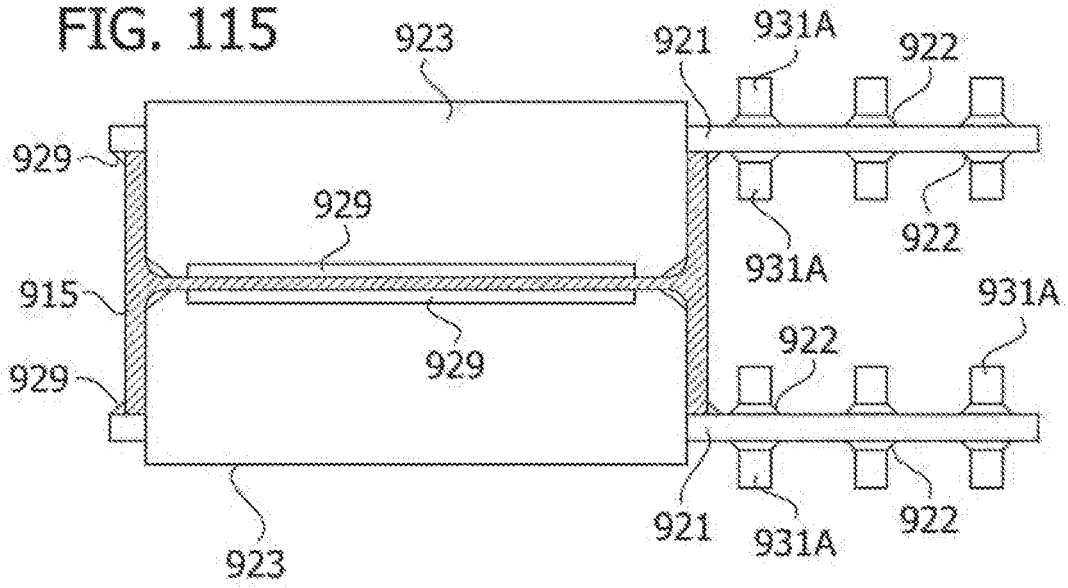
Figure 116:
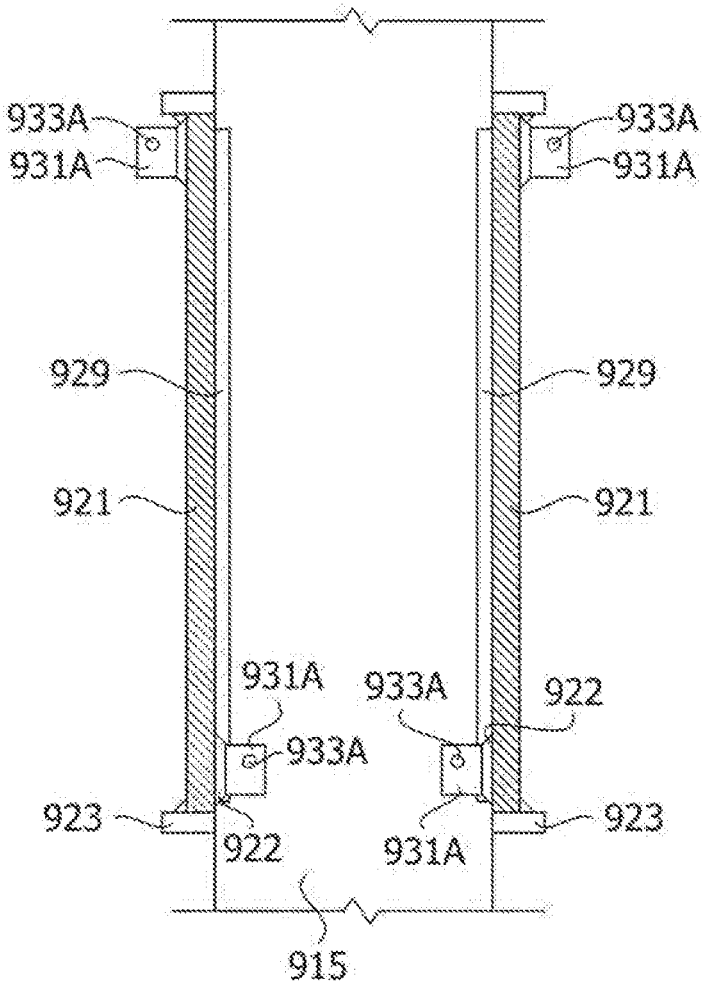

Referring to FIG. 113, the column assembly 913 may be fabricated at a fabrication shop and later transported to the construction site. To fabricate the column assembly 913, the gusset plates 921 are welded at 929 or otherwise attached to the flanges of the column 915 and the horizontal shear plates 923 are welded at 929 or otherwise attached to the web of the column and to the top and bottom edges of the gusset plate. Any welding needed on the column assembly 913 to form the beam-to-column joint may be carried out by the shop. The horizontal shear plates 923 can be omitted from the column assembly 913. The gusset plates 921 and lugs 931A can have other configurations than those illustrated in the current embodiment. Moreover, the number of lugs 931A can be other than three.

Prior to attaching the gusset plates 921 to the column 915, the lugs 931A are secured to the gusset plates. The lugs 131A are secured to the gusset plates 921 by welding at 922 each individual lug directly to the surface of the gusset plate as shown in the illustrated embodiment. Alternatively, the lugs 931A can be grouped using a common case steel strip plate (not shown). Still further, the lugs 931A can be modularly set in place on a longitudinal steel strip plate (not shown) and welded to the plate. The longitudinal steel strip plate can then be welded or otherwise attached to the gusset plate 921. This provides a greater weld surface area for a more secure weld and may allow for greater accuracy in placement of the lugs 931A. The lugs 931A may also be secured to the gusset plates 921 by casting the lugs with the gusset plates. Other means of securing the lugs 931A to the gusset plates 921 are envisioned.

Figure 117:
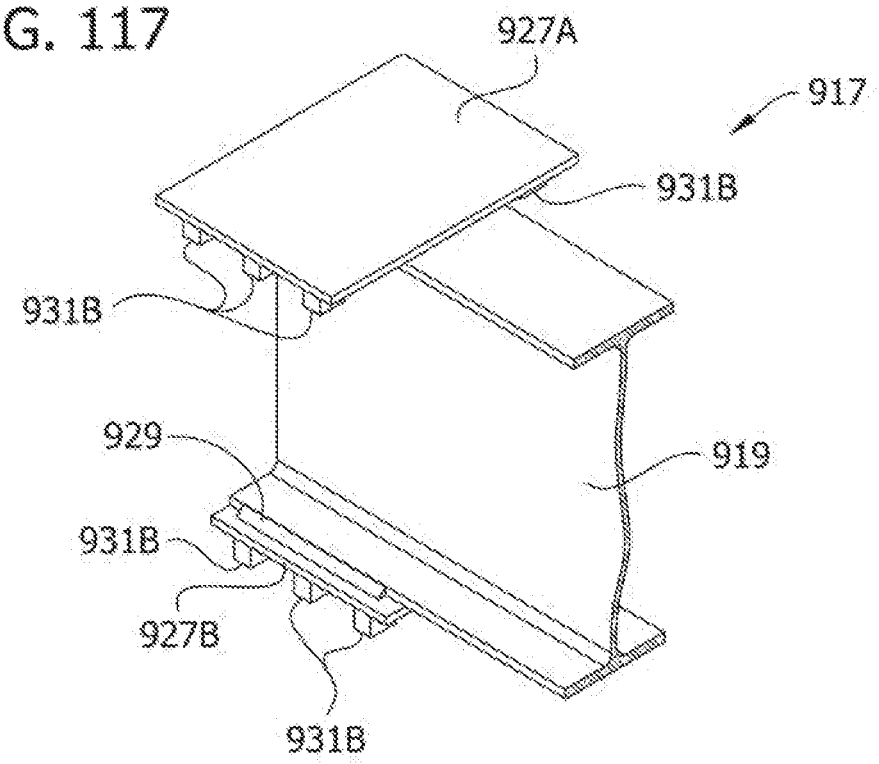
Figure 118:
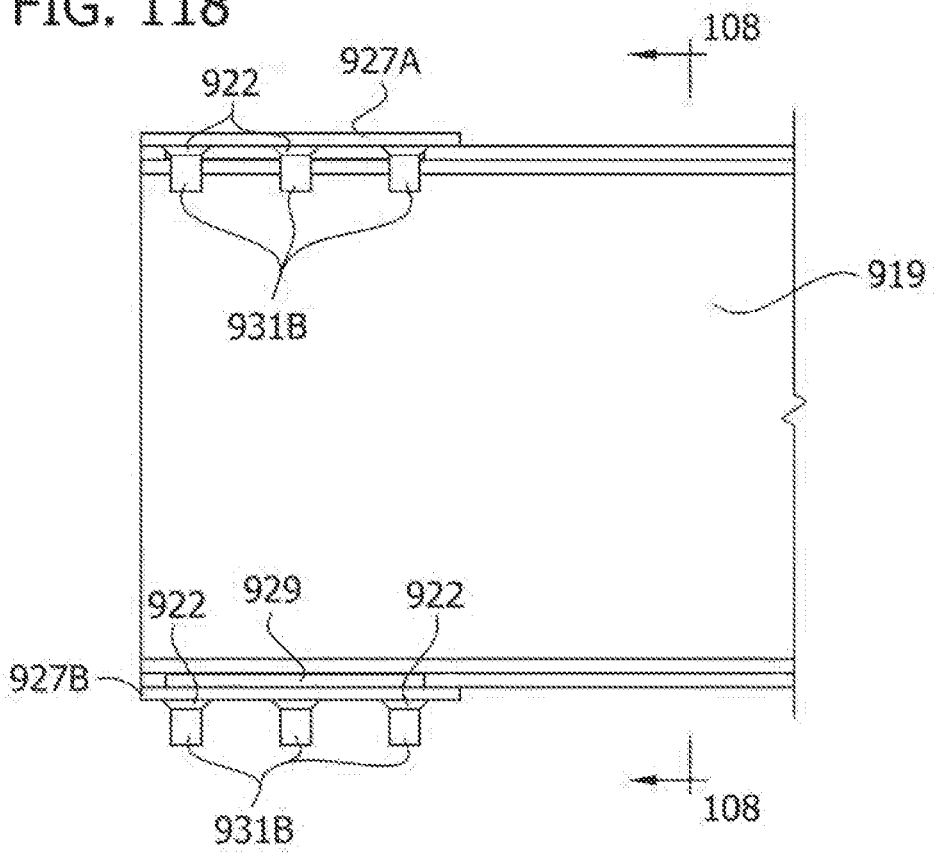
Figure 119:
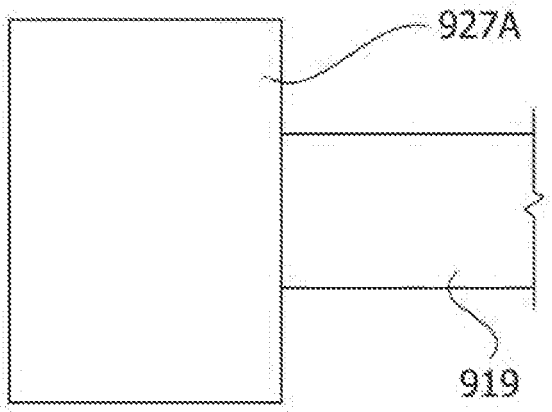
Figure 120:
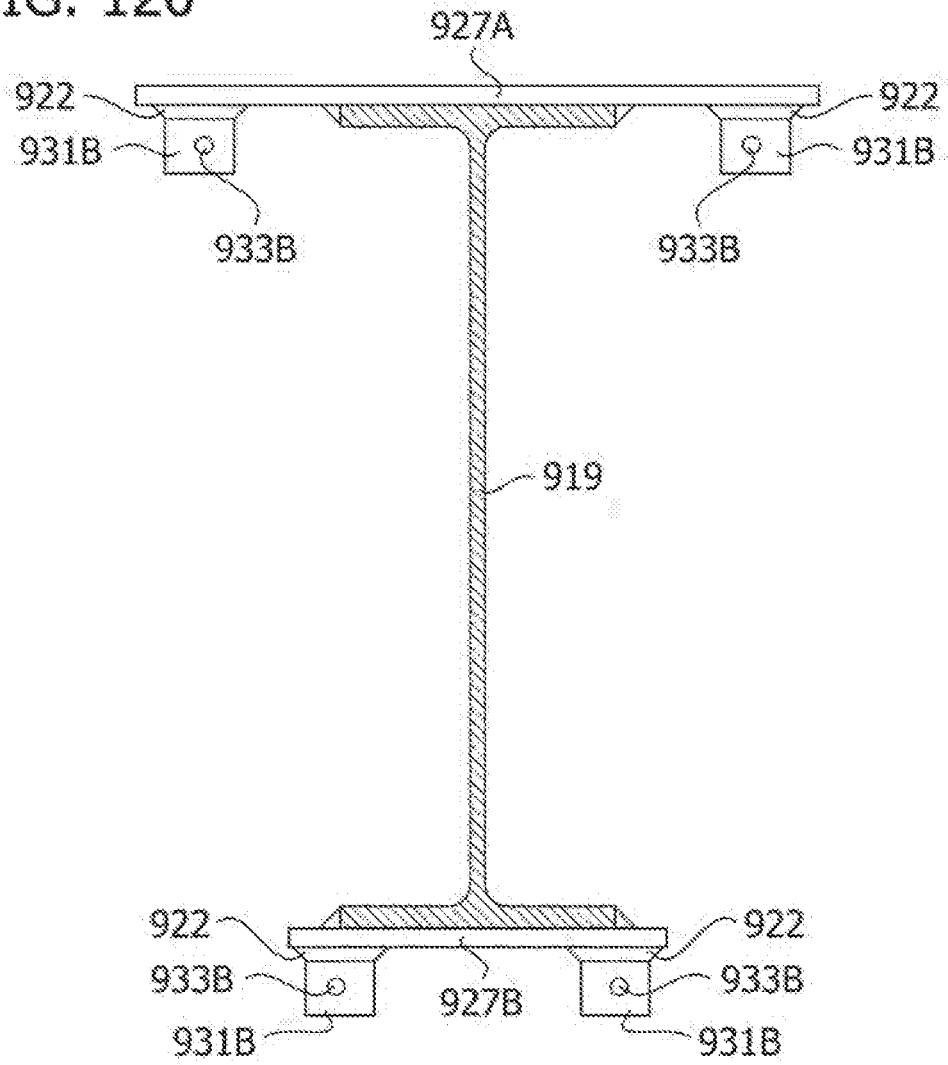

Referring to FIG. 117, the full-length beam assembly 917 may be fabricated at a fabrication shop prior to being transported to the construction site. To fabricate the full-length beam assembly 917, the cover plates 927A, 927B are welded at 929 or otherwise attached to the upper and lower flanges, respectively, of the full-length beam 919. Any welding needed on the full-length beam assembly 917 to form the joint may be carried out at the shop. The cover plates 927A, 927B may have other configurations than those illustrated in the current embodiment.

Prior to attaching the cover plates 927A, 927B to the full-length beam 919, the lugs 931B are secured to the cover plates. The lugs 931B are secured to the cover plates 927A, 927B by welding at 922 or otherwise attaching each individual lug directly to the surface of the cover plate as shown in the illustrated embodiment. Alternatively, the lugs 931B can be modularly set in plate on a longitudinal steel strip plate (not shown) and welded or otherwise attached to the plate, which can then be welded to the cover plates 927A, 927B. As mentioned above, this provides a greater weld surface area for a more secure weld and potentially more accurate location of the lugs 931B. The lugs 931B may also be secured to the cover plates 927A, 927B by casting the lugs with the cover plates. If cover plate 927B is omitted, the lugs 931B can be case as an integral part of a longitudinal steel strip plate that may be welded or otherwise attached to the corresponding top or bottom beam flange. Other means of securing the lugs 931B to the cover plates 927A, 927B are envisioned.

At the construction site, the column assembly 913 is joined to the full-length beam assembly 917. The column assembly 913 is first erected in a vertical orientation and the end of the full-length beam assembly 917 is positioned adjacent the column assembly, over the gusset plates 921. The full-length beam assembly 917 is then lowered between the gusset plates 921 until the bottom surface of the upper cover plate 927A engages the upper edges of the gusset plates. This engagement temporarily locates and supports the full-length beam assembly 917 on the column assembly 913. When the beam assembly 917 is lowered into engagement with the column assembly 913, the lugs 931B on the cover plates 927A, 927B are located adjacent to respective lugs 931A on the gusset plates 921 so that the holes 933A, 933B in the lugs 931A, 931B, respectively, are aligned. To fixedly secure the two assemblies 913, 917, bolts 926 are inserted through the aligned holes 933A, 933B in the respective components. The holes 933B in the lugs 931B are oversized to facilitate threading the bolt 926 through holes 931B and 931A, and to ensure that bolts 926 can only act in tension or compression, and thus provide higher both capacity. It will be understood that it could be the holes 933A in the lugs 931A that are oversized. Thus, at the construction site, the joint connection structure 911 is completed exclusively through bolt connections. So in the field, the joint connection structure 911 is constructed without the use of welds.

The configuration and position of the lugs 931A, 931B and bolts 926 counteract bending moments that can be placed on the full-length beam 919 after the building framework is erected. Loads on the building framework can cause the beam 919 to flex up and/or down generally about a horizontal axis extending perpendicular to the length of the beam. As the beam 919 flexes up and/or down about the horizontal axis, the bolts 926 are placed in tension and/or compression. This loading may be cyclical. This is a result of the holes 933A, 933B of the lugs 931A, 931B, respectively, being arranged to receive the bolts 926 in an orientation where the bolts extend along a length of the beam 919. This is unlike other bolted joint connection structures of the current disclosure, such as the joint connection structures, 11, 111, 211, 311, 411, 511, 611, 711 described herein, which positions the bolts to extend transverse to the length of the beam, so that the bolts are loaded in shear thereby minimizing the load capacity of the bolts. In contrast, in the current embodiment the loading in bolts 926 occurs in tension or compression, which maximizes the capacity of the bolts, allowing a fewer number of bolts to be employed. It is also envisioned that bearings (not shown) instead of lugs can be used.

Referring to FIGS. 121-132, a beam-to-column movement-resisting joint connection structure of an eleventh embodiment is generally indicated at 1011. The joint connection structure may be used in the construction of a building framework. In the illustrated embodiment, the joint connection joins a column assembly 1013 including a column 1015 to a full-length beam assembly 1017 including a full-length beam 1019.

A spaced apart pair of parallel, vertically and horizontally extending gusset plates 1021 sandwich the column 1015 and beam 1019. Four horizontal shear plates 1023 (only three are shown in FIG. 121) are arranged in vertically spaced pairs generally aligned at top and bottom edges of the gusset plates 1021. Vertical shear plates 1028 are welded at 1029 to a web of the beam 1019 and bolted to the gusset plates 1021 by way of vertical angle irons 1025 attached to the vertical shear plates. The vertical angle irons 1025 are L-shaped in vertical plan view. Each vertical angle iron 1025 may include a vertically extending first leg welded to the a corresponding vertical shear plate 1028 and a second vertically extending leg projecting perpendicular to the first leg along the length of the beam. An outer surface of the second leg of each angle iron 1025 is bolted to an inner surface of a respective gusset plate 1021 by vertically spaced bolts 1026 extending through aligned bolt holes 1026A in the second leg of the angle iron and respective gusset plate. A horizontal cover plate 1027 is located on a top surface of an upper flange of the beam 1019 and is attached in a suitable manner as by welding to tips of the upper flange. Cover plate 1027 may have a width that is greater than a width of the beam 1019 and greater than a horizontal spacing of the gusset plates 1021. Lower angle irons 1033 are each attached in a suitable manner such as by welds 1029 to a bottom surface of a lower flange of the beam 1019 and to a tip of the lower flange. The spacing between laterally outwardly facing surfaces of vertical legs of the angle irons 1033 is less than the horizontal spacing between the gusset plates 1021. The configuration of the cover plate 1027 and angle irons 1033 allows the beam 1019 to be lowered between the gusset plates 1021 so that the cover plate 1027 rests on the top edge of the gusset plates before fixedly securing the beam assembly 1017 to column assembly 1013 via the gusset plates 1021 as will be explained in greater detail below. It will be understood that the other sizes and arrangements of the cover plate 1027 and angle irons 1033 are possible. For example, the angle irons 1033 can be attached to a lower cover plate (not shown) that is attached to the lower flange of the beam 1019.

Referring to FIGS. 121-128, each gusset plate 1021 may have an upper angle iron 1031 (broadly, "an upper connecting member") attached to an outer surface of the gusset plate. The upper angle iron 1031 may comprise an elongate L-shaped member including a vertical first leg attached to the outer surface of the gusset plate at an upper portion of the gusset plate and extending horizontally along the upper portion of the gusset plate. The first leg of each upper angle iron 1031 may be welded or otherwise attached to the outer surface of the respective gusset plate 1021. A horizontal second leg of the upper angle iron 1031 may project transversely from the first leg of the upper angle iron and laterally away from the gusset plate 1021 and away from the beam 1019. In the illustrated embodiment, the first and second legs of the upper angle irons 1031 are disposed at substantially a right angle to each other. A top surface of the second leg of each upper angle iron 1031 is bolted to a bottom surface the cover plate 1027 by horizontally spaced bolts 1026 extending through aligned bolt holes 1026A in the second leg of the upper angle irons and upper cover plate. In the illustrated embodiment, the upper angle iron 1031 are configured such that the lateral edge of the second legs are flush with the lateral edges of the cover plate 1027 (FIG. 124). Further, the top surface of the second leg of the upper angle irons 1031 are above the top edge of the gusset plates 1021. In another embodiment, the second leg of at least one of the upper angle irons 1031' may extend laterally past a lateral edge of the cover plate 1027 (FIG. 133). This configuration of the upper angle iron 1031' may provide a support surface for a component such as a metal floor decking 1035 to rest on top of the upper angle iron. The upper angle irons 1031, 1031' may be otherwise configured and/or arranged within the scope of the present invention.

Referring to FIGS. 129-132, the lower angle irons 1033 (broadly, "lower connecting members") comprise elongate L-shaped members including a first leg attached to the bottom surface lower flange of the beam 1019 at opposite side portions of the lower flange and extending horizontally along the side portions. The first leg of each lower angle iron 1033 may be welded or otherwise attached to the bottom surface of the lower flange of the beam 1019. Each lower angle iron 1033 may also include a second leg projecting transversely from the first leg of the lower angle iron and downward, away from the lower flange. In the illustrated embodiment, the first and second legs of each lower angle iron 1033 are disposed at substantially a right angle to each other. An outer surface of the second leg of each lower angle iron 1033 is bolted to an inner surface of a respective gusset plate 1021 by horizontally spaced bolts 1026 extending through aligned bolt holes 1026A in the second leg of the lower angle iron and the gusset plate. The bolt holes 1026A in the various components may be slotted as shown in the first embodiment to facilitate alignment. Other arrangements to reduce alignment constraints are possible. Referring to FIG. 129-132, the full-length beam assembly 1017 may be fabricated at a fabrication shop prior to being transported to the construction site. To fabricate the full-length beam assembly 1017, the angle irons 1025 are welded or otherwise attached to the web of the beams 1019, the cover plate 1027 is welded or otherwise attached to the upper flange of the beam, and the lower angle irons 1033 are welded or otherwise attached to the lower flange of the beam. Thus, at the shop, the full length beam assembly 1017 is constructed exclusively by welds. The angle irons 1025, cover plate 1027 and lower angle iron 1033 may have other configurations than those illustrated in the current embodiment.

Referring to FIG. 125-128, the column assembly 1013 may also be fabricated at a fabrication shop and later transported to the construction site. To fabricate the column assembly 1013, the gusset plates 1021 are welded or otherwise attached to the flanges of the column 1015, the horizontal sheet plates 1023 are welded or otherwise attached to the web of the column and to the top and bottom edges of the gusset plates, and the upper angle arms 1031 are welded or otherwise attached to the gusset plates. Thus, at the shop, the column assembly 1013 is constructed exclusively by welds. The horizontal sheet plates 1023 can be omitted from the column assembly 1013. The gusset plates 1021 and upper angle irons 1031 can have other configurations than those illustrated in the current embodiment.

At the construction site, the column assembly 1013 is joined to the full-length beam assembly 1017. The column assembly 1013 is first erected in a vertical orientation and the end of the full-length beam assembly 1017 is positioned adjacent the column assembly, over the gusset plates 1021. The full-length beam assembly 1017 is then lowered between the gusset plates 1021 until the bottom surface of the cover plate 1027 engages the top surface of the second leg of the upper angle irons 1031. This engagement temporarily locates and supports the full-length beam assembly 1017 on the column assembly 1013. To fixedly secure the two assemblies 1013, 1017, bolts 1026 are used to attach the upper angle irons 1031 to the cover plate 1027, the lower angle irons 1033 to the gusset plates 1021, and the vertical angle irons 1025 to the gusset plates through aligned bolt holes 1026A in the respective components. Thus, at the construction site, the joint connection structure 1011 is completed exclusively through bolt connections. So in the field, the joint connection structure 1011 is constructed without the use of welds.

Referring to FIGS. 134-136, a beam-to-column moment-resisting joint connection structure of a twelfth embodiment is generally indicated at 1111. In the illustrated embodiment, the joint connection joins a column assembly 1113 including a column 1115 to a full-length beam assembly 1117 including a full-length beam 1119. The joint connection structure 1111 of the twelfth embodiment is substantially identical to the joint connection structure 11 of the first embodiment. The primary difference between the two embodiments is gusset plates 1121 are bolted to the column 1115. In particular, a pair of vertical angle irons 1124A are welded at 1129 to each flange 1116 of the column 1115 (only three can be seen in the Figures) and a pair of horizontal angle irons 1124B are welded at 1129 to opposite sides of the web of the column (only two). The vertical angle irons 1124A are elongate L-shaped member. Each vertical angle iron 1124A may include a vertically extending first leg welded to the a flange 1116 of the column 1115 and a second vertically extending leg projecting perpendicular to the first leg transverse to the length of the column. An outer surface of the second leg of each vertical angle iron 1124A is bolted to an inner surface of a respective gusset plate 1121 by vertically spaced bolts 1126 extending through aligned bolt holes in the second leg of the vertical bracket and respective gusset plate.

The horizontal angle irons 1124B are also elongate L-shaped members. Each horizontal angle iron 1124B may include a horizontally extending first leg welded to a web of the column 1115 and a second horizontally extending leg projecting perpendicular to the first leg along the length of the column. An outer surface of the second leg of each horizontal angle iron 1124B is bolted to an inner surface of a respective gusset plate 1121 by vertically spaced bolts 1126 extending through aligned bolt holes in the second leg of the horizontal angle iron and respective gusset plate. The angle irons 1124A, 1124B can have other configurations without departing from the scope of the disclosure.

Referring to FIGS. 137-139, a beam-to-column moment-resisting joint connection structure of a thirteenth embodiment is generally indicated at 1211. In the illustrated embodiment, the joint connection joins a column assembly 1213 including a column 1215 to a full-length beam assembly 1217 including a full-length beam 1219. The joint connection structure 1211 of the thirteenth embodiment is substantially identical to the joint connection structure 1111 of the twelfth embodiment except vertical brackets 1124A are rectangular plate members rather than angle irons 1124A. However, brackets 1124A, 1124B can have other configurations without departing from the scope of the disclosure.

It will be understood that the specific connections described in each of the embodiments are interchangeable.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

Moment resisting column-to-beam joint connection structures, column assemblies and beam assemblies that are constructed according to the principles of the present invention provide numerous unique features, benefits and advantages. Reference is made to the figures illustrating one of the embodiments to which the advantages and benefits apply.

What is claimed is:

1. A prefabricated column assembly comprising:

a column having a length and a longitudinal axis extending along the column's length, the column including flanges and a web extending between the flanges;

a pair of gusset plates each including opposite major surfaces and edge surfaces extending between the major surfaces, the major surfaces having larger surface areas than the edge surfaces, the major surfaces of the gusset plates extending parallel to the longitudinal axis of the column, across the column and laterally outward from the column, and configured for receiving a beam therebetween with the major surfaces of the gusset plates on horizontally opposite sides of flanges of the beam to connect the beam to the column;

bolts attaching the gusset plates to the column on opposite sides of the column, the bolts extending parallel to the flanges of the column; and a plurality of first connecting members separately formed from the column and the gusset plates and attached directly to the flanges of the column, the first connecting members each having a vertically extending plate with bolt holes for receiving some of said bolts therein, each of said plurality of first connecting members being mounted on only respective ones of the flanges, said plurality of first connecting members attaching only one of said pair of gusset plates to the column;

wherein the flanges of the column each comprise a pair of side edges and an outwardly facing surface extending between the side edges, each of said plurality first connecting members engaging the outwardly facing surface extending between the side edges of a respective one of the flanges such that each vertically extending plate extends away from both flanges of the column.

2. The column assembly of claim 1 further comprising a shear plate separately formed from the plurality of first connecting members and directly connected to the column between the flanges of the column, and a second connecting member mounted on the shear plate and having bolt holes receiving some of said bolts therein.

3. The column assembly of claim 2 wherein the shear plate comprises a first shear plate, the column assembly further comprising a second shear plate separately formed from the plurality of first connecting members and directly connected to the column between the flanges of the column, and a third connecting member mounted on the second shear plate and having bolt holes receiving some of said bolts therein.

4. The column assembly of claim 3 wherein the second and third connecting members both attach a first gusset plate of said pair of gusset plates to the column.

5. The column assembly of claim 3 wherein the second and third connecting members are horizontally extending angle irons.

6. The column assembly of claim 2 wherein the plurality of first connecting members and the second connecting member are selected from a group including: an angle iron and a rectangular plate.

7. The column assembly of claim 2 wherein said plurality of first connecting members and the second connecting member comprise a first set of connecting members attached to the column and receiving some of the bolts to attach a first gusset plate of the pair of gusset plates to the column, the assembly further comprising a second set of connecting members attached to the column and receiving some of the bolts to attach a second gusset plate of the pair of gusset plates to the column.

8. The column assembly of claim 1 wherein one of said plurality of first connecting members is directly attached to one of the flanges of the column and another of said plurality of first connecting members is attached directly to an opposite one of the flanges of the column, the opposite flange comprising a pair of side edges and a surface extending between the side edges, the other of the plurality of first connecting members engaging the surface extending between the side edges of the opposite flange.

9. The column assembly of claim 8 wherein said plurality of first connecting members are selected from a group including: vertically extending angle irons and vertically extending rectangular plates.

10. The column assembly of claim 1 wherein said plurality of first connecting members are attached to the flanges of the column by welding.

11. The column assembly of claim 1 further comprising bolt holes in said pair of gusset plates for receiving the bolts that attach the gusset plates to the column, one of the bolt holes in the gusset plates and the bolt holes in the first connecting members being slotted.

12. The column assembly of claim 1 in combination with a full length beam assembly bolted to the gusset plates.

13. A joint connection structure of a building framework comprising:

a column assembly including a column and a pair of planar gusset plates, the column having a length and a longitudinal axis extending along the column's length, the column further including flanges and a web extending between the flanges, the gusset plates each including opposite major surfaces and edge surfaces extending between the major surfaces, the major surfaces having larger surface areas than the edge surfaces, the gusset plates being bolted to the column on opposite sides of the column in a configuration in which the major surfaces of the gusset plates extend parallel to the longitudinal axis of the column and laterally outward from the column; and a beam assembly including a beam having an end portion received between the major surfaces of the gusset plates with the major surfaces being disposed on horizontally opposite sides of the beam, the beam being attached to the gusset plates connecting the beam assembly to the column assembly, the beam assembly being free of mounting connection to the column except through the beam assembly's connection with the gusset plates; and a plurality of first connecting members separately formed from the column and the gusset plates and attached directly to the column, and bolts received through bolt holes in the plurality of first connecting members connecting one of said pair of gusset plates to the column, the bolts extending parallel to the flanges of the column, each of said plurality of first connecting members being mounted on only respective ones of said flanges of the column, said plurality of first connecting members attaching one of said pair of gusset plates to the column, wherein the plurality of first connecting members are attached directly to respective ones of the flanges of the column, the flanges each comprising a pair of side edges and an outwardly facing surface extending between the side edges, each of said plurality of first connecting members engaging the outwardly facing surface extending between the side edges of a respective one of the flanges, and each of said plurality of first connecting members comprising a vertically extending plate that extends away from both flanges of the column.

14. The joint connection structure of claim 13 further comprising a shear plate separately formed from the plurality of first connecting members and directly connected to the column between the flanges of the column, and a second connecting member mounted on the shear plate.

15. The joint connection structure of claim 13 further comprising a second connecting member welded to the beam and bolted to the one of said pair of gusset plates.

16. The joint connection structure of claim 13 further comprising bolts attaching the beam to the gusset plates.

17. A framework comprising a plurality of interconnected joint connection structures as set forth in claim 13.

*18. A prefabricated column assembly comprising:*

*a column having a length and a width;*

*a pair of gusset plates connected to the column on opposite sides of the column, each gusset plate extending across the width of the column and being arranged parallel to the length of the column;*

*connecting members fixedly attached to respective outer surfaces of said pair of gusset plates and extending laterally outward from the column; and*

*bolt holes in the connecting members arranged to receive bolts to connect the prefabricated column assembly to a prefabricated beam assembly generally between the connecting members for erection of a building framework.*

*19. The column assembly of claim 18 wherein the connecting members are each welded to the outer surfaces of a respective one of said pair of gusset plates.*

*20. The column assembly of claim 18 wherein the bolt holes in the connecting members each have a bolt receiving axis that extends parallel to the length the column such that bolts received through the bolt holes extend parallel to the length of the column.*

*21. The column assembly of claim 20 wherein there are at least five bolt holes in each of the connecting members.*

*22. The column assembly of claim 18 wherein at least one of the connecting members comprises a horizontal plate member projecting laterally outward from its respective gusset plate.*

*23. The column assembly of claim 22 wherein said at least one of the connecting members further comprises a vertical plate member.*

*24. The column assembly of claim 18 wherein the gusset plates extend laterally outward from the column.*

*25. The column assembly of claim 24 wherein the gusset plates each extend laterally outwardly from the column on opposite sides of the column.*

*26. The column assembly of claim 18 wherein there are at least five bolt holes in at least one of the connecting members.*

*27. The column assembly of claim 18 further comprising bolt holes in said at least one of said pair of gusset plates.*

*28. The column assembly of claim 18 wherein each of the connecting members comprises a horizontal plate member projecting laterally outward from its respective gusset plate.*

*29. A joint connection structure of a building framework comprising:*

*a column assembly including a column having a length and a width, a pair of gusset plates connected to the column on opposite sides of the column, and first connecting members attached to respective ones of the*

*gusset plates, the first connecting members extending laterally outward from the column; and*

*a full-length beam assembly including a full-length beam having upper and lower flanges, and an end portion received between the first connecting members, and a second connecting member operatively attached to one of said flanges of the full-length beam, the second connecting member being bolted to at least one of the first connecting members to connect the full-length beam assembly to the column assembly.*

*30. The joint connection structure of claim 29 further comprising a third connecting member attached to the other of said flanges of the full-length beam, the third connecting member being bolted to the column assembly to connect the full-length beam assembly to the column assembly.*

*31. The joint connection structure of claim 30 wherein the second connecting member is attached to the upper flange of the full-length beam and the third connecting member is attached to the lower flange of the full-length beam.*

*32. The joint connection structure of claim 29 further comprising bolts and bolt holes in the first connecting members and bolt holes in the second connecting member, each bolt passing through the bolt hole in one of the first connecting members and one of the bolt holes in the second connecting member.*

*33. The joint connection structure of claim 32 wherein the first connecting members are welded to outer surfaces of respective ones of the gusset plates.*

*34. The joint connection structure of claim 33 wherein the second connecting member comprises a cover plate.*

*35. The joint connection structure of claim 29 wherein the first connecting members are welded to outer surfaces of respective ones of the gusset plates.*

* * * * *